US012233600B2

(12) United States Patent
Megretski et al.

(10) Patent No.: US 12,233,600 B2
(45) Date of Patent: Feb. 25, 2025

(54) BLADE ASSIST PART PEEL FOR ADDITIVE MANUFACTURING

(71) Applicant: Formlabs Inc., Somerville, MA (US)

(72) Inventors: Dmitri Megretski, Carlisle, MA (US); Benjamin FrantzDale, Harvard, MA (US); Jacob Sanchez, Cambridge, MA (US); Alec Rudd, Arlington, MA (US)

(73) Assignee: Formlabs Inc., Somerville, MA (US)

( * ) Notice: Subject to any disclaimer, the term of this patent is extended or adjusted under 35 U.S.C. 154(b) by 134 days.

(21) Appl. No.: 18/062,627

(22) Filed: Dec. 7, 2022

(65) Prior Publication Data

US 2023/0182390 A1 Jun. 15, 2023

Related U.S. Application Data

(60) Provisional application No. 63/265,182, filed on Dec. 9, 2021.

(51) Int. Cl.

| | |
|---|---|
| ***B29C 64/30*** | (2017.01) |
| ***B29C 64/264*** | (2017.01) |
| ***B33Y 40/00*** | (2020.01) |
| *B29C 64/124* | (2017.01) |
| *B29C 64/188* | (2017.01) |
| *B29C 64/223* | (2017.01) |
| *B29C 64/245* | (2017.01) |
| *B33Y 10/00* | (2015.01) |
| *B33Y 30/00* | (2015.01) |

(52) U.S. Cl.

CPC ............ *B29C 64/30* (2017.08); *B29C 64/264* (2017.08); *B33Y 40/00* (2014.12); *B29C 64/124* (2017.08); *B29C 64/188* (2017.08); *B29C 64/223* (2017.08); *B29C 64/245* (2017.08); *B33Y 10/00* (2014.12); *B33Y 30/00* (2014.12)

(58) Field of Classification Search

CPC ..... B29C 64/30; B29C 64/264; B29C 64/124; B29C 64/223; B29C 64/188; B29C 64/245; B33Y 40/00; B33Y 10/00; B33Y 30/00

USPC .......................................................... 264/308

See application file for complete search history.

(56) References Cited

U.S. PATENT DOCUMENTS

| | | | | |
|---|---|---|---|---|
| 5,447,822 A * | 9/1995 | Hull | ...................... | B33Y 10/00 430/269 |
| 2016/0046080 A1* | 2/2016 | Thomas | ................ | B29C 64/379 425/165 |
| 2019/0176393 A1* | 6/2019 | Broady | ................ | B29C 64/245 |

FOREIGN PATENT DOCUMENTS

CN 112537028 A * 3/2021

OTHER PUBLICATIONS

Ying et al., CN 112537028A, published Mar. 23, 2021, machine translation to English. (Year: 2021).*

* cited by examiner

*Primary Examiner* — Galen H Hauth
*Assistant Examiner* — Lawrence D. Hohenbrink, Jr.
(74) *Attorney, Agent, or Firm* — Honigman LLP

(57) ABSTRACT

A method includes curing a photopolymer resin disposed between a first build surface and a flexible film layer to form a print layer of a printed part. Here, the print layer of the printed part defines a second build surface attached to the flexible film layer. The method also includes translating a peeling mechanism between the second build surface and the flexible film layer to detach the flexible film layer from the second build surface.

20 Claims, 127 Drawing Sheets

BLADE ASSIST PART PEEL FOR ADDITIVE MANUFACTURING

CROSS REFERENCE TO RELATED APPLICATIONS

This application claims priority under 35 U.S.C. § 119(e) to U.S. Provisional Application 63/265,182, filed on Dec. 9, 2021. The disclosure of this prior application is considered part of the disclosure of this application and is hereby incorporated by reference in its entirety.

TECHNICAL FIELD

The present disclosure relates generally to systems and methods for a blade assist part peel for additive manufacturing.

BACKGROUND

Additive fabrication, e.g., 3-dimensional (3D) printing, provides techniques for fabricating objects, typically by causing portions of a building material to solidify at specific positions. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a build surface upon which the object is built.

In one approach to additive fabrication, known as stereolithography or inverted stereolithography, solid objects are created by successively forming thin layers of a curable polymer resin, typically first onto a build surface and then one on top of another. Exposure to actinic radiation cures a thin layer of liquid resin, which causes it to harden and adhere to previously cured layers and/or to a print substrate (i.e., film layer). As such, the adhesion between the previous formed layer of liquid resin and the print substrate must be separated before forming the next successive thin layer of liquid resin.

SUMMARY

One aspect of the disclosure provides a method that includes curing a photopolymer resin disposed between a first build surface and a flexible film layer to form a print layer of a printed part. Here, the print layer of the printed part defines a second build surface attached to the flexible film layer. The method also includes a peeling mechanism between the second build surface and the flexible film layer to detach the flexible film layer from the second build surface.

Implementations of the disclosure may include one or more of the following optional features. In some implementations, the method further includes inducing a peel front between the second build surface and the flexible film layer. Here, translating the peeling mechanism between the second build surface and the flexible film layer may include translating the peeling mechanism along the peel front. In these implementations, before inducing the peel front between the second build surface and the flexible film layer, the method may further include separating the flexible film layer from a substrate by a poke actuation applied to a bottom side of the flexible film layer. In some examples, before inducing the peel front between the second build surface and the flexible film layer, the method further includes separating the flexible film layer and a substrate by forced air applied to a bottom side of the flexible film layer. Optionally, before inducing the peel front between the second build surface and the flexible film layer, the method may further include separating the flexible film layer and a substrate by applying a parallel force to the flexible film layer.

In some implementations, the method further includes flattening the flexible film layer on a substrate by applying a vacuum to a bottom side of the flexible film layer. In some examples, the method further includes flattening the flexible film layer on a substrate by applying tension to opposite ends of the flexible film layer. The method may further include operating the peeling mechanism from a first peel position on a first side of the printed part to a second peel position on a second side of the printed part. In other examples, after curing the photopolymer resin disposed between the first build surface and the flexible film layer to form the print layer of the printed part photopolymer resin at a first distance from the printed part includes a first temperature and photopolymer resin at a second distance from the printed part includes a second temperature. Optionally, the method may further include moving the printed part from a first part position to a second part position to induce an oblique peel angle between the print layer and the flexible film layer. Translating the peeling mechanism between the second build surface and the flexible film layer to detach the flexible film layer from the second build surface may reoxygenate the flexible film layer.

Another aspect of the disclosure provides a system that includes a substrate and a flexible film layer disposed upon the substrate. The system also includes a build surface facing the flexible film layer and operable between a first build surface position a first distance from the substrate and a second build surface position a second distance from the substrate. The system also includes a peel mechanism contacting the flexible film layer and operable to translate along the flexible film layer between the build surface and the substrate.

Implementations of the disclosure may include one or more of the following optional features. In some implementations, the peel mechanism includes a first peel mechanism on a first side of the flexible film layer and a second peel mechanism on an opposite second side of the flexible film layer. The peel mechanism may include a vacuum nozzle disposed on a bottom side of the flexible film layer. In some examples, the system further includes data processing hardware in communication with the peel mechanism and controlling a translation of the peel mechanism.

The build surface may be defined by a printed part affixed to a build platform. Here, the build platform may be configured to move the build surface between the first build surface position and the second build surface position. In some implementations, the system further includes a curing light located beneath the flexible film layer. The curing light is configured to cure a liquid resin disposed between the flexible film layer and the build surface. In these implementations, curing the liquid resin disposed between the flexible film layer and the build surface may attach the build surface to the flexible film layer. Optionally, the peel mechanism may be configured to detach the flexible film layer from the build surface by translating between the build surface and the substrate when the build surface is in the second build surface position.

The details of one or more implementations of the disclosure are set forth in the accompanying drawings and the description below. Other aspects, features, and advantages will be apparent from the description and drawings, and from the claims.

BRIEF DESCRIPTION OF DRAWINGS

Various aspects and examples will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

Like reference symbols in the various drawings indicate like elements.

DETAILED DESCRIPTION

Figure 1A:
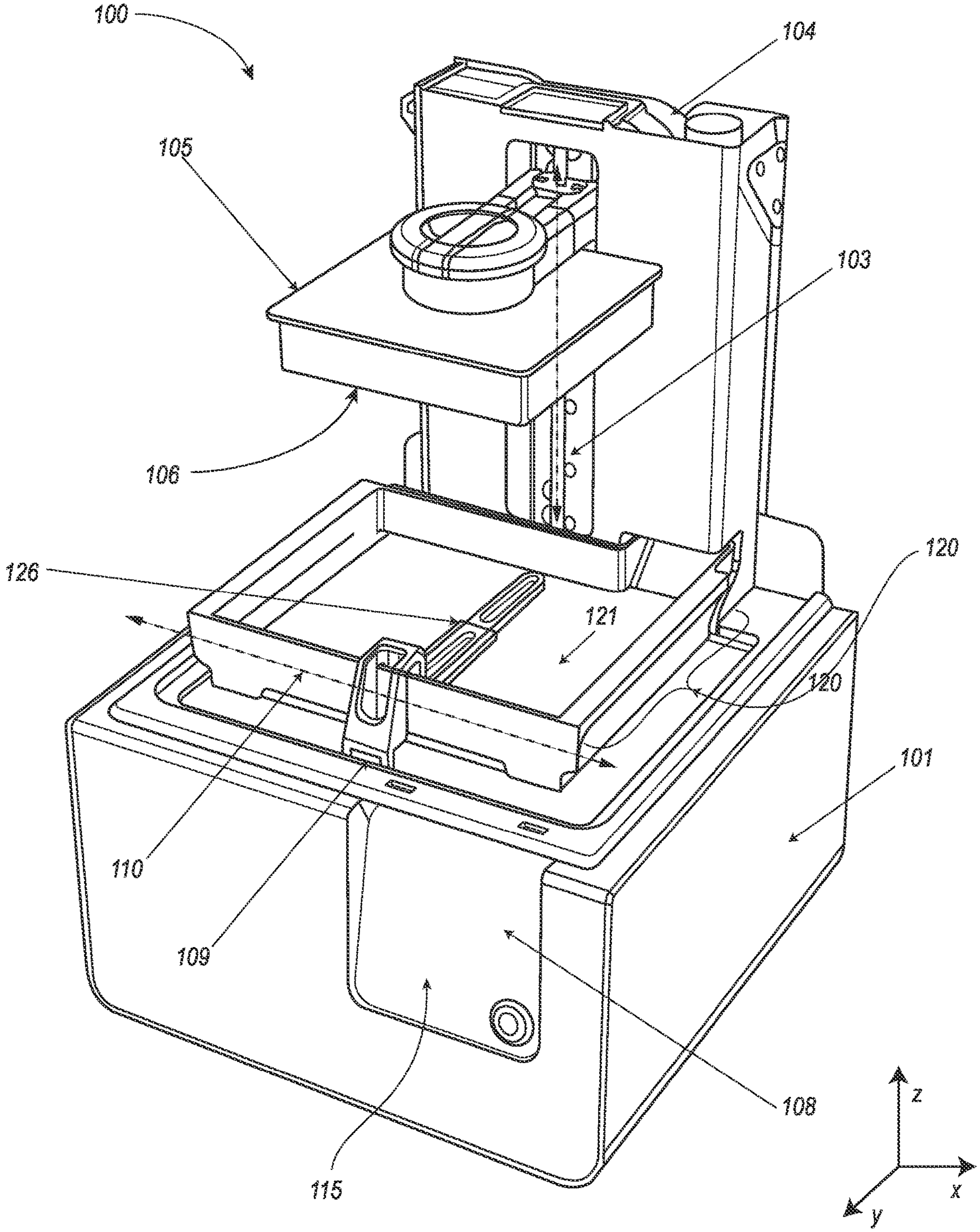
FIG. 1A depicts an illustrative stereolithographic additive fabrication device, according to some examples.

In additive fabrication, irrespective of the particular mechanism by which layers of material are formed, the material is usually formed on some kind of surface usually referred to as a build surface. The build surface is typically part of a component of the additive fabrication device referred to as a build platform. The build platform may, in some additive fabrication devices, be configured to move within the fabrication device so that material can be deposited at an appropriate position on the build surface. For instance, build platforms are frequently configured to move in a vertical direction between the formation of each layer so that a new layer may be formed on top of a previously-formed layer.

Typically in additive fabrication (e.g., inverted stereolithographic three-dimensional (3D) printing), the build platform moves in a vertical direction to lower into a resin basin that includes liquid resin. The resin basin that includes the liquid resin includes a bottom film layer. The basin may be disposed above a curing light that exposes the liquid resin disposed between the film layer and the build platform (or previously-formed layer) causing the liquid resin to cure on the bottom of the build platform and adhere to the film layer. Thereafter, the fabrication device separates the newly cured resin layer adhered to the film layer by raising the build platform to a second vertical position, allowing more liquid resin to flow into to the space disposed between the bottom of the build platform and the film layer. The fabrication device iteratively repeats the process described above for each layer of a printed part until the printed part is complete.

Inverted stereolithographic 3D printing requires a separation of the previously-formed layer of cured material from the film layer. The forces resisting this separation are both chemical (e.g., if the material has cured to the film layer and formed a chemical bond) and fluidic (e.g., from the inrush of viscous fluid into the widening gap beneath the part) and generally scales with the characteristic area of the previously-formed layer being separated. This process of separation may be similar to more common separations of adhesive interfaces, for example, the removal of common adhesive tape from a surface.

In some current implementations, the bottom film layer of the basin is a rigid film layer (i.e., not flexible). Accordingly, the fabrication device must exert a high amount of force to separate the entire cured resin layer of a printed part that is adhered to the rigid film layer for each printed layer. The high amount of force is transferred to the printed part reduce print quality of the printed part. In some examples, the bottom film layer includes a flexible film layer instead of the rigid film layer to reduce the amount of force required to separate the cured resin that is adhered to the flexible film layer. In these examples, the flexible film layer is "peeled" away from the cured resin such that only a portion of the cured resin is separated at a time (i.e., localizing the peel).

As such, peeling only the portion of the cured resin layer reduces the amount of force required as compared to the rigid film layer. However, in these examples, the flexible film layer is peeled with a relatively small angle between the cured resin layer of the printed part and the flexible film layer. Accordingly, the small angle exerts substantial and variable forces on the printed part by peeling a significant portion of the flexible film layer at a given time. The high forces required to separate the rigid film layer and flexible film layer (e.g., using a small peel angle) may result in reduced quality of printed parts and reduced longevity of the film layer. Moreover, forces that vary with part geometry have been shown to cause visible artifacts in printed parts.

Implementations herein are directed toward systems and methods of separating the film layer and the previously-formed layer by increasing the peel angle between the film layer and the previously-formed layer across a print area. Increasing the peel angle minimizes the overall force required to separate the cured resin layer of the printed part and the film layer by localizing the peel area. Moreover, increasing the peel angle reduces the variability of force on part geometry of the printed part, thereby improving print performance and reducing the risk of damage to the print substrate.

Following below are more detailed descriptions of various concepts related to, and implementations of, techniques for peeling a flexible film layer from a newly cured layer of a printed part. It should be appreciated that various aspects described herein may be implemented in any of numerous ways. Examples of specific implementations are provided herein for illustrative purposes only. In addition, the various aspects described in the implementations below may be used alone or in any combination, and are not limited to the combinations explicitly described herein. In particular, while the following describes implementations in which one or more components may be located within a basin, it may be appreciated that the one or more components may be located within an additive fabrication device in proximity to the basin and the same results achieved.

Figure 1B:
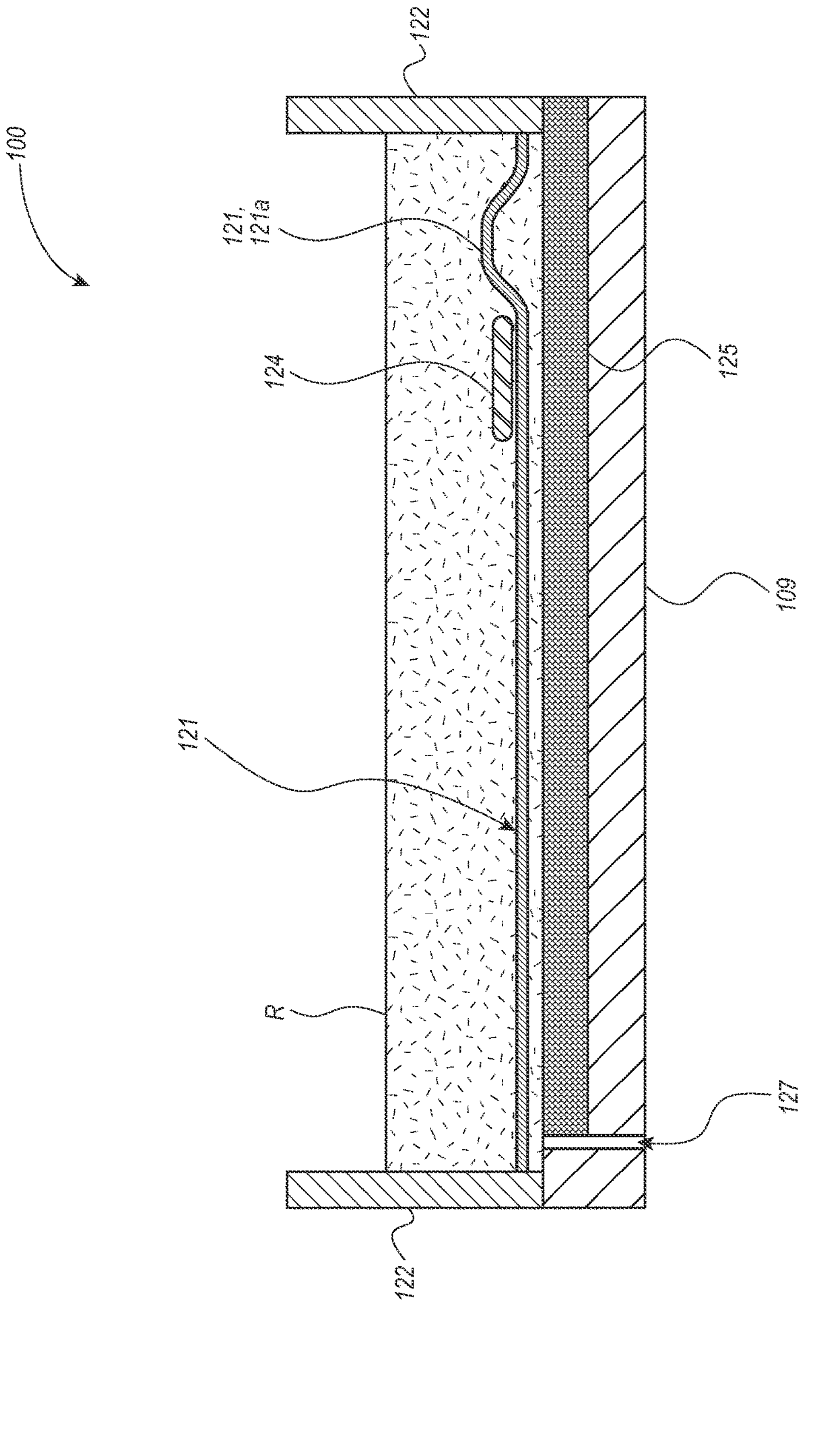
FIG. 1B depicts a cross-sectional schematic view a basin of the additive fabrication device of FIG. 1A, according to some examples.

FIGS. 1A and 1B depict an illustrative additive fabrication device comprising a basin configured as per any of the implementations discussed below. In some implementations, an illustrative stereolithographic printer 100 includes a support base 101, a display and control panel 108, and a reservoir and dispensing system 104 for storage and dispensing of photopolymer resin. The support base 101 may contain various mechanical, optical, electrical, and electronic components that may be operable to fabricate objects using the system. During operation, photopolymer resin (i.e., liquid resin) may be dispensed from the dispensing system 104 into a resin basin (i.e., basin) 120. The control panel 108 may include data processing hardware 115 in communication with the control panel 108. The data processing hardware 115 may be in communication with each component of the stereolithographic printer 100. Moreover, a user may provide instructions to the data processing hardware 115 to execute operations on the stereolithographic printer 100 by interacting with the control panel 108.

The build platform 105 may be positioned along a vertical axis 103 (oriented along the z-axis direction as shown in FIGS. 1A-B) such that the downward-facing layer (lowest z-axis position) of an object being fabricated, or the downward-facing layer of the build platform 105 itself, is a desired distance along the z-axis from the bottom 121 of the basin 120. The desired distance may be selected based on a desired thickness of a layer of solid material to be produced on the build platform 105 or onto a previously formed layer of the object being fabricated. In the example of FIGS. 1A and 1B, a first build surface 106 is defined on the bottom of the build platform 105 and faces in the −z direction, towards the basin 120. The build platform 105 may be removable from the stereolithographic printer 100. For instance, the build platform 105 may be attached to an arm (e.g., pressure fit or fastened onto) and may be removed from the printer so that a part attached to the build surface 106 of the platform can be removed.

In the example of FIGS. 1A and 1B, the bottom 121 of the basin 120 may be transparent to actinic radiation that is generated by a radiation source (not shown) located within the support base 101, such that liquid photopolymer resin located between the bottom 121 of basin 120 and the bottom facing portion of build platform 105 or an object being fabricated thereon, may be exposed to the radiation. Upon exposure to such actinic radiation, the liquid photopolymer resin may undergo a chemical reaction, sometimes referred to as "curing," that substantially solidifies and attaches the exposed resin to the downward-facing portion of build platform 105 or to an object being fabricated thereon. FIGS. 1A and 1B represent a configuration of the stereolithographic printer 100 prior to formation of any layers of an object on build platform 105, and for clarity also omits any liquid photopolymer resin from being shown within the depicted basin 120.

Following the curing of a layer of material, build platform 105 may be moved along the vertical axis of motion 103 in order to reposition the build platform 105 for the formation of a new layer and/or to impose separation forces upon any bond with the bottom 121 of basin 120. In addition, the basin 120 is mounted onto the support base such that the stereolithographic printer 100 may move the basin along horizontal axis of motion 110, the motion thereby advantageously introducing additional separation forces in at least some cases. The basin 120 may include a wiper 126 that is additionally provided, capable of motion along the horizontal axis of motion 110 and may be removably coupled or otherwise mounted onto the support base at 109.

FIG. 1B illustrates a schematic cross sectional view of the basin 120 in FIG. 1A. The basin may include a flexible film layer 121. The flexible film layer 121 is coupled to side walls 122 positioned at each end of the basin 120 to allow liquid resin R to be disposed within the basin 120. The basin 120 also includes a blade 124 operable to move from a first end of the basin 120 to a second end of the basin 120. In some examples, the blade 124 extends across the entire width of the flexible film layer 121. Alternatively, the blade 124 may extend across a portion of the width of the flexible film layer 121. Optionally, the data processing hardware 115 may instruct the operation of the blade 124. In some implementations the flexible film layer 121 forms a hard stop loop 121, 121*a* at one end of the basin 200. Optionally, the flexible film layer 121 includes the hard stop loop 121*a* to restrict the blade 124 from reaching the side wall 122. The basin 120 may also include a print substrate 125. The platform 109 provides structural support at the bottom of the basin 120 and is coupled to the side walls 122 at each end of the basin 120. In some examples, the basin 120 includes one or more air inlets 127. The air inlets 127 are configured to allow forced air into the basin 120 or allow a vacuum to draw air from the basin 120. The term "vacuum" as used in this application refers to a lower pressure region compared to a surrounding region. The term "pulling vacuum" refers to a process of depressurizing a region. For example, the air inlets 127 can depressurize the region between the flexible film layer 121 and the print substrate 125 such that the pressure in this region is lower than the atmospheric pressure. In some examples, the flexible film layer 121 is tensioned over the print substrate 125. The air inlets 127 are configured to allowed forced air into the basin 120 to inflate the flexible film layer 121 (e.g., increasing the pressure between the flexible film layer 121 and the print substrate 125), and the tension of the flexible film layer 121 will cause the flexible film layer 121 to return to its initial position (e.g., laminated over the print substrate 125) when the forced air stops (e.g., without actively depressurizing the region (e.g., evacuating air from) between the flexible film layer 121 and the print substrate 125). According to some implementations, the basin 200, 300, 400, 500, 600, 700, 800, 900, 1000, 1100, 1200, 1300, and 1400, as shown in FIGS. 2-14, respectively, may be employed in system 100 as the basin 120.

Figure 2A:
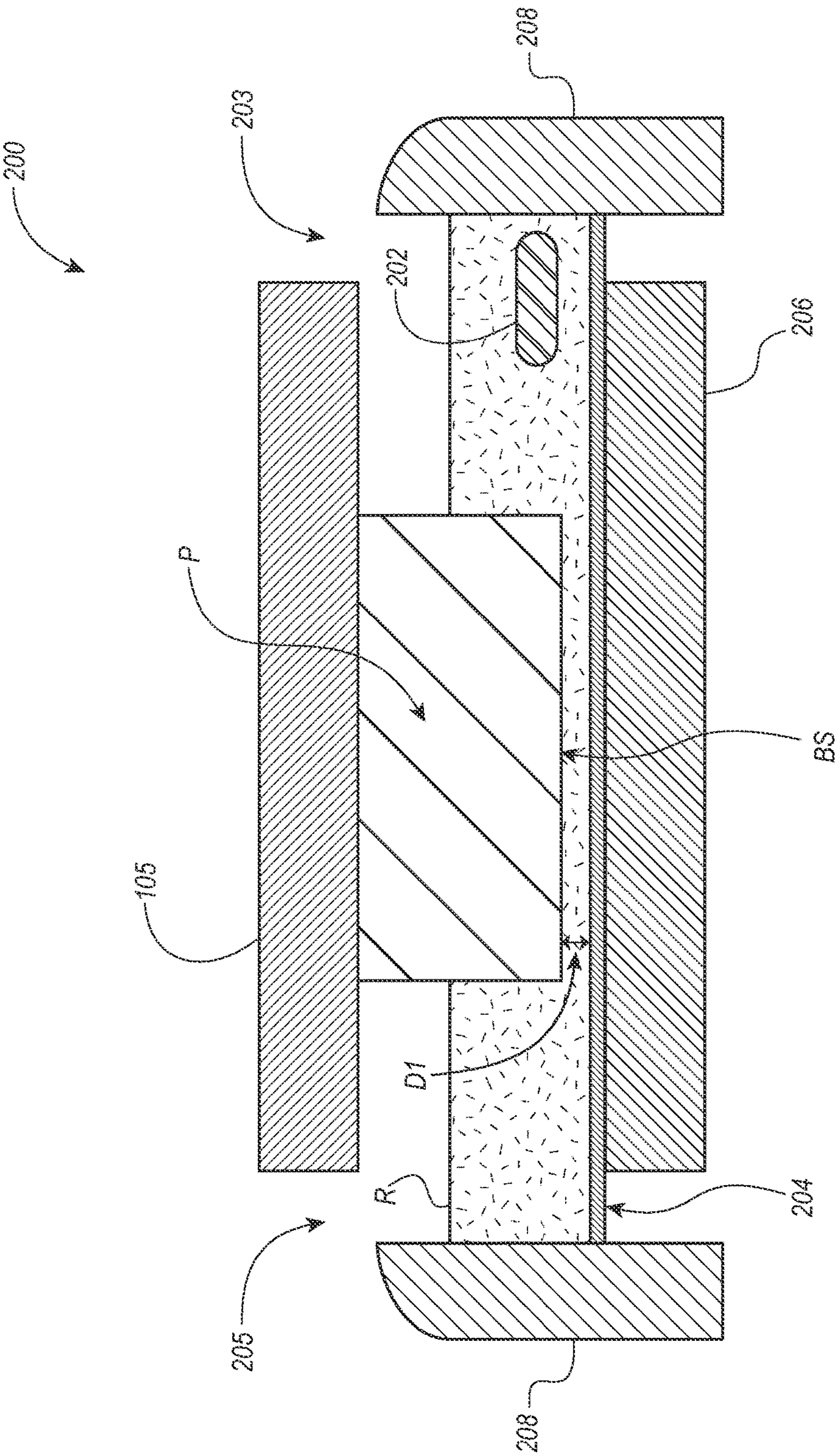
FIGS. 2A-2K illustrate cross-sectional schematic views of an example basin in which the peeling mechanism includes a blade, according to some examples.
Figure 2B:
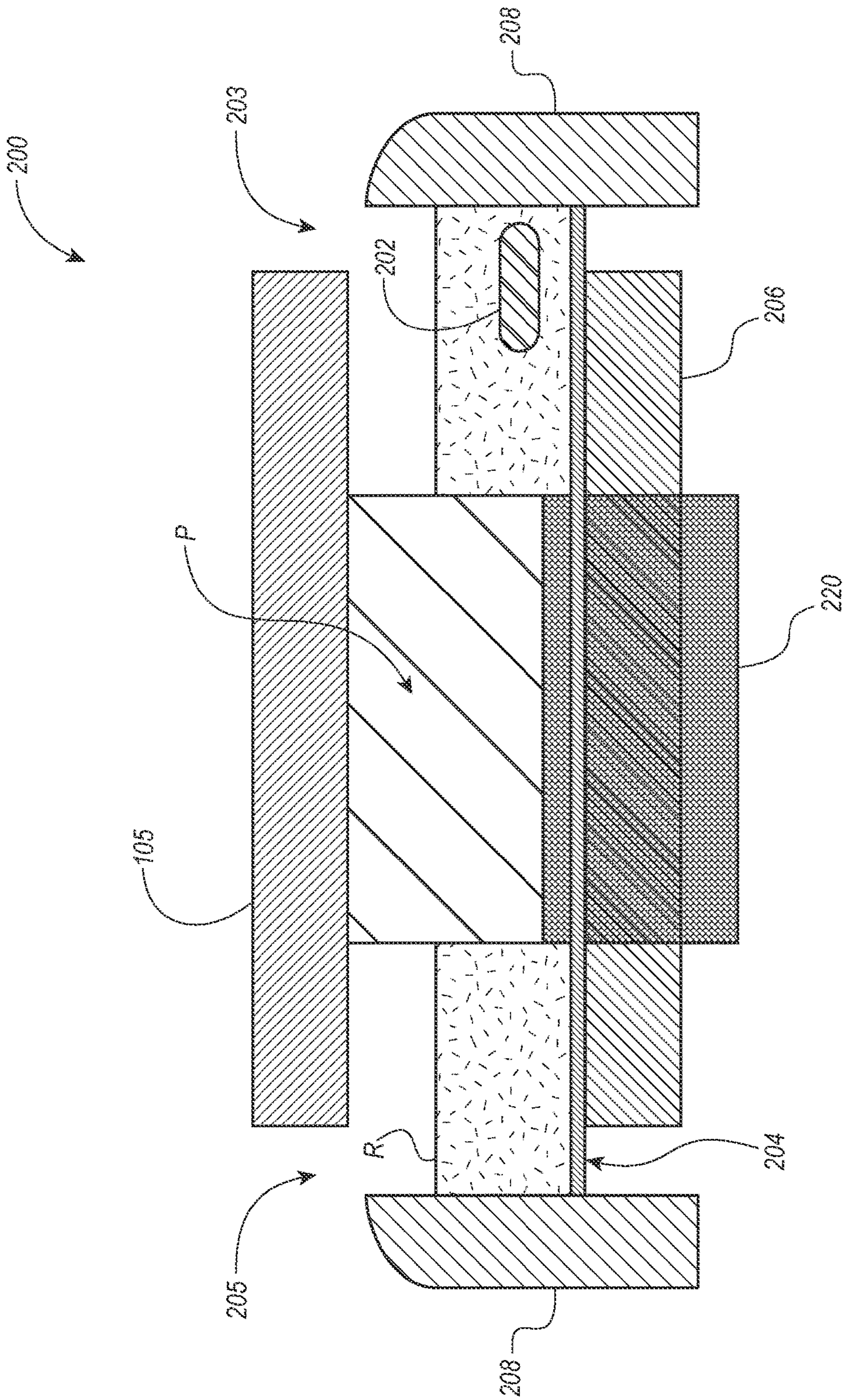

FIGS. 2A-2K illustrate cross-sectional schematic views of an example basin 200 in which the peeling mechanism includes a blade, according to some examples. In the example of FIGS. 2A-2K, the basin 200 includes a blade 202, a flexible film layer 204, a print substrate 206, side walls 208, and liquid resin R. The basin 200 also includes a first end 203 and a second end 205. The side walls 208 are coupled to the flexible film layer 204 at the first end 203 and the second end 205 of the basin 200, respectively, to allow the liquid resin R to be disposed within the basin 200. The print substrate 206 may be a glass material that focuses a curing light 220 towards the printed part P. That is, the print substrate 206 may act as a window for the curing light 220 (FIG. 2B). In each of FIGS. 2A-2K, the build platform 105 includes a printed part P affixed to the build platform 105 interacting with the basin 200.

As discussed above, the platform 105 may include a first build surface 106 upon which an initial layer L of the part P is formed by curing a thickness of the photopolymer resin. However, upon formation of the initial layer L of the part P on the build surface 106 of the platform 105, each layer L defines a new build surface BS (i.e., second build surface) upon which a subsequent layer L of the part P can be formed by curing the photopolymer resin R. In other words, the platform 105 defines an initial build surface 106 for curing an initial layer or base layer of the part P and each new layer L defines a build surface upon which a subsequent layer L is formed.

In some examples, the blade 202 includes significant thermal properties including heat-sink features (e.g., fins). In some examples, the blade 202 may include a phase-change heat pipe. In some implementations, the blade 202 may include resistive heating and/or a thermistor. In some examples, the blade 202 may be ferrous and a target of inductive heating through the basin 200 from a heat source located beneath the basin 200. The thickness of the blade 202 may be very thin, thereby reducing requirements for the basin 200 to be completely surrounded by side walls 208. That is, if the thickness of the blade 202 is relatively large, the blade 202 will displace a larger amount of liquid resin R while operating in the basin 200. Thus, the large displacement of liquid resin R necessitates the need for the basin 200 to have side walls 208 that completely surround the basin 200 to constrain the liquid resin R.

In some examples, the blade 202 includes recoating features configured to distribute a thin layer of the liquid resin R along the bottom side of the printed part P after the part is separated from the flexible film layer 204. Thus, the recoating features of the blade 202 ensure that the bottom side of the printed part P are evenly covered by the liquid resin R prior to a subsequent curing step. Incorporating recoating features into the blade 202 allows for low-depth liquid resin R printing. Optionally, the blade 202 may also include features for minimizing surface energy, such as coatings and/or surface textures that provide the blade 202 with a low surface energy to prevent the liquid resin R from collecting onto the blade 202 during low-depth liquid resin R printing.

FIG. 2A illustrates an example of the basin 200 wherein data processing hardware 115 instructs the build platform 105 to position the printed part P at a first vertical position in the basin 200. At the first vertical position, the bottom surface of the printed part P is positioned a first distance D1 from the flexible film layer 204 corresponding one layer thickness. As used herein the first distance D1 is configurable to any distance such that the bottom surface of the printed part P may be positioned at any distance from the flexible film layer. As such, increasing the first distance D1 of the printed part from the flexible film layer thereby increases the thickness of the print layer L. The one layer thickness refers to the depth of liquid resin R disposed between the printed part P and the flexible film layer 204 for forming a single printed layer L on the bottom surface of the printed part P. Moreover, the blade 202 is located at a first position at the first end 203 of the basin 200.

FIG. 2B illustrates an example of the basin 200 wherein a curing light 220 exposes the liquid resin R disposed between the printed part P and the flexible film layer 204. As used herein (i.e., for all implementations), the term curing light may also interchangeably refer to an actinic radiation source. The actinic radiation source may produce electromagnetic radiation thereby producing photochemical reactions to solidify the liquid resin R disposed between the printed part P and the flexible film layer 204. The curing light 220 cures the liquid resin R from the bottom side of the basin 200 through the print substrate 206 and the flexible film layer 204, creating a new print layer L of the printed part P. The curing light 220 may be provided by any light source known by those skilled in the art of SLA printing.

Figure 2C:
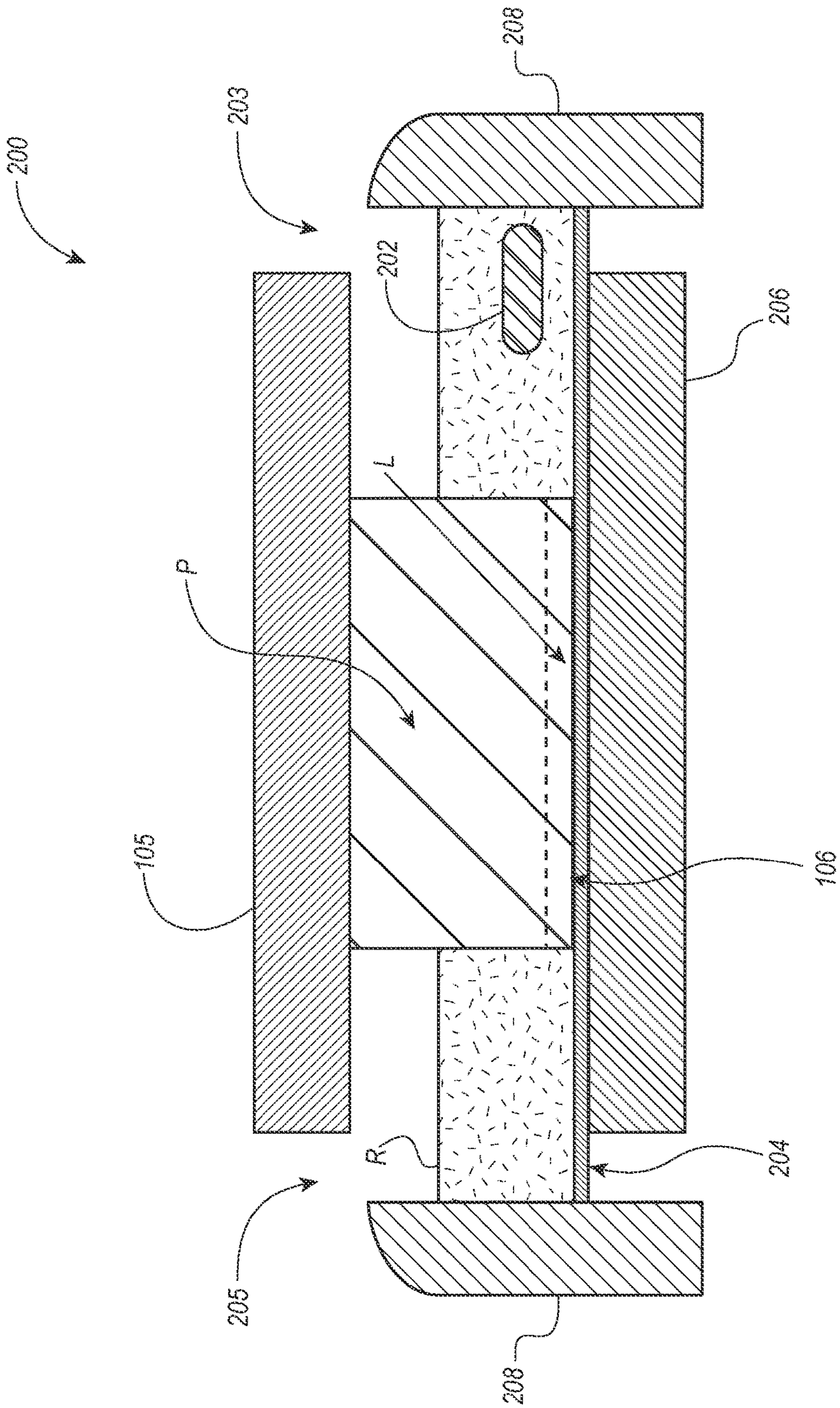
Figure 2D:
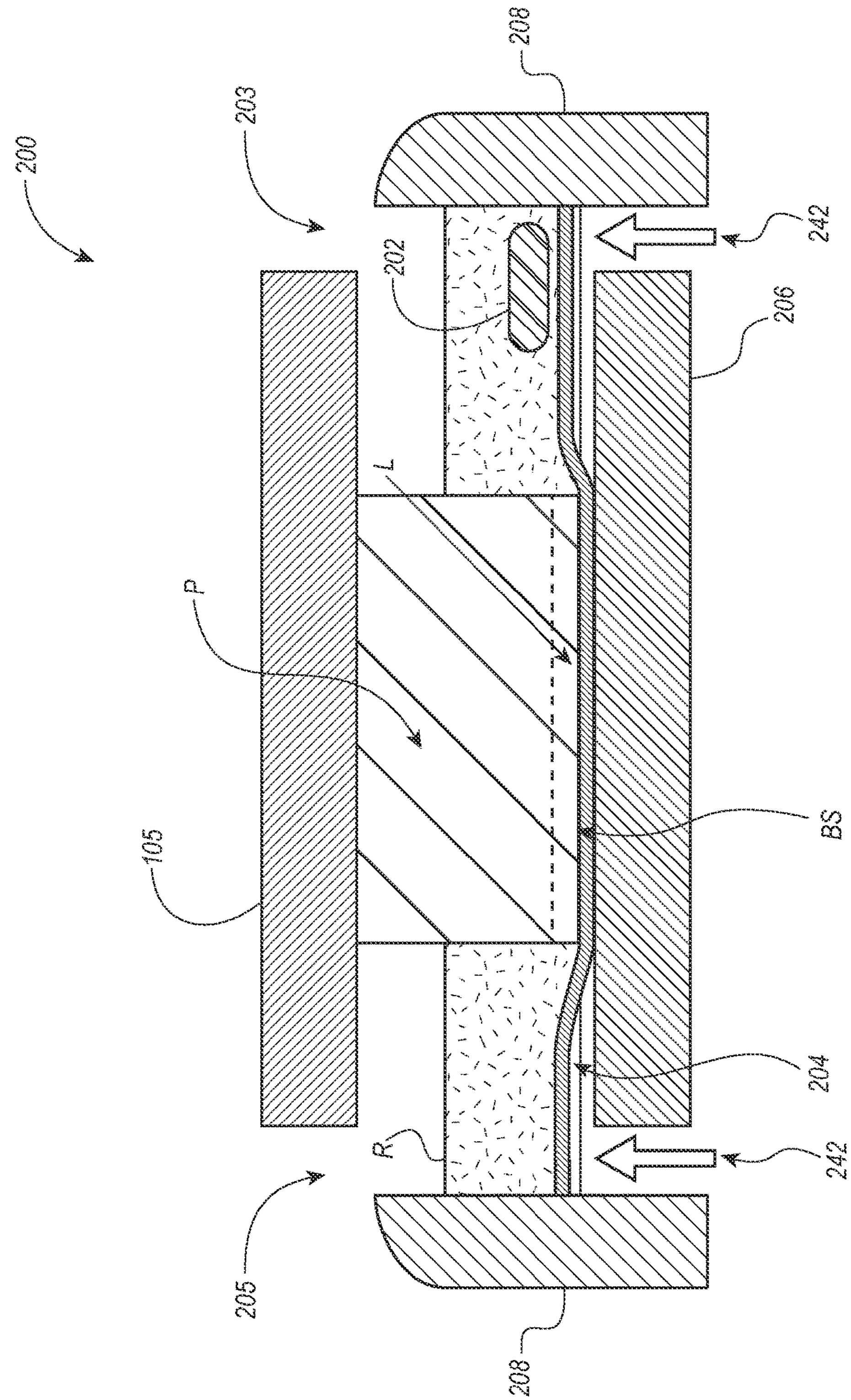
Figure 2E:
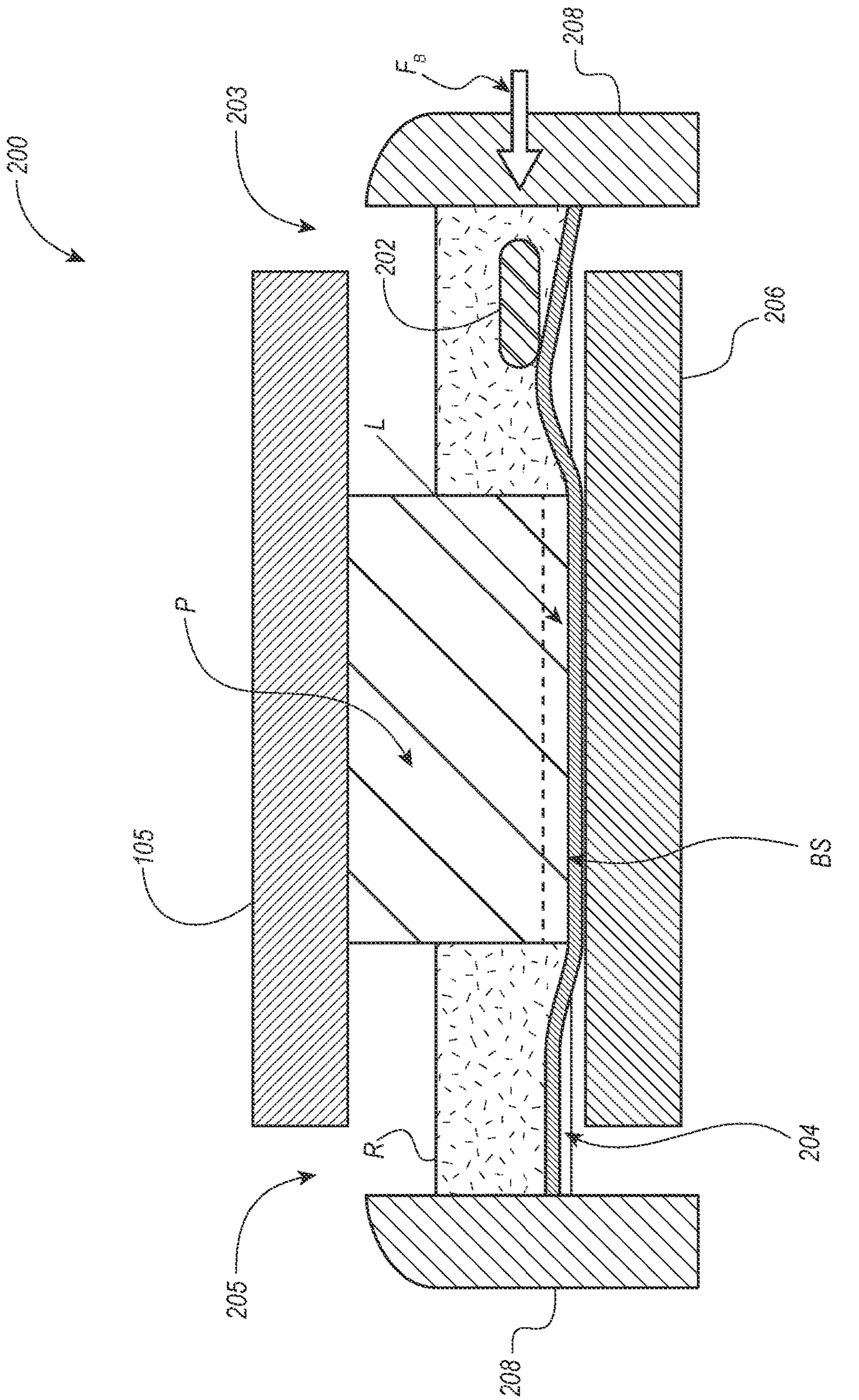
Figure 2F:
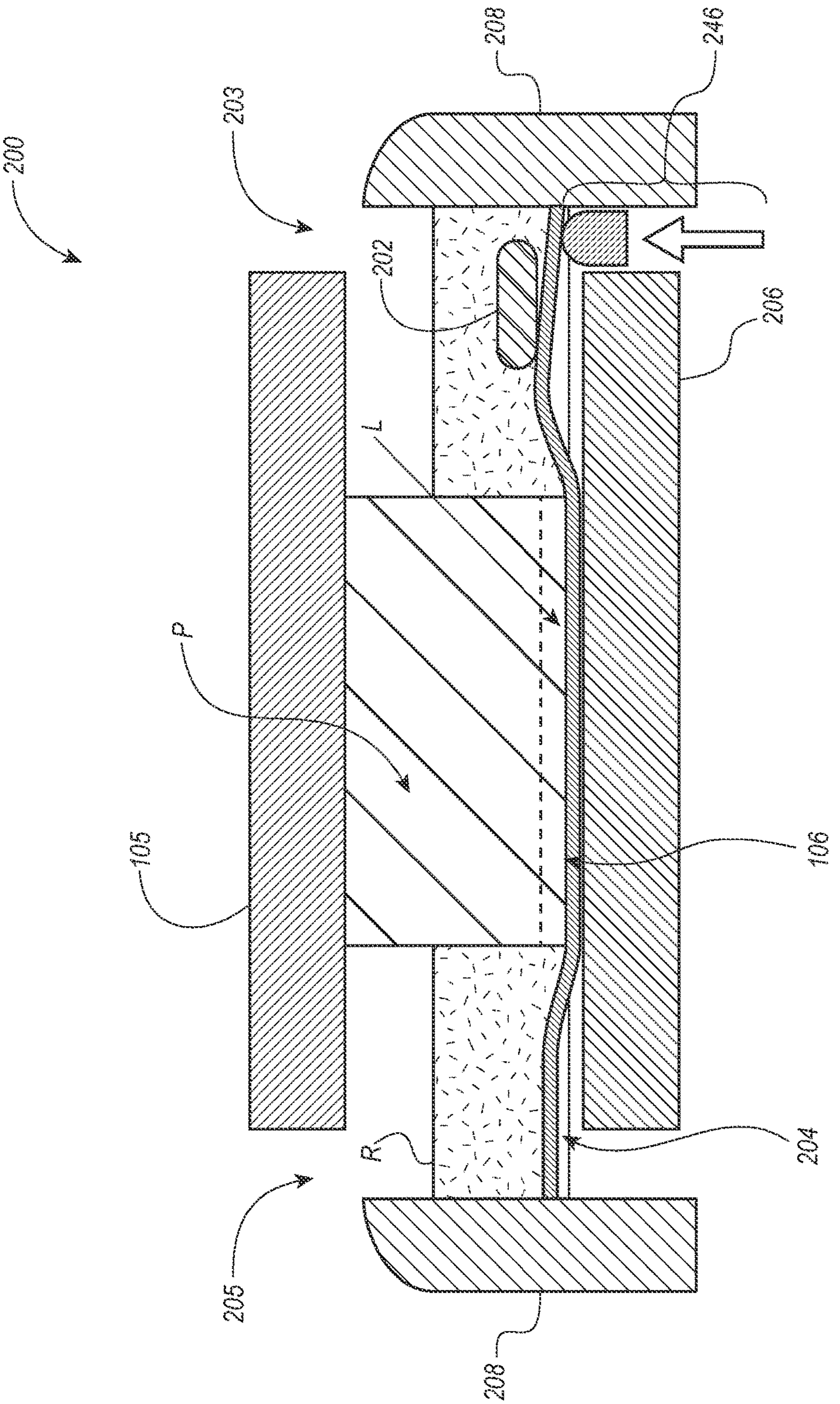

FIG. 2C illustrates an example of the basin 200 wherein the liquid resin R disposed between the printed part P and the flexible film layer 204 is cured to form a new print layer L (i.e., second build surface). That is, the curing light 220 (FIG. 2B) solidifies the liquid resin R onto the bottom surface of the printed part P to form the new print layer L of the printed part P. Notably, the printed part P in FIG. 2C is larger than the printed part P in FIG. 2B by the size of the new print layer L. The new print layer L of the printed part P adheres to the flexible film layer 204 such that a force must be applied to separate new print layer L and the flexible film layer 204. Moreover, Stefan forces exist between the flexible film layer 204 and the print substrate 206. As used herein the term Stefan forces may also include any fluid forces and/or vacuum forces between the flexible film layer and the print substrate. That is, the Stefan force between the flexible film layer 204 and the print substrate 206 prevent the printed part P from being lifted in the vertical direction away from the print substrate 206. The Stefan force between the flexible film layer 204 and the print substrate 206 may be the result of a chemical bond and/or a fluidic bond from the inrush of viscous fluid (i.e., liquid resin R) into the widening gap beneath the printed part P. FIGS. 2D-2F illustrate various implementations to overcome the Stefan force between the flexible film layer 204 and the print substrate 206. In particular, each example of FIGS. 2D-2F may be used independently of the other implementations of this disclosure, or in conjunction with the other implementations, to overcome the Stefan force.

FIG. 2D illustrates example configuration for overcoming the Stefan force between the print substrate 206 and the flexible film layer 204. Here, forced air 242 is provided to the bottom side of the flexible film layer 204 at the first end 203 of the basin 200 and the second end 205 of the basin 200. As such, the forced air 242 provided to the bottom of the flexible film layer 204 overcomes the Stefan force adhering the print substrate 206 to the flexible film layer 204 such that the flexible film layer 204 separates from the corners of the print substrate 206.

FIG. 2E illustrates another example for overcoming the Stefan force between the print substrate 206 and the flexible film layer 204. In this example, a horizontal buckling force $F_B$ may be applied to the side wall 208 of the basin 200 to "buckle" the flexible film layer 204. The buckling of the flexible film layer 204 causes the flexible film layer 204 to overcome the Stefan force between the print substrate 206 and the flexible film layer 204. In some examples, the horizontal buckling force $F_B$ is applied directly to the side wall 208 to create the buckle motion of the flexible film layer 204. Alternatively, the horizontal force $F_B$ may be applied directly to the flexible film layer 204 rather than to the side wall 208. In the example shown, the horizontal buckling force $F_B$ is only applied at the first end 203 of the basin, however, it is understood that the horizontal buckling force $F_B$ may be applied additionally and/or alternatively to the second end 205 of the basin 200.

FIG. 2F illustrates another example configuration for overcoming the Stefan force between the flexible film layer 204 and the print substrate 206. Here, a poke actuation 246 may be applied to the bottom side of the flexible film layer 204. The poke actuation 246 applies a force to the flexible film layer 204 that overcomes the Stefan force between the flexible film layer 204 and the print substrate 206. The poke actuation 246 may be provided by a mechanical actuator or by any other actuator mechanism. In the example shown, the poke actuation 246 is only applied at the first end 203 of the basin, however, it is understood that the poke actuation 246 may be applied additionally and/or alternatively to the second end 205 of the basin 200.

Figure 2G:
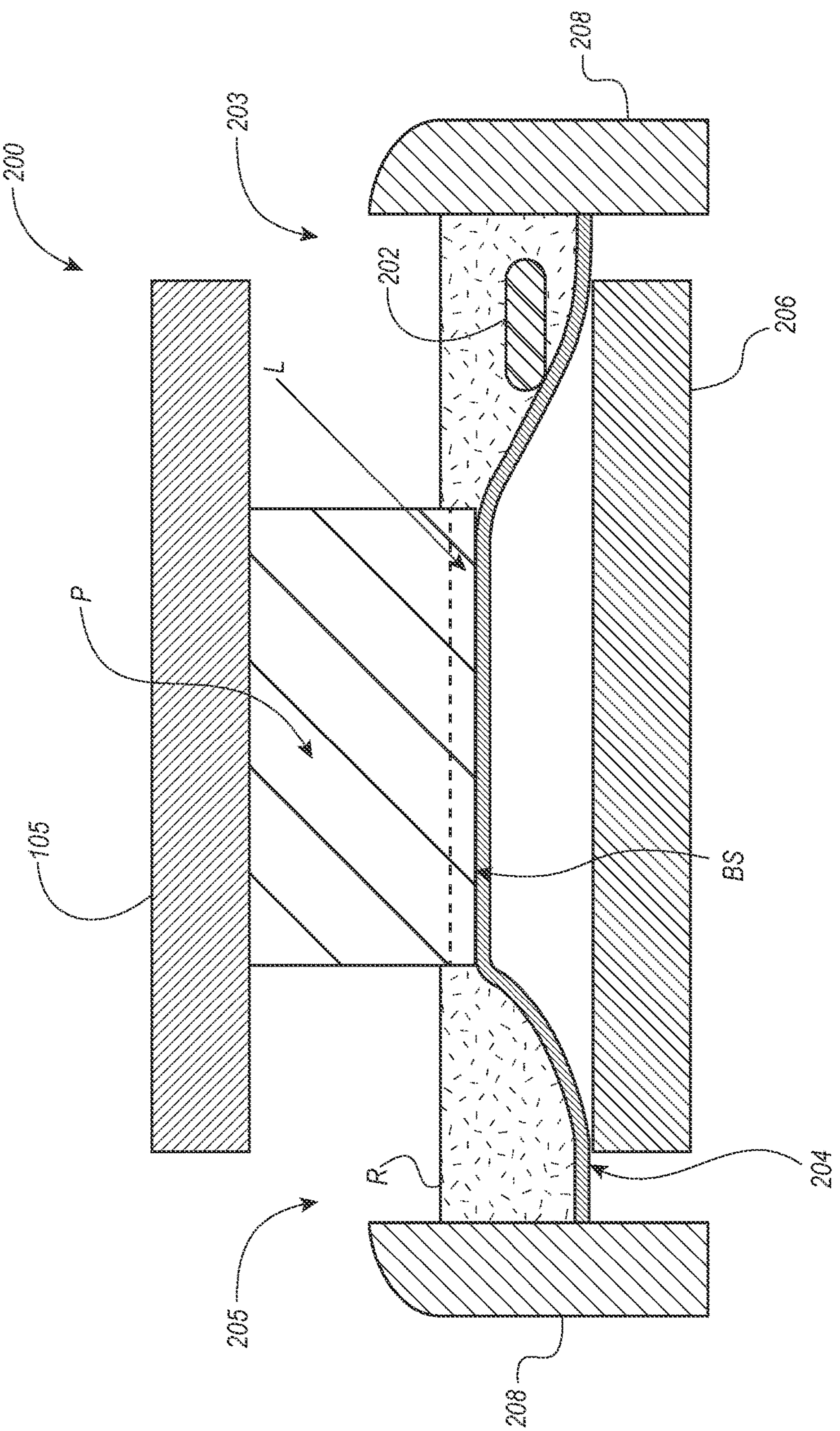

FIG. 2G, illustrates an example of the basin 200 wherein the flexible film layer 204, is lifted from the print substrate 206 by the data processing hardware 115 instructing the build platform 105 to move in the vertical direction away from the print substrate 206. Here, the printed part P affixed to the build platform 105 and the flexible film layer 204 adhered to the printed part P are lifted in the vertical direction away from the print substrate 206. That is, now that the flexible film layer 204 has overcome (or partially overcome) the Stefan force between the flexible film layer 204 and the print substrate 206, the flexible film layer 204 may be lifted by the build platform 105 to separate from the print substrate 206. Moving the build platform 105, and thus the printed part P, allows sufficient room for the blade 202 to operate between the bottom surface of the printed part P and the print substrate 206.

Figure 2H:
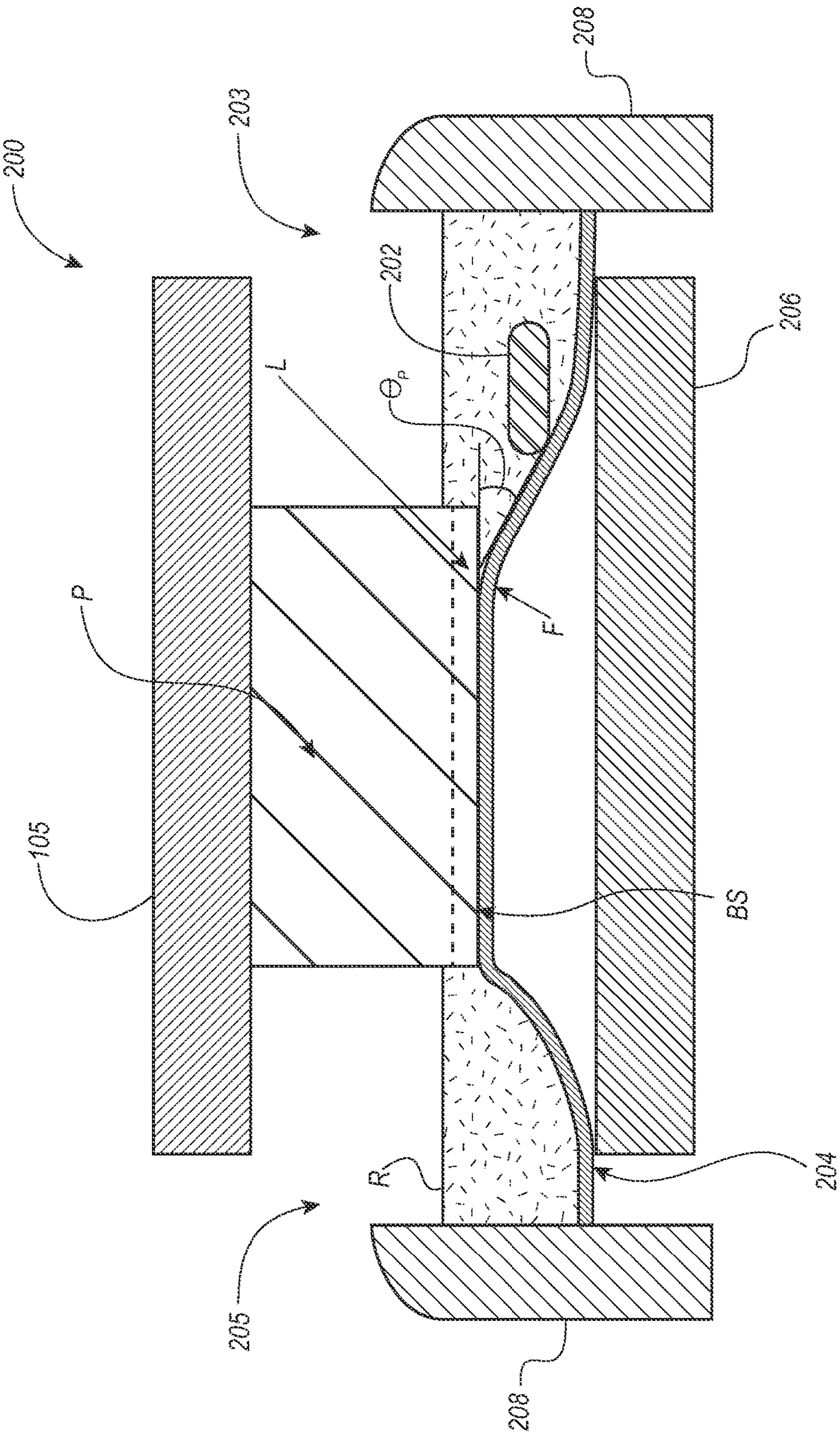

FIG. 2H illustrates an example of the basin 200 wherein the blade 202 translates from the first position (FIGS. 2A-2G) to a second position. As the blade 202 (i.e., peeling mechanism) translates from the first position to the second position, a leading edge of the blade 202 contacts the top surface of the flexible film layer 204, thereby inducing a peel front F. As used herein, the term "peel front" refers to the section of flexible film layer 204 actively "peeling" from the printed part P when the blade 202 (or similar mechanism in other implementations) is at a given position. The exact curvature of the flexible film layer 204 depends on several factors including, but not limited to, geometry of the printed part P, geometric relationship between the blade 202 and the printed part P, and the stiffness, or other characteristics, of the flexible film layer 204. Operating the blade 202 from the first position to the second position creates a separation force to separate the new layer L (i.e., second build surface) of the printed part P from the flexible film layer 204. Notably, the blade 202 induces a high peel angle $\theta_P$ (i.e., angle between the new print layer L of the printed part P and the flexible film layer 204) while operating from the first position to the second position. The high peel angle $\theta_P$ reduces the force applied to the printed part P (e.g., by localizing the peel front F), providing improved print quality of the printed part P.

Figure 2I:
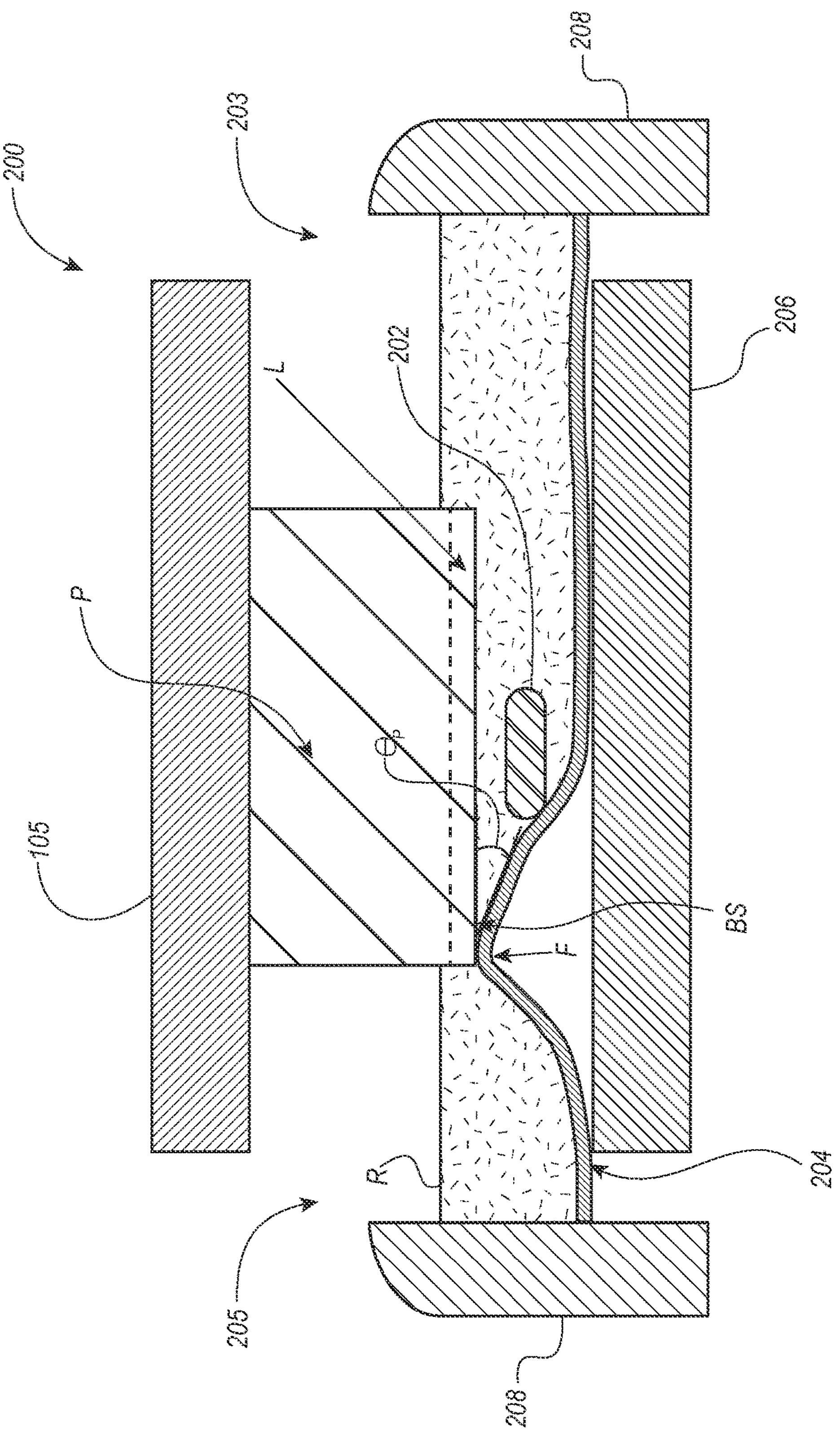

FIG. 2I illustrates an example of the basin 200 wherein the blade 202 translates from the second position (FIG. 2H) to a third position. As the blade 202 translates from the second position to the third position, the leading edge of the blade 202 remains in contact with the flexible film layer 204. As such, the contact between blade 202 and the flexible film layer 204 induces a peeling force that peels the flexible film layer 204 from the printed part P. Translating the blade 202 from the second position to the third position continues creating the separation force to separate the new layer of the printed part P from the flexible film layer 204. Notably, the blade 202 induces a high peel angle $\theta_P$ while operating from the second position to the third position. In some examples, the blade 202 induces the peeling force that peels the flexible film layer 204 from the printed part P when the blade 202 is at a first distance from the flexible film layer 204. For example, the blade 202 may be at a first distance of without contacting the flexible film layer 204. For example, the blade 202 may be at a first distance of 100 μm from the flexible film layer 204 during the peel. Whether the blade 202 contacts the flexible film layer 204 or is at the first distance from the flexible film layer 204, the blade 202 reoxygenates the liquid resin R. Reoxygenation refers to providing oxygen into the flexible film layer 204 and/or the liquid resin R. Reoxygenation is required because, in some implementations, in order for the curing light 220 to cure the liquid resin R disposed between the printed part P and the flexible film layer 204 oxygen must be present. Notably, after curing a new print layer L the flexible film layer 204 and/or the liquid resin R may not have enough oxygen to form a subsequent new print layer L until the blade reoxygenates the liquid resin R.

Figure 2J:
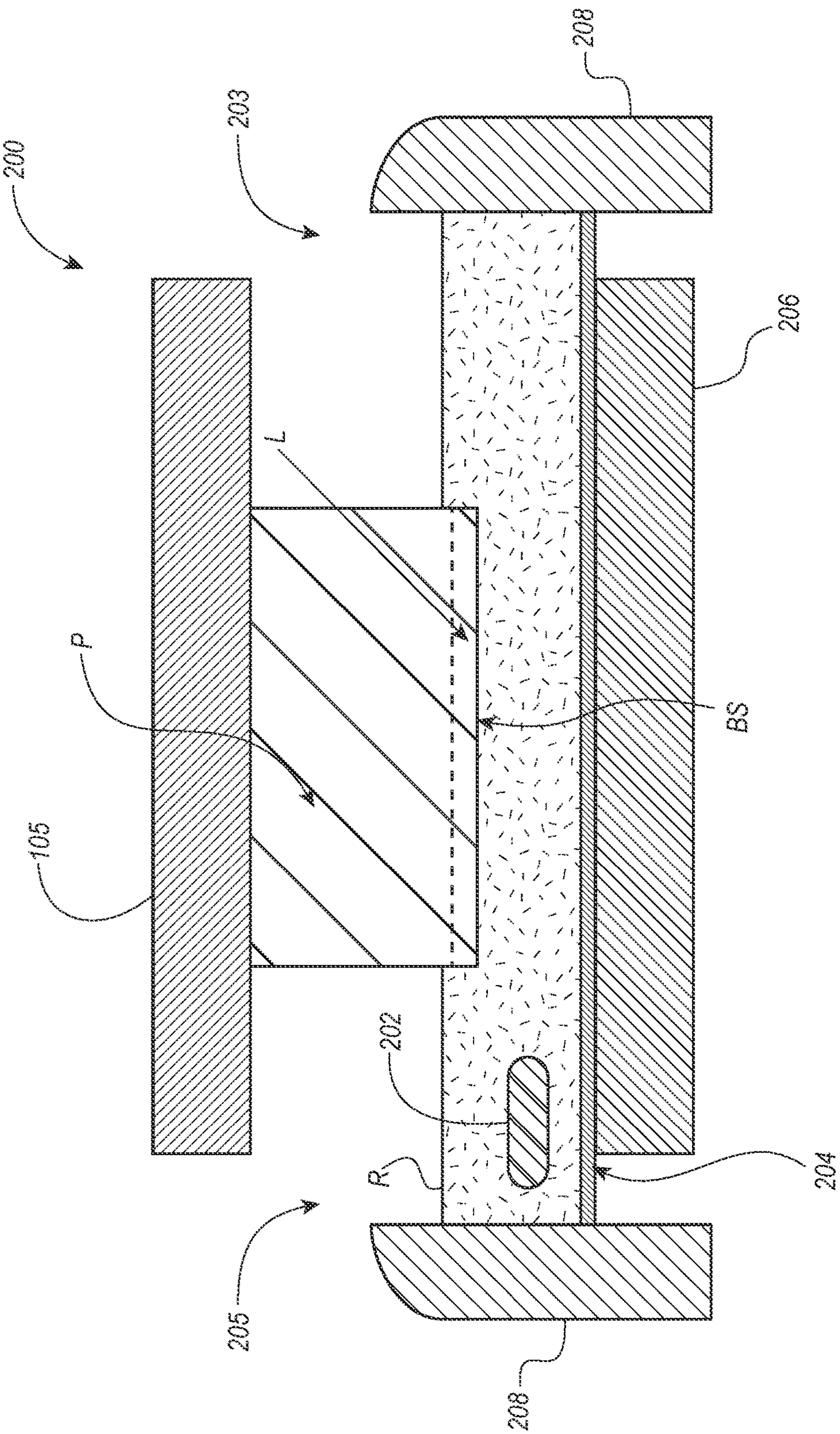

FIG. 2J illustrates an example of the basin 200 wherein the blade 202 translates from the third position (FIG. 2I) to a fourth position at the second end 205 of the basin 200. As the blade 202 translates from the third position to the fourth position, the flexible film layer 204 separates completely from the printed part P (i.e., the flexible film layer 204 and the printed part P are no longer in contact, and the flexible film layer 204 re-laminates over the print substrate 206 due to tension of the flexible film layer 204 and/or Stefan force). Accordingly, the build platform 105 and the printed part P are now free to move in the vertical direction without causing movement of the flexible film layer 204.

Figure 2K:
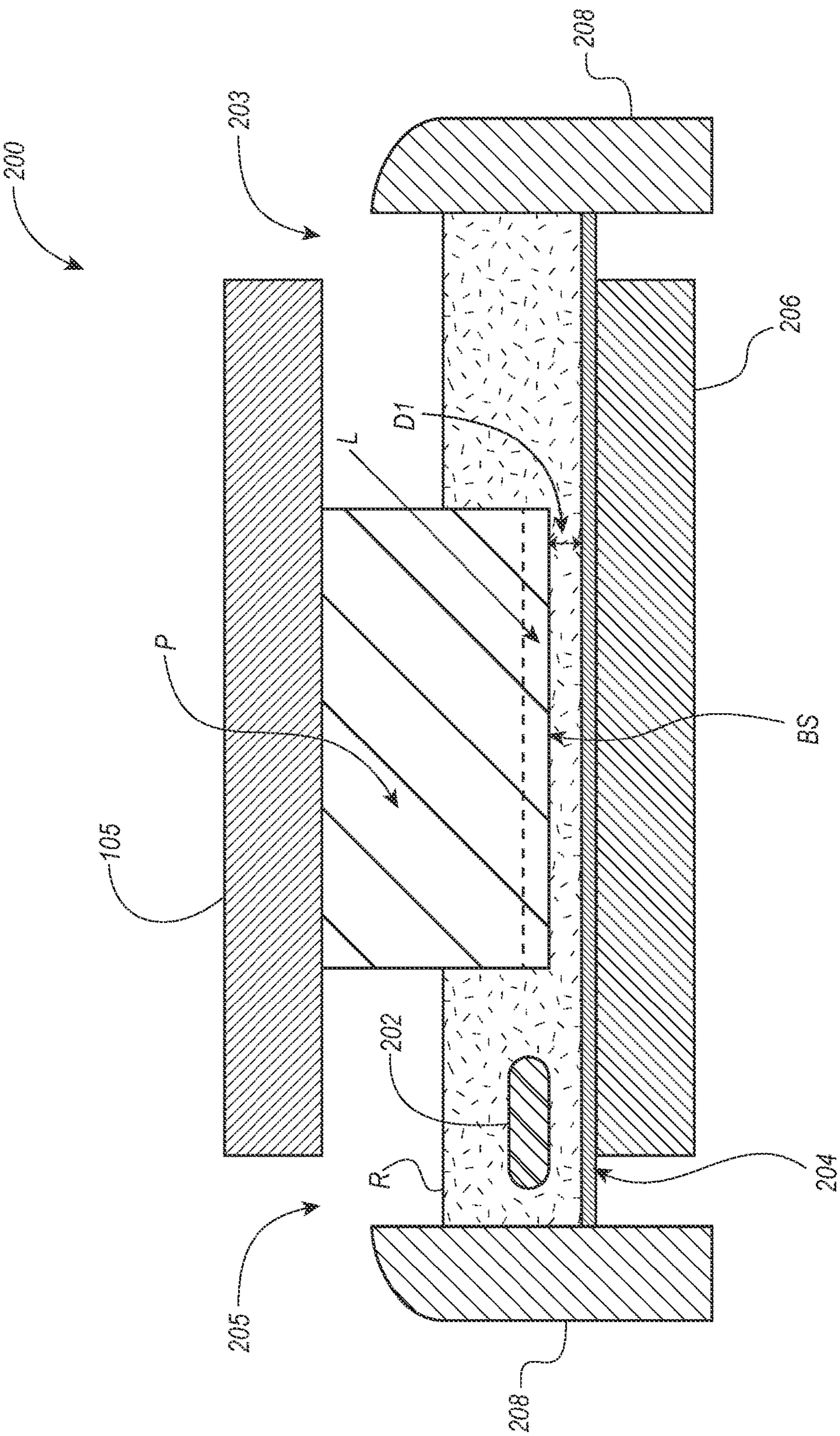

FIG. 2K illustrates an example of the basin 200, wherein the data processing hardware 115 instructs the build platform 105 to lower the printed part P in the vertical direction towards the flexible film layer 204, commonly referred to as a "squish" move. The build platform 105 lowers the printed part P such that the bottom surface of the new print layer L of the printed part P is spaced the first distance D1 equal to one layer thickness from the flexible film layer 204 (e.g., in a const-thickness printing setting, every layer shares the same thickness and D1 is a constant. In an adaptivethickness printing setting, each layer can have a different thickness and D1 can be a variable). Notably, the printed part in FIG. 2K is larger than the printed part in FIG. 2A by the thickness of the previously printed print layer L. The process described above in FIGS. 2A-2K can be repeated until all print layers are formed onto the printed part P and the print is complete.

In some examples, after the curing light 220 solidifies the print layer L of the printed part P, liquid resin R disposed near the flexible film layer 204 is at a first temperature and liquid resin R disposed at a further distance from the flexible film layer 204 is at a second temperature. Here, the first temperature is greater than the second temperature. In other examples, liquid resin R disposed near a rigid film substrate (not shown) is at the first temperature and liquid resin R disposed at a further distance from the rigid film substrate is at the second temperature. That is, as the liquid resin R cures to form the new print layer L and adheres to the flexible film layer 204 (or rigid film substrate) the surrounding liquid resin R heats to a higher temperature as compared to liquid resin R disposed at a further distance from the new print layer L. In these examples, the translation of the blade 202 from the first end 203 of the basin 200 to the second end 205 of the basin 200 reduces the temperature of the liquid resin R near the flexible film layer 204 (or rigid film substrate). In particular, the translation of the blade 202 causes the liquid resin R at the first temperature to mix with the liquid resin R at the second temperature thereby reducing the temperature of the liquid resin R disposed near the new print layer L. As such, the translation of the blade 202 provides a thermal regulation for the liquid resin R.

Figure 3A:
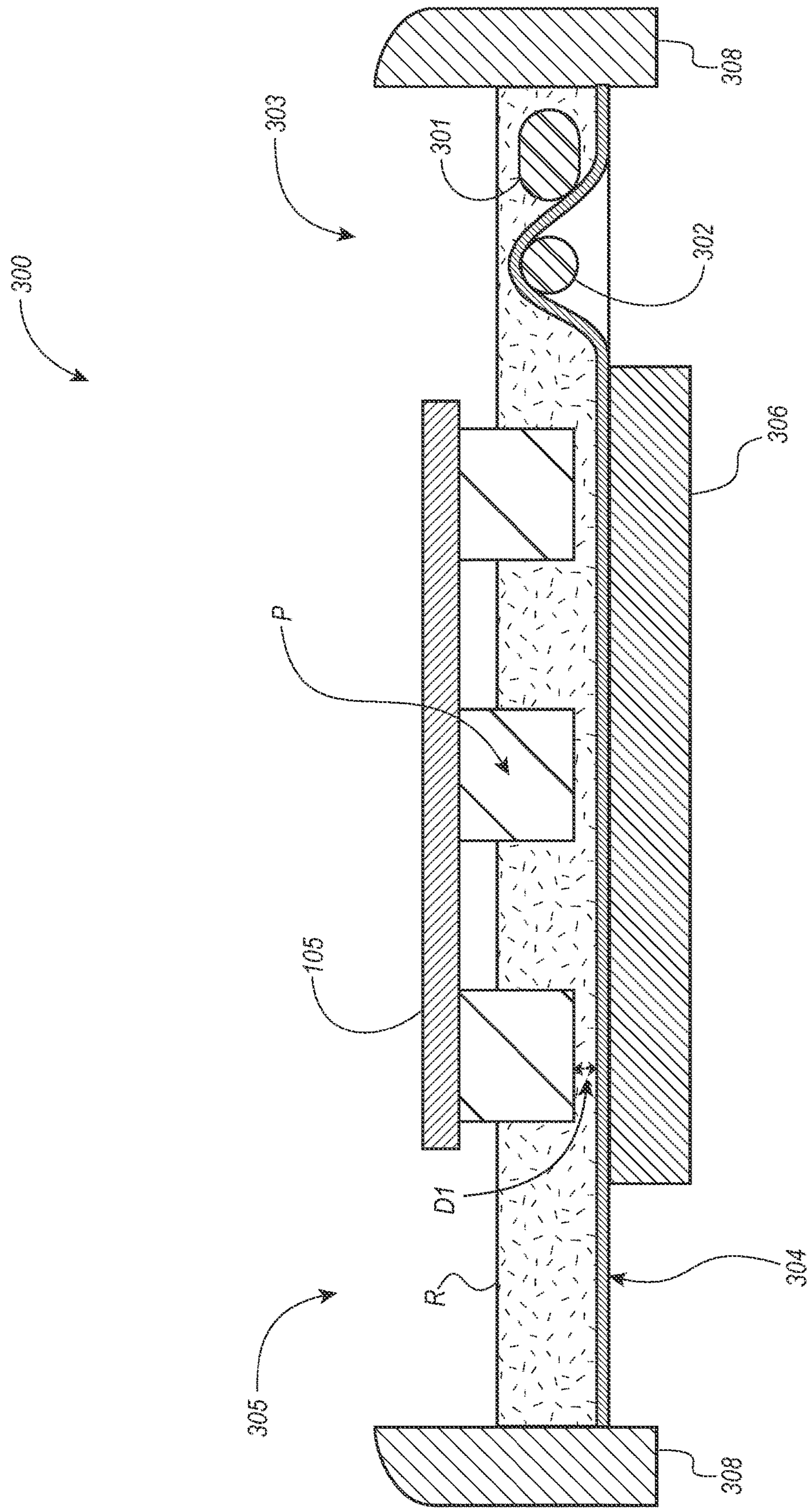
FIGS. 3A-3K illustrate cross-sectional schematic views of an example basin in which the peeling mechanism includes a blade and a roller, according to some examples.
Figure 3B:
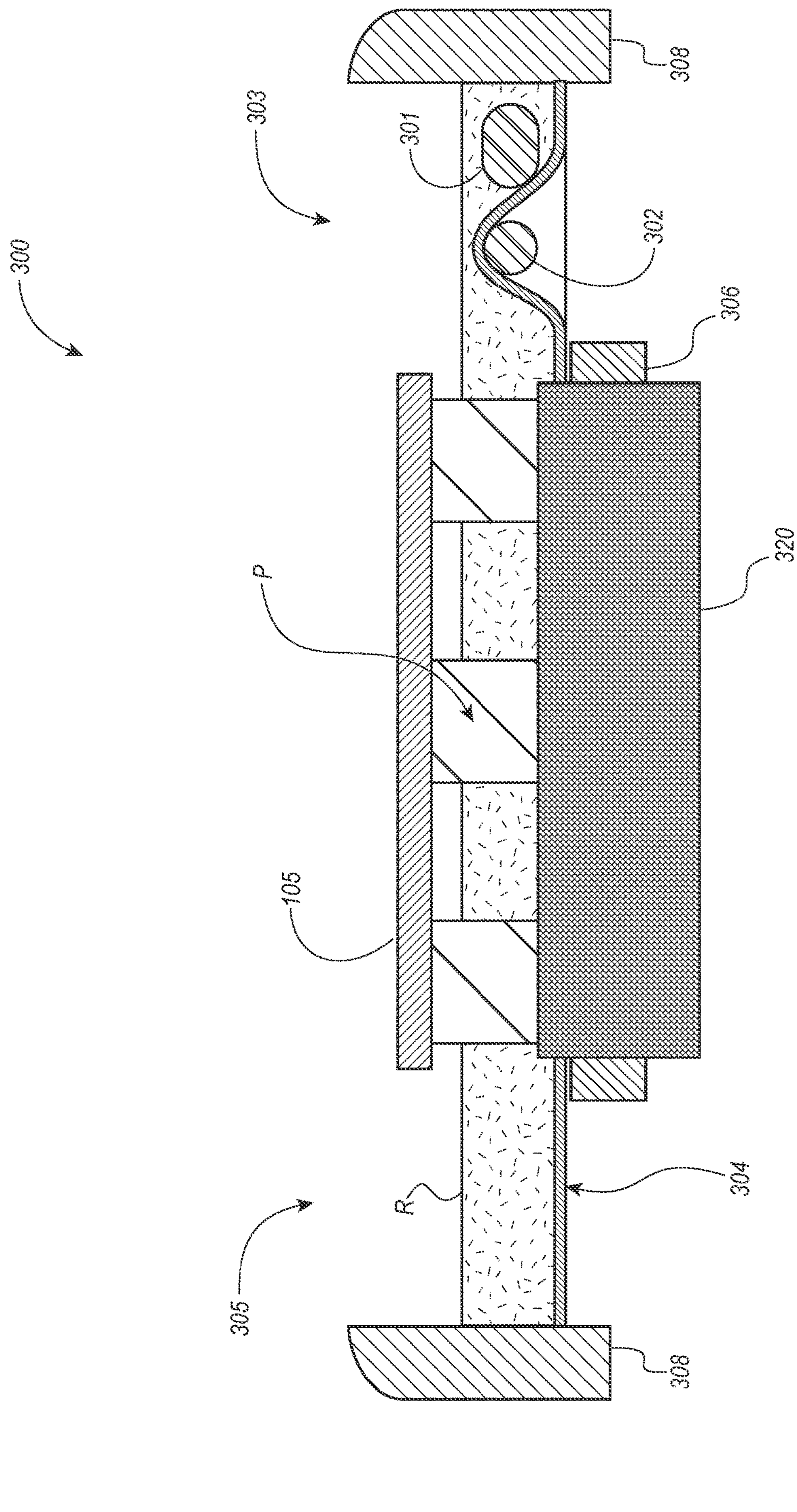

FIGS. 3A-3K illustrate schematic views of an example basin 300 in which the peeling mechanism includes a blade and a roller, according to some examples. In the example of FIGS. 3A-3K, the basin 300 includes a top side blade 301, a bottom side roller 302, a flexible film layer 304, a print substrate 306, side walls 308, and liquid resin R. The top side blade 301 is located on top of the flexible film layer 304 and the bottom side roller 302 is located below the flexible film layer 304. In some examples, the top side blade 301 and/or the bottom side roller 302 extend across the entire width of the flexible film layer 304 (not shown). Alternatively, the top side blade 301 and/or the bottom side roller 302 may extend across a portion of the width of the flexible film layer 304 (not shown). The basin 300 also includes a first end 303 and a second end 305. The side walls 308 are coupled to the flexible film layer 304 at the first end 303 and the second end 305 of the basin 300, respectively, to allow the liquid resin R to be disposed within the basin 300. The print substrate 306 may be a glass material that focuses a curing light 320 towards the printed part P. That is, the print substrate 306 may act as a window for the curing light 320 (FIG. 3B). In each of FIGS. 3A-3K, the build platform 105 includes a printed part P affixed to the build platform 105 interacting with the basin 300.

FIG. 3A illustrates an example of the basin 300 wherein data processing hardware 115 instructs the build platform 105 to position the printed part P at a first vertical position in the basin 300. Here, the printed part P includes three distinct structures rather than a single structure as in FIG. 2. At the first vertical position, the bottom surface of the printed part P is positioned a first distance D1 from the flexible film layer 304 corresponding to one layer thickness. The one layer thickness refers to the depth of liquid resin R disposed between the printed part P and the flexible film layer 304 for forming a single printed layer L on the bottom surface of the printed part P. Moreover, the top side blade 301 and the bottom side roller 302 are located at a first position at the first end 303 of the basin 300. Optionally, at the first position the bottom side roller 302 may translate up or down in the vertical direction. In particular, moving the bottom side roller 302 in the downward vertical direction reduces will allow the flexible film layer 304 to lay flat on the print substrate 306 when the top side blade 301 and the bottom side roller 302 are located at the first position. Put another way, moving the bottom side roller 302 in the downward vertical direction reduces the curvature of the flexible film layer 304 thereby causing the flexible film layer 304 to lay flat on the print substrate 306. In some examples, the data processing hardware 115 instructs the top side blade 301 and the bottom side roller 302 to operate in conjunction with each other. That is, as the top side blade 301 translates, the bottom side roller 302 translates with the top side blade 301 and vice versa. Alternatively, the data processing hardware 115 may instruct the top side blade 301 and the bottom side roller 302 to translate independently of each other.

FIG. 3B illustrates an example of the basin 300 wherein a curing light 320 exposes the liquid resin R disposed between the printed part P and the flexible film layer 304. The curing light 320 cures the liquid resin R from the bottom side of the basin 300 through the print substrate 306 and the flexible film layer 304 creating a new print layer L of the printed part P. The curing light 320 may be provided by any light source known by those skilled in the art of SLA printing.

Figure 3C:
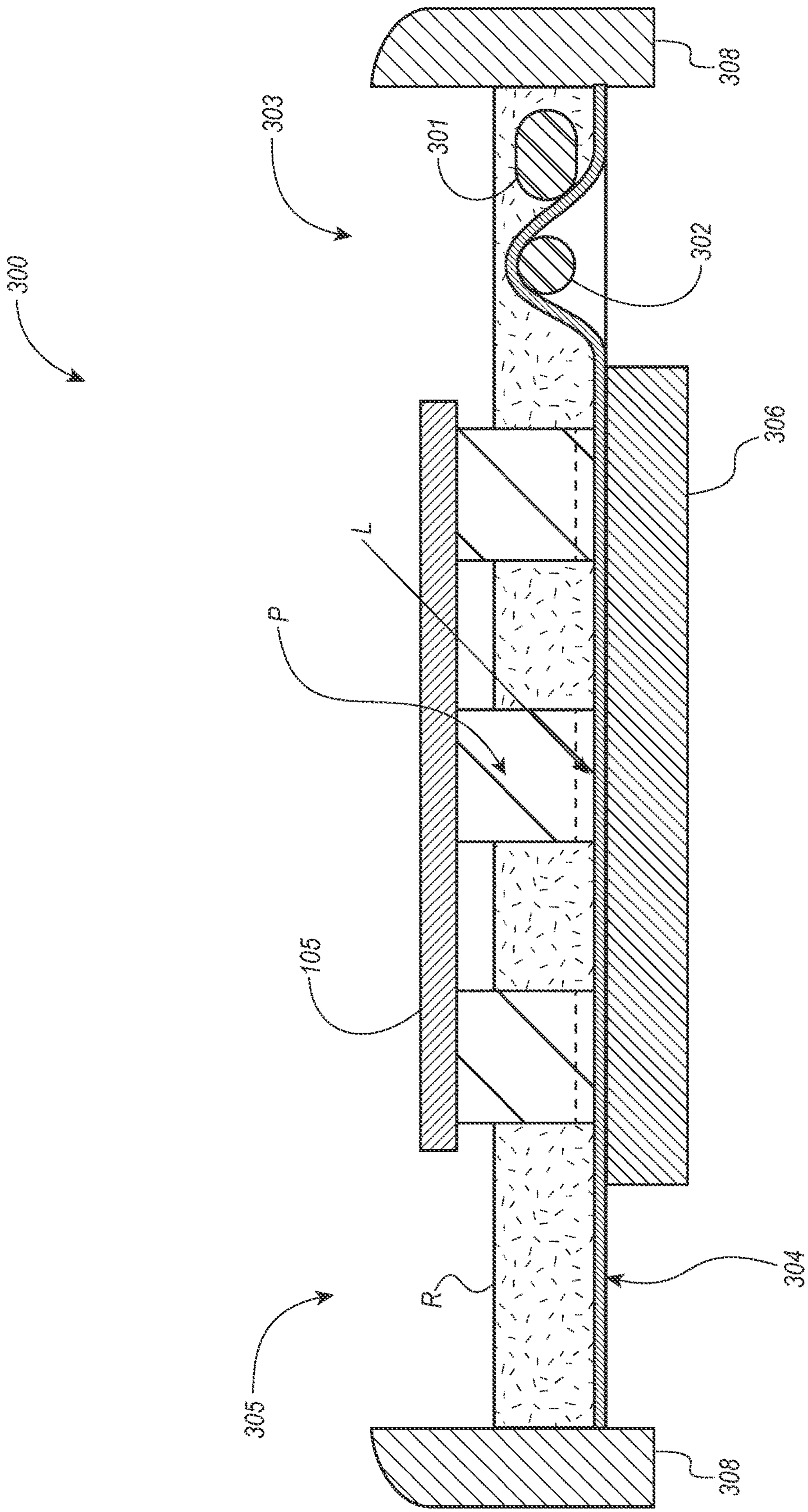
Figure 3D:
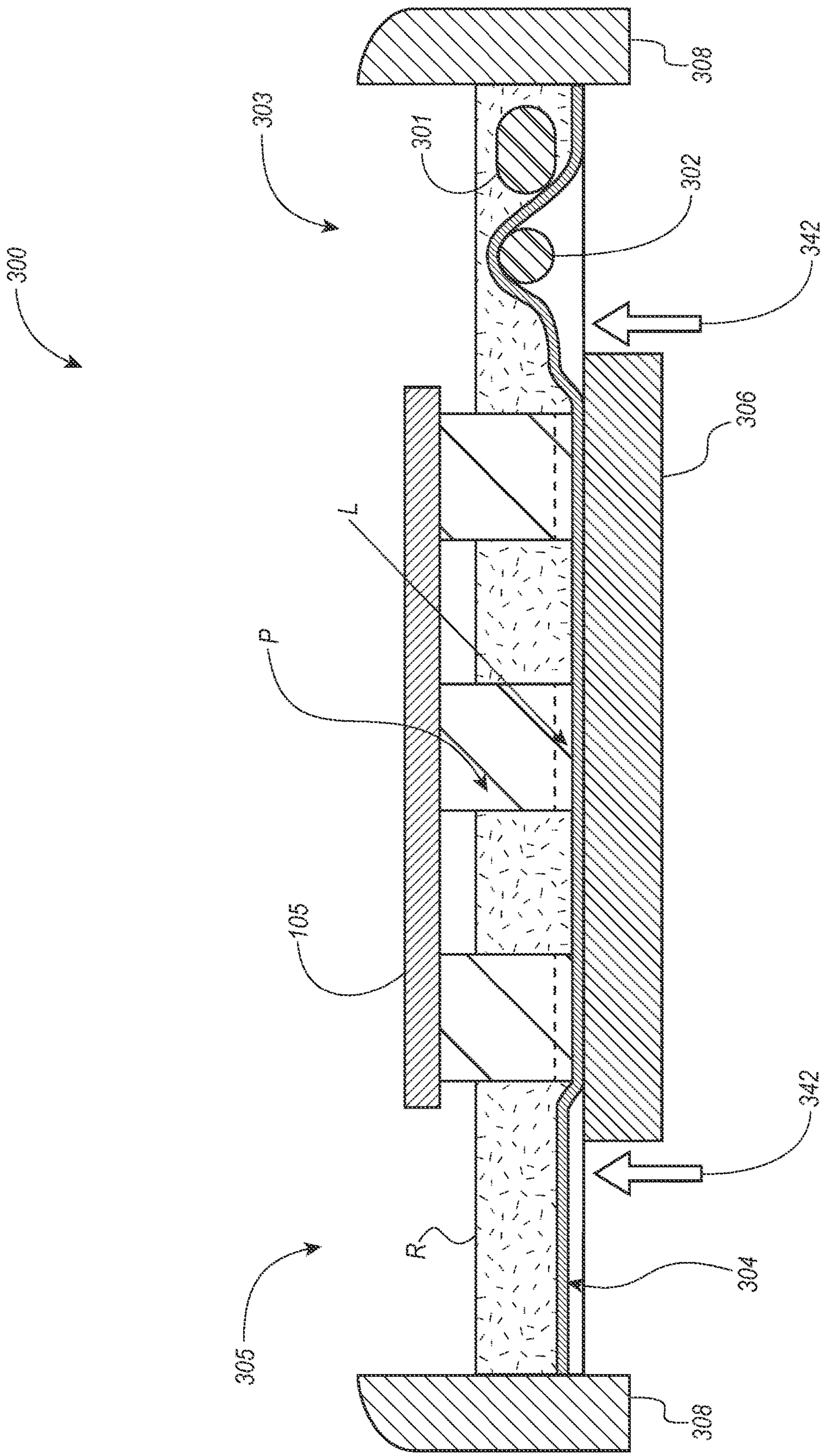
Figure 3E:
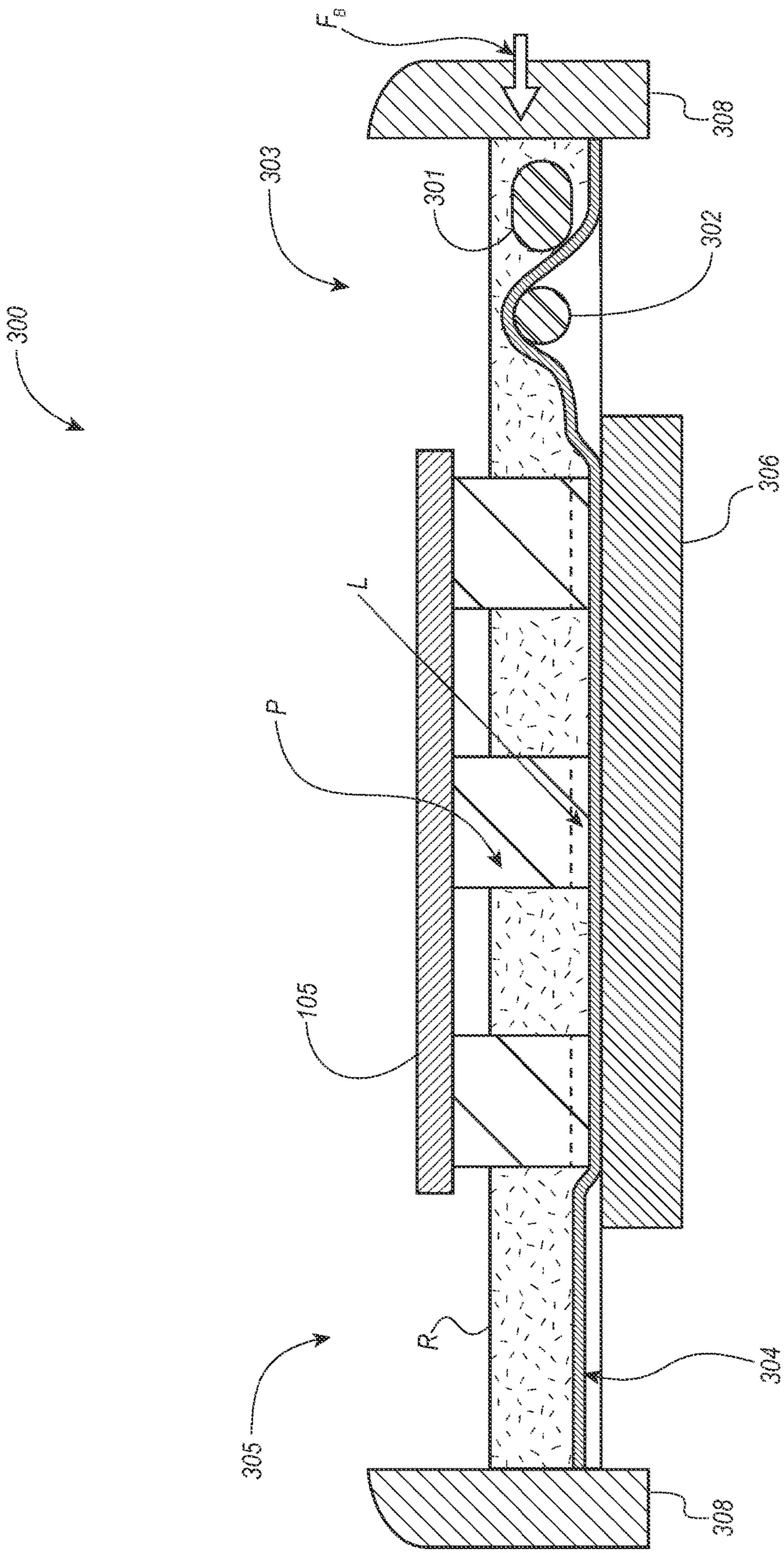
Figure 3F:
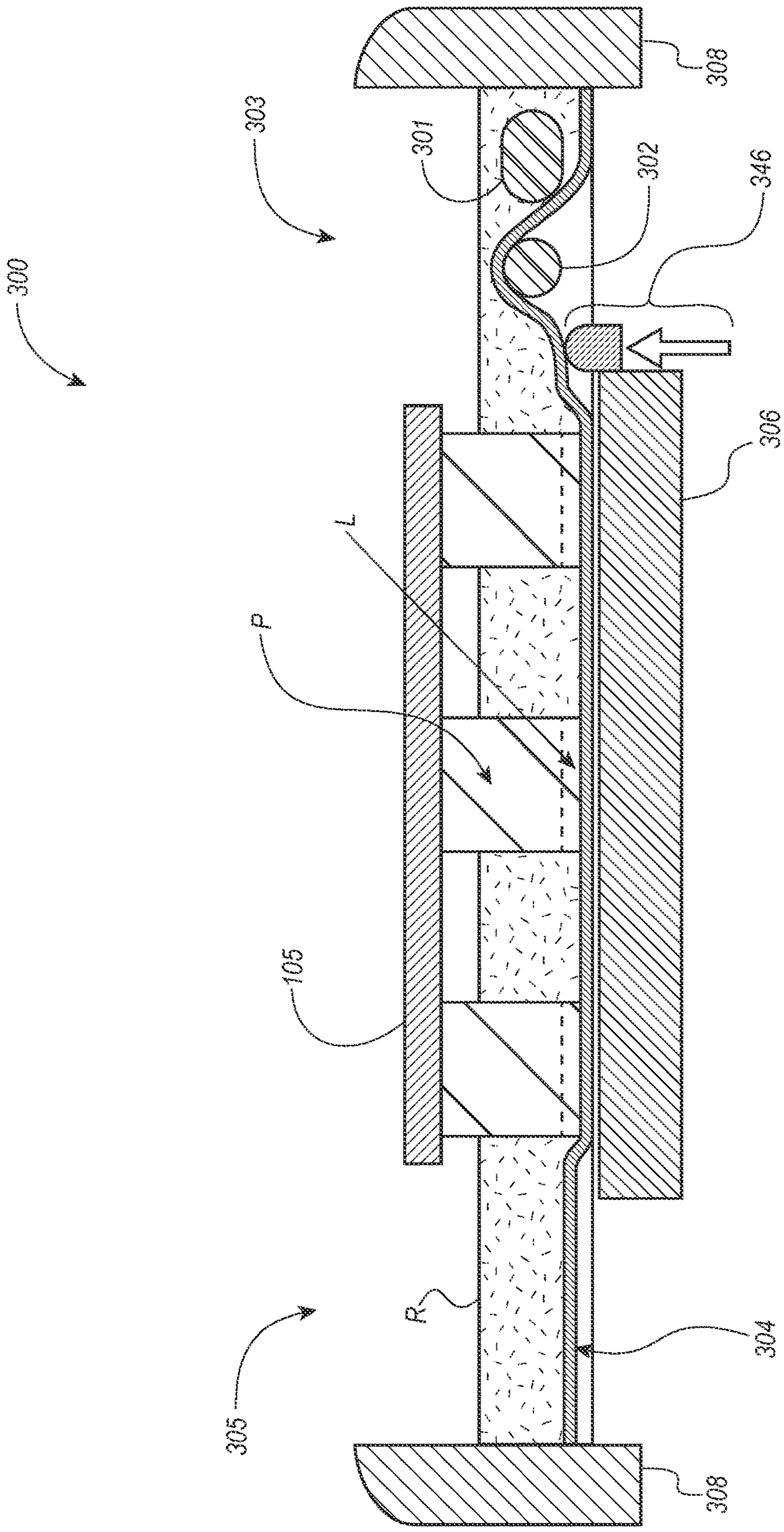

FIG. 3C illustrates an example of the basin 300 wherein the liquid resin R disposed between the bottom surface of the printed part P and the flexible film layer 304 is cured to form a new print layer L (i.e., second build surface). That is, the curing light 320 (FIG. 3B) solidifies the liquid resin R onto the bottom surface of the printed part P to form the new print layer L of the printed part P. Notably, the printed part P in FIG. 3C is larger than the printed part P in FIG. 3B by the size of the new print layer L. The new print layer L of the printed part P adheres to the flexible film layer 304 such that a force must be provided to separate new print layer L and the flexible film layer 304. Moreover, Stefan forces exist between the flexible film layer 304 and the print substrate 306. That is, the Stefan force between the flexible film layer 304 and the print substrate 306 prevent the printed part from being lifted in the vertical direction away from the print substrate 306. FIGS. 3D-3F illustrate various implementations to overcome the Stefan force between the flexible film layer 304 and the print substrate 306. In particular, each example of FIGS. 3D-3F may be used independently of the other implementations of this disclosure, or in conjunction with the other implementations, to overcome the Stefan force.

FIG. 3D illustrates an example for overcoming the Stefan force between the print substrate 306 and the flexible film layer 304. Here, forced air 342 is provided to the bottom side of the flexible film layer 304 at the first end 303 of the basin 300 and the second end of 305 the basin 300. As such, the forced air 342 provided to the bottom of the flexible film layer 304 overcomes the Stefan force adhering the print substrate 306 to the flexible film layer 304 such that the flexible film layer 304 separates from the corners of the print substrate 306.

FIG. 3E illustrates another example for overcoming the Stefan force between the print substrate 306 and the flexible film layer 304. In this example, a horizontal buckling force $F_B$ may be provided to the side wall 308 of the basin 300 to "buckle" the flexible film layer 304. The buckling of the flexible film layer 304 causes the flexible film layer 304 to overcome the Stefan force between the print substrate 306 and the flexible film layer 304. In some examples, the horizontal buckling force $F_B$ is provided directly to the side wall 308 to create the buckle motion of the flexible film layer. Alternatively, the horizontal buckling force $F_B$ may be provided directly to the flexible film layer 304 rather than to the side wall 308. In the example shown, the horizontal buckling force $F_B$ is only provided at the first end 303 of the basin 300, however, it is understood that the horizontal buckling force $F_B$ may be provided additionally and/or alternatively to the second end 305 of the basin 300.

FIG. 3F illustrates another example for overcoming the Stefan force between the flexible film layer 304 and the print substrate 306. Here, a poke actuation 346 may be provided to the bottom side of the flexible film layer 304. The poke actuation 346 applies a force to the flexible film layer 304 that overcomes the Stefan force between the flexible film layer 304 and the print substrate 306. The poke actuation 346 may be provided by a mechanical actuator or by any other actuator mechanism. In the example shown, the poke actuation 346 is only provided at the first end 303 of the basin, however, it is understood that the poke actuation 346 may be provided additionally and/or alternatively to the second end 305 of the basin 300.

Figure 3G:
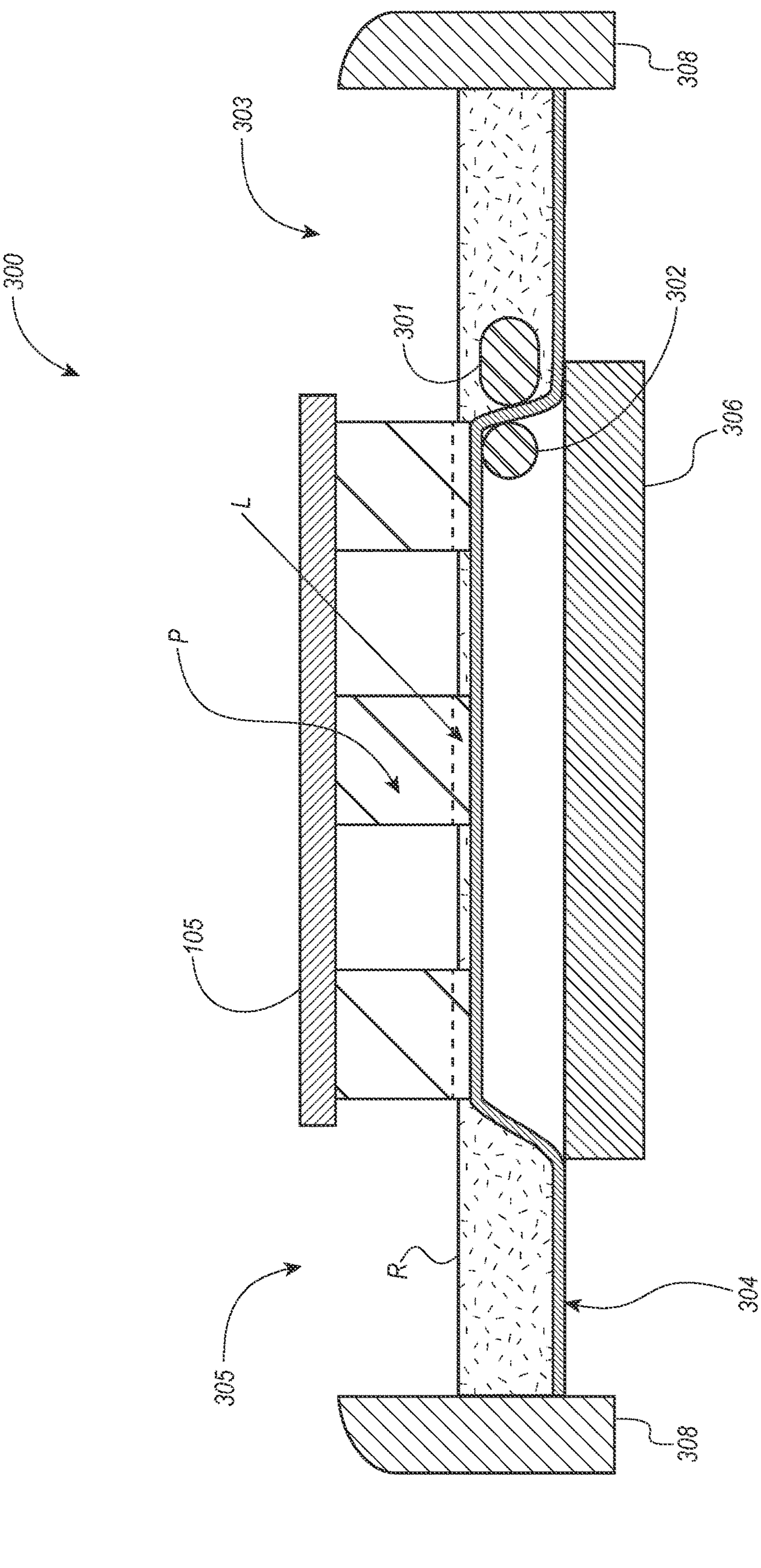

FIG. 3G, illustrates an example of the basin 300 wherein the flexible film layer 304, is lifted from the print substrate 306 by the data processing hardware 115 instructing the build platform 105 to move in the vertical direction away from the print substrate 306. Here, the printed part P, affixed to the build platform 105, and the flexible film layer 304 adhered to the printed part Pare lifted in the vertical direction away from the print substrate 306. That is, now that the flexible film layer 304 has overcome (or partially overcome) the Stefan force between the flexible film layer 304 and the print substrate 306, the flexible film layer 304 may be lifted by the build platform 105 to separate from the print substrate 306. Moving the build platform 105, and thus the printed part P, allows sufficient room for the top side blade 301 and the bottom side roller 302 to operate between the bottom surface of the printed part P and the print substrate 306.

Figure 3H:
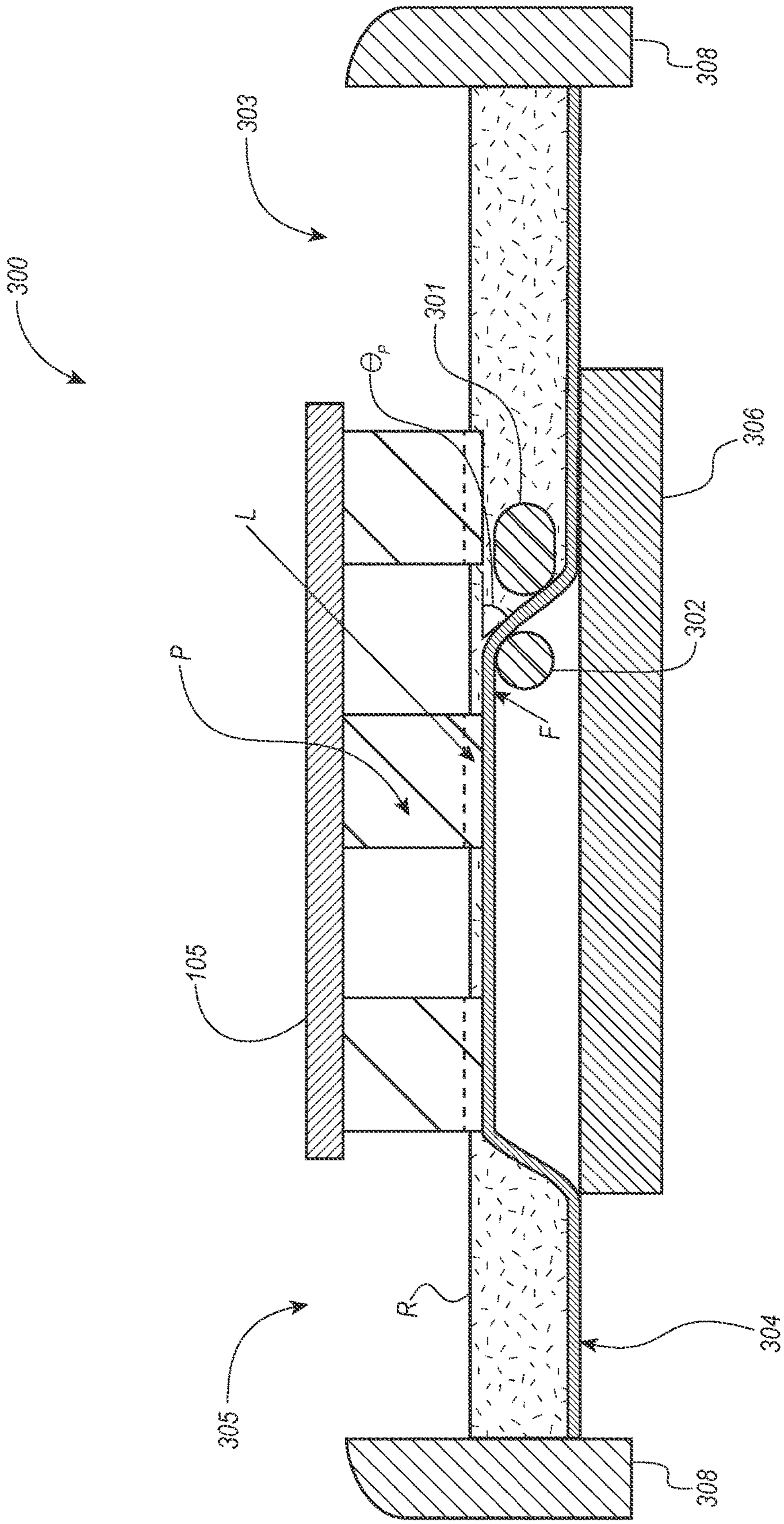

FIG. 3H illustrates an example of the basin 300 wherein the top side blade 301 and the bottom side roller 302 (collectively referred to as the peeling mechanism) translate from the first position (FIGS. 3A-3H) to a second position. As the top side blade 301 and the bottom side roller 302 translate from the first position to the second position, a leading edge of the top side blade 301 contacts the top surface of the flexible film layer 304, thereby inducing a peel front F. The exact curvature of the flexible film layer 304 depends on several factors including, but not limited to, geometry of the printed part P, geometric relationship between the blade and the printed part P, and the stiffness, or other characteristics, of the flexible film layer 304. Translating the top side blade 301 from the first position to the second position creates a separation force to separate the new layer L (i.e., second build surface) of the printed part P from the flexible film layer 304. Notably, the top side blade 301 induces a high peel angle $\theta_P$ (i.e., angle between the new print layer L of the printed part P and the flexible film layer 304) while translating from the first position to the second position. The high peel angle $\theta_P$ minimizes the force applied to the printed part P (e.g., by localizing the peel front F), thereby providing improved print quality of the printed part P.

Additionally, as the top side blade 301 translates from the first position to the second position, the bottom side roller 302 translates from the first position to the second position. The bottom side roller 302 is configured to support the flexible film layer 304 as the top side blade 301 propagates the peel. In particular, a trailing edge of the bottom side roller 302 supports the bottom of the flexible film layer 304 to increase the peel angle $\theta_P$ and localize the peel front F. Accordingly, the bottom side roller 302 further minimizes the force applied on the printed part P as the top side blade 301 peels the flexible film layer 304 from the printed part P by increasing the peel angle $\theta_P$.

The bottom side roller 302 allows the printed parts P to be supported from beneath the flexible film layer 304 thereby allowing high peel forces between the top side blade 301 and the flexible film layer 304 without transferring the high peel forces to the printed part. Moreover, the bottom side roller 302 protects the flexible film layer 304 by supporting the bottom side of the flexible film layer 304 thereby maintaining a consistent peel angle $\theta_P$ throughout the entire peel. Thus, by maintaining the consistent peel angle $\theta_P$, the flexible film layer 304 peels from the printed part P with zero Gaussian curvature. In contrast, by simply lifting the printed part P to separate the printed part P from the flexible film layer 304 without the top side blade 301 and/or bottom side roller 302, the flexible film layer 304 forms a conical shape curvature that may damage the flexible film layer 304. In addition to supporting the bottom surface of the printed part P, the combination of the top side blade 301 with the bottom side roller 302 dictates the curvature and the peel angle $\theta_P$ of the flexible film layer 304 as the top side blade 301 and the bottom side roller 302 traverse the build area.

Figure 3I:
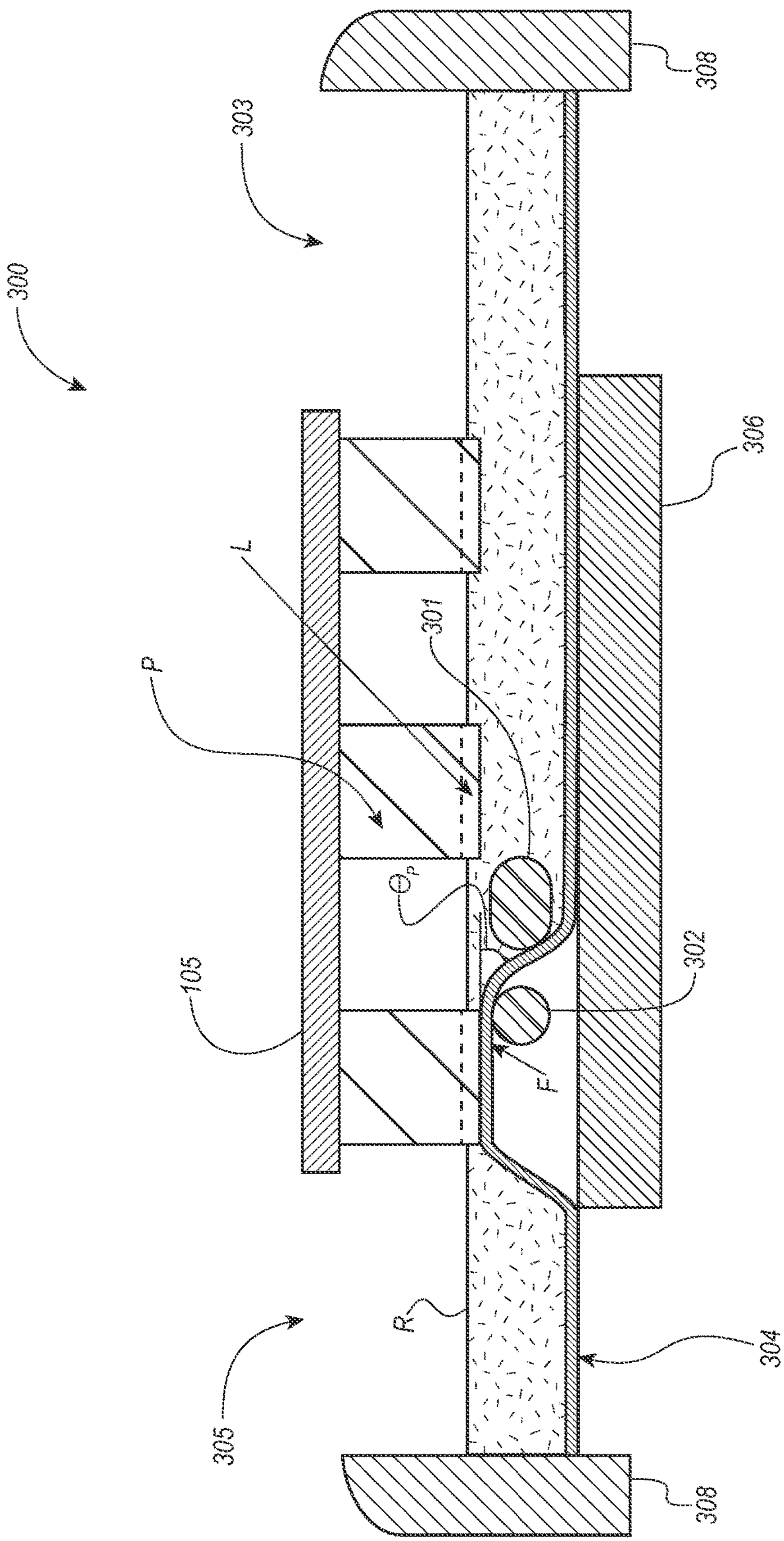

FIG. 3I illustrates an example of the basin 300 wherein the top side blade 301 and the bottom side roller 302 translate from the second position (FIG. 3H) to a third position. As the top side blade 301 and the bottom side roller 302 translate from the second position to the third position, the leading edge of the top side blade 301 remains in contact with the flexible film layer 304. As such, the contact between top side blade 301 and the flexible film layer 304 induces a peeling force that peels the flexible film layer 304 from the printed part P. Translating the top side blade 301 from the second position to the third position continues creating the separation force to separate the new layer L of the printed part P from the flexible film layer 304. Notably, the top side blade 301 and the bottom side roller 302 induces a high peel angle $\theta_P$ while translating from the second position to the third position.

Figure 3J:
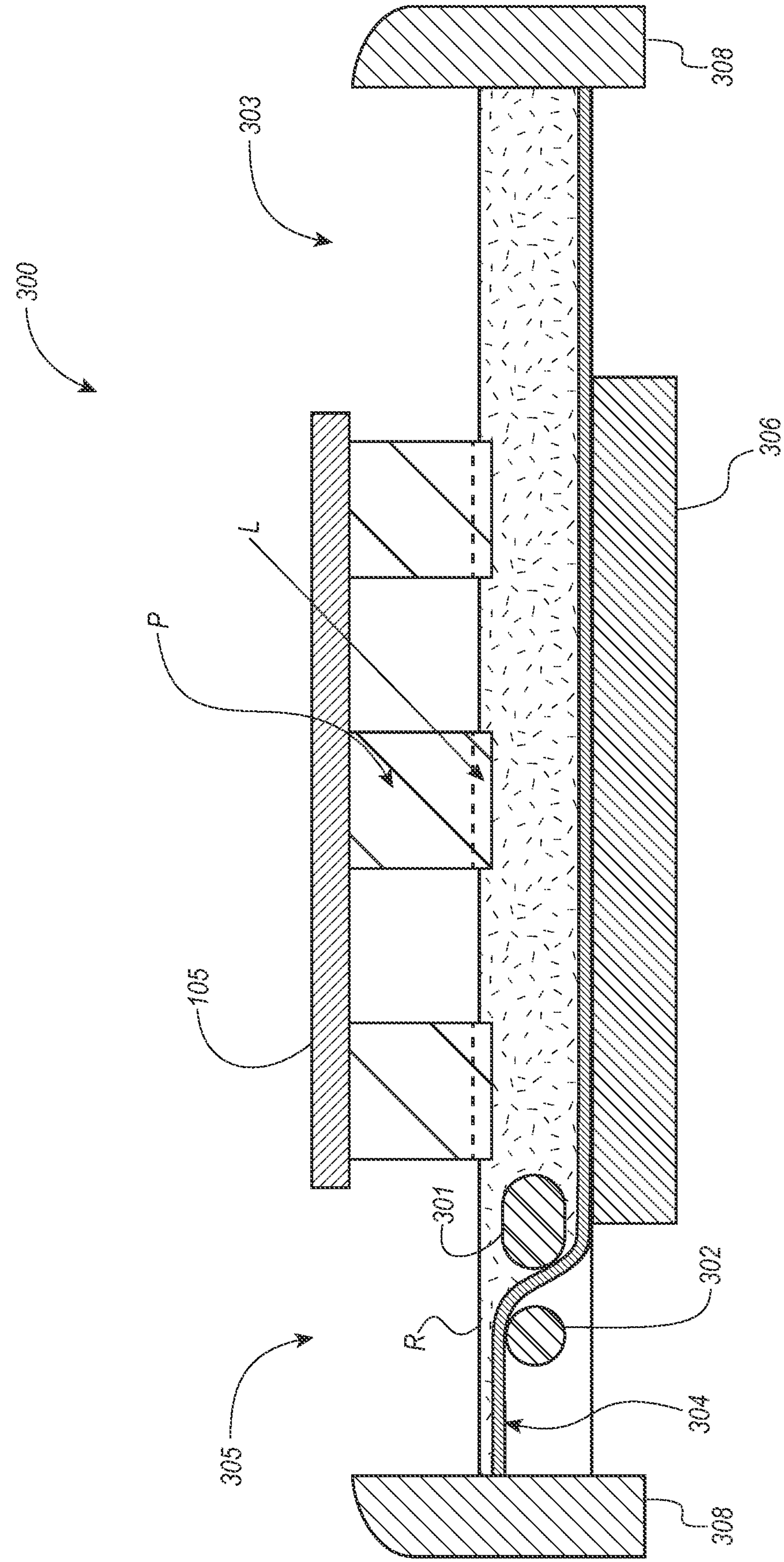

FIG. 3J illustrates an example of the basin 300 wherein the top side blade 301 and the bottom side roller 302 translate from the third position (FIG. 3I) to a fourth position at the second end 305 of the basin 300. As the top side blade 301 and the bottom side roller translate from the third position to the fourth position, the flexible film layer 304 separates completely from the printed part P (i.e., the flexible film layer 304 and the printed part P are no longer in contact). Accordingly, the build platform 105 and the printed part P are now free to move in the vertical direction without causing movement of the flexible film layer 304.

Figure 3K:
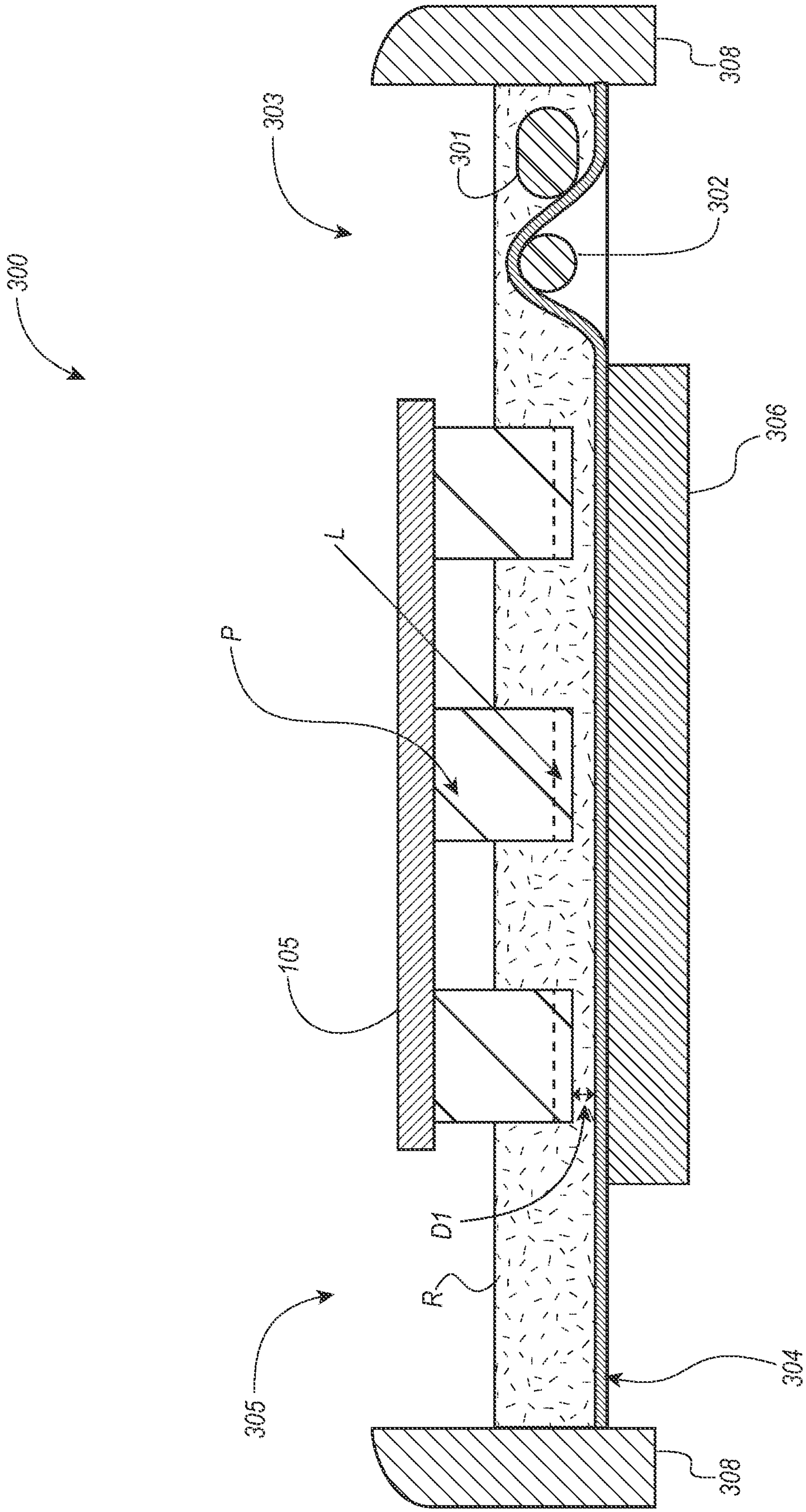

FIG. 3K illustrates an example of the basin 300, wherein the data processing hardware 115 instructs the build platform 105 to lower the printed part P in the vertical direction towards the flexible film layer 304, commonly referred to as a "squish" move. The build platform 105 lowers the printed part P such that the bottom surface of the new print layer L of the printed part P is spaced the first distance D1 equal to one layer thickness from the flexible film layer 304. Notably, the printed part in FIG. 3K is larger than the printed part in FIG. 3A by the thickness of the previously printed layer. Here, the top side blade 301 and bottom side roller 302 translate from the fourth position (FIG. 3J) to the first position before the build platform 105 lowers the printed part P to the first distance D1 from the flexible film layer 304. Optionally, the top side blade 301 and bottom side roller 302 may remain in the fourth position (FIG. 3J) as the build platform 105 lowers the printed part P to the first distance D1 from the flexible film layer 304. The process described above in FIGS. 3A-3K can be repeated until all print layers are formed onto the printed part P and the print is complete.

An additional extension of this implementation involves the phenomenon of "squish," where the printed parts P are traditionally brought to a distance of one layer thickness away from the print substrate 306 to entrap a layer of uncured liquid resin R between the flexible film layer 304 and the bottom surface of the printed part P. In a typical stereolithography process, the printed parts P are lowered toward the print substrate 306 over a much greater depth of the resin R than the thickness of the subsequent new print layer L, necessitating the displacement of a volume of viscous liquid resin R. This displacement imparts a significant force to the printed parts P, which may be undesirable. By including the second trailing bottom side roller 302 behind the top side blade 301, or by reversing the motion of the mechanism from the second end 305 to the first end 303 of the basin 300, it is possible to push the flexible film layer 304 up to laminate it to the bottom surface of the printed part P with a thin layer L of the liquid resin R in a gradual process known as line squish. Thus, the forces associated with displacing the excess fluid are imparted on the bottom side roller 302 and not by the bottom surface of the printed part P, greatly reducing or even eliminating the need to perform a typical "squish" maneuver.

In some examples, after the curing light 320 solidifies the print layer L of the printed part P, liquid resin R disposed near the flexible film layer 304 is at a first temperature and liquid resin R disposed at a further distance from the flexible film layer 304 is at a second temperature. Here, the first temperature is greater than the second temperature. In other examples, liquid resin R disposed near a rigid film substrate (not shown) is at the first temperature and liquid resin R disposed at a further distance from the rigid film substrate is at the second temperature. That is, as the liquid resin R cures to form the new print layer L and adheres to the flexible film layer 304 (or rigid film substrate) the surrounding liquid resin R heats to a higher temperature as compared to liquid resin R disposed at a further distance from the new print layer L. In these examples, the translation of the top side blade 301 and bottom side roller 302 from the first end 303 of the basin 300 to the second end 305 of the basin 300 reduces the temperature of the liquid resin R near the flexible film layer 304 (or rigid film substrate). In particular, the translation of the top side blade 301 and bottom sider roller 302 causes the liquid resin R at the first temperature to mix with the liquid resin R at the second temperature thereby reducing the temperature of the liquid resin R disposed near the new print layer L. As such, the translation of the top side blade 301 and bottom side roller 302 provides a thermal regulation for the liquid resin R.

FIGS. 4A-4K illustrate schematic views of an example basin 400 in which the peeling mechanism includes a vacuum nozzle, according to some examples. In the example of FIGS. 4A-4K, the basin 400 includes a vacuum nozzle 402, a flexible film layer 404, a print substrate 406, side walls 408, and liquid resin R. The basin 400 also includes a first end 403 and a second end 405. The vacuum nozzle 402 is located on the bottom side of the flexible film layer 404 and includes an outer chamber 402, 402*a* and an inner chamber 402, 402*b*. The outer chamber 402*a* is configured to provide structural support for the vacuum nozzle 402. The inner chamber 402*b* is configured to pull a vacuum against the flexible film layer 404 (e.g., to depressurize a region between the flexible film layer 404 and the vacuum nozzle 402). That is, the vacuum of the inner chamber 402*b* pulls via the vacuum the bottom side of the flexible film layer 404 towards the top side of the vacuum nozzle 402 to draw the flexible film layer 404 away from the printed part P. Optionally, the basin 400 may have a bottom side roller 302 (FIG. 3) to further support the flexible film layer 404 (not shown). In some examples, the vacuum nozzle 402 and/or the bottom side roller 302 (FIG. 3) extend across the entire width of the flexible film layer 404. Alternatively, the vacuum nozzle 402 and/or the bottom side roller 302 (FIG. 3) may extend across a portion of the width of the flexible film layer 404.

The side walls 408 are coupled to the flexible film layer 404 at the first end 403 and the second end 405 of the basin 400, respectively, to allow the liquid resin R to be disposed within the basin 400. The print substrate 406 may be a glass material that focuses a curing light 420 towards the printed part P. That is, the print substrate 406 may act as a window for the curing light 420 (FIG. 4B). In each of FIGS. 4A-4K, the build platform 105 includes a printed part P affixed to the build platform 105 interacting with the basin 400.

Figure 4A:
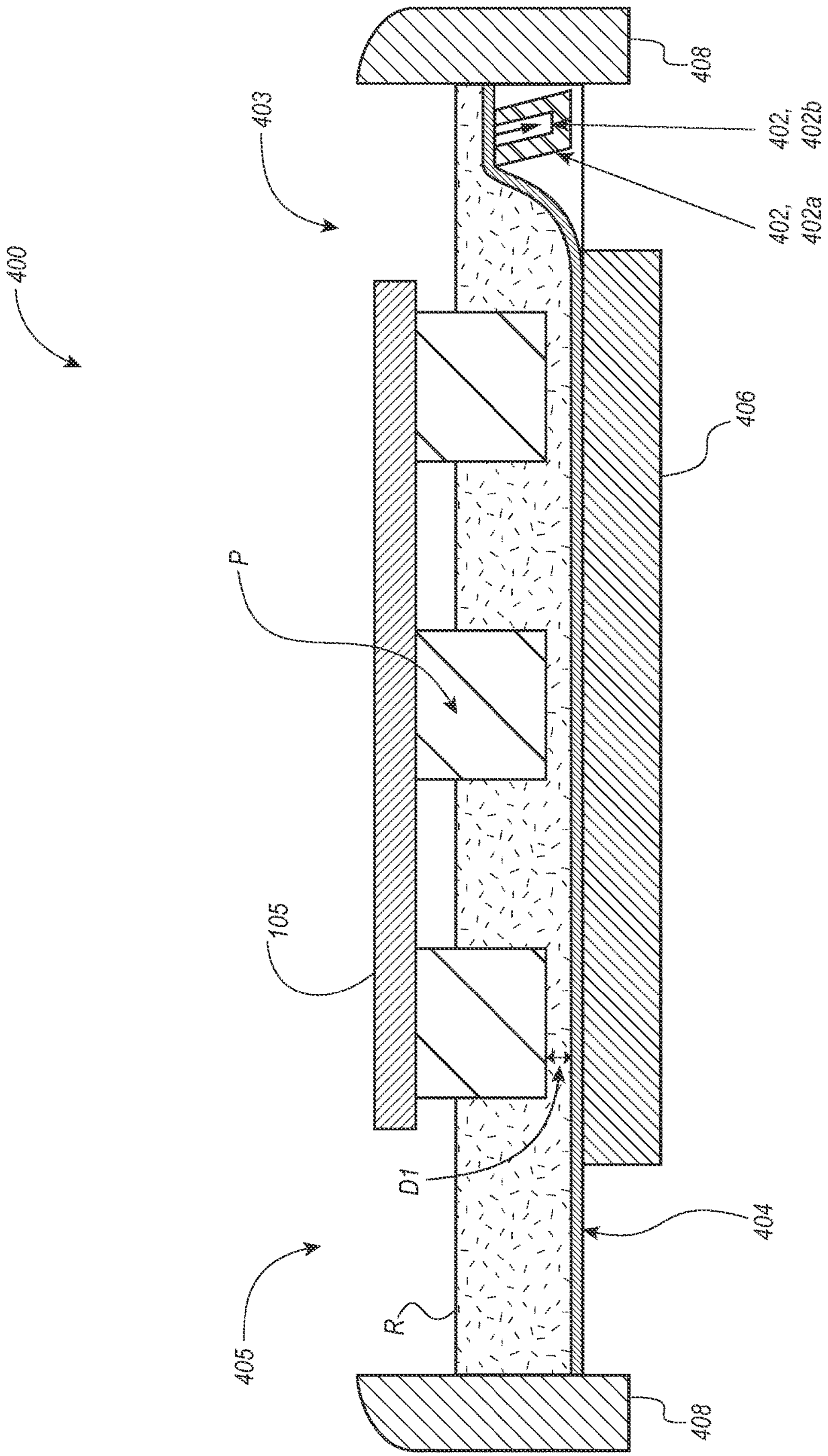
FIGS. 4A-4K illustrate cross-sectional schematic views of an example basin in which the peeling mechanism includes a vacuum nozzle, according to some examples.
Figure 4B:
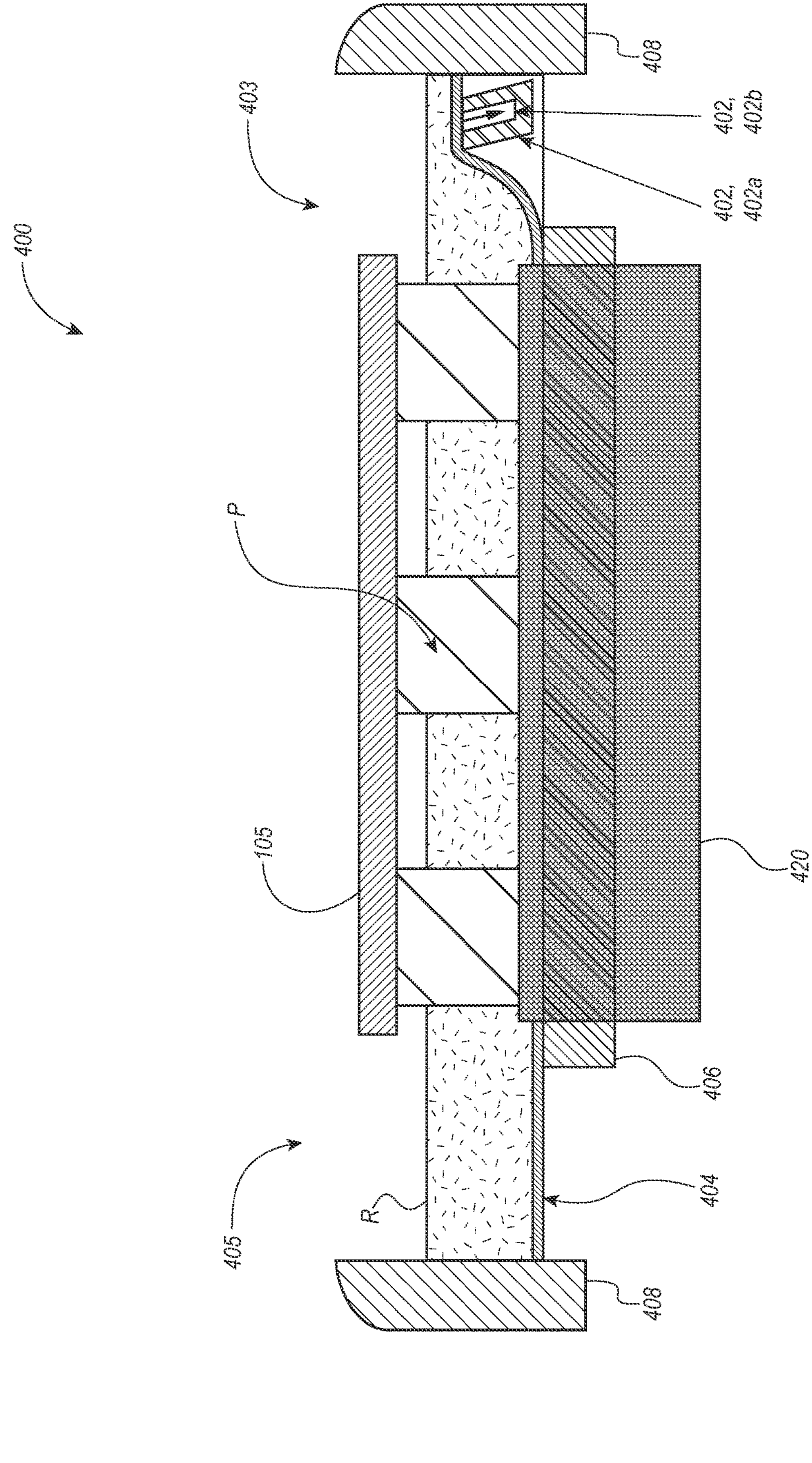

FIG. 4A illustrates an example of the basin 400 wherein data processing hardware 115 instructs the build platform 105 to position the printed part P at a first vertical position in the basin 400. At the first vertical position, the bottom surface of the printed part P is positioned a first distance D1 from the flexible film layer 404 corresponding to one layer thickness. The one layer thickness refers to the depth of liquid resin R disposed between the printed part P and the flexible film layer 404 for forming a single printed layer L on the bottom surface of the printed part P. Moreover, the vacuum nozzle 402 is located at a first position at the first end 403 of the basin 400.

FIG. 4B illustrates an example of the basin 400 wherein a curing light 420 exposes the liquid resin R disposed between the printed part P and the flexible film layer 404. The curing light 420 cures the liquid resin R from the bottom side of the basin 400 through the print substrate 406 and the flexible film layer 404 creating a new print layer L of the printed part P. The curing light 420 may be provided by any light source known by those skilled in the art of SLA printing.

Figure 4C:
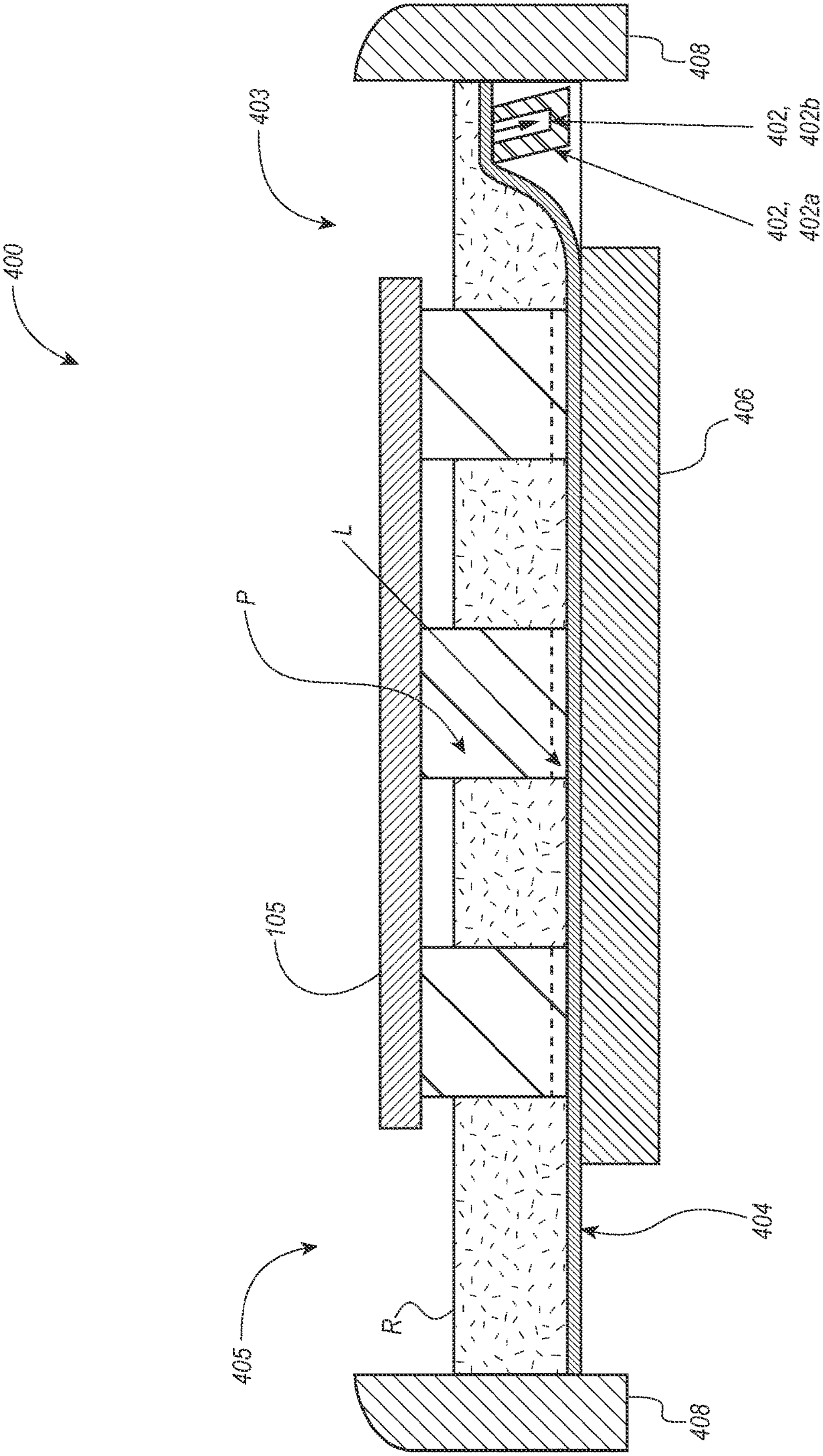
Figure 4D:
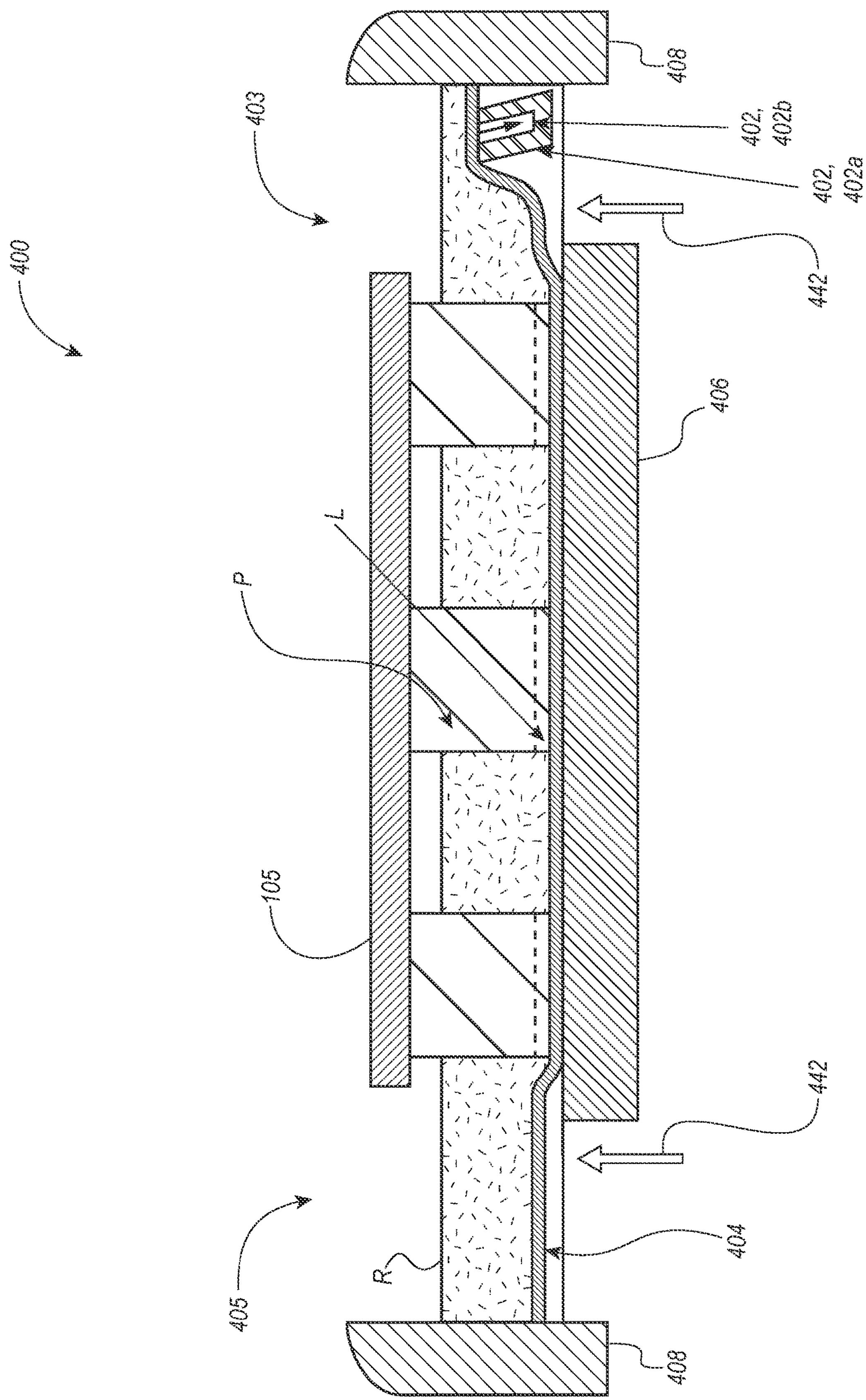
Figure 4E:
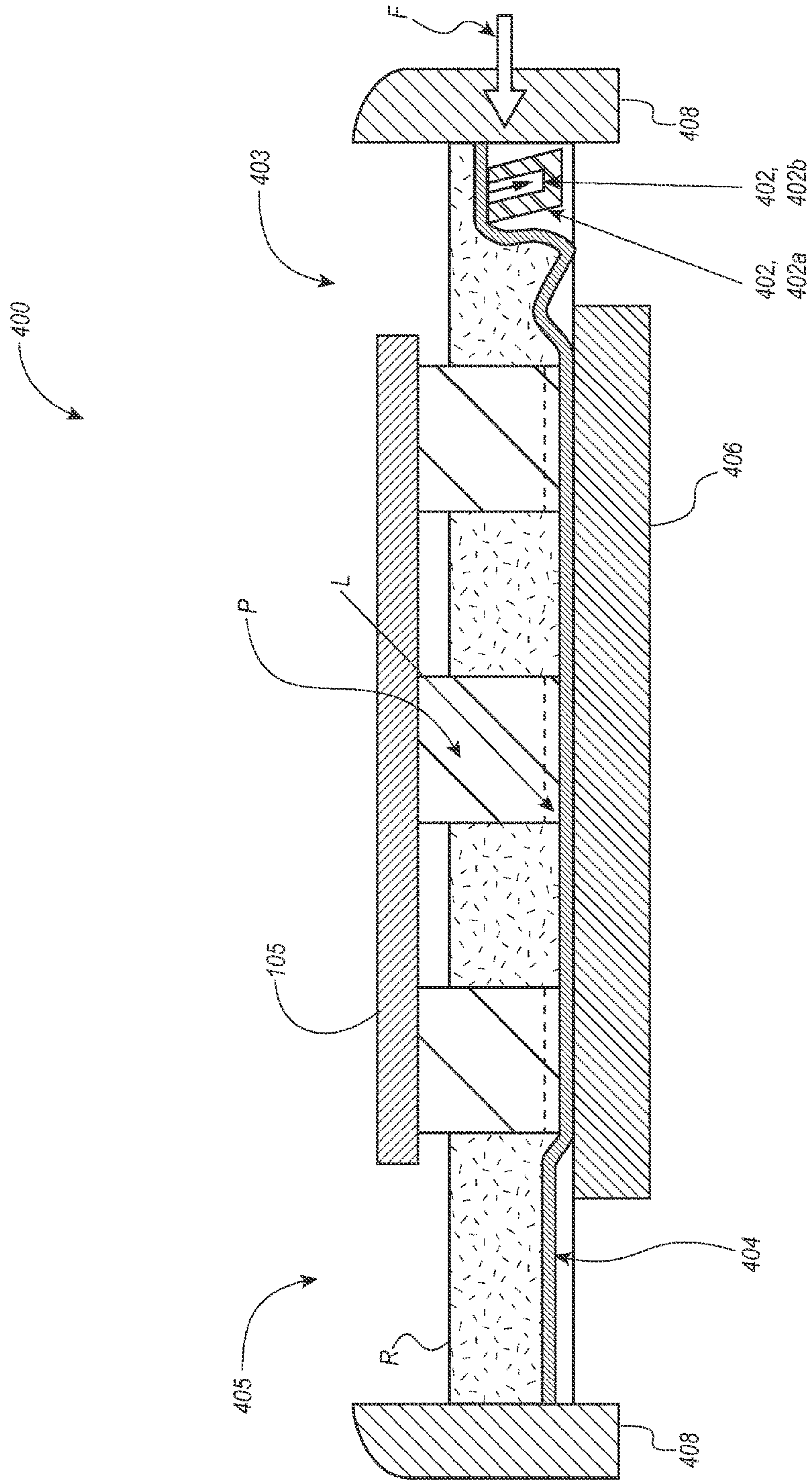
Figure 4F:
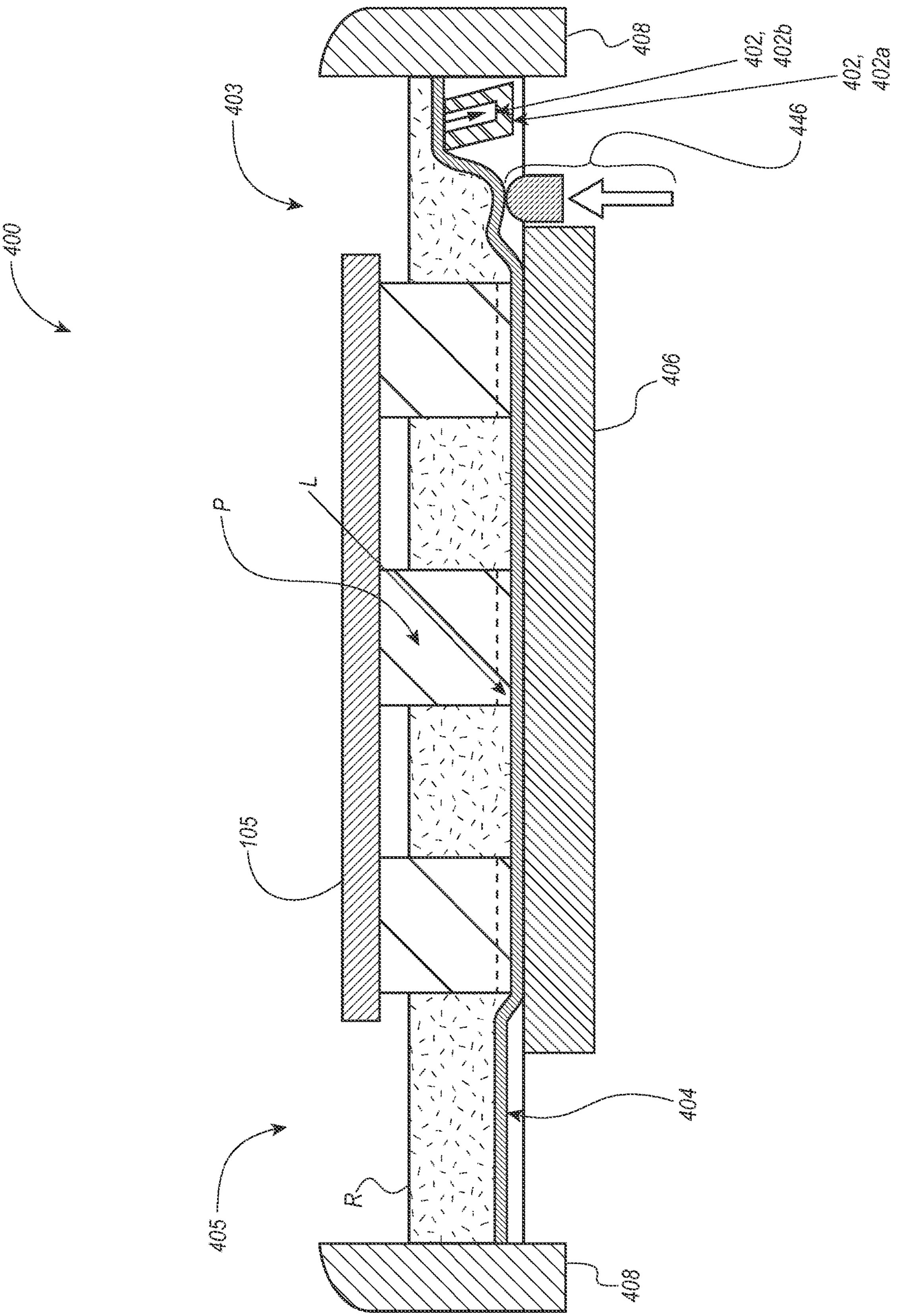

FIG. 4C illustrates an example of the basin 400 wherein the liquid resin R disposed between the bottom surface of the printed part P and the flexible film layer 404 is cured to form a new print layer L. That is, the curing light 420 (FIG. 4B) solidifies the liquid resin R onto the bottom surface of the printed part P to form the new print layer L of the printed part P. Notably, the printed part P in FIG. 4C is larger than the printed part P in FIG. 4B by the size of the new print layer L. The new print layer L (i.e., second build surface) of the printed part P adheres to the flexible film layer 404 such that a force must be provided to separate new print layer L and the flexible film layer 404. Moreover, Stefan forces exist between the flexible film layer 404 and the print substrate 406. That is, the Stefan force between the flexible film layer 404 and the print substrate 406 prevent the printed part from being lifted in the vertical direction away from the print substrate 406. FIGS. 4D-4F illustrate various implementations to overcome the Stefan force between the flexible film layer 404 and the print substrate 406. In particular, each example of FIGS. 4D-4F may be used independently of the other implementations of this disclosure, or in conjunction with the other implementations, to overcome the Stefan force.

FIG. 4D illustrates an example for overcoming the Stefan force between the print substrate 406 and the flexible film layer 404. Here, forced air 442 is provided to the bottom side of the flexible film layer 404 at the first end 403 of the basin 400 and the second end of 405 the basin 400. As such, the forced air 442 provided to the bottom of the flexible film layer 404 overcomes the Stefan force adhering the print substrate 406 to the flexible film layer 404 such that the flexible film layer 404 separates from the corners of the print substrate 406.

FIG. 4E illustrates another example for overcoming the Stefan force between the print substrate 406 and the flexible film layer 404. A horizontal buckling force FB may be provided to the side wall 408 of the basin 400 to "buckle" the flexible film layer 404. The buckling of the flexible film layer 404 causes the flexible film layer 404 to overcome the Stefan force between the print substrate 406 and the flexible film layer 404. In some examples, the horizontal buckling force $F_B$ is provided directly to the side wall 408 to create the buckle motion of the flexible film layer. Alternatively, the horizontal buckling force $F_B$ may be provided directly to the flexible film layer 404 rather than to the side wall 408. In the example shown, the horizontal buckling force $F_B$ is only provided at the first end 403 of the basin 400, however, it is understood that the horizontal buckling force $F_B$ may be provided additionally and/or alternatively to the second end 405 of the basin 400.

FIG. 4F illustrates another example for overcoming the Stefan force between the flexible film layer 404 and the print substrate 406. Here, a poke actuation 446 may be provided to the bottom side of the flexible film layer 404. The poke actuation 446 applies a force to the flexible film layer 404 that overcomes the Stefan force between the flexible film layer 404 and the print substrate 406. The poke actuation 446 may be provided by a mechanical actuator or by any other actuator mechanism. In the example shown, the poke actuation 446 is only provided at the first end 403 of the basin, however, it is understood that the poke actuation 446 may be provided additionally and/or alternatively to the second end 405 of the basin 400.

Figure 4G:
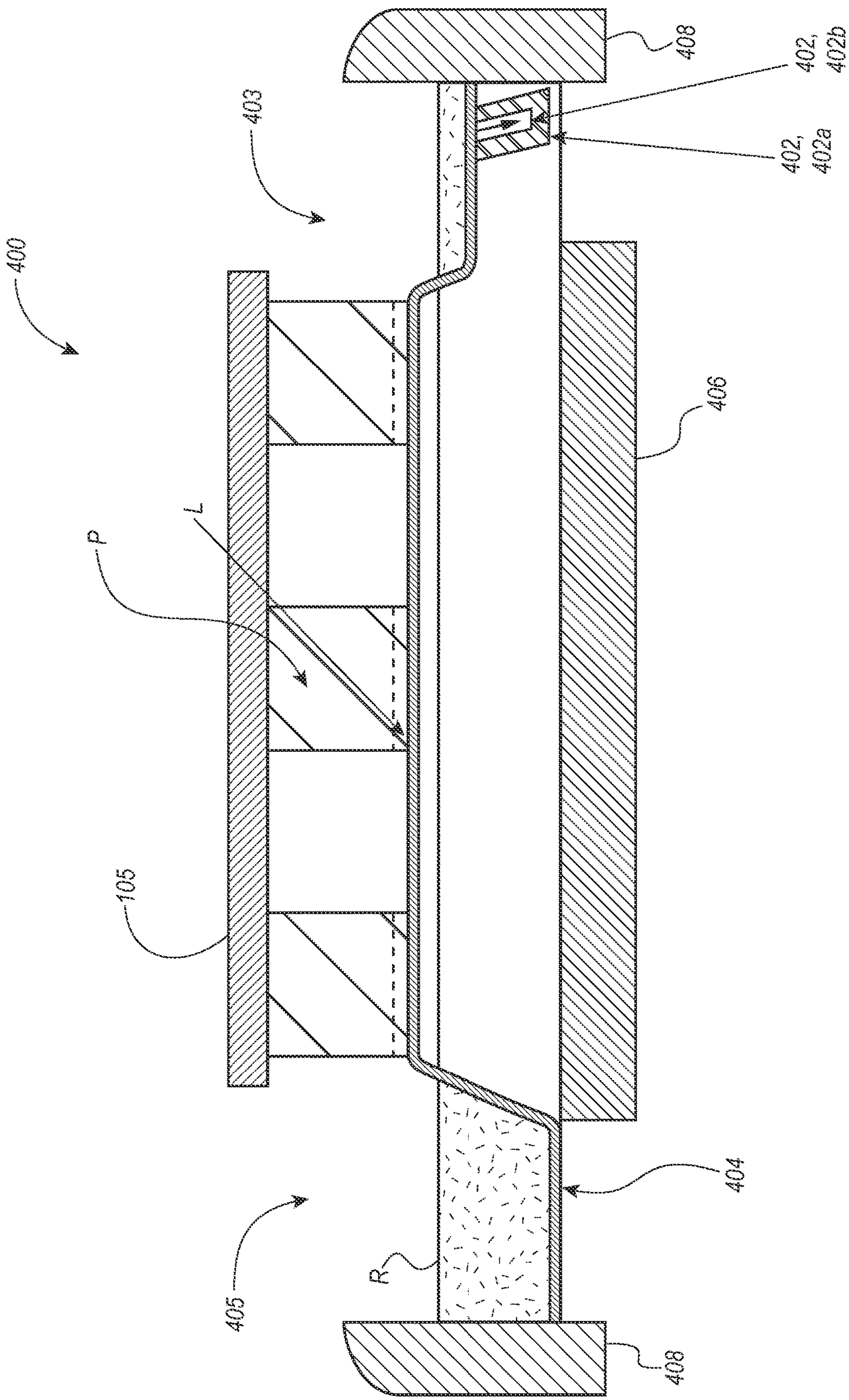

FIG. 4G, illustrates an example of the basin 400 wherein the flexible film layer 404, is lifted from the print substrate 406 by the data processing hardware 115 instructing the build platform 105 to move in the vertical direction away from the print substrate 406. Here, the printed part P affixed to the build platform 105 and the flexible film layer 404 adhered to the printed part P are lifted in the vertical direction away from a first part position (FIG. 4A) to a second part position away from the print substrate 406. That is, now that the flexible film layer 404 has overcome (or partially overcome) the Stefan force between the flexible film layer 404 and the print substrate 406, the flexible film layer 404 may be lifted by the build platform 105 to separate from the print substrate 406. Moving the build platform 105, and thus the printed part P, allows sufficient room for the vacuum nozzle 402 to operate between the bottom surface of the printed part P and the print substrate 406.

Figure 4H:
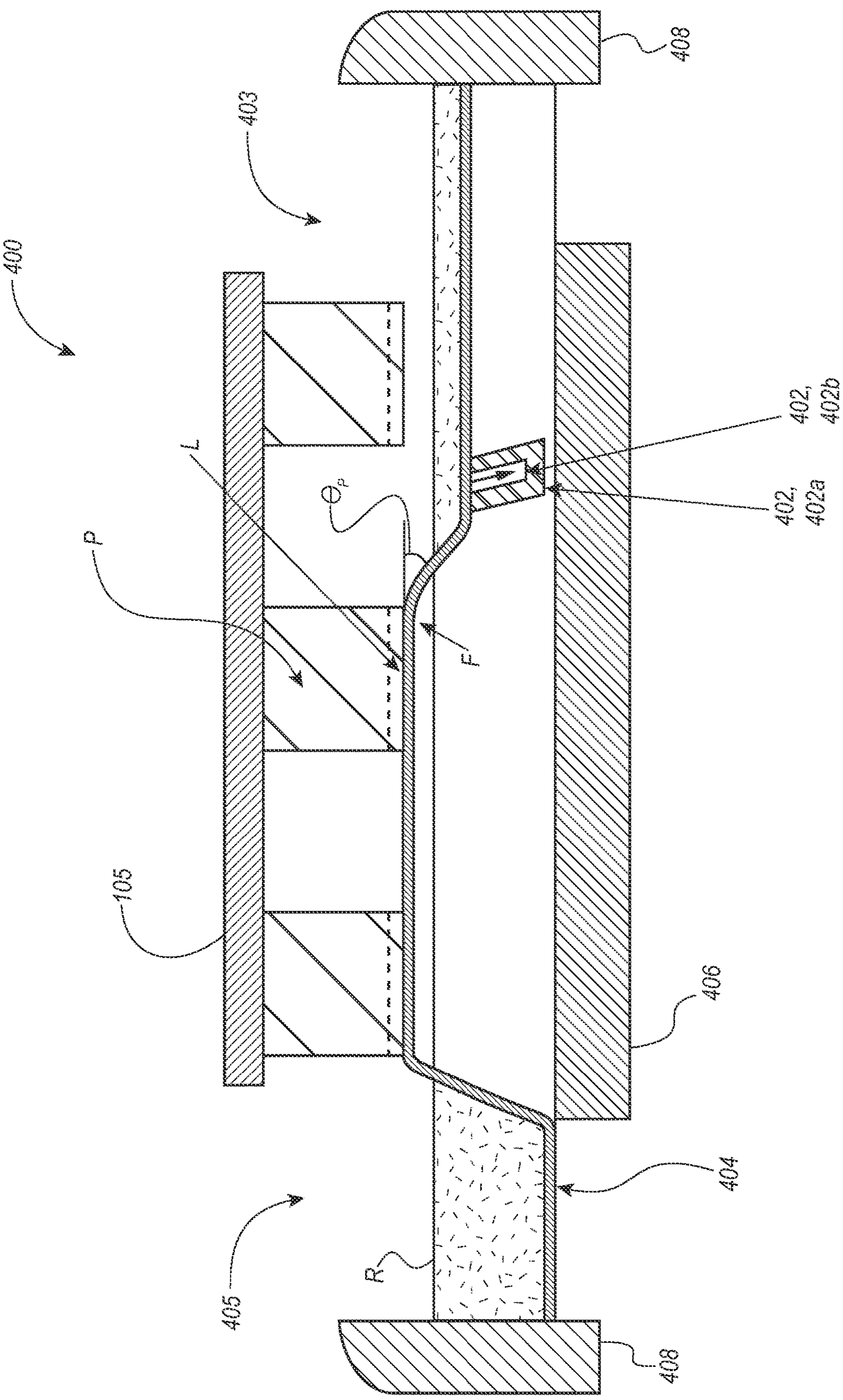

FIG. 4H illustrates an example of the basin 400 wherein the vacuum nozzle 402 translates from the first position (FIGS. 4A-4G) on a first side of the printed part to a second position. As the vacuum nozzle 402 translates from the first position to the second position, vacuum of the vacuum nozzle 402 pulls the flexible film layer 404 down towards the vacuum nozzle 402. Accordingly, as the vacuum nozzle 402 (i.e., peeling mechanism) pulls the flexible film layer 404 down towards the leading edge of the vacuum nozzle 402 inducing a peel front F. The exact curvature of the flexible film layer 404 depends on several factors including, but not limited to, geometry of the printed part P, geometric relationship between the blade and the printed part P, and the stiffness, or other characteristics, of the flexible film layer 404. Notably, the vacuum nozzle 402 induces a high peel angle $\theta_P$ (i.e., angle between the new print layer L of the printed part P and the flexible film layer 404) while translating from the first position to the second position. The high peel angle $\theta_P$ reduces the force applied to the printed part P (e.g., by localizing the peel front F) providing increased print quality of the printed part P.

Figure 4I:
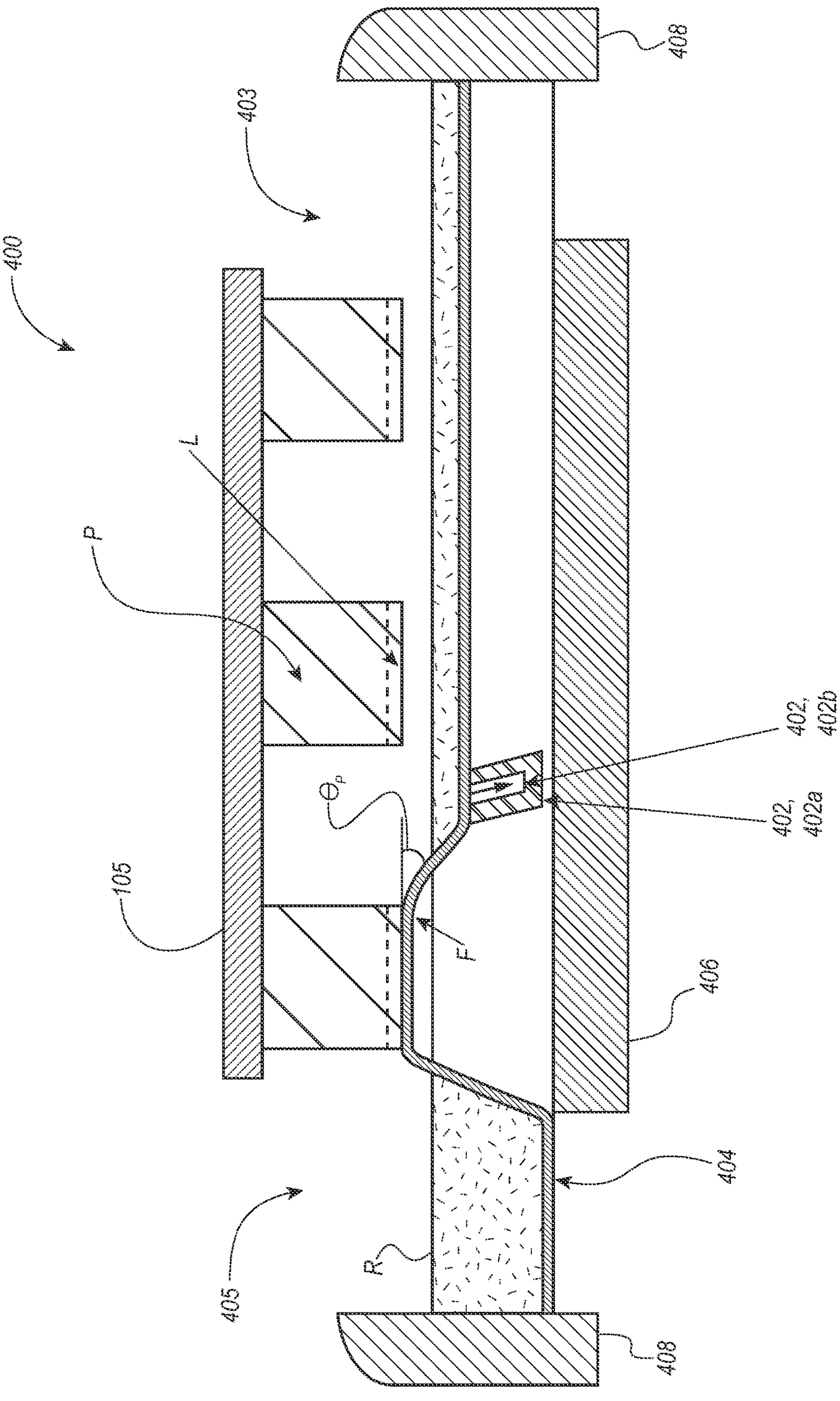

FIG. 4I illustrates an example of the basin 400 wherein the vacuum nozzle 402 translates from the second position (FIG. 4H) to a third position. As the vacuum nozzle 402 translates from the second position to the third position, the vacuum nozzle 402 continues to pull the vacuum pulling the flexible film layer 404 towards the top of the vacuum nozzle 402. As such, the vacuum between vacuum nozzle 402 and the flexible film layer 404 induces a peeling force that peels the flexible film layer 404 from the printed part P. Translating the vacuum nozzle 402 from the second position to the third position continues creating the separation force to separate the new layer of the printed part P from the flexible film layer 404. Notably, the vacuum nozzle 402 induces a high peel angle $\theta_P$ while translating from the second position to the third position.

Figure 4J:
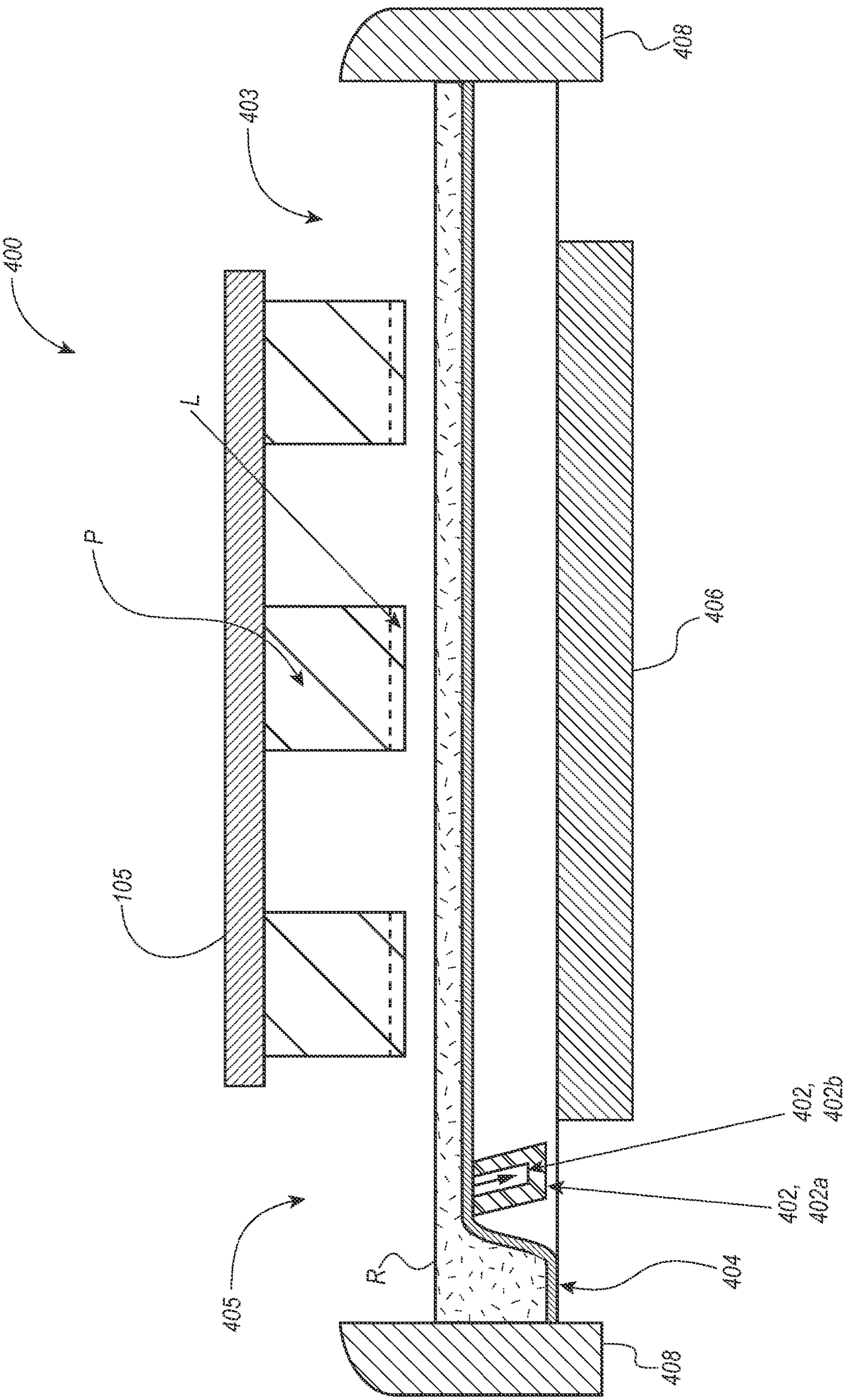

FIG. 4J illustrates an example of the basin 400 wherein the vacuum nozzle 402 translates from the third position (FIG. 4I) to a fourth position on a second side of the printed part P at the second end 405 of the basin 400. As the vacuum nozzle 402 translates from the third position to the fourth position, the flexible film layer 404 separates completely from the printed part P (i.e., the flexible film layer 404 and the printed part P are no longer in contact). As such, the flexible film layer 404 re-laminates over the print substrate 406 due to tension of the flexible film layer 404 and/or the vacuum nozzle 402 pulling the flexible film layer 404 (e.g., via vacuum applied to the bottom side of the flexible film layer 404) away from the printed part P and towards the print substrate 406. Accordingly, the build platform 105 and the printed part P are now free to move in the vertical direction without causing movement of the flexible film layer 404.

Figure 4K:
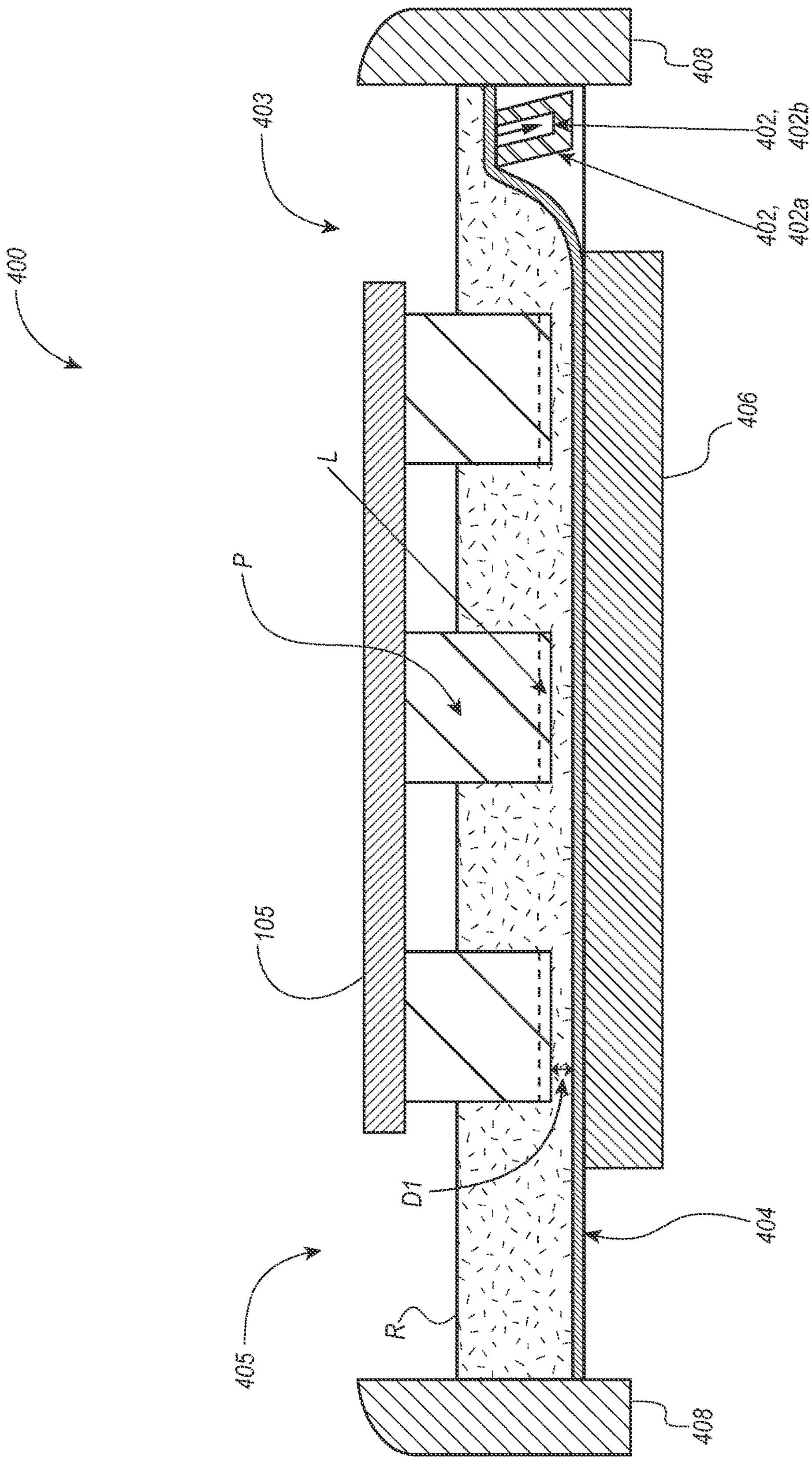

FIG. 4K illustrates an example of the basin 400, wherein the data processing hardware 115 instructs the build platform 105 to lower the printed part P in the vertical direction towards the flexible film layer 404, commonly referred to as a "squish" move. The build platform 105 lowers the printed part P such that the bottom surface of the new print layer L of the printed part P is spaced the first distance D1 equal to one layer thickness from the flexible film layer 404. Notably, the printed part in FIG. 4K is larger than the printed part in FIG. 4A by the thickness of the previously printed layer. The process described above in FIGS. 4A-4K can be repeated until all print layers are formed onto the printed part P and the print is complete.

In some examples, after the curing light 420 solidifies the print layer L of the printed part P, liquid resin R disposed near the flexible film layer 404 is at a first temperature and liquid resin R disposed at a further distance from the flexible film layer 404 is at a second temperature. Here, the first temperature is greater than the second temperature. In other examples, liquid resin R disposed near a rigid film substrate (not shown) is at the first temperature and liquid resin R disposed at a further distance from the rigid film substrate is at the second temperature. That is, as the liquid resin R cures to form the new print layer L and adheres to the flexible film layer 404 (or rigid film substrate) the surrounding liquid resin R heats to a higher temperature as compared to liquid resin R disposed at a further distance from the new print layer L. In these examples, the translation of the vacuum nozzle 402 from the first end 403 of the basin 400 to the second end 405 of the basin 400 reduces the temperature of the liquid resin R near the flexible film layer 404 (or rigid film substrate). In particular, the translation of the vacuum nozzle 402 causes the liquid resin R at the first temperature to mix with the liquid resin R at the second temperature thereby reducing the temperature of the liquid resin R disposed near the new print layer L. As such, the translation of the vacuum nozzle 402 provides a thermal regulation for the liquid resin R.

FIGS. 5A-5G illustrate schematic views of an example basin 500 that includes a deformable substrate, according to some examples. In the example of FIGS. 5A-5G, the basin 500 includes a roller 502, a deformable print substrate 504 side walls 508, and liquid resin R. The deformable print substrate 504 may be any deformable substrate including foam, plastic, a volume of gel, encapsulated liquid, or any other deformable transparent medium. The deformable print substrate 504 may be translucent allowing light to pass through the deformable print substrate 504. That is, the deformable print substrate 504 may act as a window for the curing light 520. In each of FIGS. 5A-5G, the build platform 105 includes a printed part P affixed to the build platform 105 interacting with the basin 500.

Figure 5A:
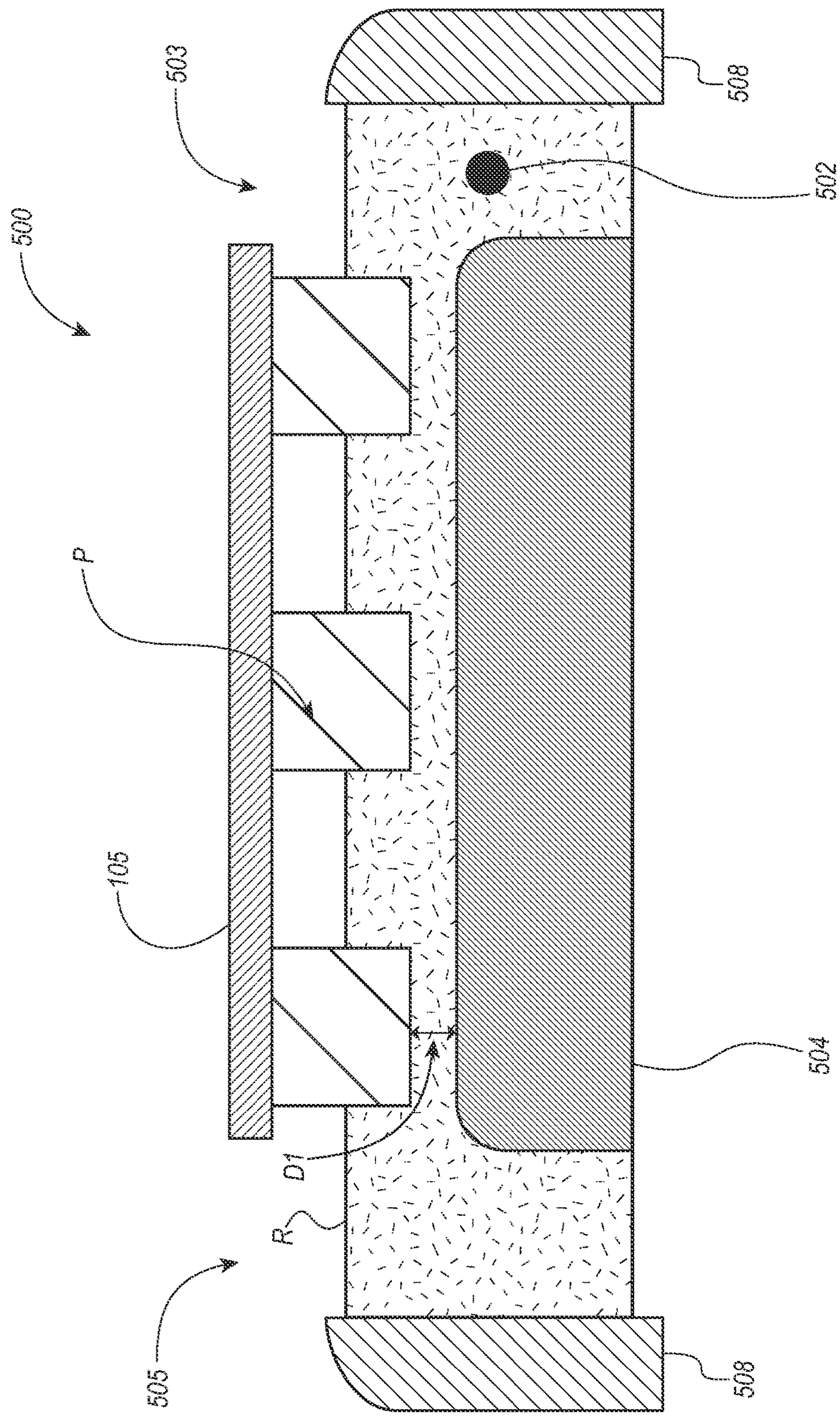
FIGS. 5A-5G illustrate cross-sectional schematic views of an example basin that includes a deformable substrate, according to some examples.

FIG. 5A illustrates an example of the basin 500 wherein data processing hardware 115 instructs the build platform 105 to position the printed part P at a first vertical position in the basin 500. Here, the printed part P includes three distinct structures rather than a single structure as in FIG. 2. At the first vertical position, the bottom surface of the printed part P is positioned a first distance D1 from the deformable print substrate 504 corresponding to one layer thickness. The one layer thickness refers to the depth of liquid resin R disposed between the printed part P and the deformable print substrate 504 for forming a single printed layer L on the bottom surface of the printed part P. Moreover, the roller 502 may be located at or near the deformable print substrate 504 at the first end 503 of the basin 500, and may extend across the entire width of the deformable print substrate 504 or a portion of the width of the deformable print substrate 504.

Figure 5B:
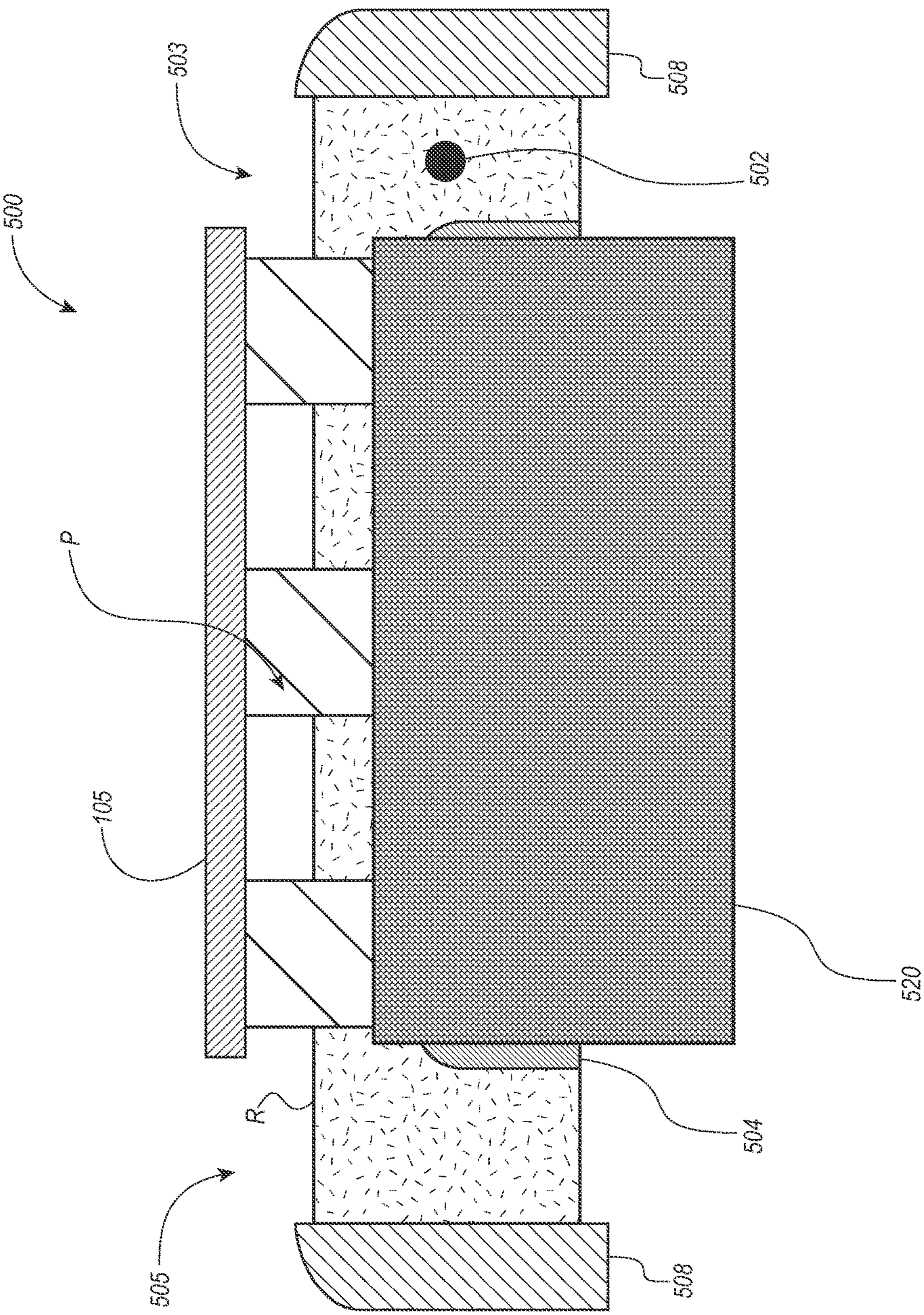

FIG. 5B illustrates an example of the basin 500 wherein a curing light 520 exposes the liquid resin R disposed between the printed part P and the deformable print substrate 504. The curing light 520 cures the liquid resin R from the bottom side of the basin 500 through the deformable print substrate 504 creating a new print layer L of the printed part P. The curing light 520 may be provided by any light source known by those skilled in the art of SLA printing.

Figure 5C:
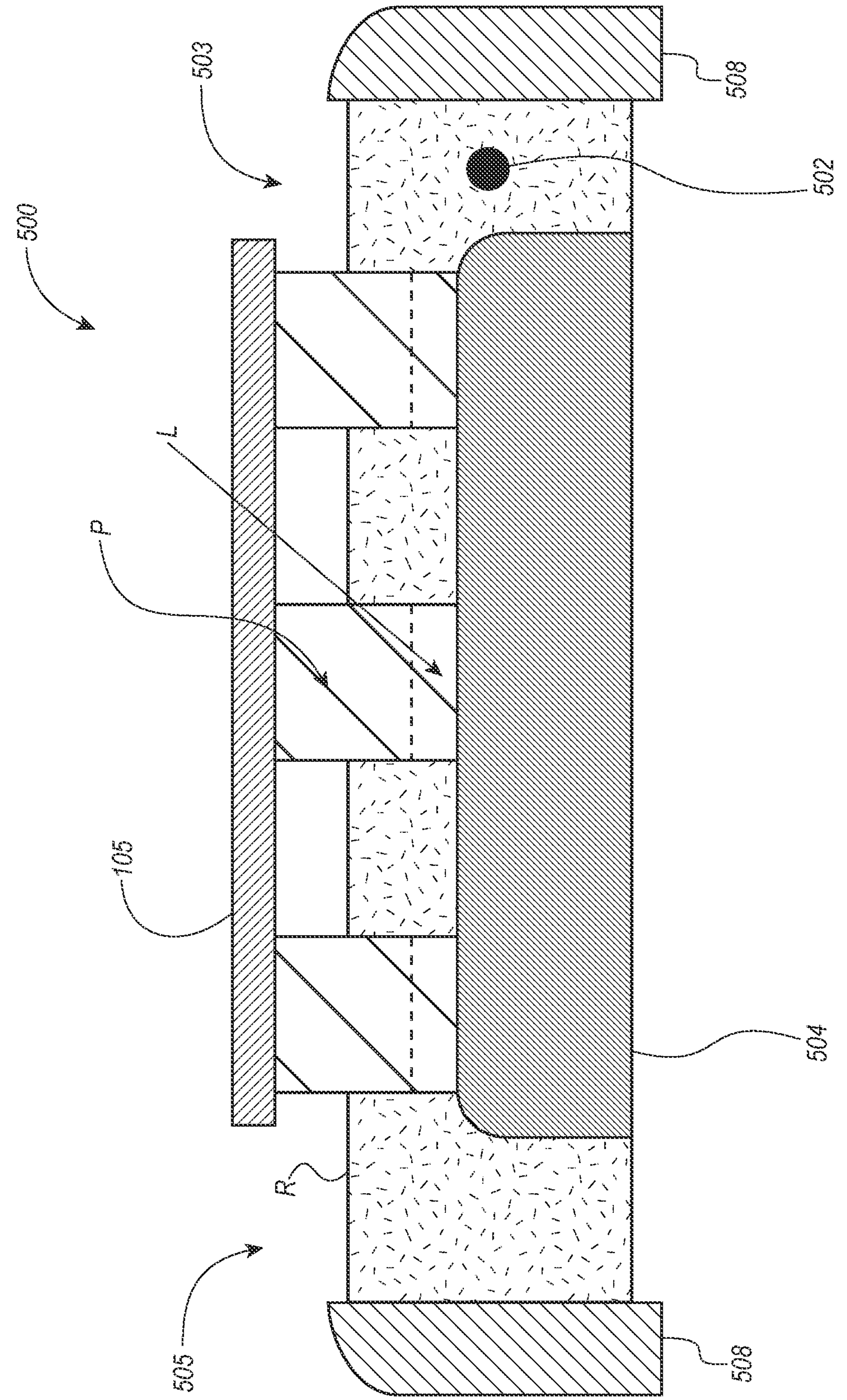

FIG. 5C illustrates an example of the basin 500 wherein the liquid resin R disposed between the printed part P and the deformable print substrate 504 is cured to form a new print layer L. That is, the curing light 520 (FIG. 5B) solidifies the liquid resin R onto the bottom surface of the printed part P to form the new print layer L of the printed part P. Notably, the printed part P in FIG. 5C is larger than the printed part P in FIG. 5B by the size of the new print layer L. The new print layer L of the printed part P adheres to the deformable print substrate 504 such that a force must be provided to separate new print layer L and the deformable print substrate 504. Optionally, the data processing hardware may instruct the build platform 105 to raise the printed part P creating tension on the deformable print substrate.

Figure 5D:
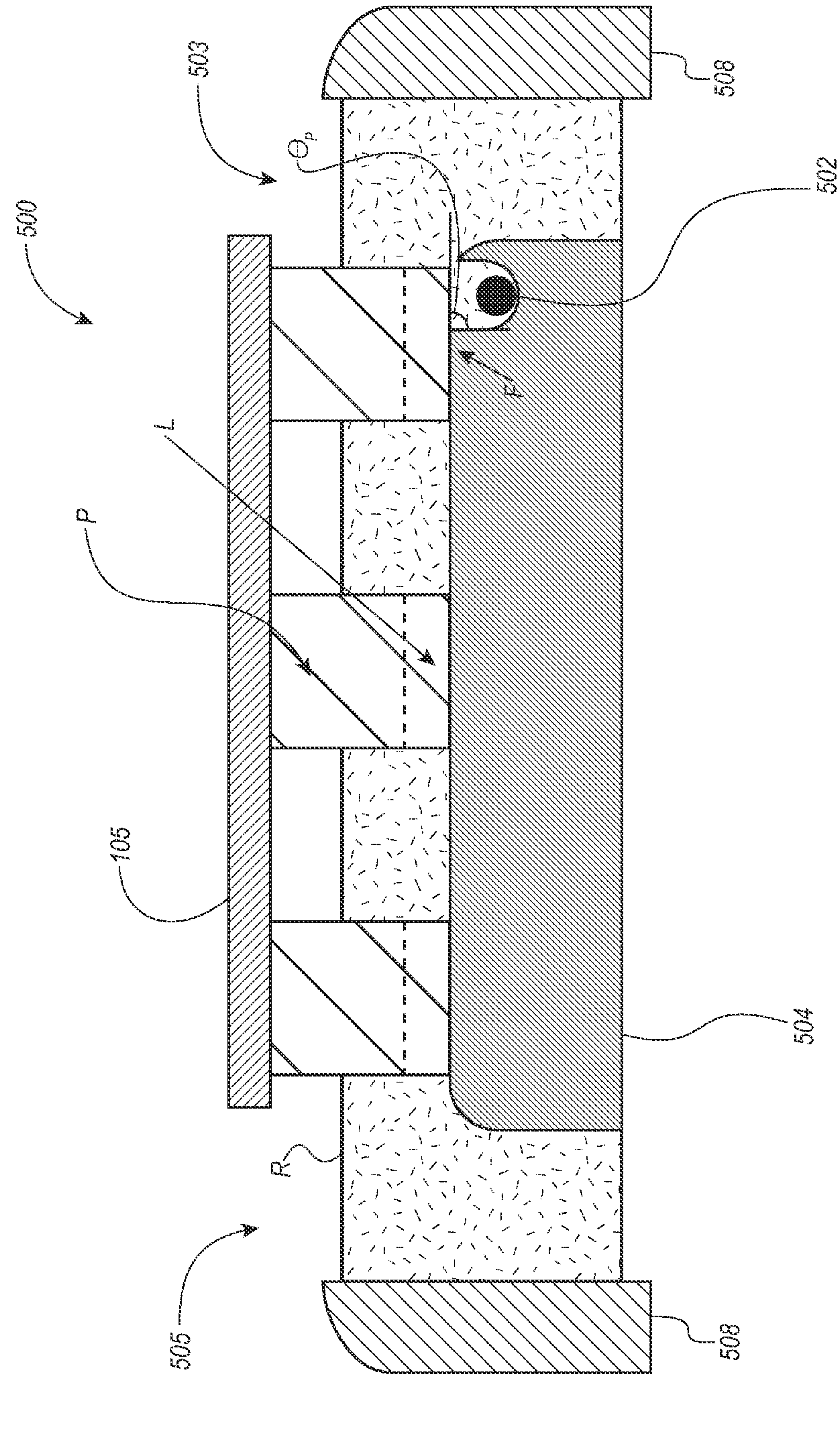

FIG. 5D, illustrates an example of the basin 500 wherein the data processing hardware 115 (FIG. 1) instructs the roller 502 to move from the first position at the first end of the basin to a second position. At the second position, the roller 502 induces a peel front F by deforming the deformable print substrate 504. The exact curvature of the deformable print substrate 504 depends on several factors including, but not limited to, geometry of the printed part P, geometric relationship between the blade and the printed part P, and the stiffness, or other characteristics, of the deformable print substrate 504. Operating the roller 502 from the first position to the second position creates a separation force to separate the new layer of the printed part P from the deformable print substrate. Notably, the roller 502 induces a high peel angle $\theta_P$ (i.e., angle between the new print layer L of the printed part P and the deformable print substrate 504) while operating from the first position to the second position. The high peel angle $\theta_P$ reduces the force applied to the printed part P (e.g., by localizing the peel front F) providing increased print quality of the printed part P. Moreover, at the second position the roller 502 localizes the peel front F to the pocket created by the roller 502 deforming the deformable print substrate.

Figure 5E:
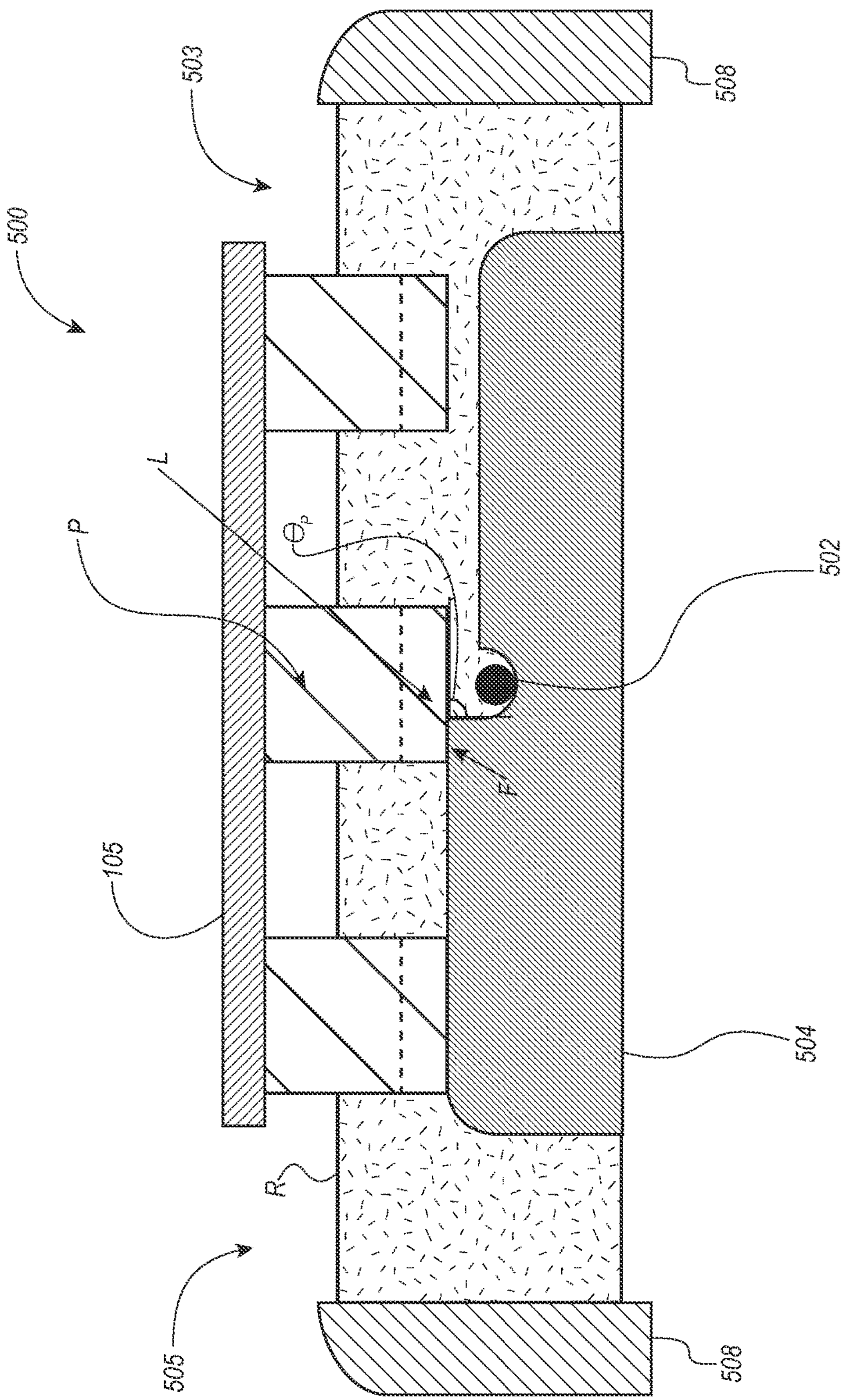

FIG. 5E illustrates an example of the basin 500 wherein the roller 502 translates from the second position (FIG. 5D) to a third position. As the roller 502 operates from the second position to the third position, the previously deformed material (i.e., to the right of the roller 502) remains separated from the printed part. FIG. 5E is for illustrative purpose only, and in actual practice, the previously deformed material will return to its original shape/height after the roller 502 moves over. The roller 502 continues to contact the deformable print substrate 504 inducing a print front with a high peel angle $\theta_P$. Accordingly, the roller 502 only applies a small amount of force onto the printed part P to separate the deformable print substrate 504 and the printed part P.

Figure 5F:
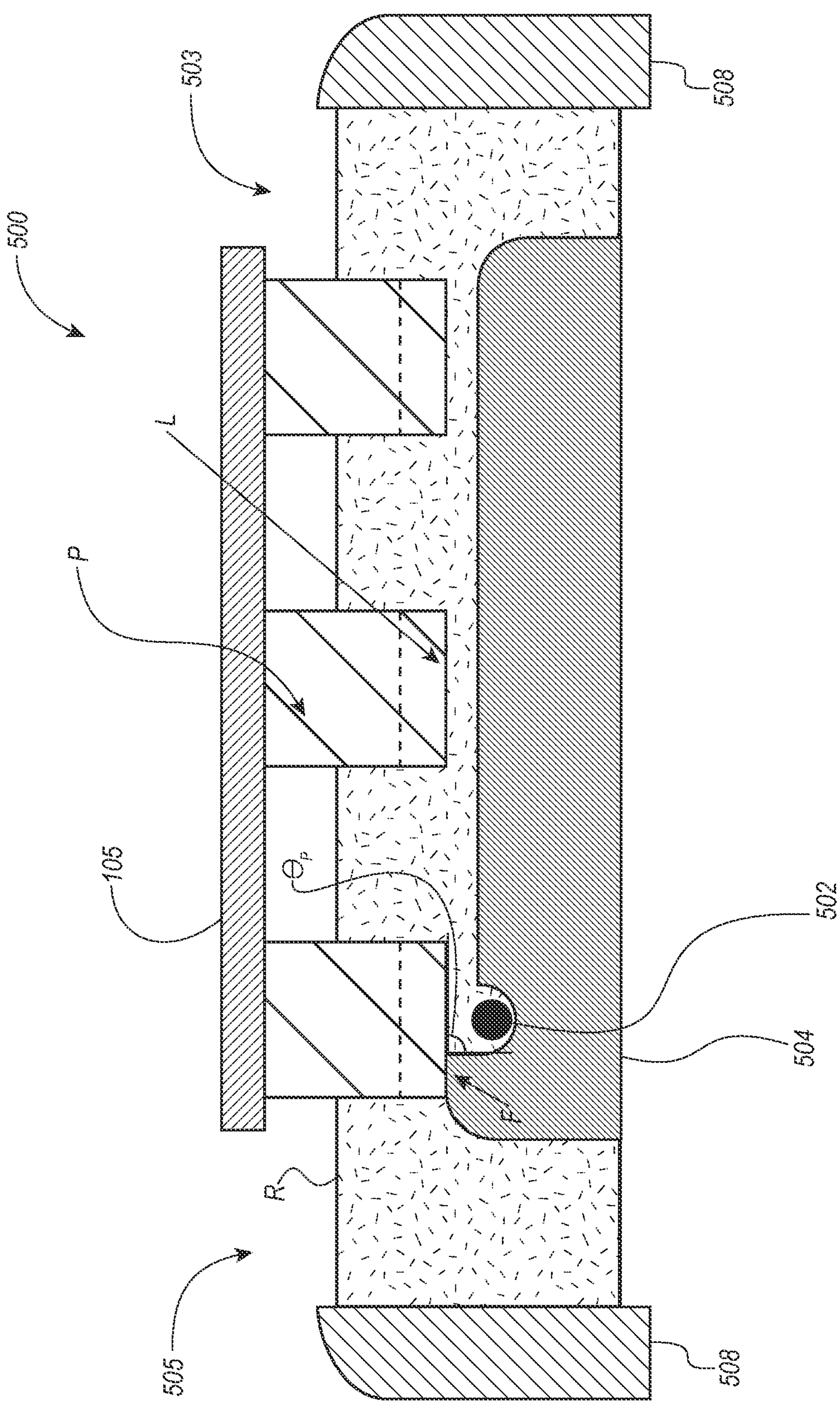

FIG. 5F illustrates an example of the basin 500 wherein the roller 502 translates from the third position (FIG. 5E) to a fourth position. As the roller 502 translates from the third position to the fourth position, the previously deformed material (i.e., to the right of the roller 502) remains separated from the printed part P. The roller 502 continues to contact the deformable print substrate 504 inducing a print front with a high peel angle $\theta_P$. Accordingly, the roller 502 only applies a small amount of force onto the printed part P to separate the deformable print substrate 504 and the printed part P.

Figure 5G:
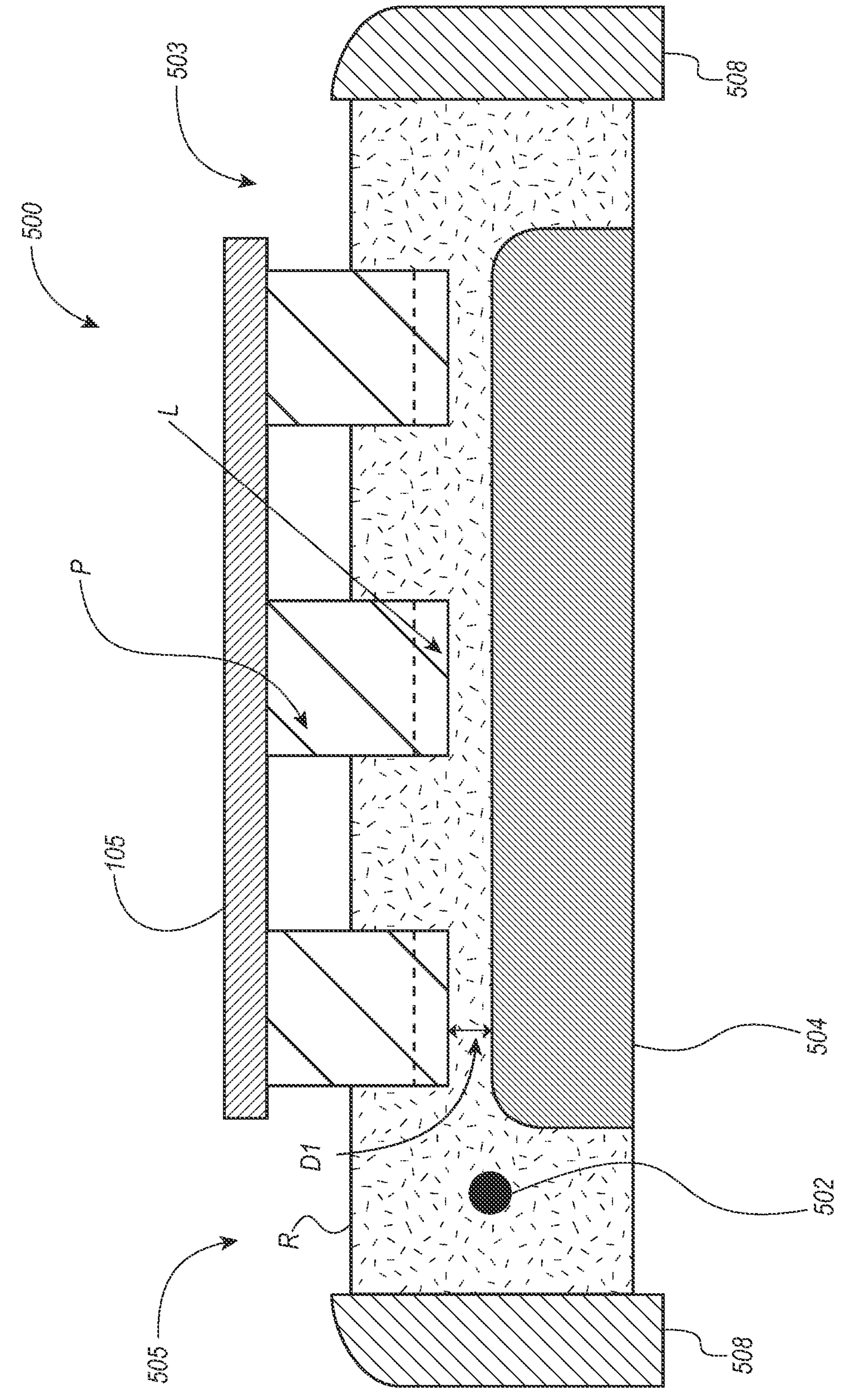

FIG. 5G illustrates an example of the basin 500 wherein the roller 502 fourth position (FIG. 5F) to a fifth position at the second end 505 of the basin 500. As the roller 502 translates from the fourth position to the fifth position, the deformable print substrate 504 separates completely from the printed part P (i.e., the deformable print substrate 504 and the printed part P are no longer in contact). Accordingly, the build platform 105 and the printed part P are now free to move in the vertical direction without causing movement of the deformable print substrate 504. Here, the data processing hardware may instruct the build platform 105 to position the printed part the one layer thickness from the deformable print substrate for another print cycle.

Alternatively, the deformable print substrate 504 peels at or about the one layer thickness away from the printed part P. Put another way, after the roller 502 completes the peel of the deformable print substrate 504 and the printed part, the deformable print substrate 504 is spaced the first distance D1 equal to one layer thickness away from the printed part P. That is because the roller 502 acting on the deformable print substrate 504 localizes the peel and keeps the deformable print substrate 504 in close proximity to the printed part P. Therefore, because the deformable print substrate 504 is already one layer thickness from the printed part P (i.e., spaced by the first distance D1) the build platform 105 is not required to lower the printed part P into the liquid resin R performing the "squish" movement. Not performing the squish movement (i.e., lowering the printed part P in the vertical direction into the liquid resin R) prevents the printed part P from incurring additional forces from displacing the liquid resin R as the printed part P is lowered towards the printed part P. The process described above in FIGS. 5A-5G can be repeated until all print layers are formed onto the printed part P and the print is complete.

FIGS. 6A-6F illustrate schematic views of an example basin 600 in that includes tensioners, according to some examples. In the example of FIGS. 6A-6F, the basin 600 includes capstans 602, a flexible film layer 604, side walls 608, tensioners 614, a platform 612, and liquid resin R. The capstans 602 are configured to support the flexible film layer 604 and are located on the bottom side of the flexible film layer 604 and on top of the platform 612. The capstans 602 are rotatable about the X-axis in either direction. The capstans 602 are located at the first end 603 of the basin 600 and the second end 605 of the basin 600. The side walls 608 are coupled to the flexible film layer 604 at the first end 603 and the second end 605 of the basin 600, respectively, to allow the liquid resin R to be disposed within the basin 600. Tensioners 614 may be located within the side walls 608 and coupled to the flexible film layer 604. The tensioners 614 are configured to control the tension of the flexible film layer 604 by moving inwards towards the center of the basin 600 (e.g., to loosen tension) and moving outwards from the center of the basin 600 (e.g., to increase tension). In some examples, one of the tensioners 614 is fixed (i.e., does not move or increase/reduce tension) and the other one of the tensioners 614 controls the tension of the flexible film layer 604. The tensioners 614 may apply tension by springs, vacuum, a mechanical actuator, and/or magnets. As the tensioners 614 increase and loosen tension on the flexible film layer 604, the capstans 602 rotate about the X-axis allowing the flexible film layer 604 to move across the capstans 602. In each of FIGS. 6A-6F, the build platform 105 includes a printed part P affixed to the build platform 105 interacting with the basin 600.

Figure 6A:
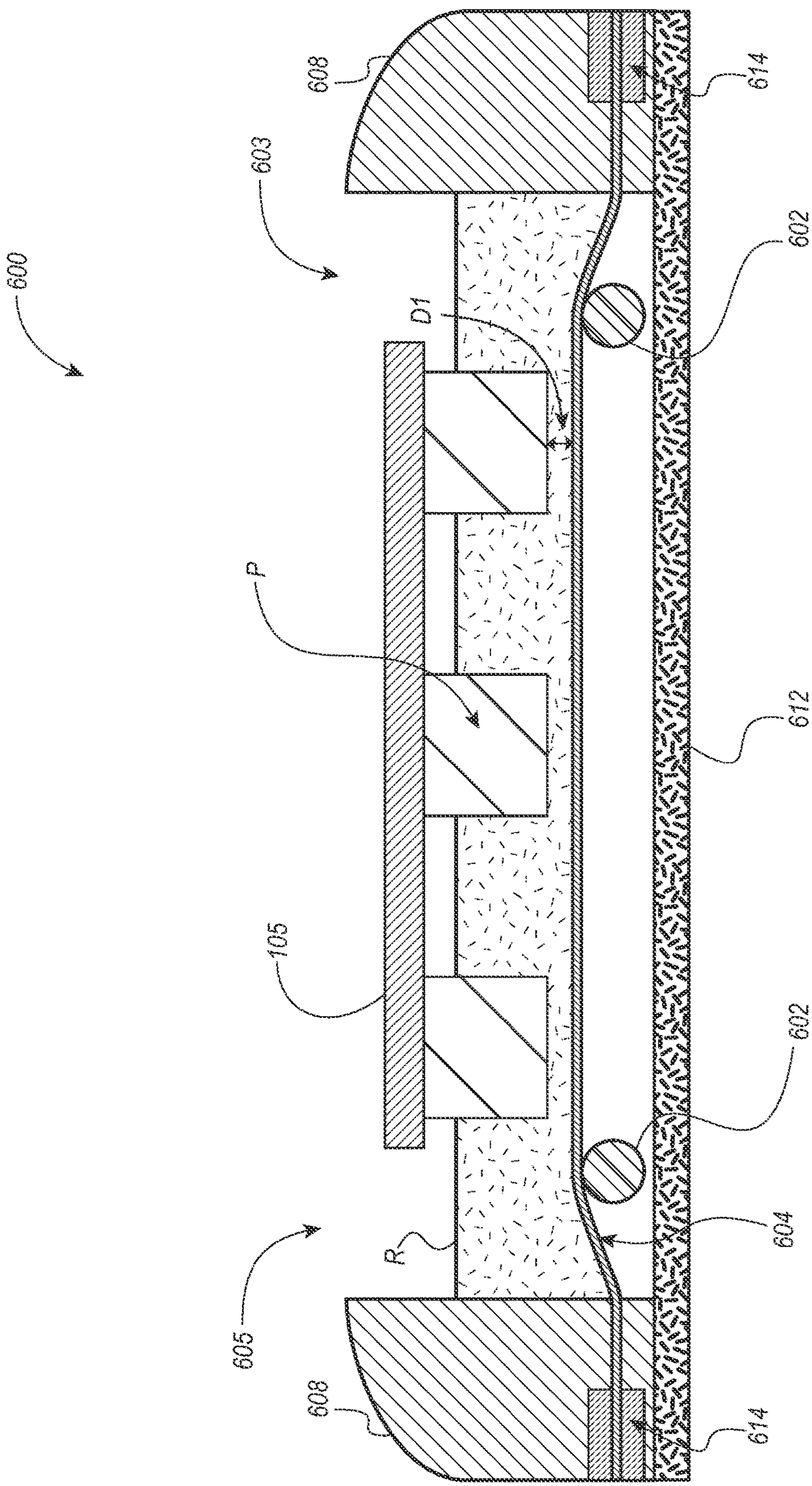
FIGS. 6A-6F illustrate cross-sectional schematic views of an example basin that includes tensioners, according to some examples.

FIG. 6A illustrates an example of the basin 600 wherein data processing hardware 115 instructs the build platform 105 to position the printed part P at a first vertical position in the basin 600. Here, the printed part P includes three distinct structures rather than a single structure as in FIG. 2. At the first vertical position, the bottom surface of the printed part P is positioned a first distance D1 from the flexible film layer 604 corresponding to one layer thickness. The one layer thickness refers to the depth of liquid resin R disposed between the printed part P and the flexible film layer 604 for forming a single printed layer L on the bottom surface of the printed part P. Moreover, the tensioners 614 increase tension on the flexible film layer 604 by moving outward from the center of the basin 600. Applying tension to the flexible film layer 604 causes the flexible film layer 604 to lay flat thereby increasing the transparency of the flexible film layer 604. Increasing the flatness and/or transparency of the flexible film layer reduces defects caused in the printed part caused by any imperfections in the flexible film layer as a curing light 620 cures the liquid resin R through the flexible film layer 604.

Figure 6B:
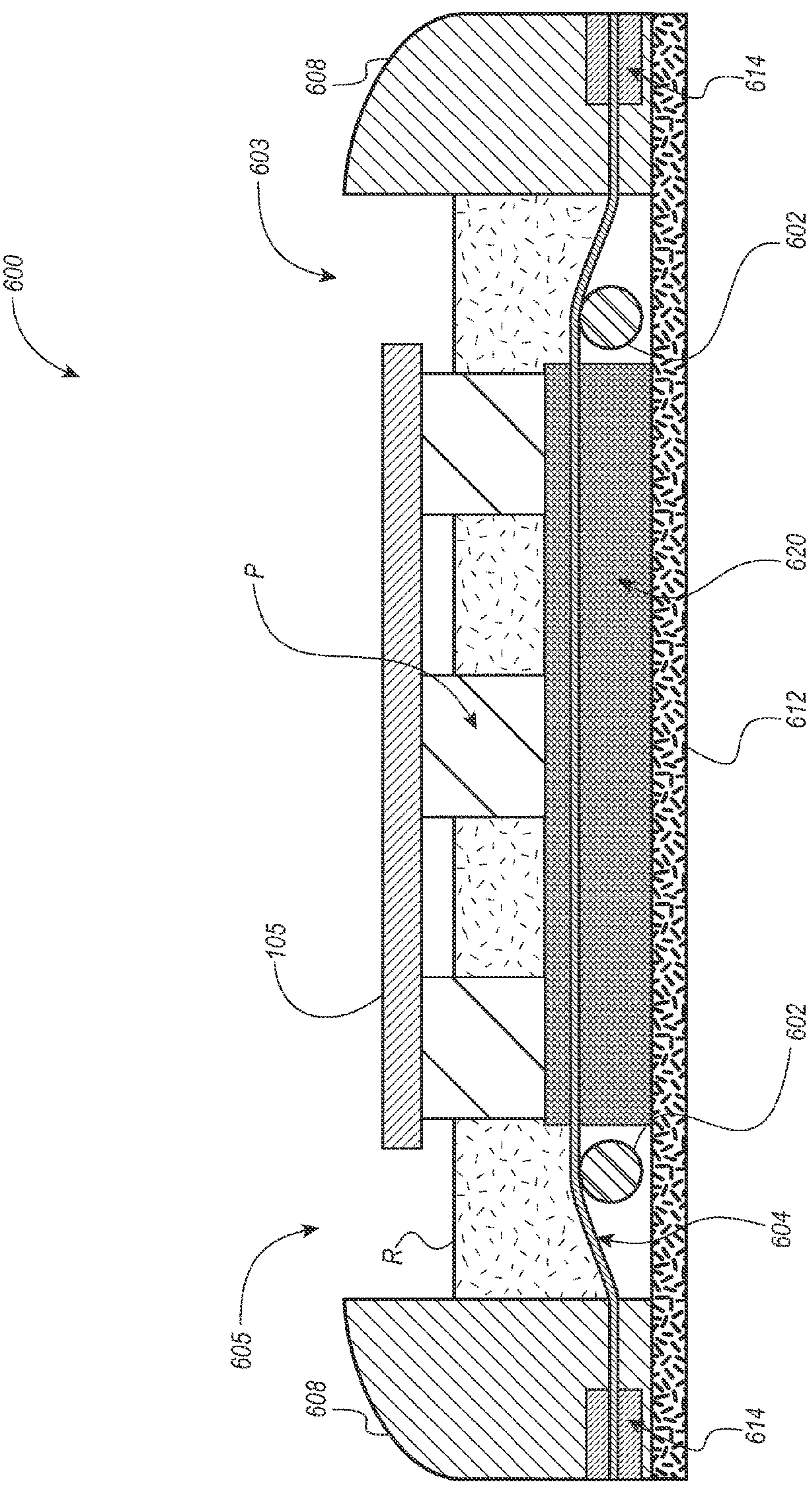

FIG. 6B illustrates an example of the basin 600 wherein the curing light 620 exposes the liquid resin R disposed between the printed part P and the flexible film layer 604. The curing light 620 cures the liquid resin R disposed between the printed part P and the flexible film layer 604 is cured to form a new part layer L. That is, the curing light 620 solidifies the liquid resin R onto the bottom surface of the printed part P to form the new print layer L of the printed part P. Optionally, the light source of the curing light 620 may be located beneath the platform 612. The curing light 620 may be provided by any light source known by those skilled in the art of SLA printing.

Figure 6C:
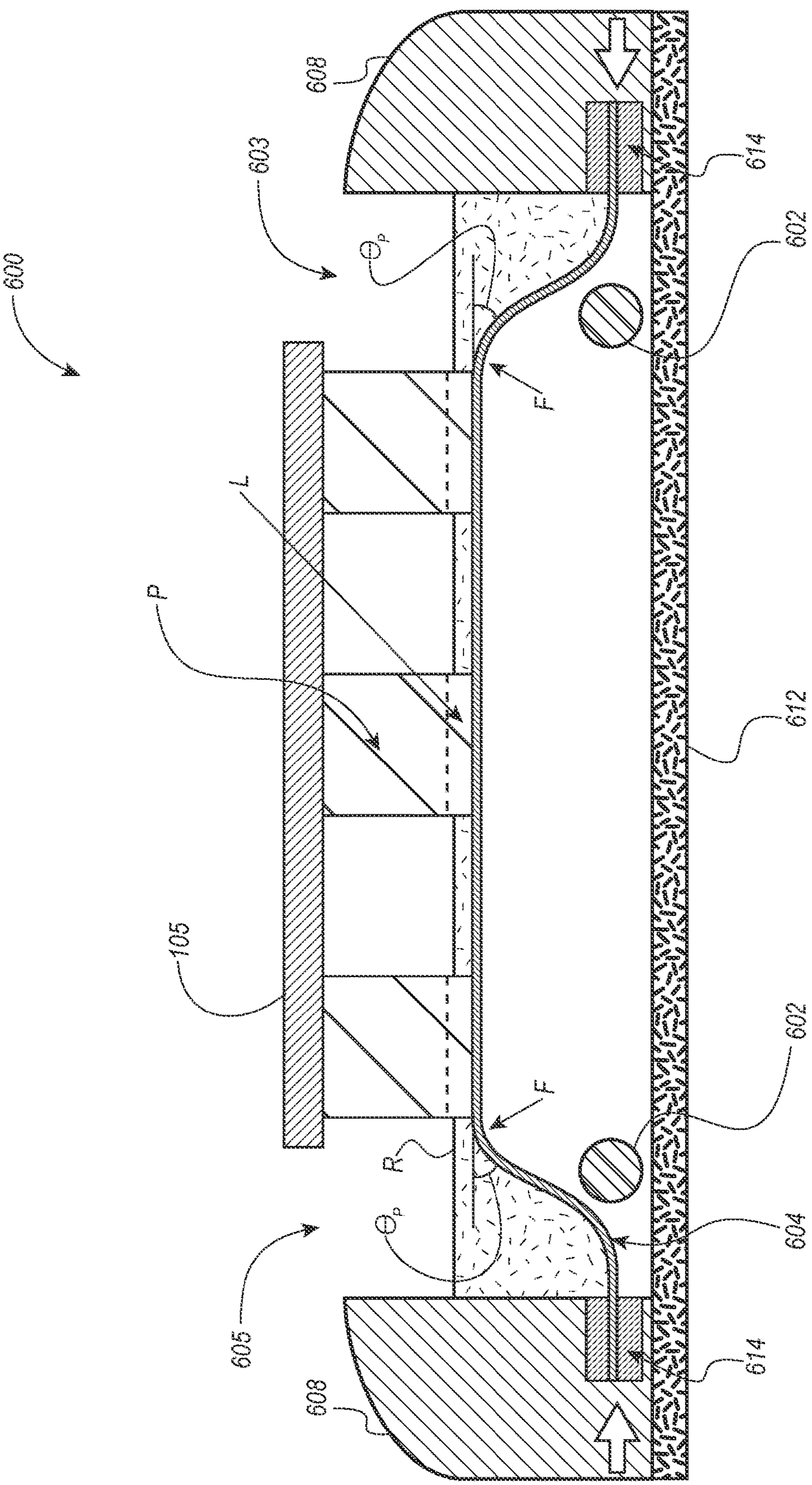

FIG. 6C illustrates an example of the basin 600 wherein the tensioners reduce tension on the flexible film layer 604. That is, the curing light 620 (FIG. 6B) solidifies the liquid resin R onto the surface of the printed part P becoming the new print layer L of the printed part P. Notably, the printed part P in FIG. 6C is larger than the printed part P in FIG. 6B by the size of the new print layer L. The new print layer L of the printed part P adheres to the flexible film layer 604 such that a force must be applied to separate new print layer L and the flexible film layer 604.

Moreover, the tensioners 614 reduce tension on the flexible film layer 604 (i.e., by moving inwards towards the center of the basin 600) providing extra film length for the flexible film layer 604. Thus, the data processing hardware 115 (FIG. 1) instructs the build platform 105 to lift the printed part P in the vertical direction away from the platform 612. Reducing tension on the flexible film layer 604 allows the build platform 105 to raise the printed part P to apply a force between the flexible film layer 604 and the printed part P.

Figure 6D:
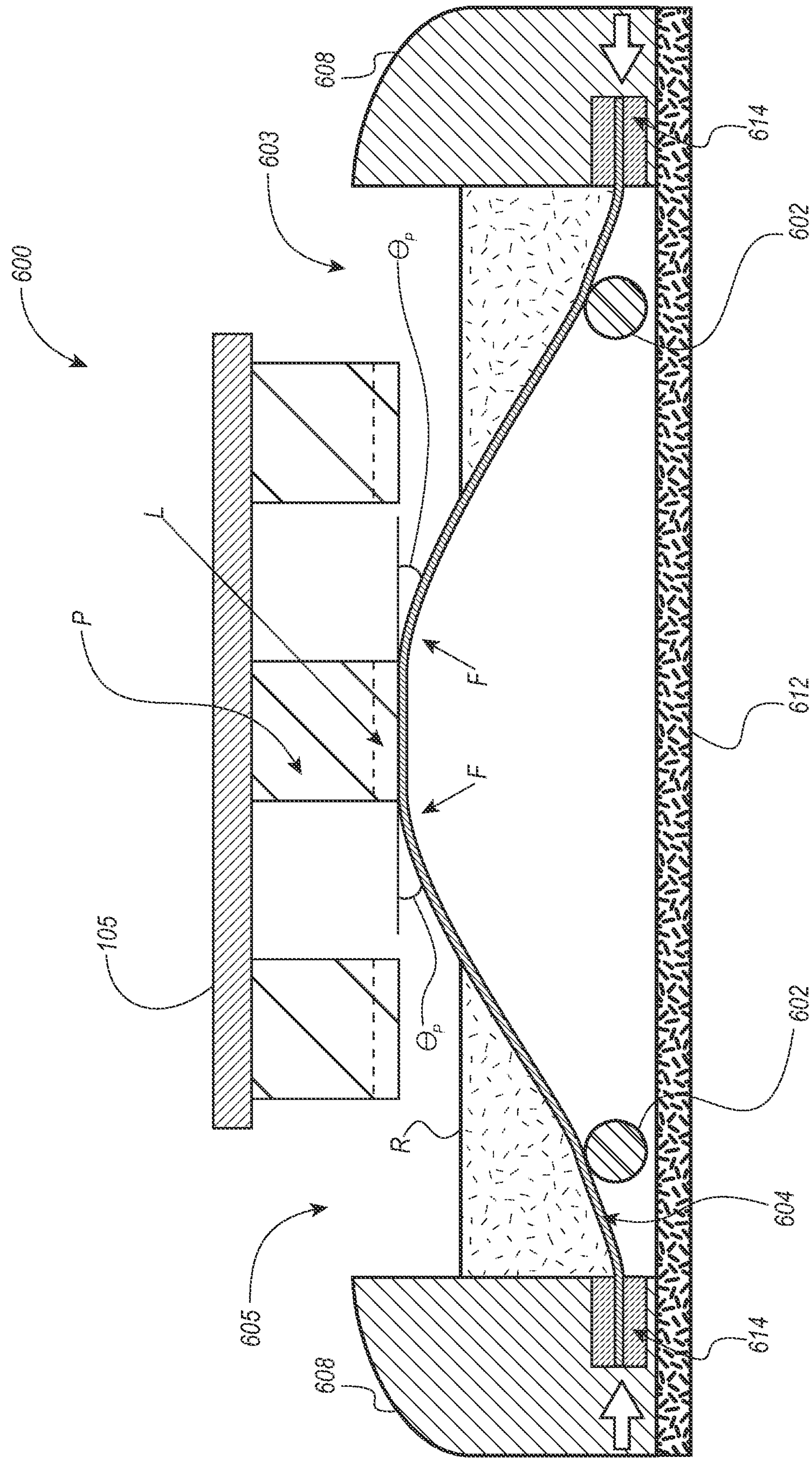

FIG. 6D illustrates an example of the basin 600 wherein the flexible film layer 604 peels from the printed part P. That is, the data processing hardware 115 instructs the build platform 105 to move in the vertical direction further away from the platform 612 inducing a peel front F. Here, the printed part P affixed to the build platform 105 and the flexible film layer 604 adhered to the printed part P are lifted in the vertical direction away from the platform 612. Thus, the build platform 105 and the printed part P is at a position further away from the platform 612 as compared to FIG. 6C. The exact curvature of the flexible film layer 604 depends on several factors including, but not limited to, geometry of the printed part P, geometric relationship between the blade and the printed part P, and the stiffness, or other characteristics, of the flexible film layer 604. Notably, the reducing the tension and further raising the build platform 105 induces a high peel angle $\theta_P$ (i.e., angle between the new print layer L of the printed part P and the flexible film layer 604) on both sides of the flexible film layer 604. Here, the peeling process initiates on both the first end 603 and the second end 605 of the basin and converging in the center of the basin. The high peel angle $\theta_P$ reduces the force applied to the printed part P (e.g., by localizing the peel front F) providing increased print quality of the printed part P. Optionally, the build platform 105 and the printed part P may not move further away from the platform 612 and the tensioners 614 move to an intermediate position within the side walls 608. As such, the retraction of the tensioners 614 (not shown) provides tension on the flexible film layer 604 to peel from the printed part P. In some examples, the build platform 105 and the printed part P may move further away from the platform 612 and the tensioners move to the intermediate position within the side walls 608.

Figure 6E:
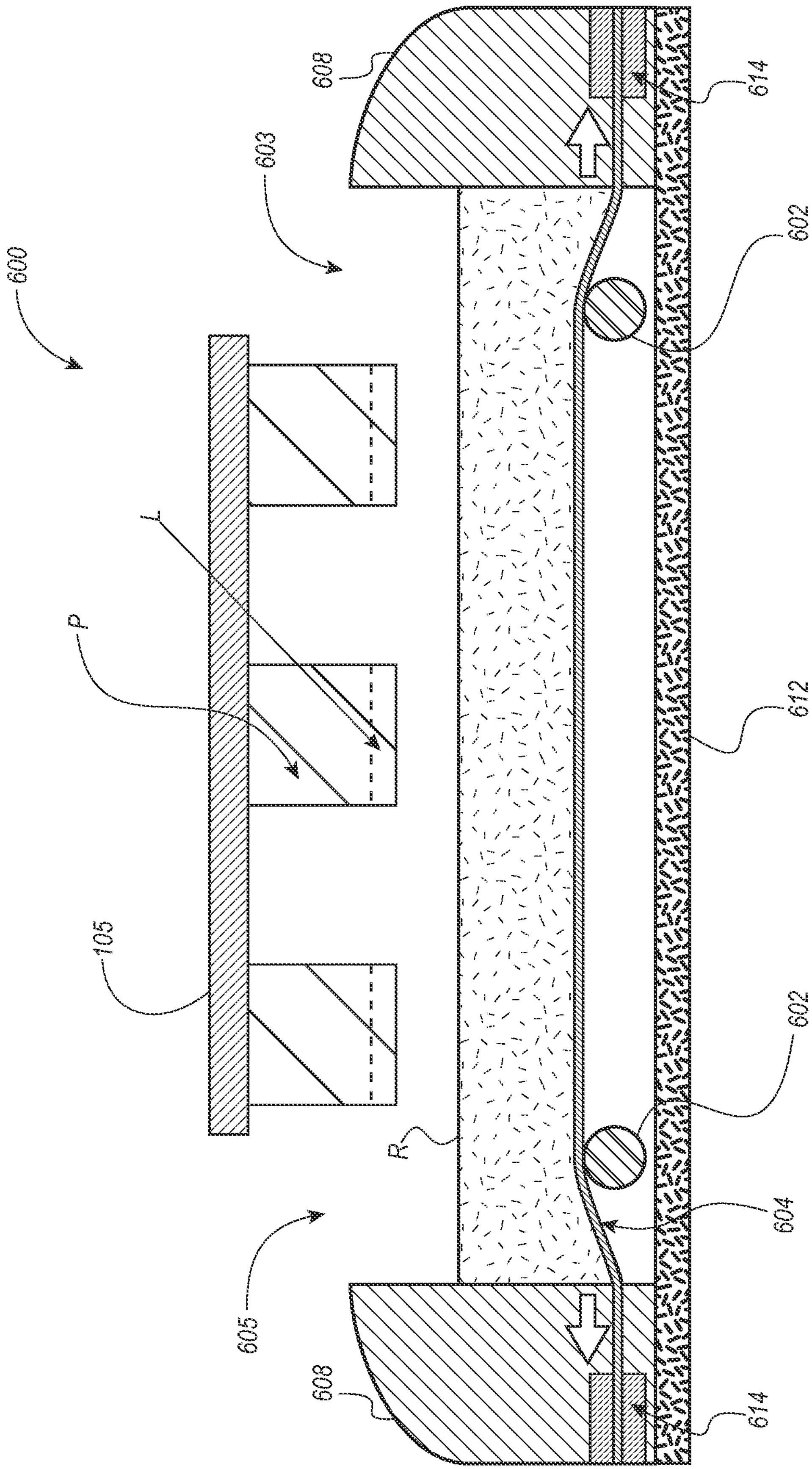

FIG. 6E illustrates an example of the basin 600 wherein the flexible film layer 604 fully separates from the printed part. That is, the printed part P is now free to move in the vertical direction causing movement of the flexible film layer 604. After the flexible film layer 604 completely separates from t the printed part, the tensioners increase tension on the flexible film layer 604 causing the flexible film layer 604 to flatten out.

Figure 6F:
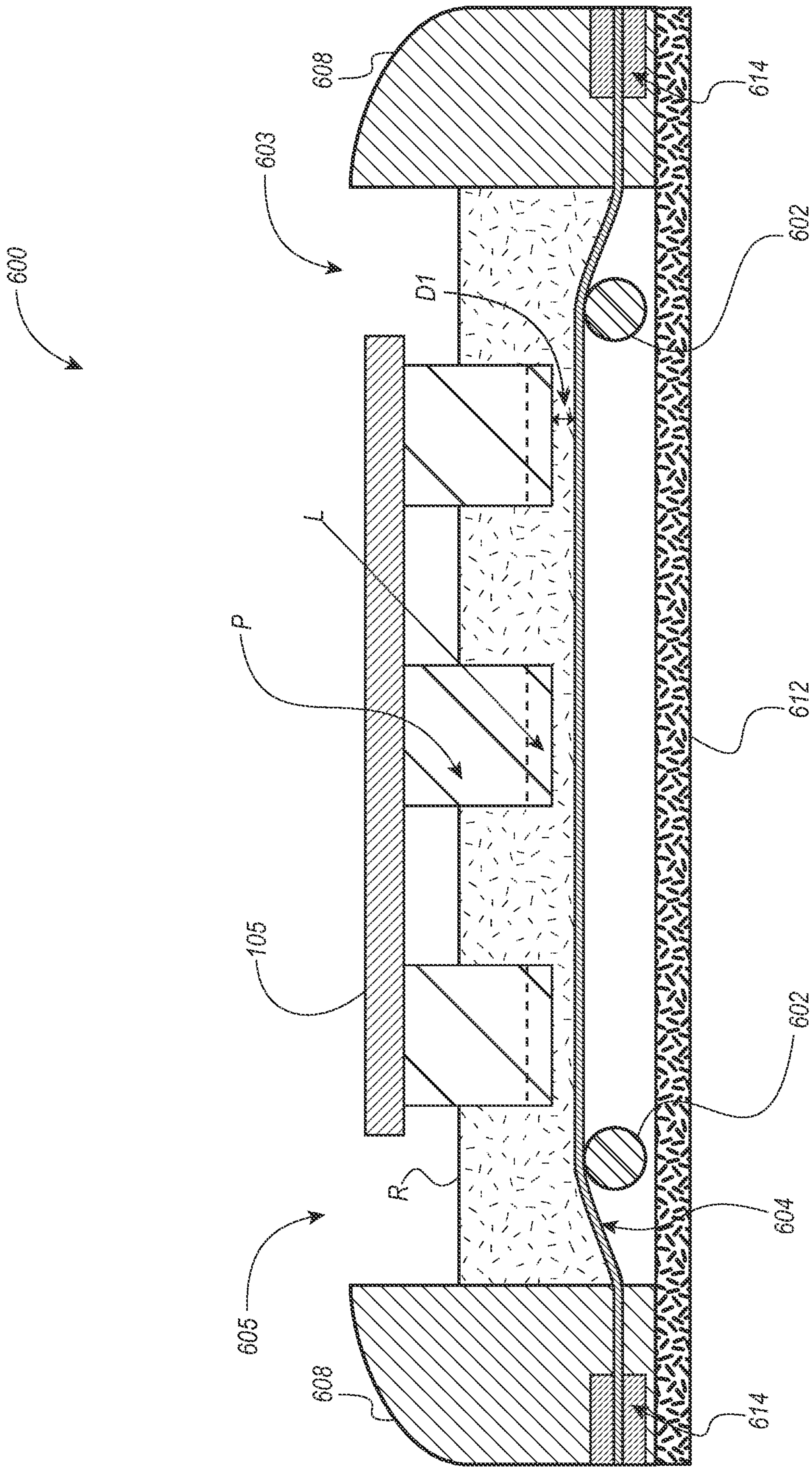

FIG. 6F illustrates an example of the basin 600, wherein the data processing hardware 115 instructs the build platform 105 to lower the printed part P in the vertical direction towards the flexible film layer 604, commonly referred to as a "squish" move. The build platform 105 lowers the printed part P such that the bottom surface of the new print layer L of the printed part P is spaced the first distance D1 equal to one layer thickness from the flexible film layer 604. Notably, the printed part in FIG. 6F is larger than the printed part in FIG. 6A by the thickness of the previously printed print layer L. The process described above in FIGS. 6A-6F can be repeated until all print layers are formed onto the printed part P and the print is complete.

Figure 7A:
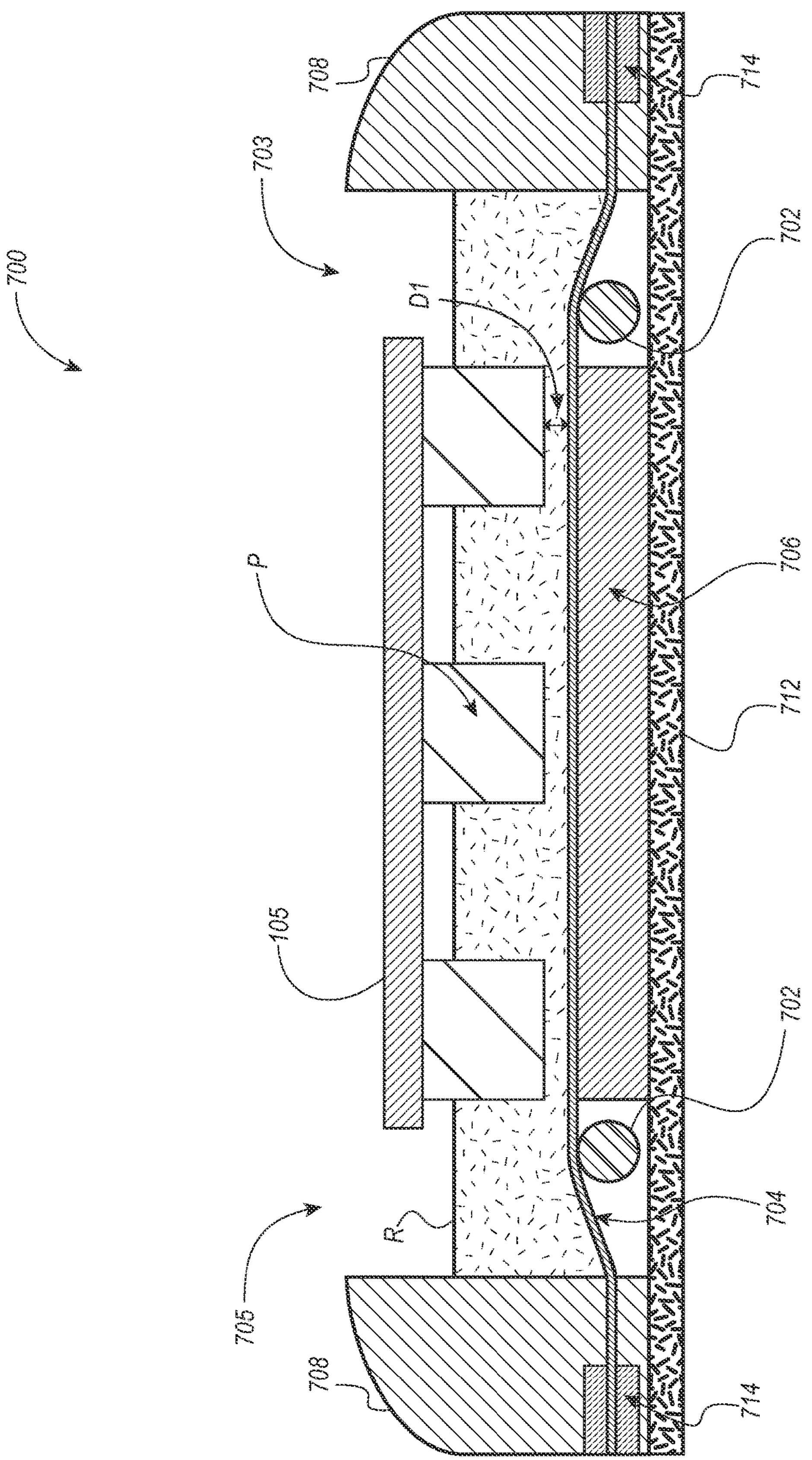
FIGS. 7A-7F illustrate cross-sectional schematic views of an example basin that includes tensioners, according to some examples.
Figure 7B:
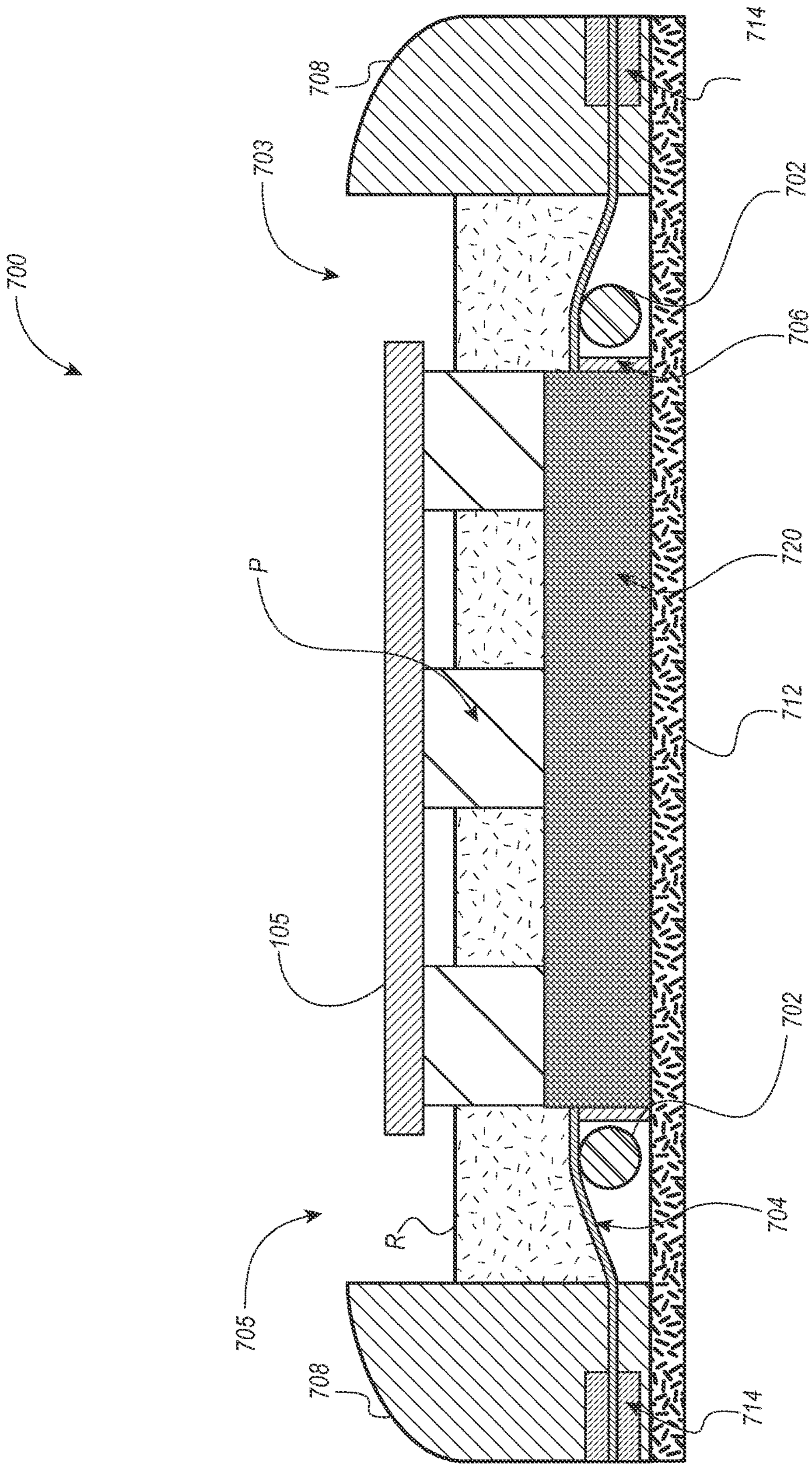

FIGS. 7A-7F illustrate schematic views of an example basin 700 that includes tensioners, according to some examples. In the example of FIGS. 7A-7F, the basin 700 includes capstans 702, a flexible film layer 704, a print substrate 706, side walls 708, tensioners 714, a platform 712, and liquid resin R. The capstans 702 are configured to support the flexible film layer 704 and are located on the bottom side of the flexible film layer 704 and on top of the platform 712. The capstans 702 are rotatable about the X-axis in either direction. The capstans 702 are located at the first end 703 of the basin 700 and the second end 705 of the basin 700. The side walls 708 are coupled to the flexible film layer 704 at the first end 703 and the second end 705 of the basin, respectively, to allow the liquid resin R to be disposed within the basin 700. The print substrate 706 is configured to provide reinforcement to the flexible film layer 704. That is, the print substrate 706 is a rigid material that include mechanical stability, repeatability, and high tolerance to higher squish pressures while maintaining planarity that the flexible film layer 704 does not. Thus, by supporting the flexible film layer 704 with the print substrate 706, the flexible film layer 704 is able to benefit from these advantages. The print substrate 706 may be a glass material that focuses a curing light 720 towards the printed part P. That is, the print substrate 706 may act as a window for the curing light 720 (FIG. 7B).

Tensioners 714 may be located within the side walls 708 and coupled to the flexible film layer 704. The tensioners 714 are configured to control the tension of the flexible film layer 704 by moving inwards towards the center of the basin 700 (e.g., to loosen tension) and moving outwards from the center of the basin 700 (e.g., to increase tension). In some examples, one of the tensioners 714 is fixed (i.e., does not move or increase/reduce tension) and the other one of the tensioners 714 controls the tension of the flexible film layer 704. The tensioners 714 may apply tension by springs, vacuum, a mechanical actuator, and/or magnets. As the tensioners 714 increase and loosen tension on the flexible film layer 704, the capstans 702 rotate about the X-axis allowing the flexible film layer 704 to move across the capstans 702. In each of FIGS. 7A-7F, the build platform 105 includes a printed part P affixed to the build platform 105 interacting with the basin 700.

FIG. 7A illustrates an example of the basin 700 wherein data processing hardware 115 instructs the build platform 105 to position the printed part P at a first vertical position in the basin 700. Here, the printed part P includes three distinct structures rather than a single structure as in FIG. 2. At the first vertical position, the bottom surface of the printed part P is positioned a first distance D1 from the flexible film layer 704 corresponding to one layer thickness. The one layer thickness refers to the depth of liquid resin R disposed between the printed part P and the flexible film layer 704 for forming a single printed layer L on the bottom surface of the printed part P. Moreover, the tensioners 714 increase tension on the flexible film layer 704 by moving outward from the center of the basin 700. Applying tension to the flexible film layer 704 causes the flexible film layer 704 to lay flat on the print substrate 706 thereby increasing the transparency of the flexible film layer 704. Increasing the flatness and/or transparency of the flexible film layer 704 reduces defects caused in the printed part caused by any imperfections in the flexible film layer as a curing light 720 cures the liquid resin R through the flexible film layer 704.

FIG. 7B illustrates an example of the basin 700 wherein the curing light 720 exposes the liquid resin R disposed between the printed part P and the flexible film layer 704. The curing light 720 cures the liquid resin R disposed between the printed part P and the flexible film layer 704 is cured to form a new part layer L. That is, the curing light 720 solidifies the liquid resin R onto the bottom surface of the printed part P to form the new print layer L of the printed part P. Optionally, the light source of the curing light 720 may be located beneath the platform 712. The curing light 720 may be provided by any light source known by those skilled in the art of SLA printing.

Figure 7C:
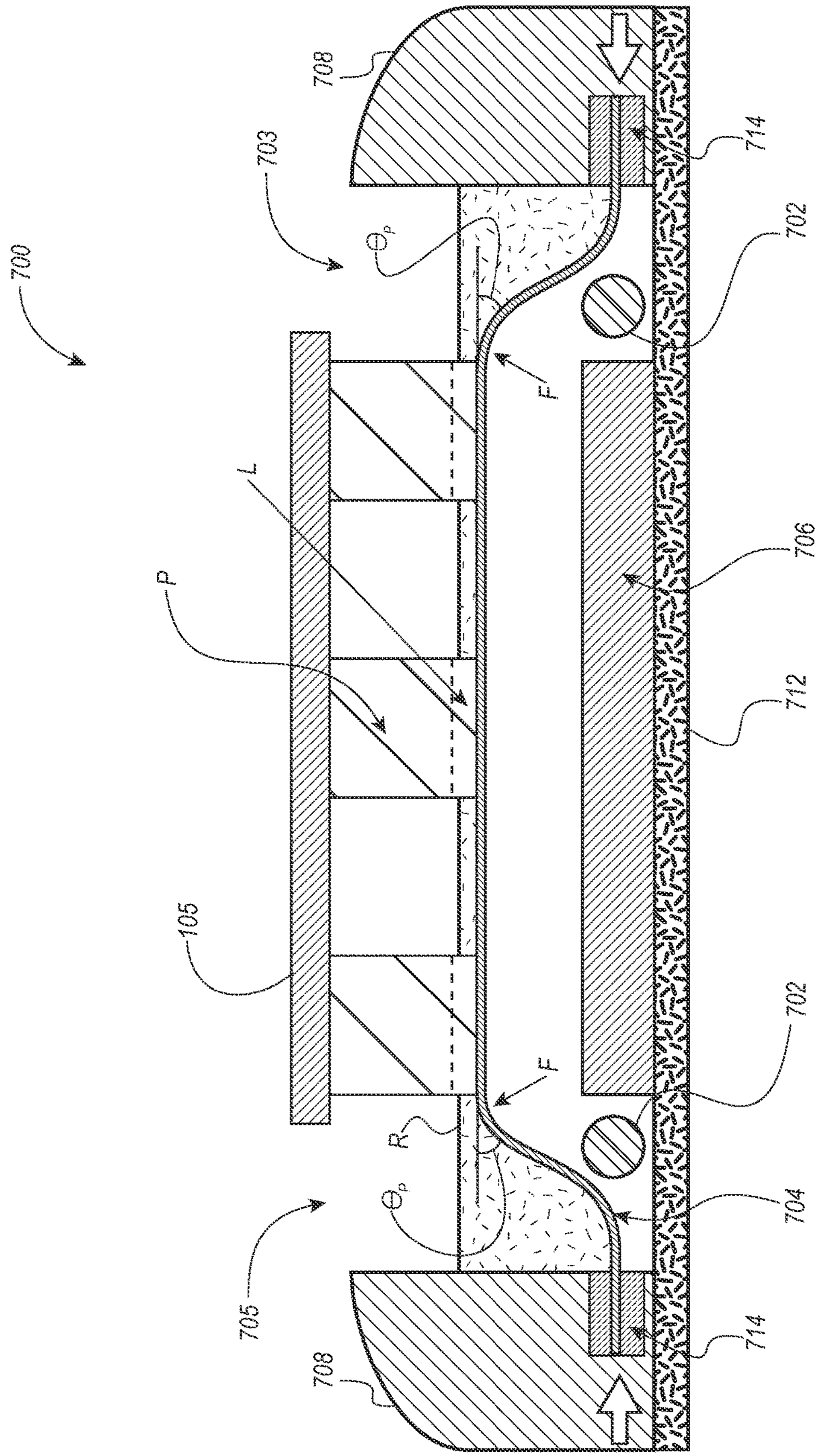

FIG. 7C illustrates an example of the basin 700 wherein the tensioners reduce tension on the flexible film layer 704. That is, the curing light 720 (FIG. 7B) solidifies the liquid resin R onto the surface of the printed part P becoming the new print layer L of the printed part P. Notably, the printed part P in FIG. 7C is larger than the printed part P in FIG. 7B by the size of the new print layer L. The new print layer L of the printed part P adheres to the flexible film layer 704 such that a force must be applied to separate new print layer L and the flexible film layer 704.

Moreover, the tensioners 714 reduce tension on the flexible film layer 704 (i.e., by moving inwards towards the center of the basin 700) providing extra film length for the flexible film layer 704. Thus, the data processing hardware 115 (FIG. 1) instructs the build platform 105 to lift the printed part P in the vertical direction away from the platform 712. Reducing tension on the flexible film layer 704 allows the build platform 105 to raise the printed part P to apply a force between the flexible film layer 704 and the printed part P.

Figure 7D:
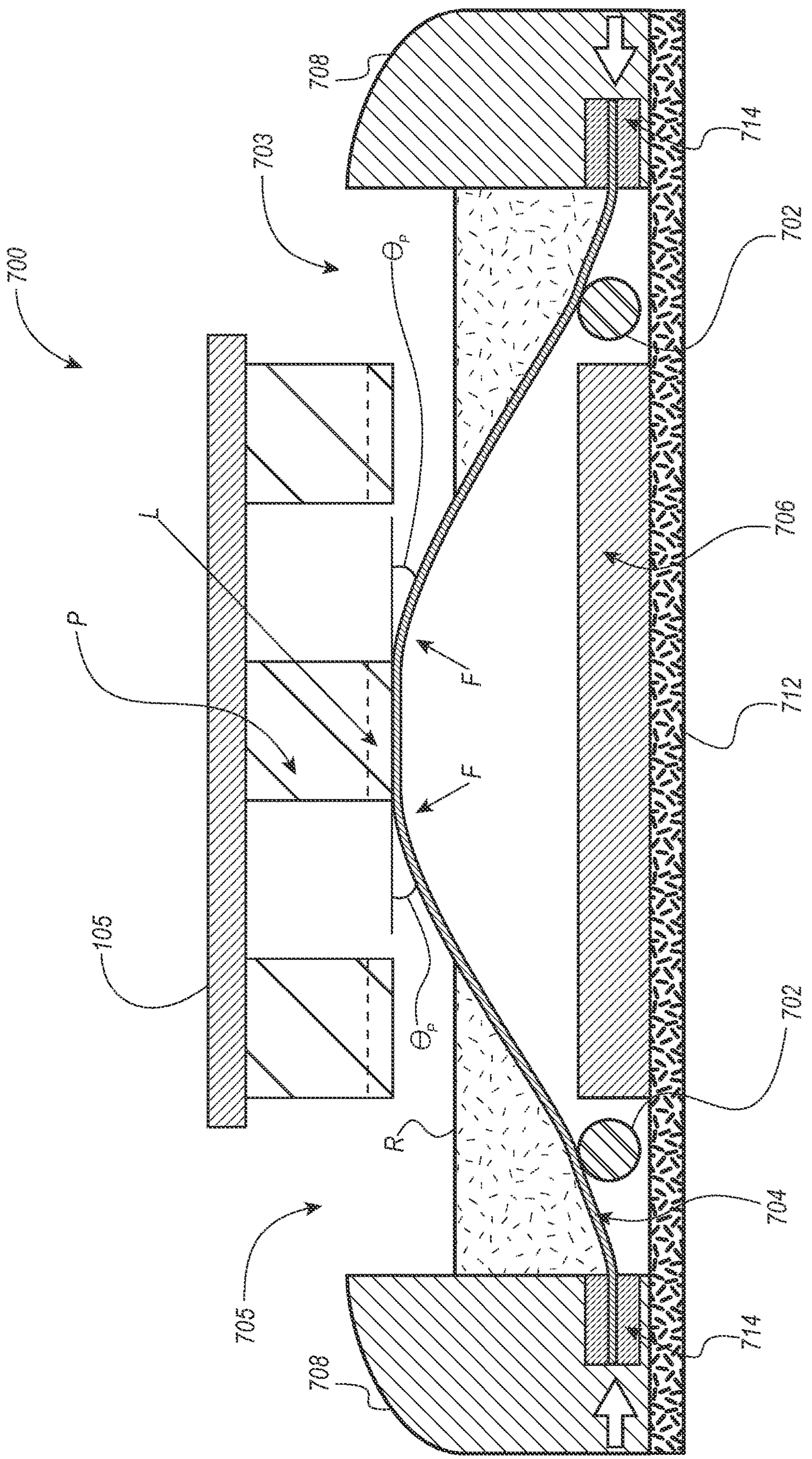

FIG. 7D illustrates an example of the basin 700 wherein the flexible film layer 704 peels from the printed part P. That is, the data processing hardware 115 instructs the build platform 105 to move in the vertical direction further away from the print substrate 706 inducing a peel front F. Here, the printed part P affixed to the build platform 105 and the flexible film layer 704 adhered to the printed part P are lifted in the vertical direction away from the print substrate 706. The exact curvature of the flexible film layer 704 depends on several factors including, but not limited to, geometry of the printed part P, geometric relationship between the blade and the printed part P, and the stiffness, or other characteristics, of the flexible film layer 704. Notably, the reducing the tension and raising the build platform 105 induces a high peel angle $\theta_P$ (i.e., angle between the new print layer L of the printed part P and the flexible film layer 704) on both sides of the flexible film layer 704. Here, the peeling process initiates on both the first end 703 and the second end 705 of the basin and converging in the center of the basin. The high peel angle $\theta_P$ reduces the force applied to the printed part P (e.g., by localizing the peel front F) providing increased print quality of the printed part P. Optionally, the build platform 105 and the printed part P may not move further away from the platform 712 and the tensioners 714 move to an intermediate position within the side walls 708. As such, the retraction of the tensioners 714 (not shown) provides tension on the flexible film layer 704 to peel from the printed part P. In some examples, the build platform 105 and the printed part P may move further away from the platform 712 and the tensioners move to the intermediate position within the side walls 708.

Figure 7E:
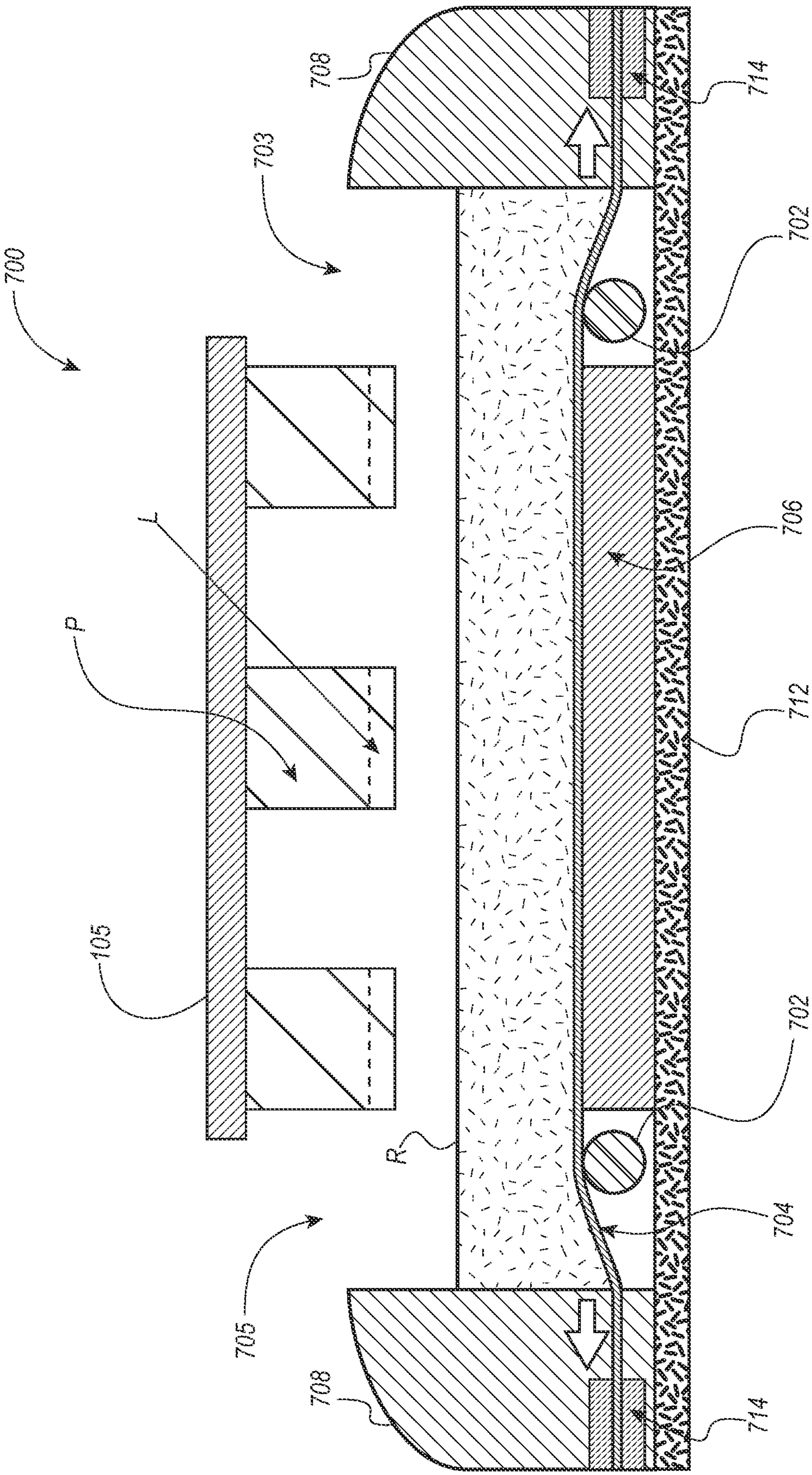

FIG. 7E illustrates an example of the basin 700 wherein the flexible film layer 704 fully separates from the printed part. That is, the printed part P is now free to move in the vertical direction without causing movement of the flexible film layer 704. After the flexible film layer 704 completely separates from t the printed part, the tensioners increase tension on the flexible film layer 704 causing the flexible film layer 704 to lay flat on the print substrate 706.

Figure 7F:
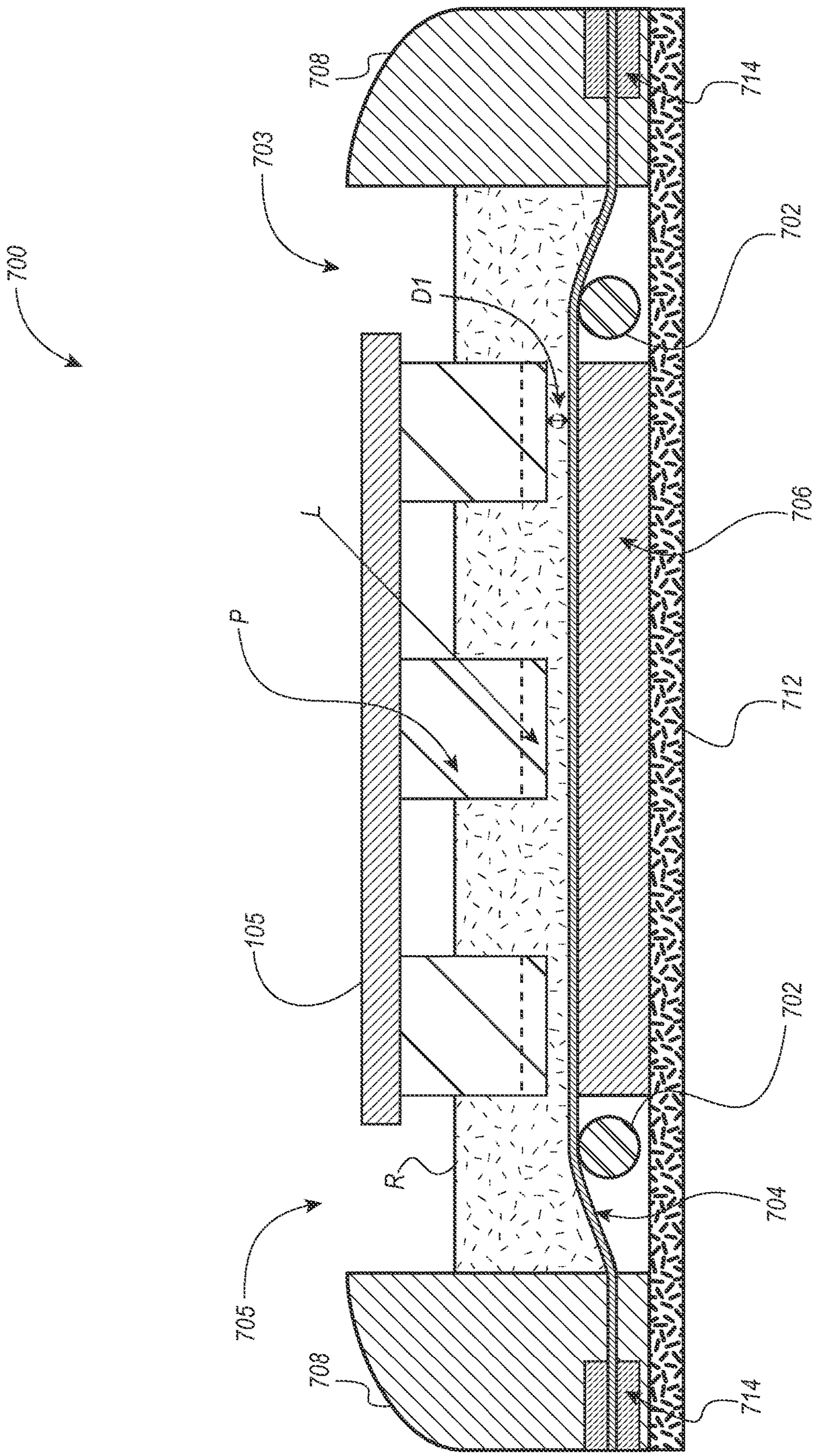

FIG. 7F illustrates an example of the basin 700, wherein the data processing hardware 115 instructs the build platform 105 to lower the printed part P in the vertical direction towards the flexible film layer 704, commonly referred to as a "squish" move. The build platform 105 lowers the printed part P such that the bottom surface of the new print layer L of the printed part P is spaced the first distance D1 equal to one layer thickness from the flexible film layer 704. Notably, the printed part in FIG. 7F is larger than the printed part in FIG. 7A by the thickness of the previously printed print layer L. The process described above in FIGS. 7A-7F can be repeated until all print layers are formed onto the printed part P and the print is complete.

Figure 8A:
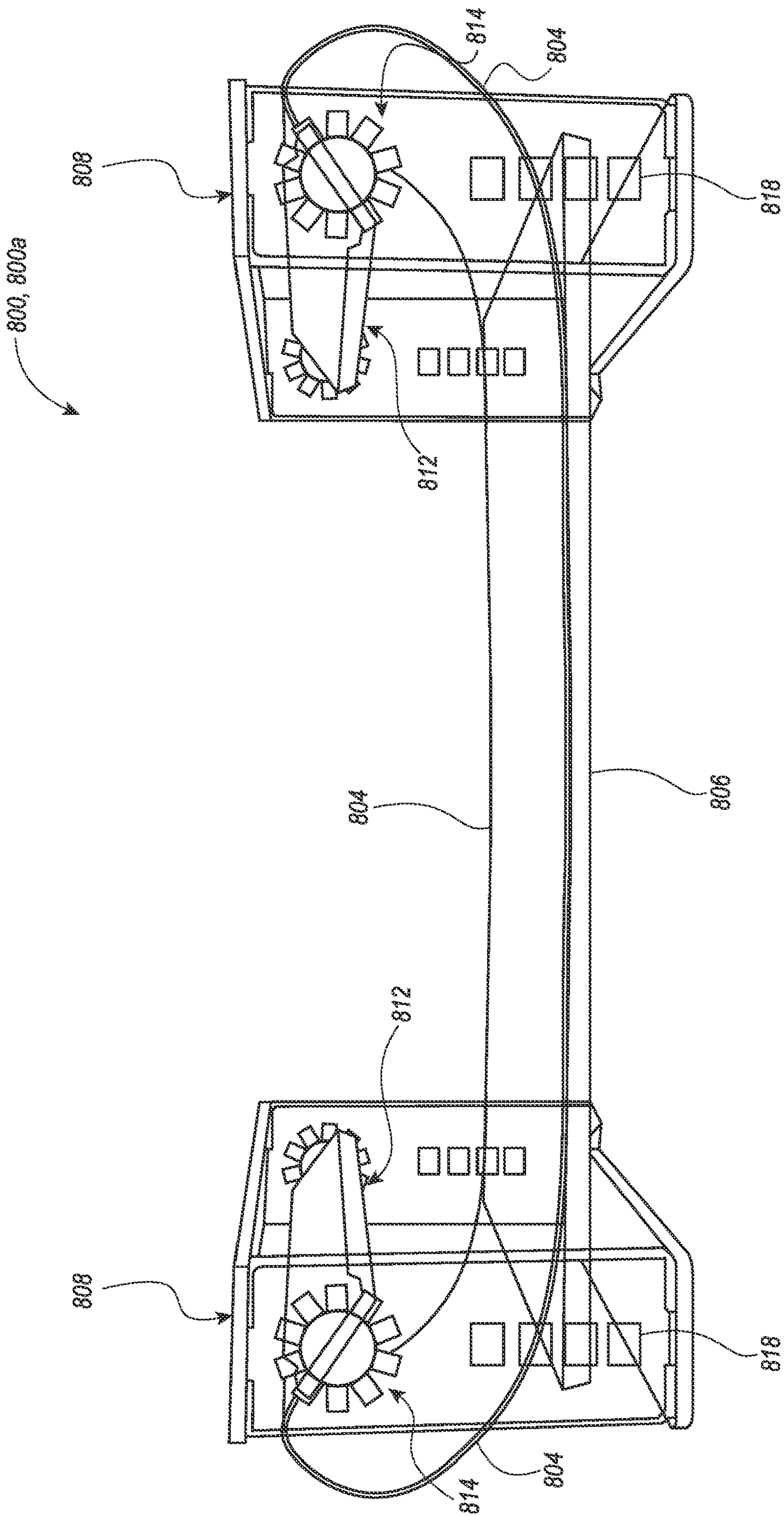
FIGS. 8A and 8B illustrate a perspective view of an example basin that includes a scroll tank.

FIG. 8A illustrates a perspective view of an example of a basin 800, 800*a* that includes a scroll tank. The basin 800*a* includes a flexible film layer 804, a print substrate 806, and side walls 808. The flexible film layer 804 is coupled to a plank 812 on each end of the flexible film layer 804. The plank 812 of the flexible film layer mechanically couples with tension adjusters 814 disposed on the side walls 808. That is, the plank 812 of the flexible film layer 804 may be rotated and mechanically couple with any of the tensioner adjusters 814. By rotating the plank 812 into the various tensioner adjusters 814, the tension of the flexible film layer 804 is adjusted by the curvature of the flexible film layer.

The side walls 808 are coupled to the print substrate 806. The print substrate 806 may be a glass material that focuses a curing light towards a printed part. That is, the print substrate 806 may act as a window for a curing light. The print substrate 806 is located beneath the flexible film layer 804 and provides support for the flexible film layer. The side walls 808 may include height adjusters 818 that adjusts the support that the print substrate 806 provides the flexible film layer 804 and thereby adjusting the tension of the flexible film layer 804.

The tension (i.e., internal bending stresses) of the flexible film layer 804 force the flexible film layer to conform to the rigid print substrate 806 while still allowing the flexible film layer to be lifted off the print substrate 806. In particular, the internal bending stresses causes the flexible film layer 804 to naturally relax into a continuous curved shape, but the print substrate 806 interferes with the flexible film layer 804 such that the flexible film layer 804 presses flat against the print substrate 806 (e.g., laminate against the print substrate 806). By rotating the plank 812 to couple with one of the tension adjusters 814 the internal bending stress of the flexible film layer 804 may increase or decrease. Increasing or decreasing the internal bending stress of the flexible film layer 804 controls the natural curvature of the flexible film layer 804 and a flatness between the flexible film layer 804 and the print substrate 806. The curvature of the scrolled ends of the flexible film layer 804 allows the entire flat area of the flexible film layer to rise the vertical direction without imparting horizontal forces as the radius of the curvature of the flexible film layers decreases. Thus, the flexible film layer 804 may be lifted from the print substrate 806 with very low force applied.

Figure 8B:
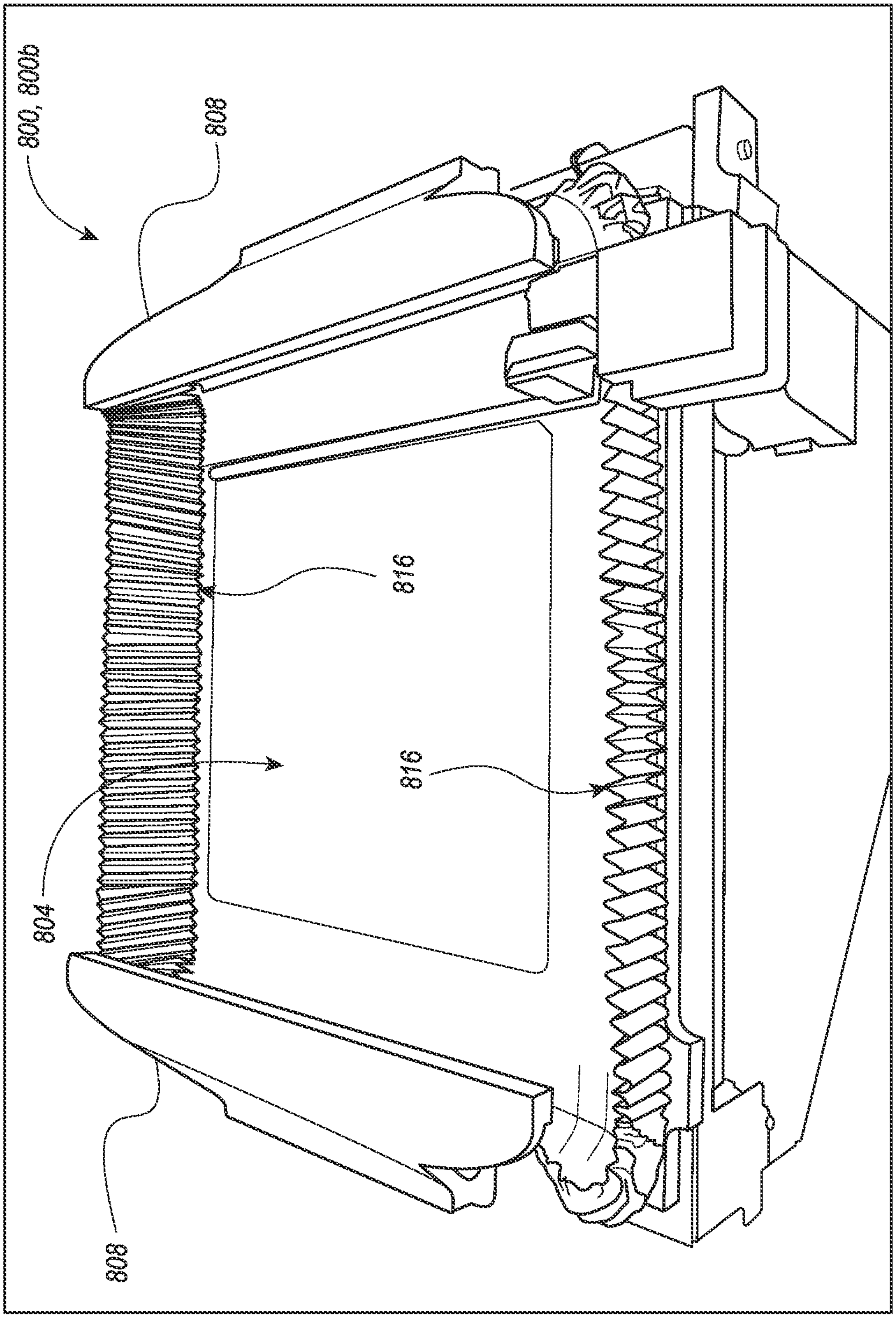

FIG. 8B illustrates a perspective view of an example of a basin 800, 800*b* that includes a scroll tank. The basin 800*b* includes a flexible film layer 804, side walls 808, and compliant walls 816. The flexible film layer 804 is attached at each end to side walls 808 creating a curvature in the flexible film layer 804 (i.e., scroll tank design). That is, the internal bending stresses of the flexible film layer 804 may be utilized to force the flexible film layer 804 to conform to the rigid print substrate while still allowing the flexible film layer 804 to be lifted off the printed substrate. The compliant walls 816 may be thermoformed walls coupled to the top of the flexible film layer 804 and coupled to the side walls 808. In some examples, the compliant walls 816 are pleated side walls thermoformed as a single parts with the active printing area. In other examples, the compliant walls 816 include foam material that allow for compliance within the compliant walls 816. The compliant walls 816 are highly compliant and may further control internal stresses of the flexible film layer 804. That is, as the flexible film layer 804 is raised and lowered, the compliant walls 816 expand or contract thereby decreasing or increasing internal stresses on the flexible film layer 804 respectively.

FIGS. 8C-8H illustrate schematic views of an example basin 800 that includes a scroll tank design, according to some examples. In the example of FIGS. 8C-8H, the basin 800 includes a flexible film layer 804, a print substrate 806, side walls 808, and liquid resin R. The side walls 808 are coupled to planks 812 of the flexible film layer 804 at the first end 803 and the second end 805 respectively to allow the liquid resin R to be disposed within the basin 800. Moreover, the planks 812 of the flexible film layer 804 are coupled to the side walls 808 such that a curvature is induced into the flexible film layer 804. The print substrate 806 interferes with the curvature of the flexible film layer 804 causing the flexible film layer 804 to lay flat on top of the print substrate 806. The print substrate 806 may be a glass material that focuses a curing light 820 towards the printed part P. That is, the print substrate 806 may act as a window for the curing light 820.

Figure 8C:
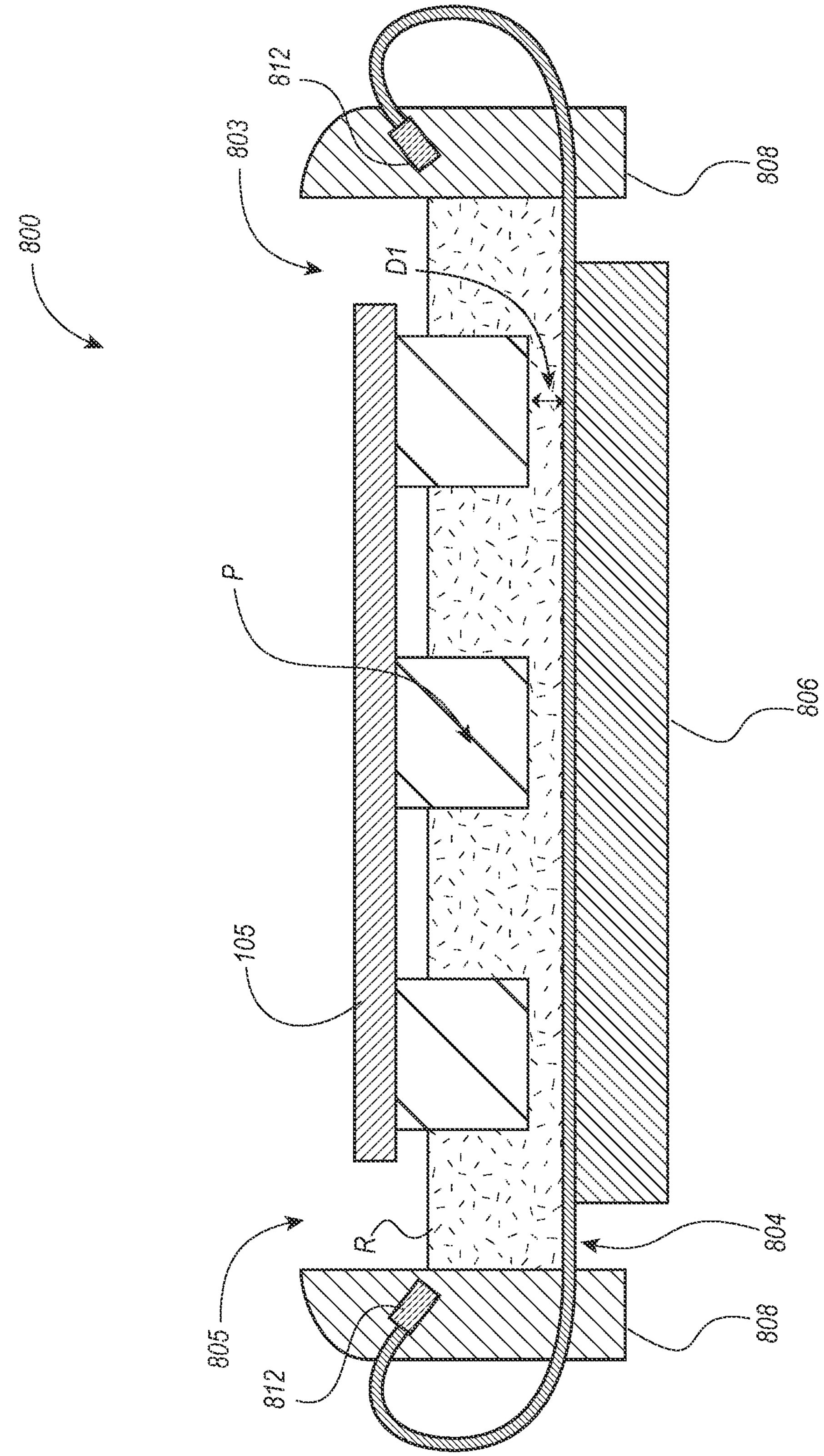
FIGS. 8C-8H illustrate cross-sectional schematic view of an example basin that includes scroll tank.

FIG. 8C illustrates an example of the basin 800 wherein data processing hardware 115 instructs the build platform 105 to position the printed part P at a first vertical position in the basin 800. Here, the printed part P includes three distinct structures rather than a single structure as in FIG. 2. At the first vertical position, the bottom surface of the printed part P is positioned a first distance D1 from the flexible film layer 804 corresponding to one layer thickness. The one layer thickness refers to the depth of liquid resin R disposed between the printed part P and the flexible film layer 804 for forming a single printed layer L on the bottom surface of the printed part P.

Figure 8D:
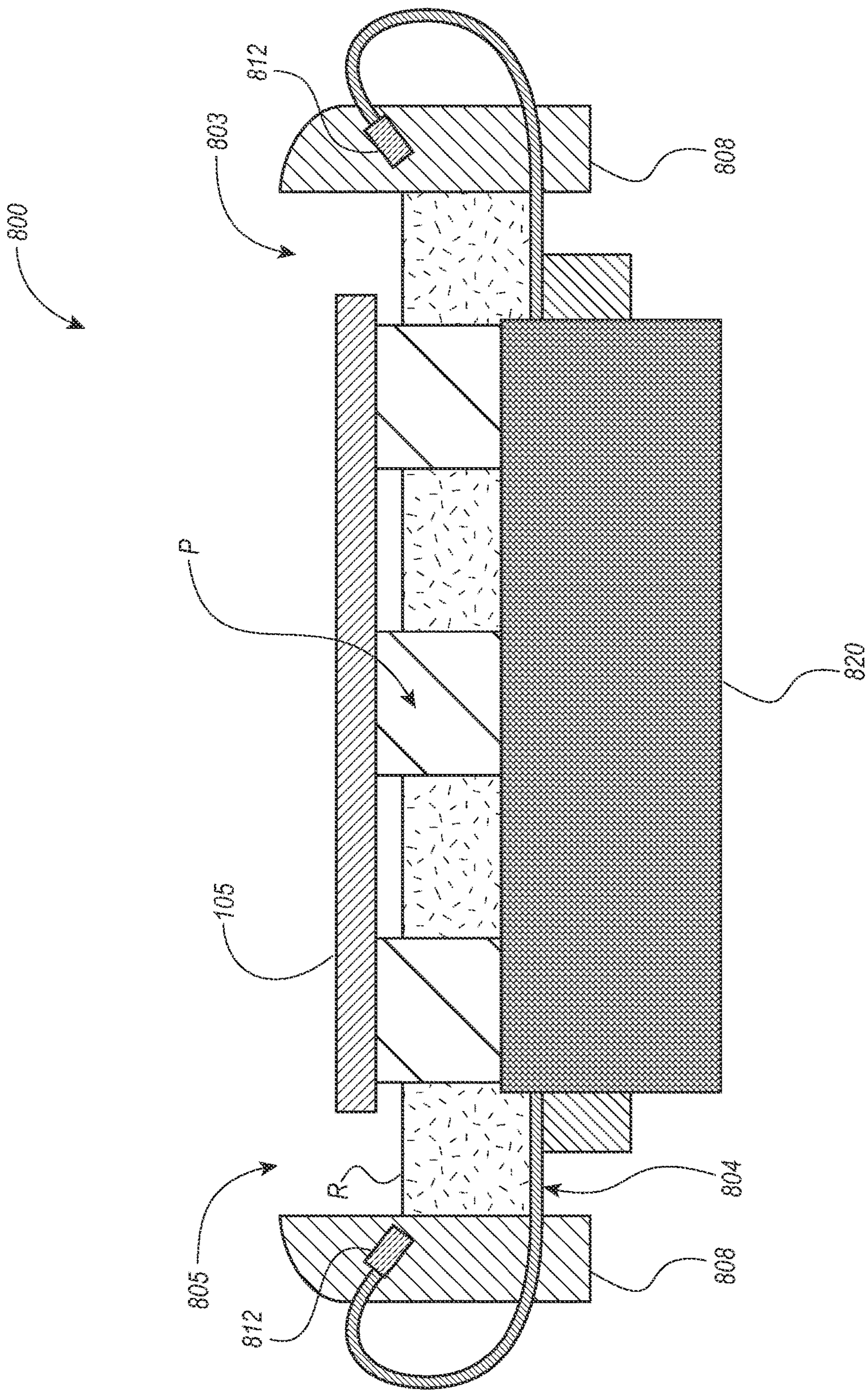

FIG. 8D illustrates an example of the basin 800 wherein the curing light 820 exposes the liquid resin R disposed between the printed part P and the flexible film layer 804. The curing light 820 cures the liquid resin R disposed between the printed part P and the flexible film layer 804 is cured to form a new part layer L. That is, the curing light 820 solidifies the liquid resin R onto the bottom surface of the printed part P to form the new print layer L of the printed part P. The curing light 820 may be provided by any light source known by those skilled in the art of SLA printing.

Figure 8E:
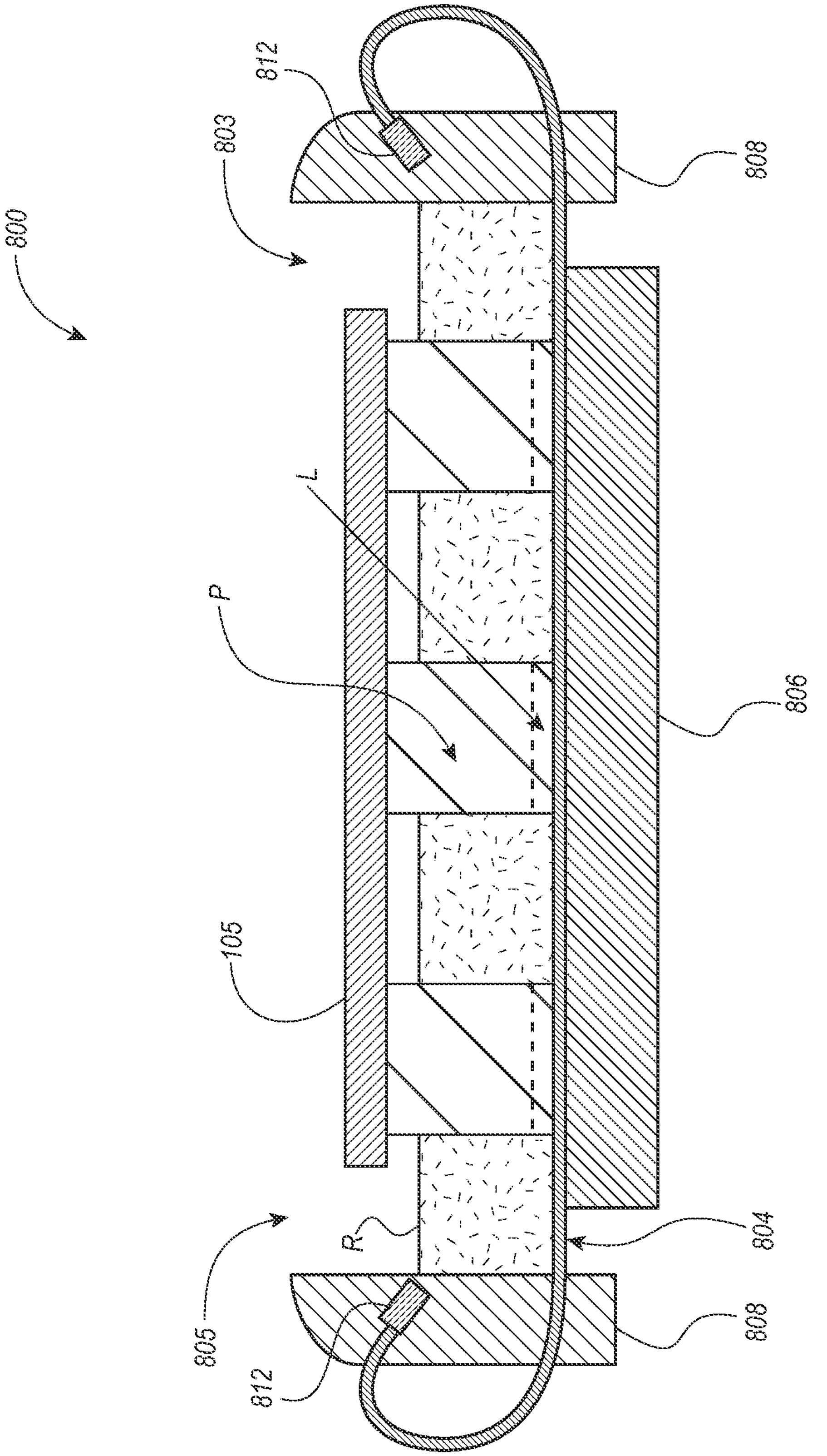

FIG. 8E illustrates an example of the basin 800 wherein the printed part P cures to the flexible film layer 804. That is, the curing light 820 (FIG. 8D) solidifies the liquid resin R onto the surface of the printed part P becoming the new print layer L of the printed part P. Notably, the printed part P in FIG. 8E is larger than the printed part P in FIG. 8D by the size of the new print layer L. The new print layer L of the printed part P adheres to the flexible film layer 804 such that a force must be applied to separate new print layer L and the flexible film layer 804.

Figure 8F:
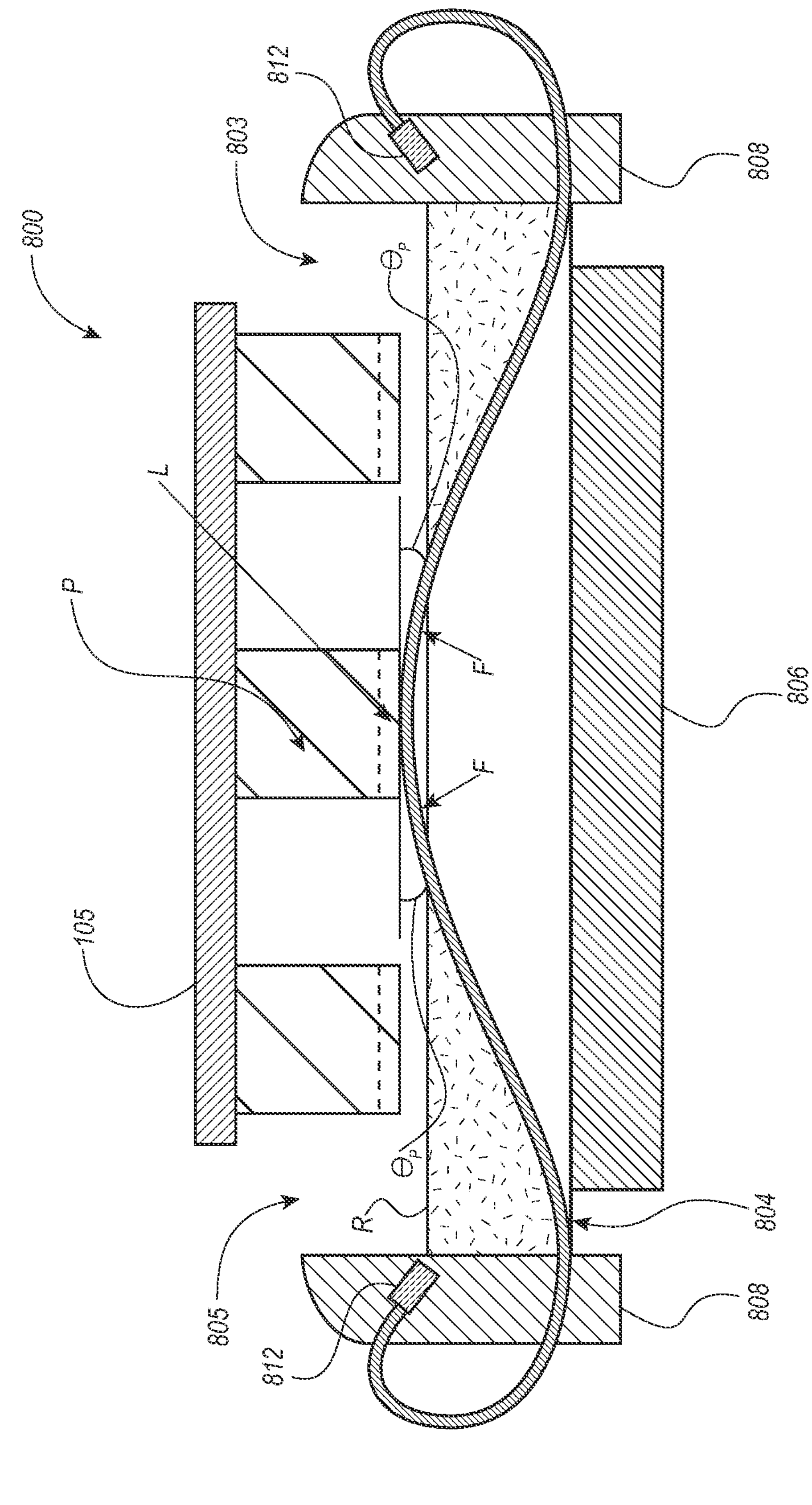

FIG. 8F illustrates an example of the basin 800 wherein the flexible film layer 804 peels from the printed part P. That is, the data processing hardware 115 instructs the build platform 105 to move in the vertical direction away from the print substrate 806 inducing a peel front F. Here, the printed part P affixed to the build platform 105 and the flexible film layer 804 adhered to the printed part P are lifted in the vertical direction away from the print substrate 806. The exact curvature of the flexible film layer 804 depends on several factors including, but not limited to, geometry of the printed part P, and the stiffness, or other characteristics, of the flexible film layer 804. Notably, raising the build platform 105 induces a high peel angle $\theta_P$ (i.e., angle between the new print layer L of the printed part P and the flexible film layer 804) on both sides of the flexible film layer 804. Here, the peeling process initiates on both the first end 803 and the second end 805 of the basin and converging in the center of the basin. The high peel angle $\theta_P$ reduces the force applied to the printed part P (e.g., by localizing the peel front F) providing increased print quality of the printed part P. Here, the tension on the flexible film layer 804 remains constant as the plank 812 remains in the same position of the side wall 808.

Figure 8G:
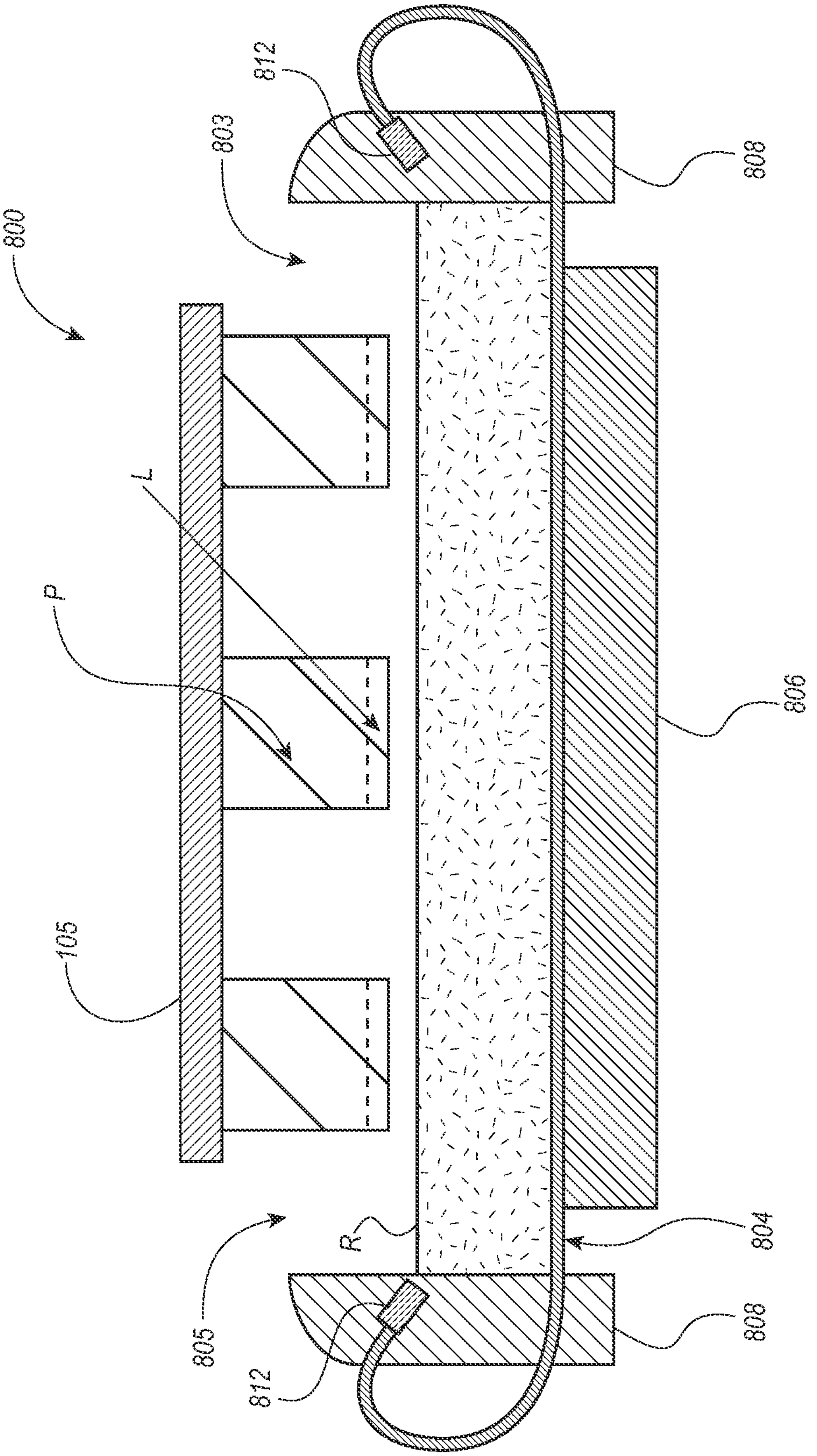

FIG. 8G illustrates an example of the basin 800 wherein the flexible film layer 804 fully separates from the printed part. That is, the printed part P is now free to move in the vertical direction without causing movement of the flexible film layer 804. After the flexible film layer 804 completely separates from t the printed part, internal stresses of the flexible film layer 804 causes the flexible film layer 804 to return to the print substrate 806 laying flat.

Figure 8H:
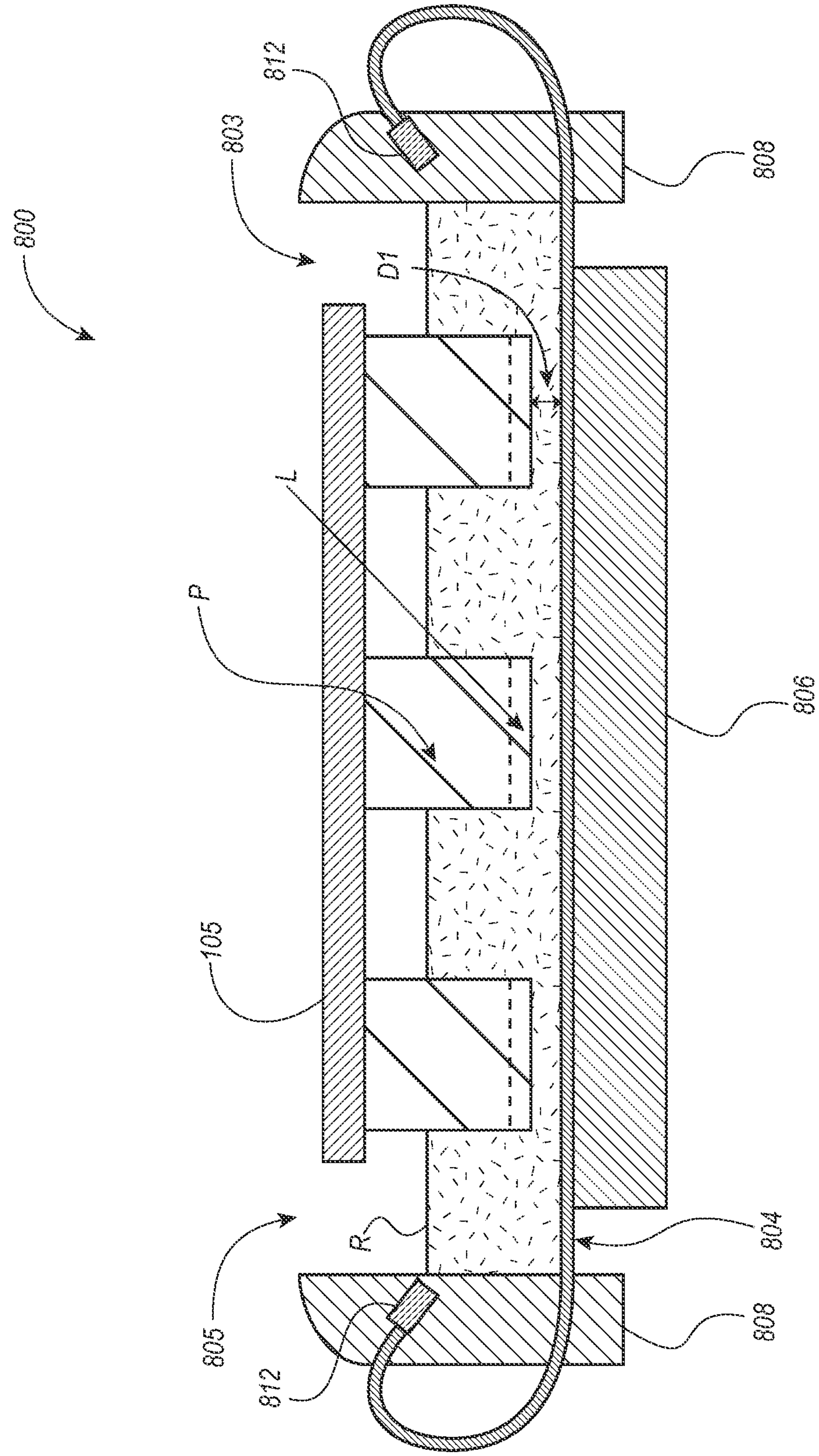

FIG. 8H illustrates an example of the basin 800, wherein the data processing hardware 115 instructs the build platform 105 to lower the printed part P in the vertical direction towards the flexible film layer 804, commonly referred to as a "squish" move. The build platform 105 lowers the printed part P such that the bottom surface of the new print layer L of the printed part P is spaced the first distance D1 equal to one layer thickness from the flexible film layer 804. Notably, the printed part in FIG. 8H is larger than the printed part in FIG. 8C by the thickness of the previously printed layer. The process described above in FIGS. 8C-8H can be repeated until all print layers are formed onto the printed part P and the print is complete.

Figure 9A:
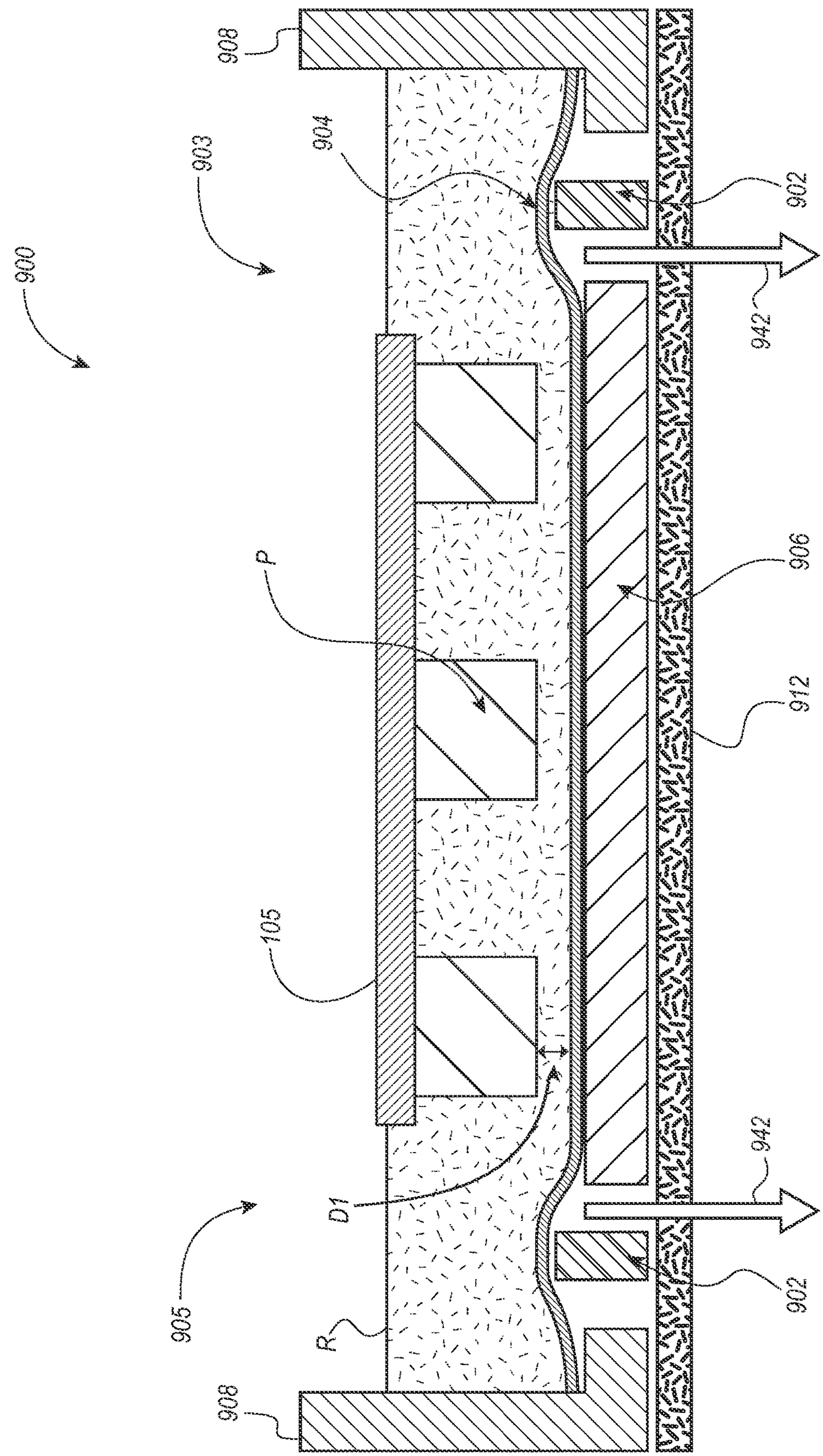
FIGS. 9A-9F illustrate schematic views of an example basin that includes capstan rings, according to some examples.
Figure 9B:
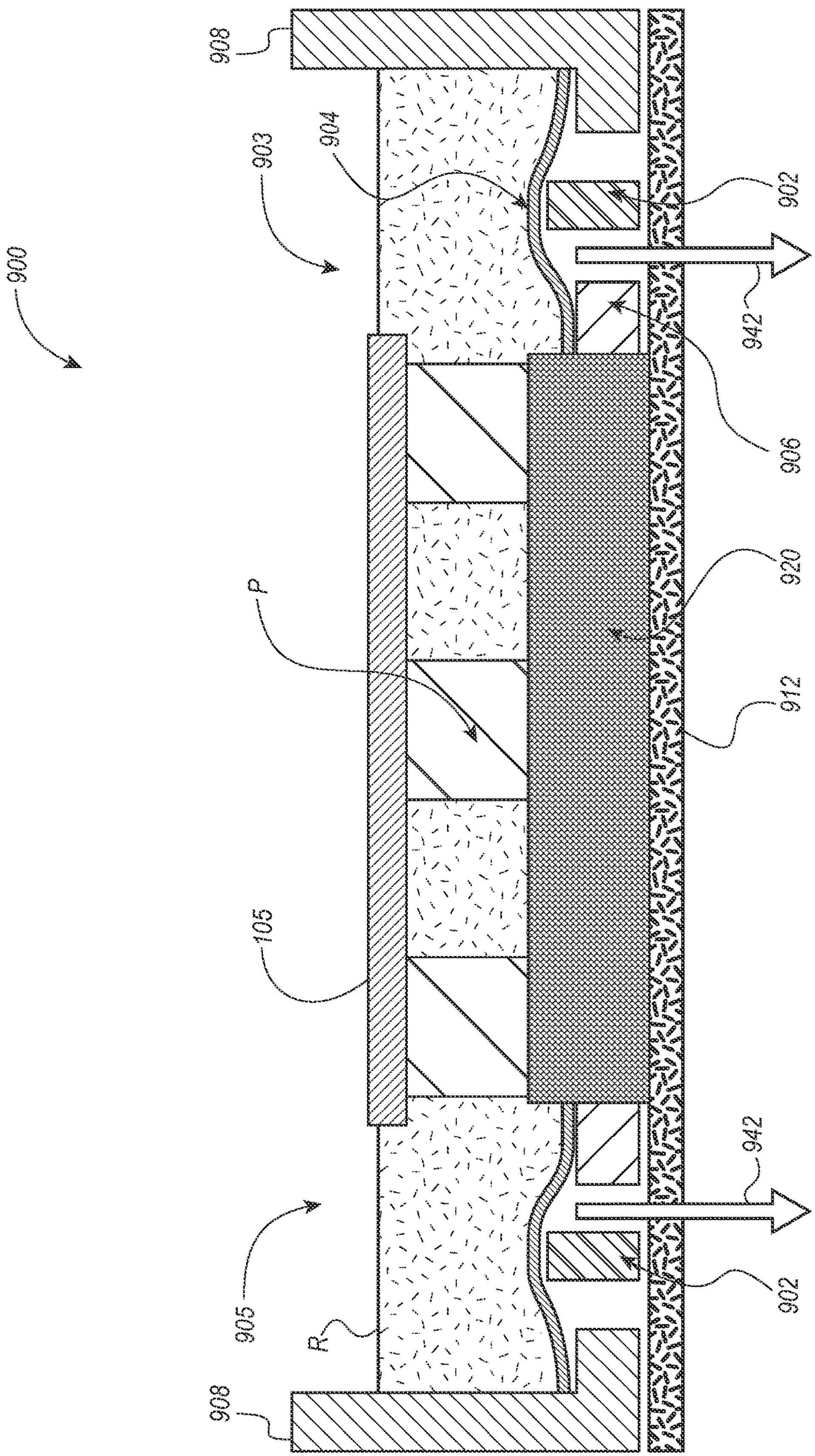

FIGS. 9A-9F illustrate schematic views of an example basin 900, according to some examples. In the example of FIGS. 9A-9F, the basin 900 includes capstan rings 902, a flexible film layer 904, a print substrate 906, side walls 908, air ports 942, a platform 912, and liquid resin R. The capstan rings 902 are configured to support the flexible film layer 904 and are located on the bottom side of the flexible film layer 904 and on top of the platform 912. The surface of the capstan rings 902 may be configured to rotate about the X-axis in either direction. The capstan rings 902 are located at the first end 903 of the basin 900 and the second end 905 of the basin 900. The side walls 908 are coupled to the flexible film layer 904 at the first end 903 and the second end 905 of the basin, respectively, to allow the liquid resin R to be disposed within the basin 900. The print substrate 906 may be a glass material that focuses a curing light 920 towards the printed part P. That is, the print substrate 906 may act as a window for the curing light 920 (FIG. 9B).

The air ports 942 may pull a vacuum downwards through the platform 912 towards the bottom of the basin 900 (e.g., depressurizing the region between the flexible film layer 904 and the print substrate 906). The vacuum provides a force that pulls the flexible film layer 904 to lay flat on the print substrate 906. The capstan rings 902 located at the first end 903 and second end 905 of the basin 900, interfere with the flexible film layer 904 inducing a contour into the flexible film layer 904. In each of FIGS. 9A-9F, the build platform 105 includes a printed part P affixed to the build platform 105 interacting with the basin 900.

FIG. 9A illustrates an example of the basin 900 wherein data processing hardware 115 instructs the build platform 105 to position the printed part P at a first vertical position in the basin 900. Here, the printed part P includes three distinct structures rather than a single structure as in FIG. 2. At the first vertical position, the bottom surface of the printed part P is positioned a first distance D1 from the flexible film layer 904 corresponding to one layer thickness. The one layer thickness refers to the depth of liquid resin R disposed between the printed part P and the flexible film layer 904 for forming a single printed layer L on the bottom surface of the printed part P. Moreover, the air ports 942 pull vacuum causing the flexible film layer 904 to lay flat on the print substrate 906. Increasing the flatness and/or transparency of the flexible film layer 904 reduces defects caused in the printed part caused by any imperfections in the flexible film layer as a curing light 920 cures the liquid resin R through the flexible film layer 904.

FIG. 9B illustrates an example of the basin 900 wherein the curing light 920 exposes the liquid resin R disposed between the printed part P and the flexible film layer 904. The curing light 920 cures the liquid resin R from the bottom side of the basin 900 through the print substrate 906 and the flexible film layer 904 creating a new print layer L of the printed part P. Optionally, the light source of the curing light 920 may be located beneath the platform 912. The curing light 920 may be provided by any light source known by those skilled in the art of SLA printing. Here, the air ports 942 continue to pull vacuum holding the flexible film layer 904 flat against the print substrate 906 while the curing light 920 cures the liquid resin R.

Figure 9C:
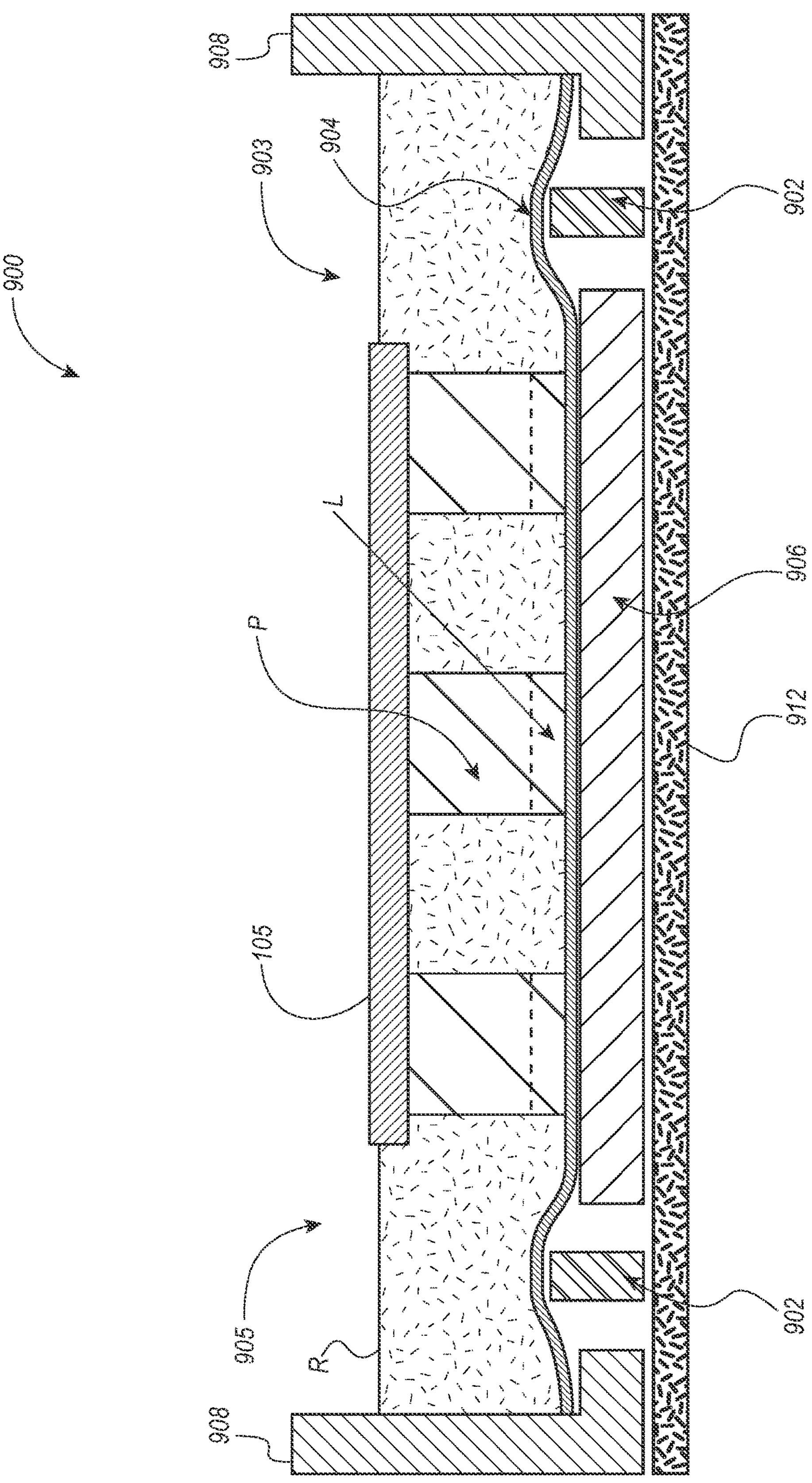

FIG. 9C illustrates an example of the basin 900 wherein the liquid resin R disposed between the printed part P and the flexible film layer 904 is cured to form a new part layer L. That is, the curing light 920 (FIG. 9B) solidifies the liquid resin R onto the bottom surface of the printed part P to form the new print layer L of the printed part P. Notably, the printed part P in FIG. 9C is larger than the printed part P in FIG. 9B by the size of the new print layer L. The new print layer L of the printed part P adheres to the flexible film layer 904 such that a force must be applied to separate new print layer L and the flexible film layer 904. Notably, the air ports 942 terminate the vacuum force pulled against the flexible film layer 904. Thus, the build platform 105 may now raise the printed part P and the flexible film layer 904 together.

Figure 9D:
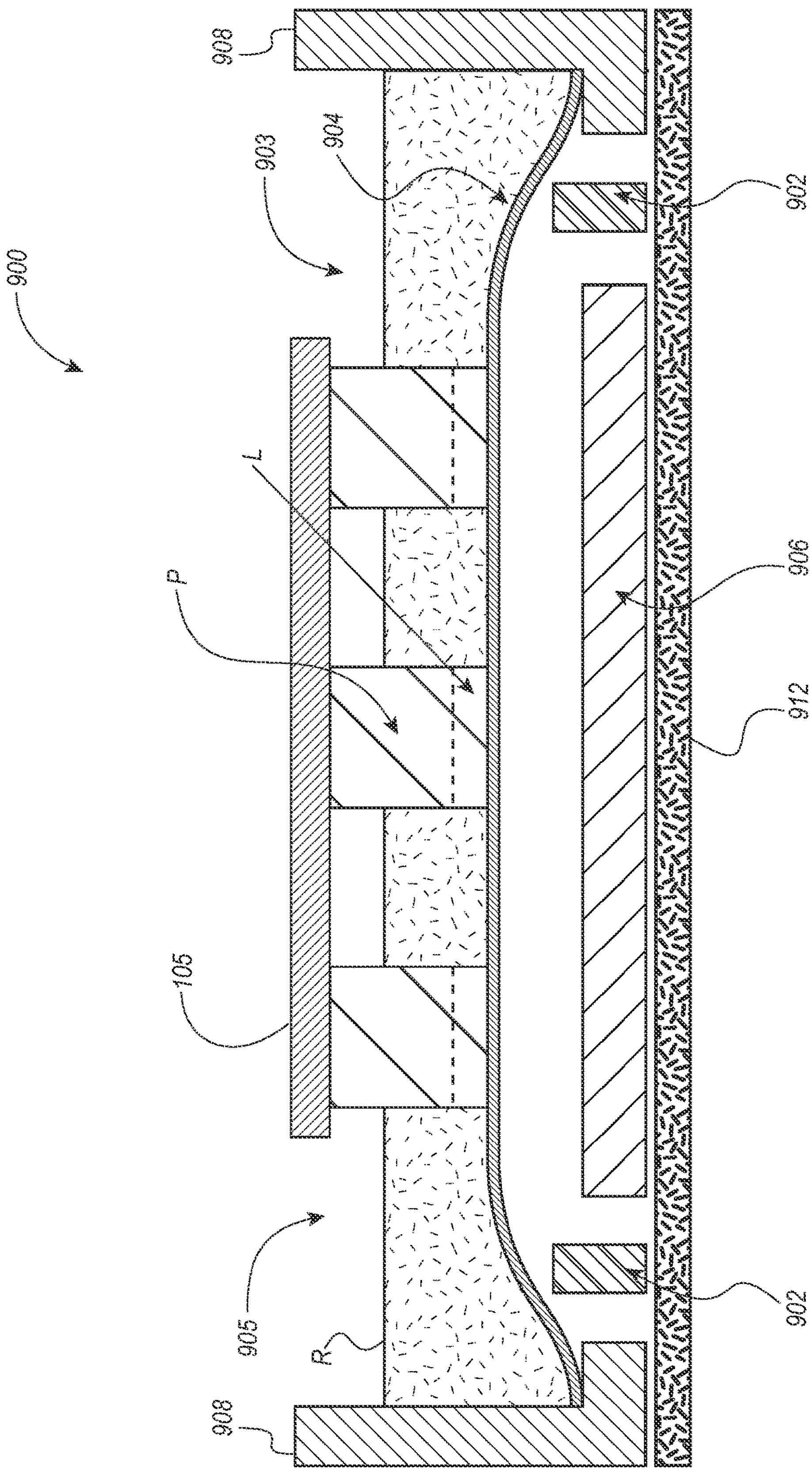

FIG. 9D illustrates an example of the basin 900 wherein the build platform 105 lifts the printed part P and the flexible film layer from the print substrate 906. Here, the flexible film layer 904 may overcome Stefan forces adhering the flexible film layer 904 and the print substrate 906 together. In particular, the data processing hardware 115 instructs the build platform 105 to move in the vertical direction away from the platform 912 and the print substrate 906 inducing a peel front F.

Figure 9E:
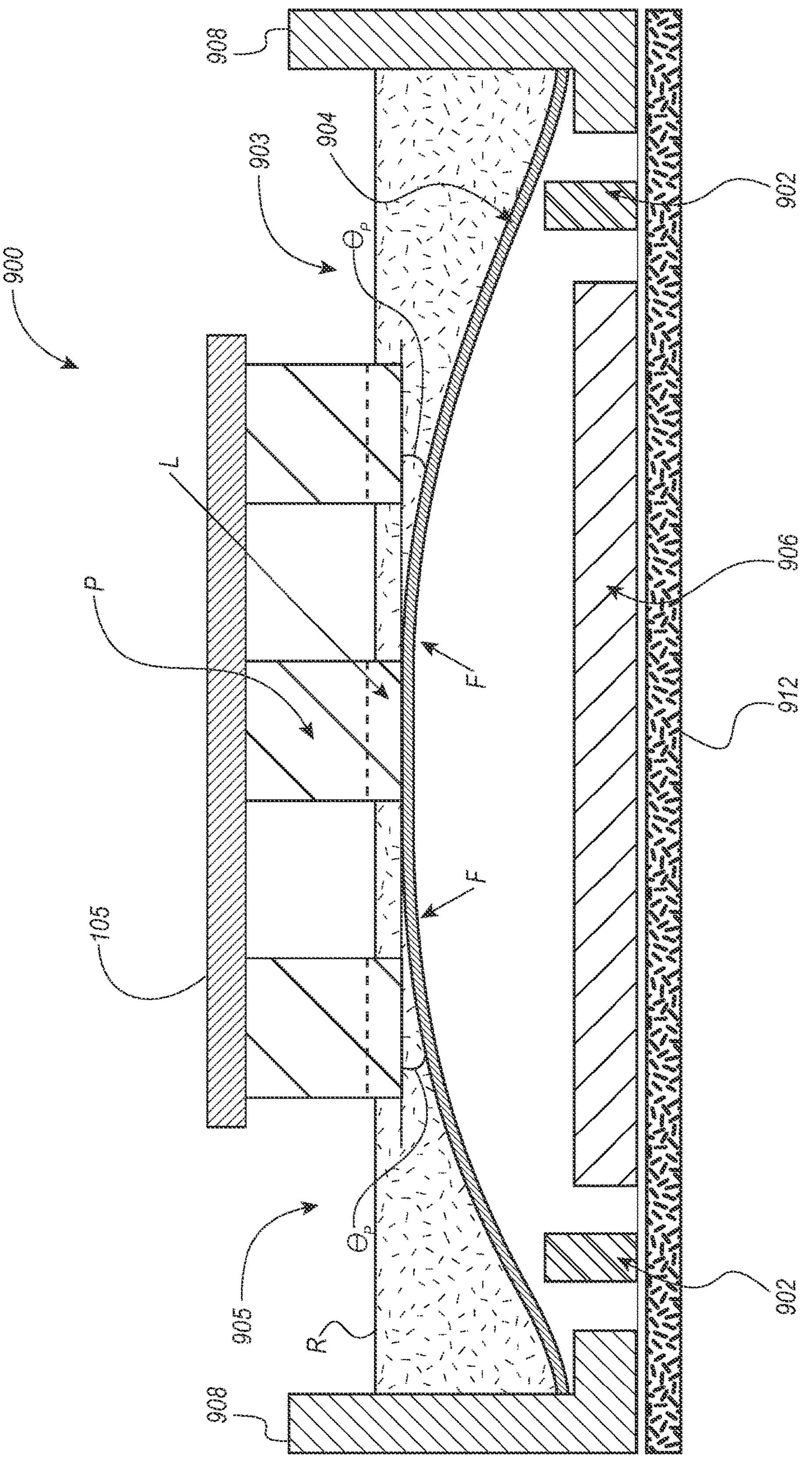

FIG. 9E illustrates an example of the basin 900 wherein the flexible film layer 904 peels from the printed part P. That is, the data processing hardware 115 instructs the build platform 105 to move in the vertical direction further away from the platform 912 inducing a peel front F. Here, the printed part P affixed to the build platform 105 and the flexible film layer 904 adhered to the printed part Pare lifted in the vertical direction away from the platform 912. The exact curvature of the flexible film layer 904 depends on several factors including, but not limited to, geometry of the printed part P, geometric relationship between the blade and the printed part P, and the stiffness, or other characteristics, of the flexible film layer 904. Notably, raising the build platform 105 induces a high peel angle $\theta_P$ (i.e., angle between the new print layer L of the printed part P and the flexible film layer 904) on both sides of the flexible film layer 904. Here, the peeling process initiates on both the first end 903 and the second end 905 of the basin and converging in the center of the basin. The high peel angle $\theta_P$ reduces the force applied to the printed part P (e.g., by localizing the peel front F) providing increased print quality of the printed part P.

Figure 9F:
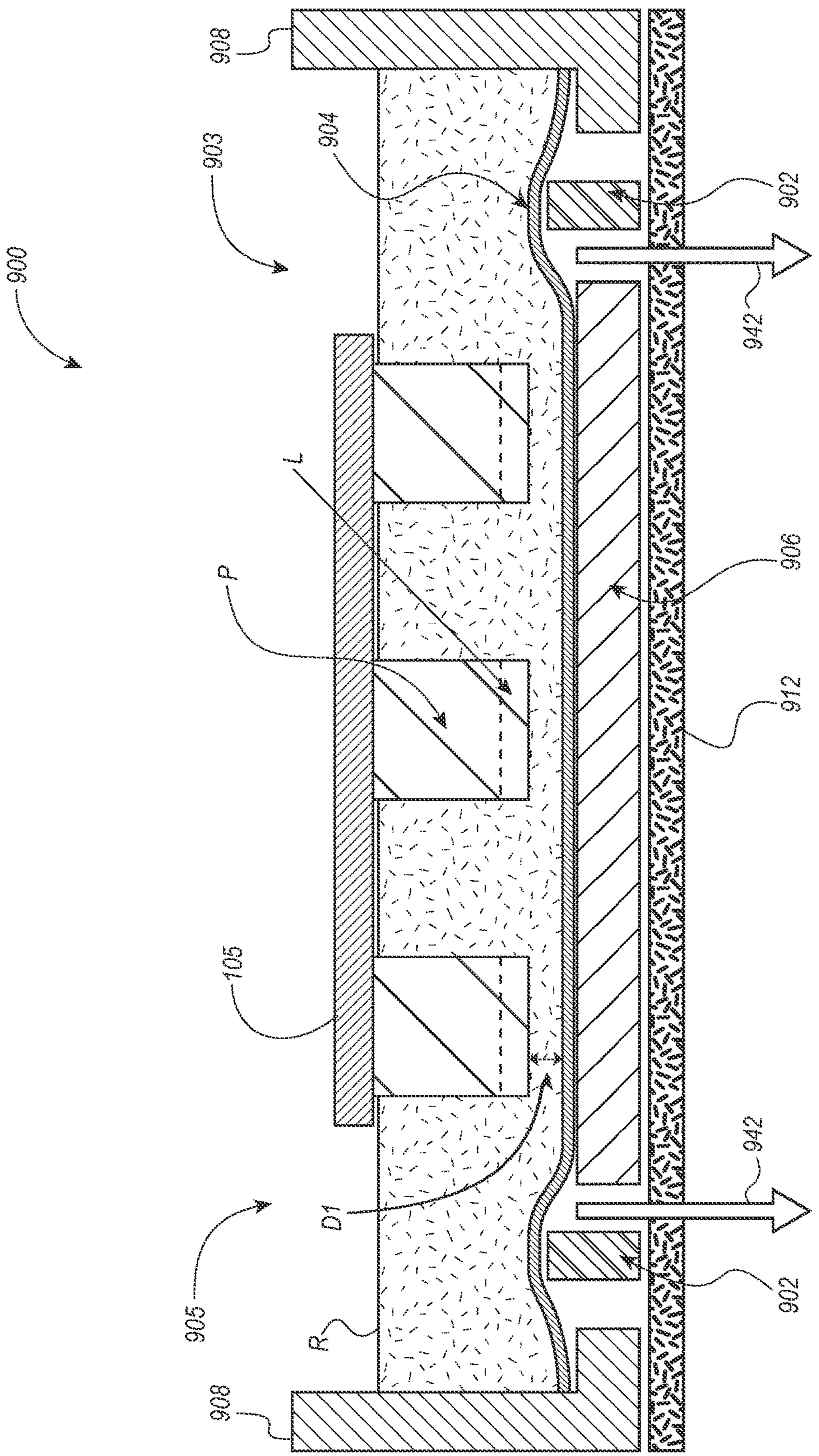

FIG. 9F illustrates an example of the basin 900 wherein the flexible film layer 904 fully separates from the printed part. After the flexible film layer 904 fully separates from the printed part P, the air ports 942 pull vacuum downward again pulling the flexible film layer 904 to lay flat against the print substrate 906. Moreover, the data processing hardware 115 instructs the build platform 105 to lower the printed part P in the vertical direction towards the flexible film layer 904, commonly referred to as a "squish" move. The build platform 105 lowers the printed part P such that the bottom surface of the new print layer L of the printed part P is spaced the first distance D1 equal to one layer thickness from the flexible film layer 904. Notably, the printed part in FIG. 9F is larger than the printed part in FIG. 9A by the thickness of the previously printed layer. The process described above in FIGS. 9A-9F can be repeated until all print layers are formed onto the printed part P and the print is complete.

FIGS. 10A-10D illustrate schematic views of an example basin 1000, according to some examples. In the example of FIGS. 10A-10D, the basin 1000 includes a flexible film layer 1004, a print substrate 1006, side walls 1008, air ports 1042, a platform 1012, and liquid resin R. The side walls 1008 are configured to induce a curvature into the flexible film layer 1004. The side walls 1008 are coupled to the flexible film layer 1004 at the first end 1003 and the second end 1005 of the basin 1000, respectively, to allow the liquid resin R to be disposed within the basin 1000. Moreover, the flexible film layer 1004 is coupled to the side walls 1008 at a height substantially higher than the print substrate 1006. Thus, as the flexible film layer 1004 lays flat on the print substrate 1006, the flexible film layer 1004 defines a curvature at the first end 1003 and the second end 1005 of the basin 1000. The print substrate 1006 may be a glass material that focuses a curing light 1020 towards the printed part P. That is, the print substrate 1006 may act as a window for the curing light 1020.

The air ports 1042 may pull a vacuum downwards through the platform 1012 towards the bottom of the basin 1000 (e.g., depressurize the region between the flexible film layer 1004 and the platform 1012/print substrate 1006). The vacuum provides a force that pulls the flexible film layer 1004 to lay flat on the print substrate 1006. The side walls 10008 located at the first end 1003 and second end 1005 of the basin 1000, interfere with the flexible film layer 1004 inducing a contour into the flexible film layer 1004. In each of FIGS. 10A-10D, the build platform 105 includes a printed part P affixed to the build platform 105 interacting with the basin 1000.

Figure 10A:
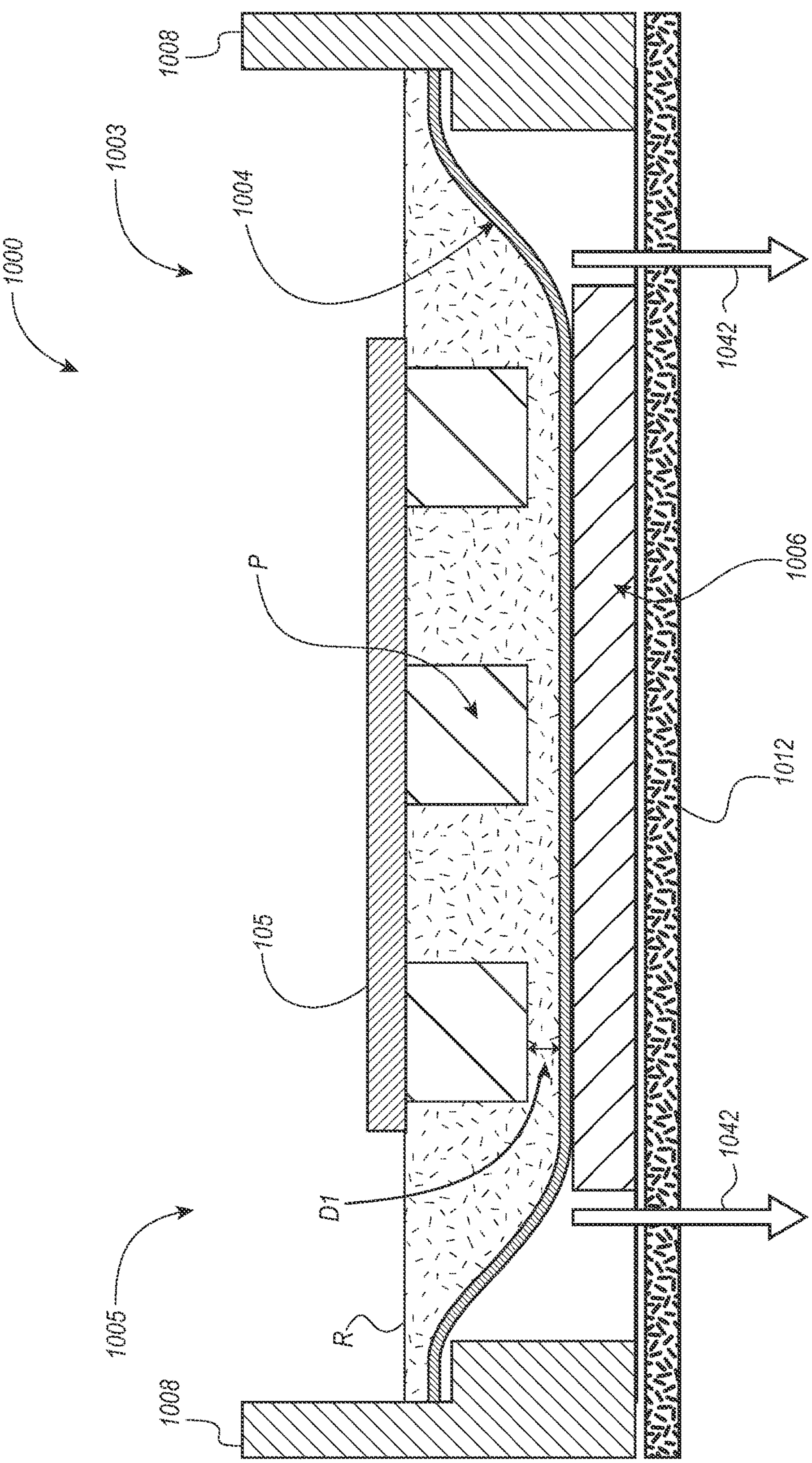
FIGS. 10A-10D illustrate schematic views of an example basin that includes a vacuum system, according to some examples.

FIG. 10A illustrates an example of the basin 1000 wherein data processing hardware 115 instructs the build platform 105 to position the printed part P at a first vertical position in the basin 1000. Here, the printed part P includes three distinct structures rather than a single structure as in FIG. 2. At the first vertical position, the bottom surface of the printed part P is positioned a first distance D1 from the flexible film layer 1004 corresponding to one layer thickness. The one layer thickness refers to the depth of liquid resin R disposed between the printed part P and the flexible film layer 1004 for forming a single printed layer L one the bottom surface of the printed part P. Moreover, the air ports 1042 pull vacuum causing the flexible film layer 1004 to lay flat on the print substrate 1006. Increasing the flatness and/or transparency of the flexible film layer 1004 reduces defects caused in the printed part caused by any imperfections in the flexible film layer as a curing light 1020 cures the liquid resin R through the flexible film layer 1004.

Figure 10B:
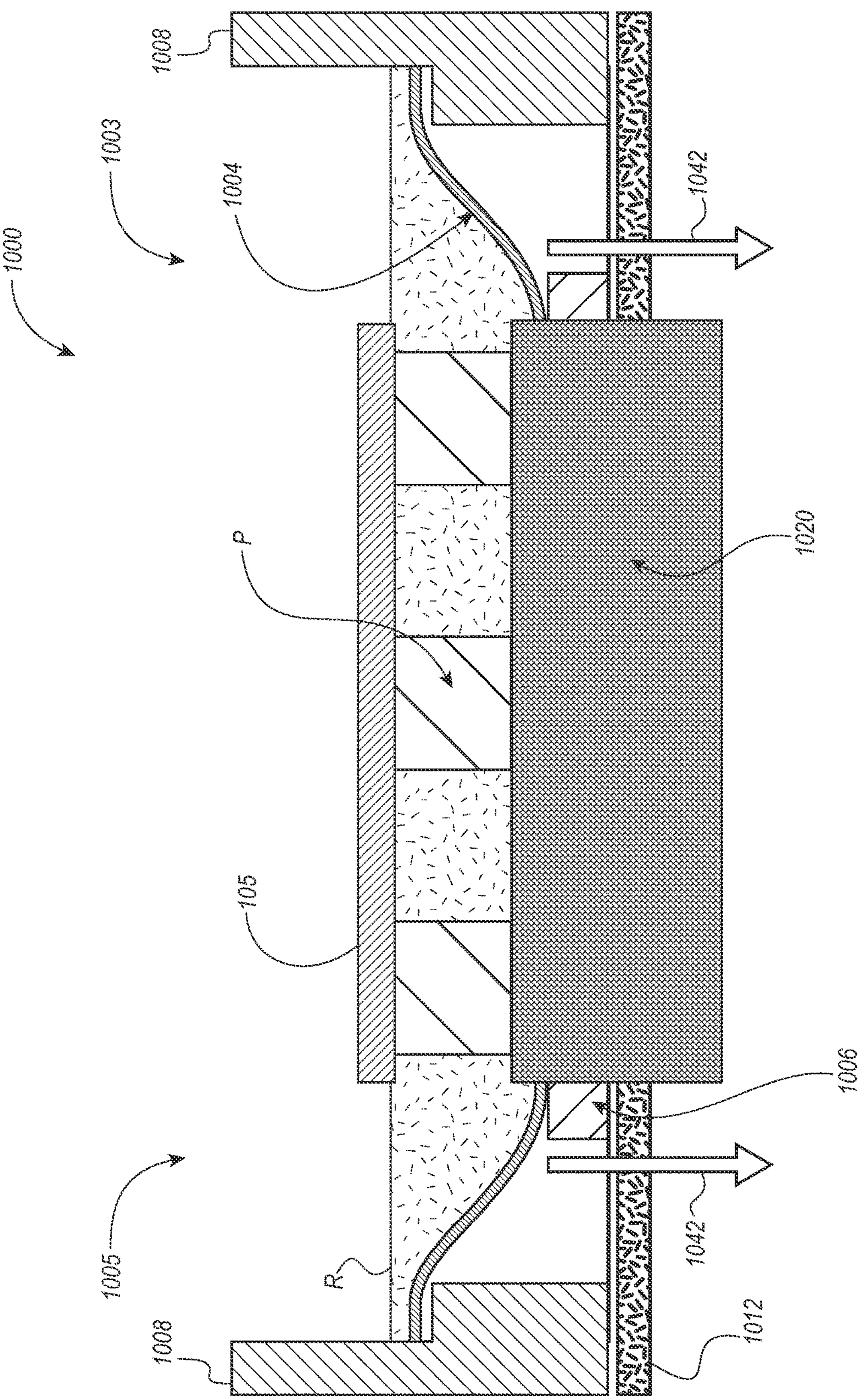

FIG. 10B illustrates an example of the basin 1000 wherein the curing light 1020 exposes the liquid resin R disposed between the printed part P and the flexible film layer 1004. The curing light 1020 cures the liquid resin R from the bottom side of the basin 1000 through the print substrate 1006 and the flexible film layer 1004 creating a new print layer L of the printed part P. Optionally, the light source of the curing light 1020 may be located beneath the platform 1012. The curing light 1020 may be provided by any light source known by those skilled in the art of SLA printing. Here, the air ports 1042 continue to pull vacuum holding the flexible film layer 1004 flat against the print substrate 1006 while the curing light 1020 cures the liquid resin R.

Figure 10C:
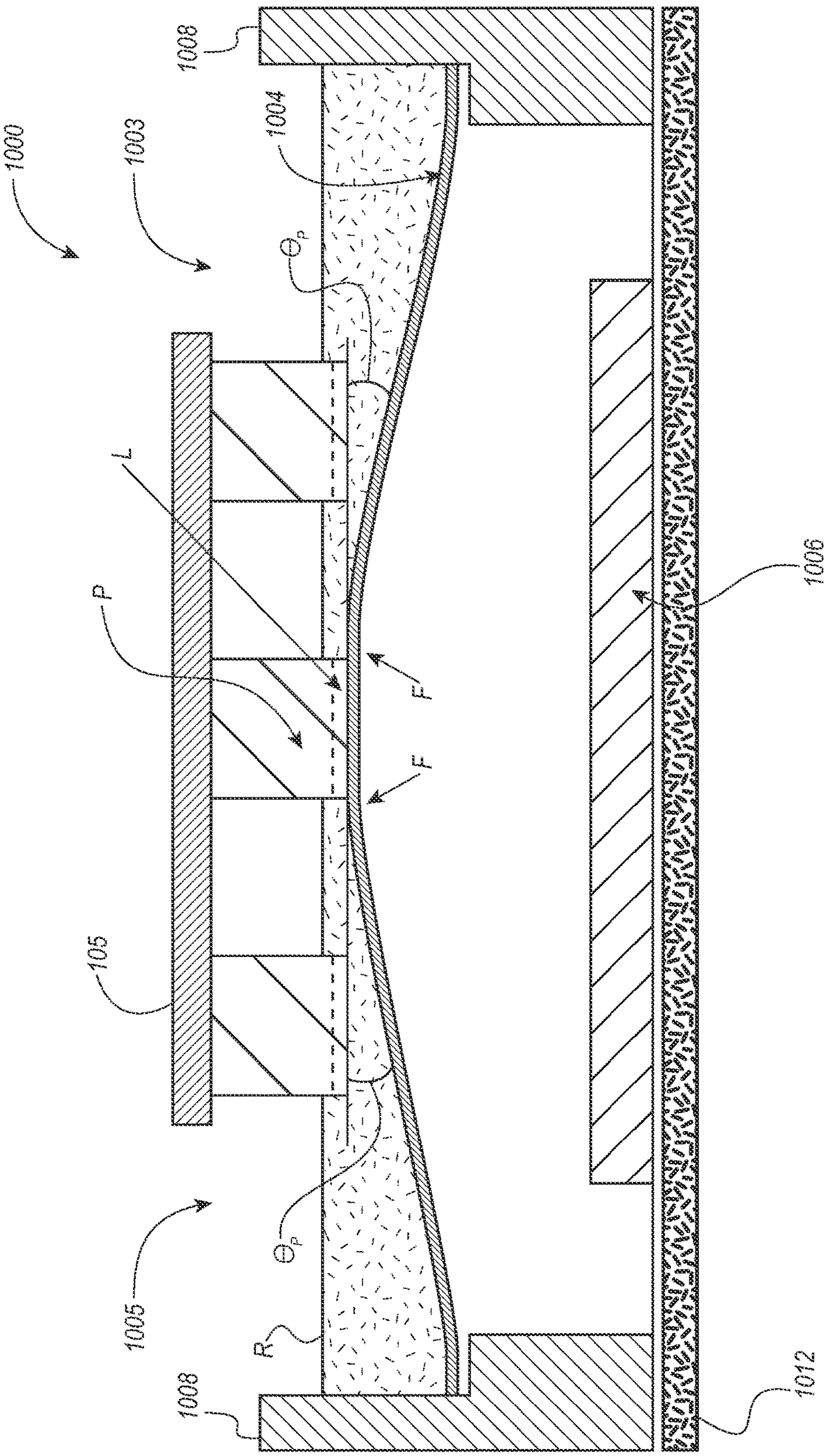

FIG. 10C illustrates an example of the basin 1000 wherein the liquid resin R disposed between the printed part P and the flexible film layer 1004 is cured to form a new part layer L. That is, the curing light 1020 (FIG. 10B) solidifies the liquid resin R onto the bottom surface of the printed part P to form the new print layer L of the printed part P. Notably, the printed part P in FIG. 10C is larger than the printed part P in FIG. 10B by the size of the new print layer L. The new print layer L of the printed part P adheres to the flexible film layer 1004 such that a force must be applied to separate new print layer L and the flexible film layer 1004. Notably, the air ports 1042 terminate the vacuum force pulled against the flexible film layer 1004. Thus, the build platform 105 may now raise the printed part P and the flexible film layer 1004 together.

After the printed part P adheres to the print substrate 1006, the flexible film layer 1004 may overcome Stefan forces adhering the flexible film layer 1004 and the print substrate 1006 together. In particular, the data processing hardware 115 instructs the build platform 105 to move in the vertical direction away from the platform 1012 and the print substrate 1006 inducing a peel front F. That is, the data processing hardware 115 instructs the build platform 105 to move in the vertical direction further away from the platform 1012 inducing a peel front F. Here, the printed part P affixed to the build platform 105 and the flexible film layer 1004 adhered to the printed part Pare lifted in the vertical direction away from the platform 1012. The exact curvature of the flexible film layer 1004 depends on several factors including, but not limited to, geometry of the printed part P, geometric relationship between the blade and the printed part P, and the stiffness, or other characteristics, of the flexible film layer 1004. Notably, lifting the build platform 105 induces a high peel angle $\theta_P$ (i.e., angle between the new print layer L of the printed part P and the flexible film layer 1004) on both sides of the flexible film layer 1004. Here, the peeling process initiates on both the first end 1003 and the second end 1005 of the basin and converging in the center of the basin. The high peel angle $\theta_P$ reduces the force applied to the printed part P (e.g., by localizing the peel front F) providing increased print quality of the printed part P.

Figure 10D:
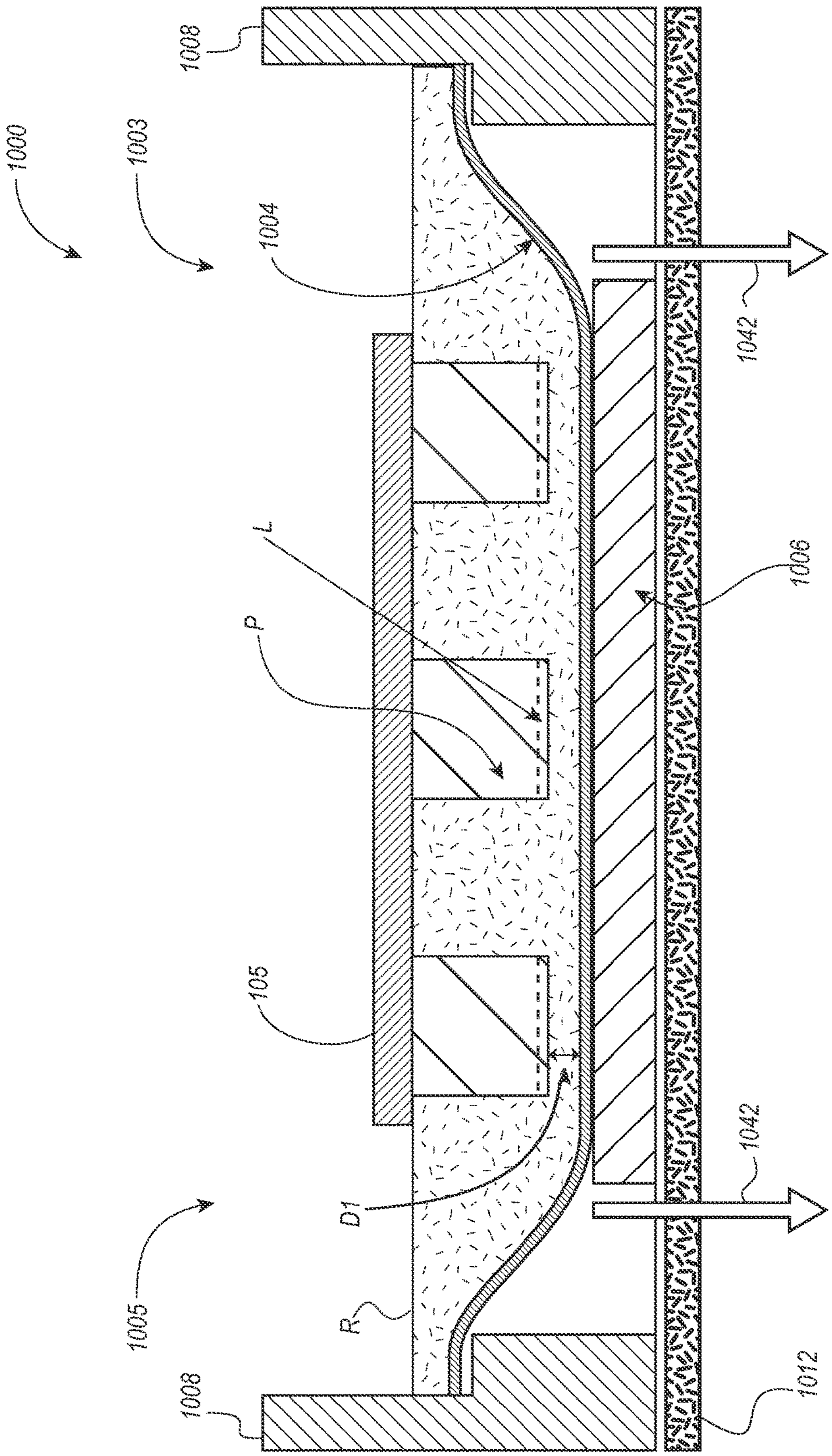

FIG. 10D illustrates an example of the basin 1000 wherein the flexible film layer 1004 fully separates from the printed part. That is, the printed part P is now free to move in the vertical direction without causing movement of the flexible film layer 1004. After the flexible film layer 1004 completely separates from the printed part, the air ports 1042 pull vacuum inducing the flexible film layer 1004 to lay flat on the print substrate 1006 again. Moreover, the data processing hardware 115 instructs the build platform 105 to lower the printed part P in the vertical direction towards the flexible film layer 1004, commonly referred to as a "squish" move. The build platform 105 lowers the printed part P such that the bottom surface of the new print layer L of the printed part P is spaced the first distance D1 equal to one layer thickness from the flexible film layer 1004 to cure the next layer of liquid resin R onto the printed part P. Notably, the printed part in FIG. 10D is larger than the printed part in FIG. 10A by the thickness of the previously printed layer. The process described above in FIGS. 10A-10D can be repeated until all print layers are formed onto the printed part P and the print is complete.

FIGS. 11A-11F illustrate schematic views of an example basin 1100 that includes a scroll tank design, according to some examples. In the example of FIGS. 11A-11F, the basin 1100 includes a flexible film layer 1104, a print substrate 1106, side walls 1108, air ports 1142, and liquid resin R. The side walls 1108 are coupled to planks 1112 of the flexible film layer 1104 at the first end 1103 and the second end 1105 of the basin 1100, respectively, to allow the liquid resin R to be disposed within the basin 1100. Moreover, the planks 1112 of the flexible film layer 1104 are coupled to the side walls 1108 such that a curvature is induced into the flexible film layer 1104. The print substrate 1106 interferes with the curvature of the flexible film layer 1104 causing the flexible film layer 1104 to lay flat on top of the print substrate 1106. The print substrate 1106 may be a glass material that focuses a curing light 1120 towards the printed part P. That is, the print substrate 1106 may act as a window for the curing light 420. The print substrate 1106 includes air ports 1142 that pull a vacuum downwards towards the bottom of the basin 1100 (e.g., depressurize the region between the flexible film layer 1104 and the print substrate 1106). The vacuum in the air ports 1142 provides a suction that pulls that flexible film layer 1104 to lay flat on the print substrate 1106.

Figure 11A:
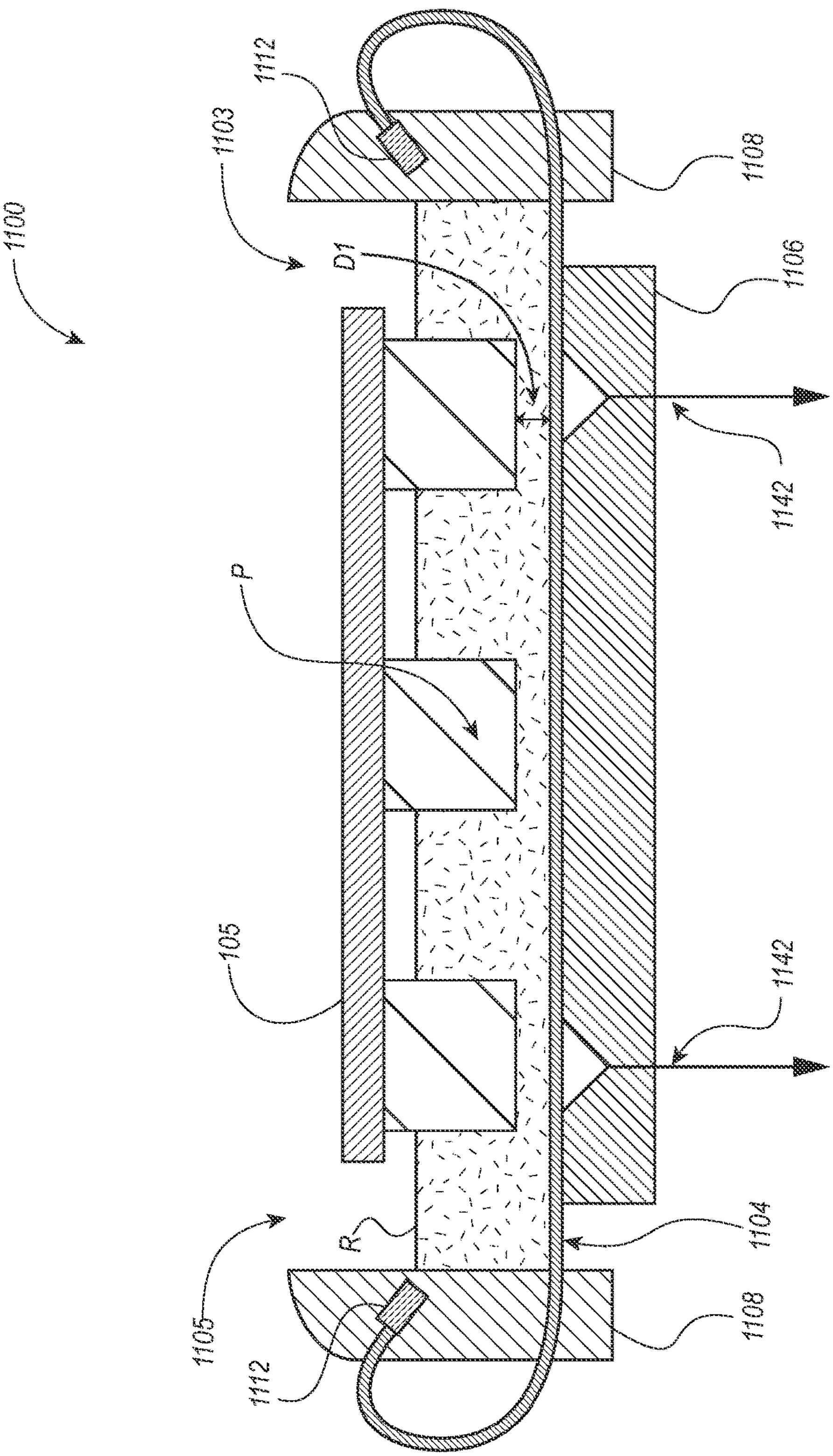
FIGS. 11A-11F illustrate cross-sectional schematic view of an example basin that includes scroll tank.

FIG. 11A illustrates an example of the basin 1100 wherein data processing hardware 115 instructs the build platform 105 to position the printed part P at a first vertical position in the basin 1100. Here, the printed part P includes three distinct structures rather than a single structure as in FIG. 2. At the first vertical position, the bottom surface of the printed part P is positioned a first distance D1 from the flexible film layer 1104 corresponding to one layer thickness. The one layer thickness refers to the depth of liquid resin R disposed between the printed part P and the flexible film layer 1104 for forming a single printed layer L on the bottom surface of the printed part P. Here, the air ports 1142 pull a vacuum to pull the flexible film layer 1104 downwards towards the print substrate 1106.

Figure 11B:
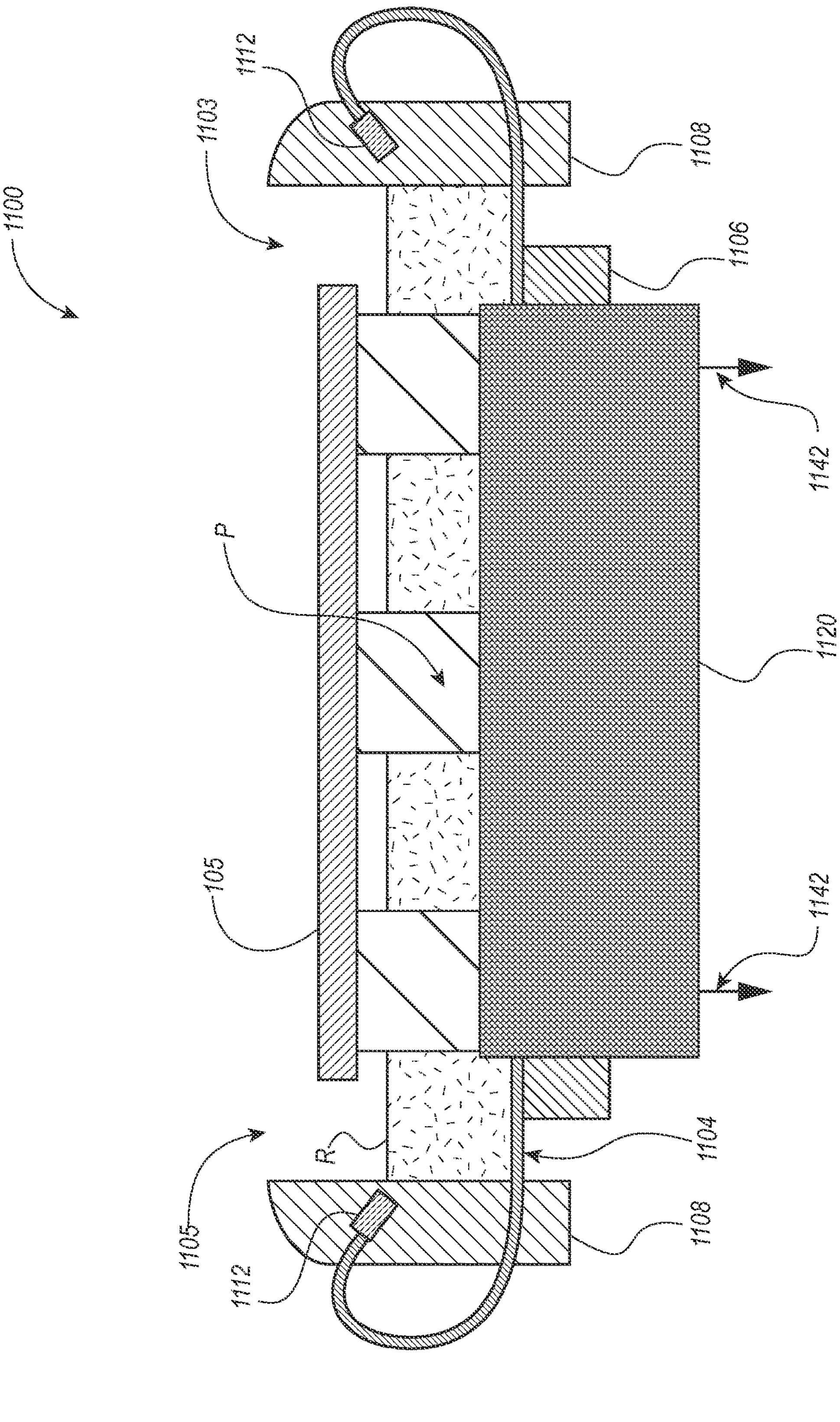

FIG. 11B illustrates an example of the basin 1100 wherein the curing light 1120 exposes the liquid resin R disposed between the printed part P and the flexible film layer 1104. The curing light 1120 cures the liquid resin R disposed between the printed part P and the flexible film layer 804 is cured to form a new part layer L. That is, the curing light 820 solidifies the liquid resin R onto the bottom surface of the printed part P to form the new print layer L of the printed part P. The curing light 1120 may be provided by any light source known by those skilled in the art of SLA printing.

Figure 11C:
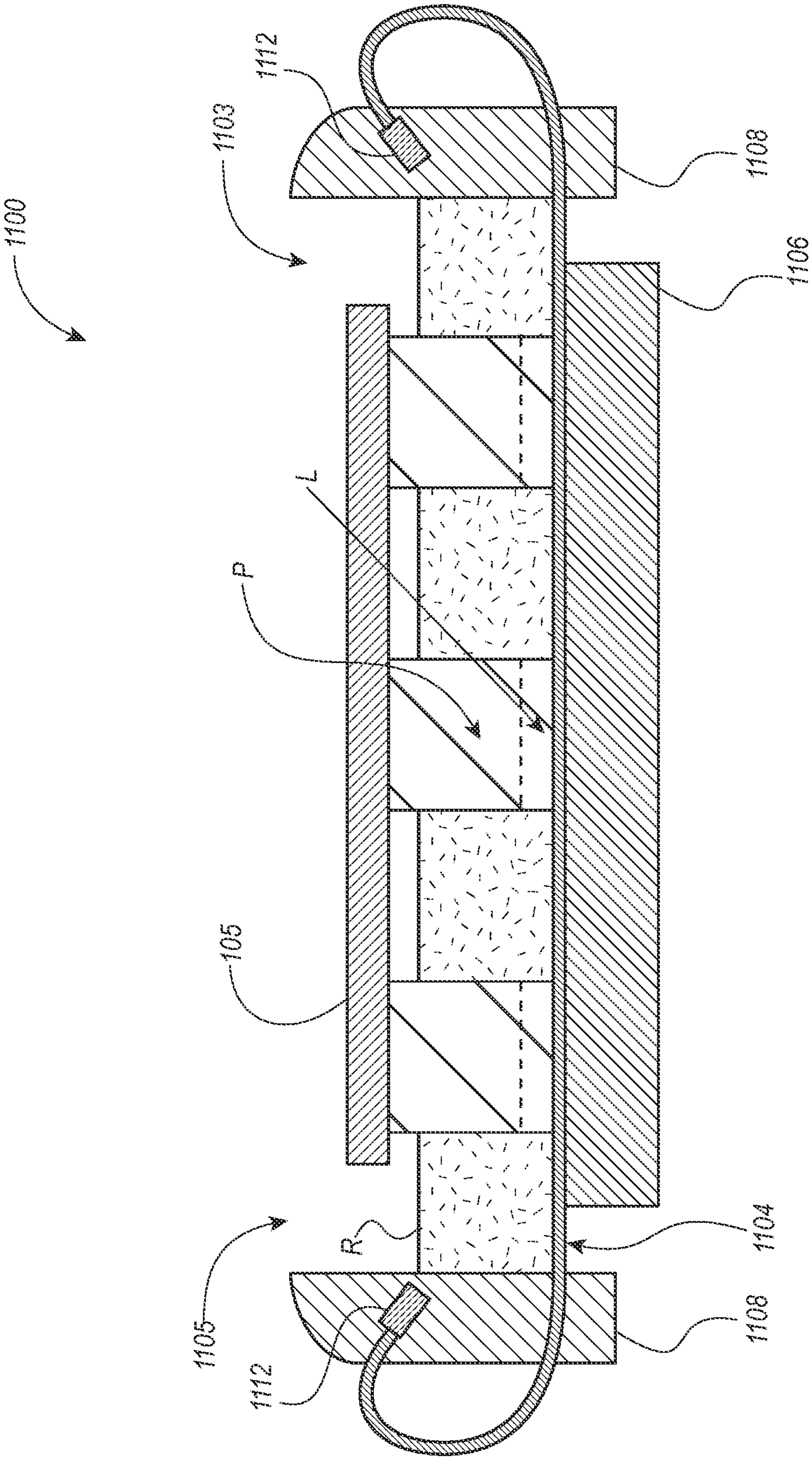

FIG. 11C illustrates an example of the basin 1100 wherein the printed part P cures to the flexible film layer 1104. That is, the curing light 1120 (FIG. 11D) solidifies the liquid resin R onto the surface of the printed part P becoming the new print layer L of the printed part P. Notably, the printed part P in FIG. 11E is larger than the printed part P in FIG. 11D by the size of the new print layer L. The new print layer L of the printed part P adheres to the flexible film layer 1104 such that a force must be applied to separate new print layer L and the flexible film layer 1104. Thus, the air ports 1142 are closed off allowing removing the vacuum force holding the flexible film layer 1104 onto the print substrate 1106.

Figure 11D:
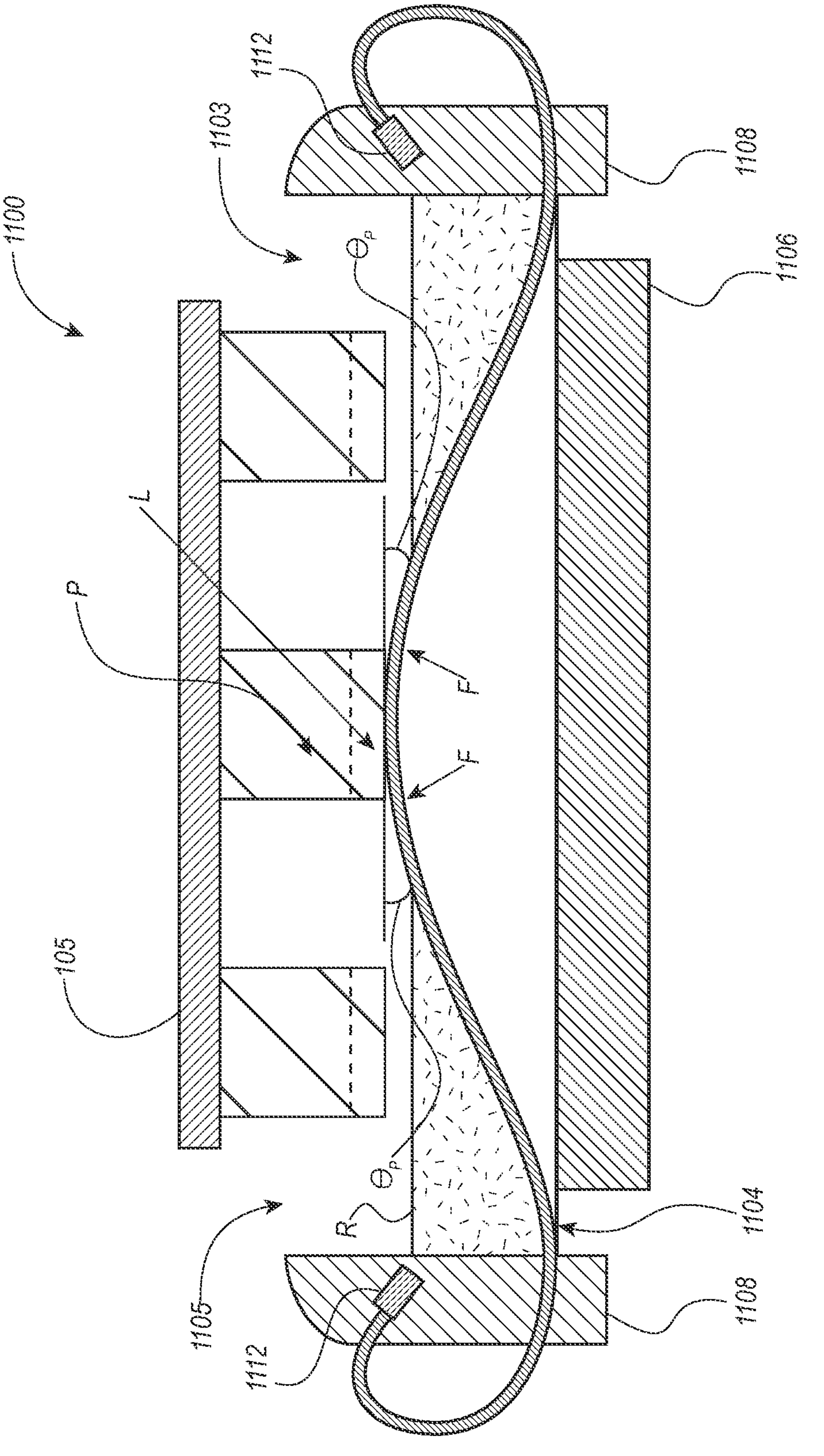
Figure 11E:
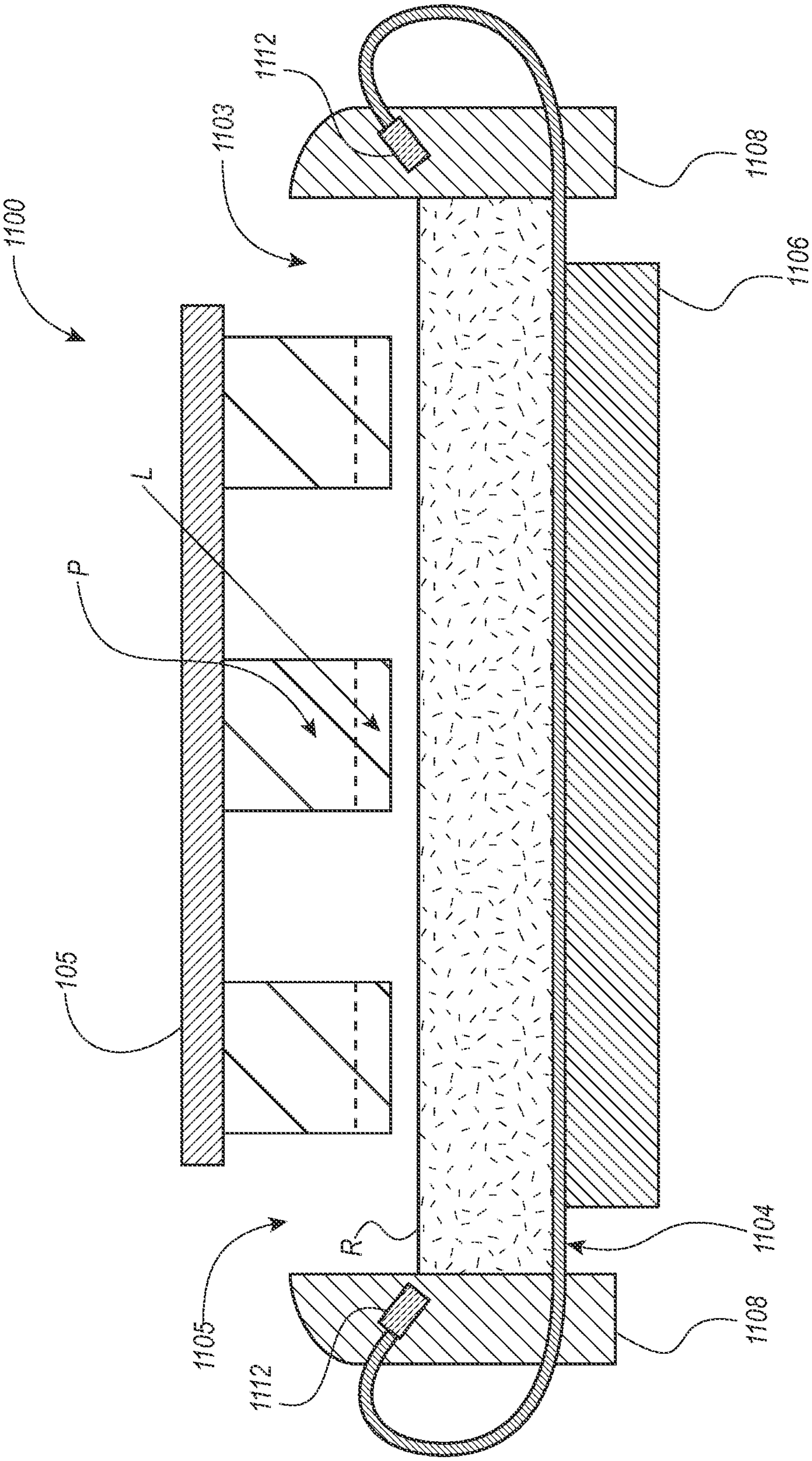

FIG. 11D illustrates an example of the basin 1100 wherein the flexible film layer 1104 peels from the printed part P. That is, the data processing hardware 115 instructs the build platform 105 to move in the vertical direction away from the print substrate 1106 inducing a peel front F. Here, the printed part P affixed to the build platform 105 and the flexible film layer 1104 adhered to the printed part P are lifted in the vertical direction away from the print substrate 1106. The exact curvature of the flexible film layer 1104 depends on several factors including, but not limited to, geometry of the printed part P, geometric relationship between the blade and the printed part P, and the stiffness, or other characteristics, of the flexible film layer 1104. Notably, raising the build platform 105 induces a high peel angle $\theta_P$ (i.e., angle between the new print layer L of the printed part P and the flexible film layer 1104) on both sides of the flexible film layer 1104. Here, the peeling process initiates on both the first end 1103 and the second end 1105 of the basin and converging in the center of the basin. The high peel angle $\theta_P$ reduces the force applied to the printed part P (e.g., by localizing the peel front F) providing increased print quality of the printed part P. Here, the tension on the flexible film layer 1104 remains constant as the plank 1112 remains in the same position of the side wall 1108.

FIG. 11E illustrates an example of the basin 1100 wherein the flexible film layer 1104 fully separates from the printed part. That is, the printed part P is now free to move in the vertical direction without causing movement of the flexible film layer 1104. After the flexible film layer 1104 completely separates from t the printed part, internal stresses of the flexible film layer 1104 causes the flexible film layer 1104 to return to the print substrate 1106 laying flat.

Figure 11F:
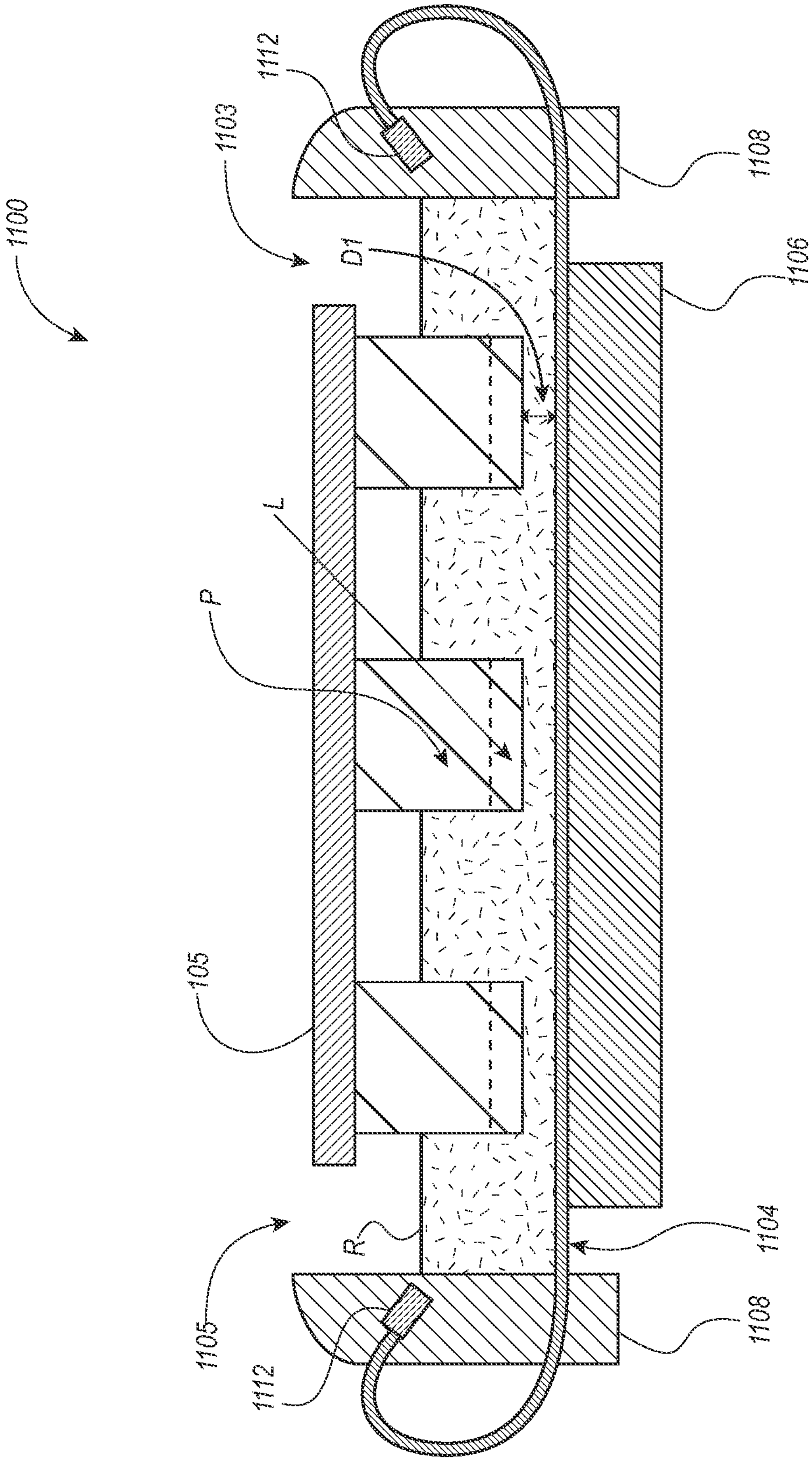

FIG. 11F illustrates an example of the basin 1100, wherein the data processing hardware 115 instructs the build platform 105 to lower the printed part P in the vertical direction towards the flexible film layer 1104, commonly referred to as a "squish" move. The build platform 105 lowers the printed part P such that the bottom surface of the new print layer L of the printed part P is spaced the first distance D1 equal to one layer thickness from the flexible film layer 1104. Notably, the printed part in FIG. 11F is larger than the printed part in FIG. 11A by the thickness of the previously printed layer. The process described above in FIGS. 11A-11F can be repeated until all print layers are formed onto the printed part P and the print is complete.

FIGS. 12A-12F illustrate schematic views of an example basin 1200, according to some examples. In the example of FIGS. 12A-12F, the basin 1200 includes blocks 1202, a flexible film layer 1204, a print substrate 1206, side walls 1208, and liquid resin R. The blocks 1202 are configured to support the flexible film layer 1204 and are located on the bottom side of the flexible film layer 1204. The blocks 1202 are located at the first end 1203 of the basin 1200 and the second end 1205 of the basin 1200. In the example shown, the blocks 1202 are triangular in shape, however, it is understood that the blocks 1202 may include any geometric shape. In some examples, the blocks 1202 define a gap between the blocks 1202 and the print substrate 1206. The side walls 1208 are coupled to the flexible film layer 1204 at the first end 1203 and the second end 1205 of the basin 1200, respectively, to allow the liquid resin R to be disposed within the basin 1200. The print substrate 1206 may be a glass material that focuses a curing light 1220 towards the printed part P. That is, the print substrate 1206 may act as a window for the curing light 1220. The blocks 1202 located at the first end 1203 and second end 1205 of the basin 1200, interfere with the flexible film layer 1204 inducing a contour into the flexible film layer 1204. In each of FIGS. 12A-12K, the build platform 105 includes a printed part P affixed to the build platform 105 interacting with the basin 1200.

Figure 12A:
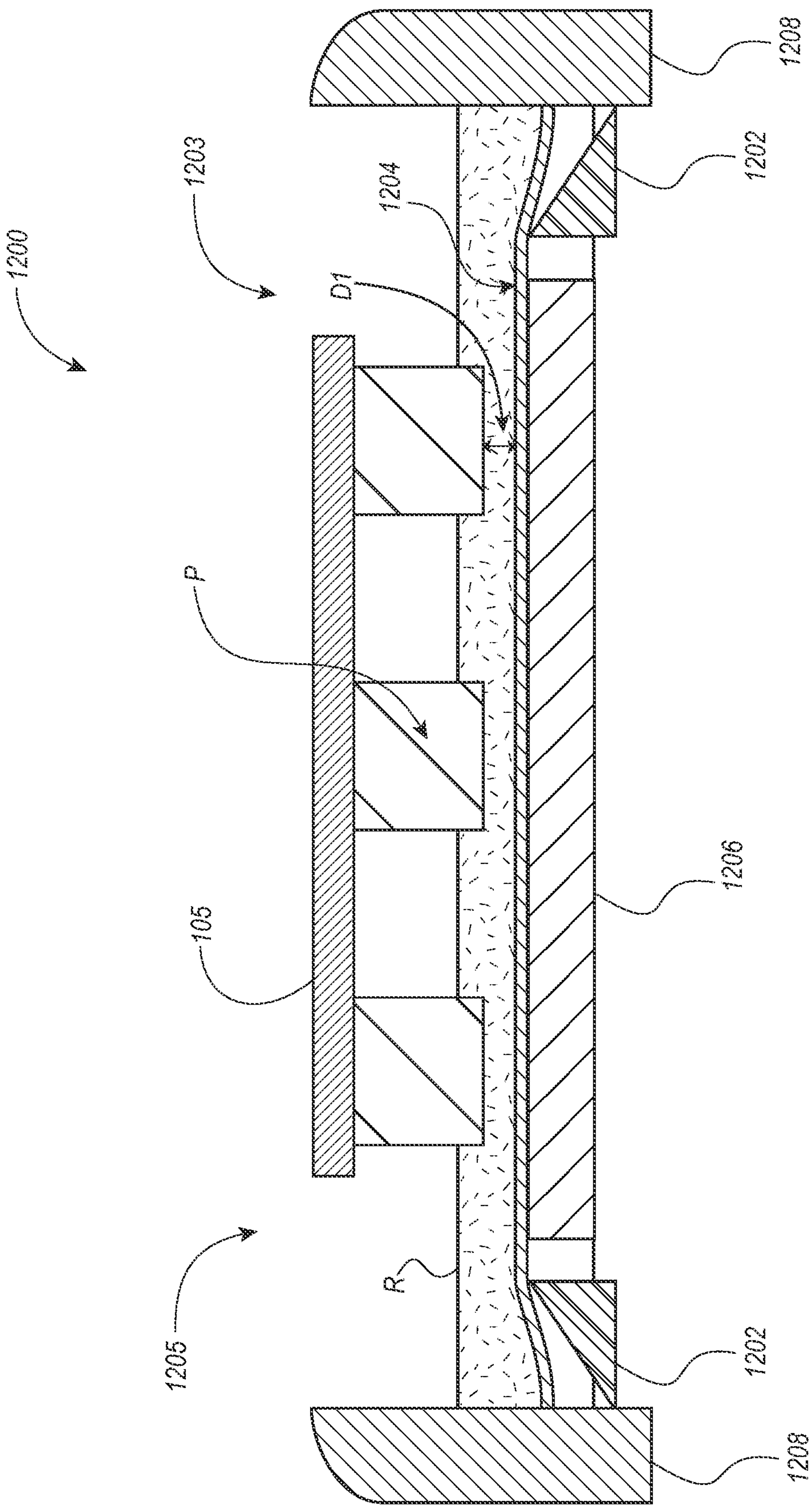
FIGS. 12A-12F illustrate schematic views of an example basin that includes air injection, according to some examples.

FIG. 12A illustrates an example of the basin 1200 wherein data processing hardware 115 instructs the build platform 105 to position the printed part P at a first vertical position in the basin 1200. Here, the printed part P includes three distinct structures rather than a single structure as in FIG. 2. At the first vertical position, the bottom surface of the printed part P is positioned a first distance D1 from the flexible film layer 1204 corresponding to one layer thickness. The one layer thickness refers to the depth of liquid resin R disposed between the printed part P and the flexible film layer 1204 for forming a single printed layer L on the bottom surface of the printed part P.

Figure 12B:
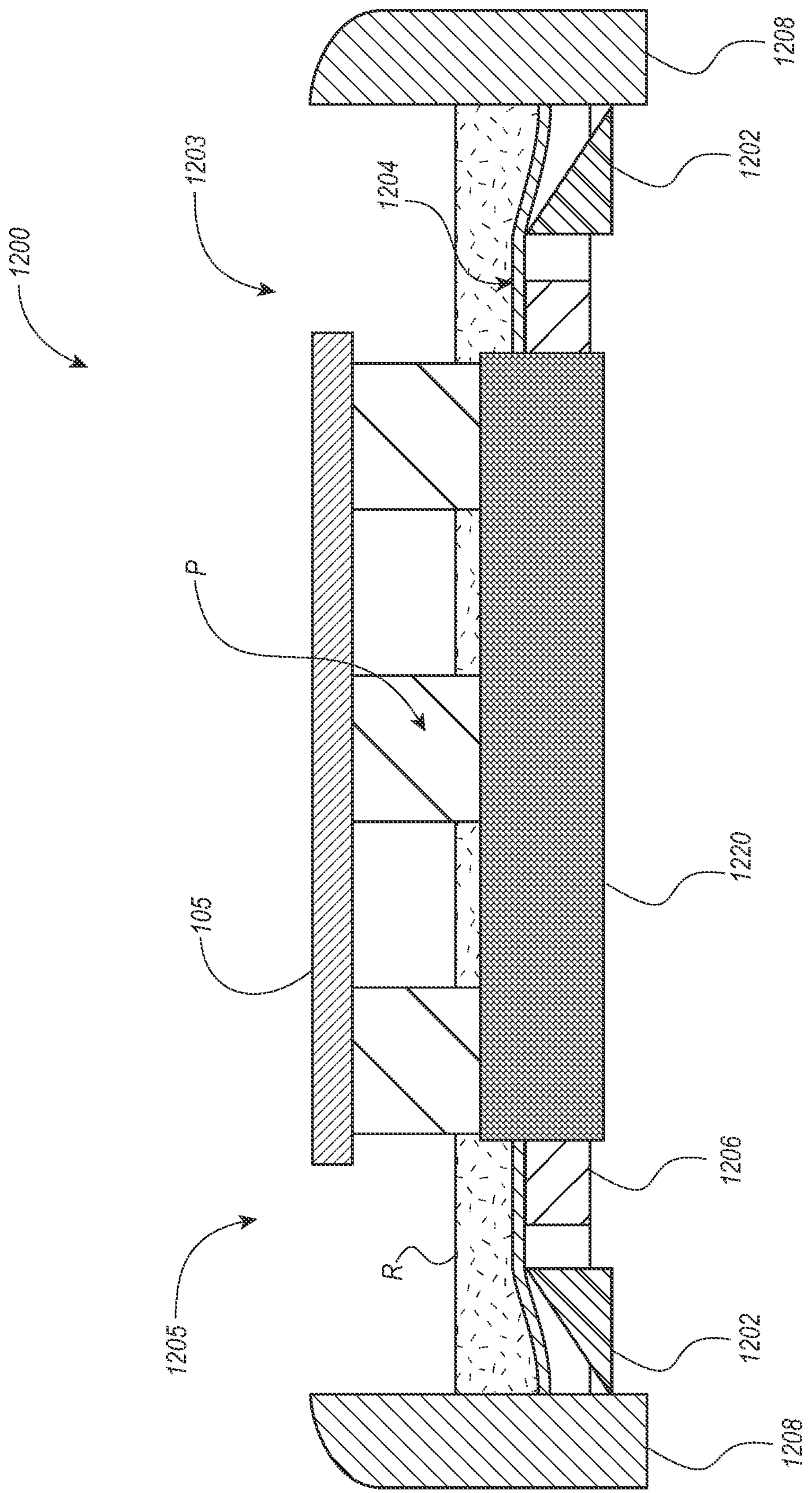

FIG. 12B illustrates an example of the basin 1200 wherein the curing light 1220 exposes the liquid resin R disposed between the printed part P and the flexible film layer 1204. The curing light 1220 cures the liquid resin R from the bottom side of the basin 1200 through the print substrate 1206 and the flexible film layer 1204 creating a new print layer L of the printed part P. Optionally, the light source of the curing light 1220 may be located beneath the print substrate 1206. The curing light 1220 may be provided by any light source known by those skilled in the art of SLA printing.

Figure 12C:
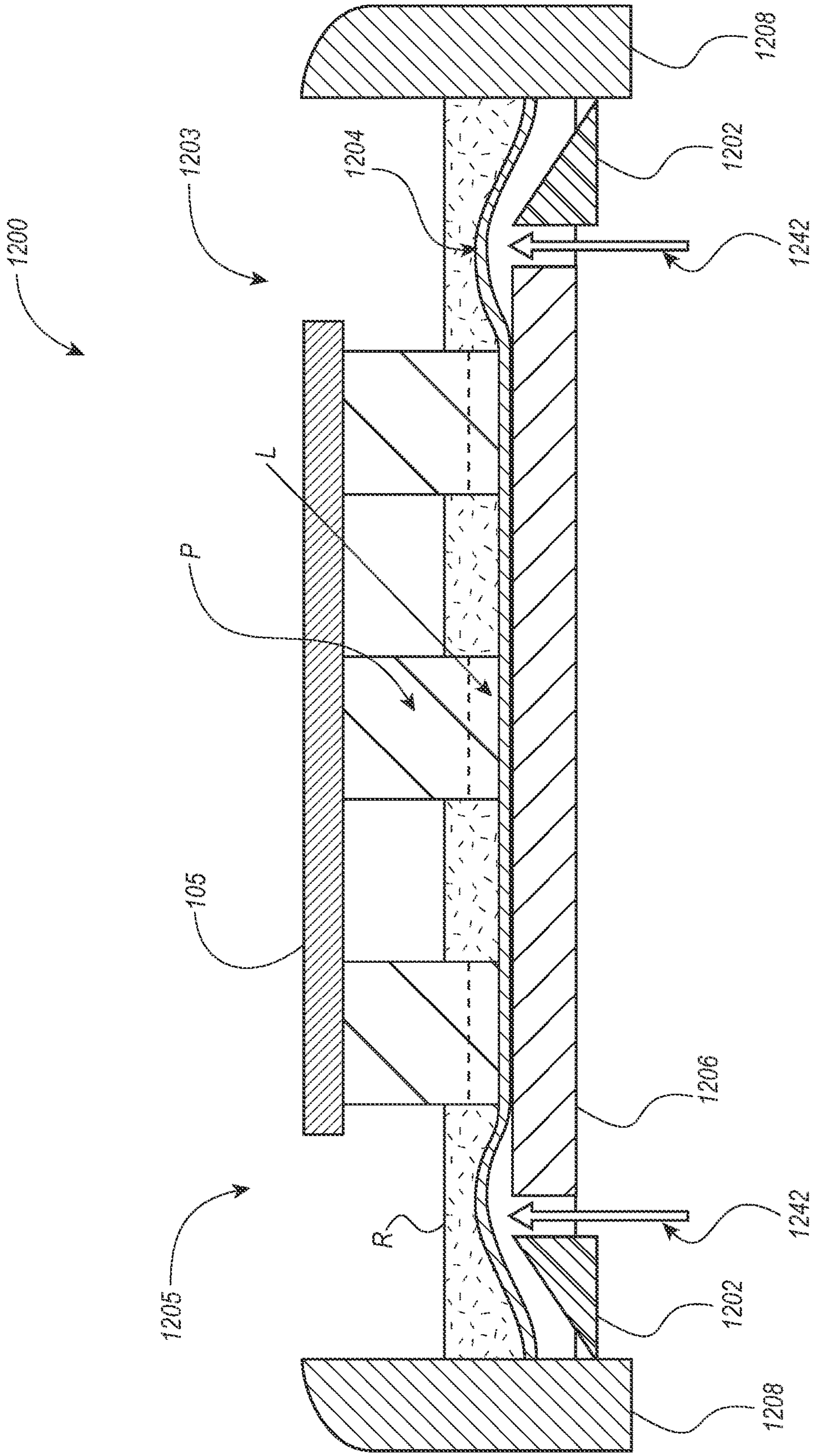

FIG. 12C illustrates an example of the basin 1200 wherein the liquid resin R disposed between the printed part P and the flexible film layer 1204 is cured to form a new part layer L. That is, the curing light 1220 (FIG. 12B) solidifies the liquid resin R onto the bottom surface of the printed part P to form the new print layer L of the printed part P. Notably, the printed part P in FIG. 12C is larger than the printed part P in FIG. 12B by the size of the new print layer L. The new print layer L of the printed part P adheres to the flexible film layer 1204 such that a force must be applied to separate new print layer L and the flexible film layer 1204. Moreover, the basin 1200 include forced air 1242 provided to the bottom side of the flexible film layer 1204. The forced air 1242 is provided between the blocks 1202 and the print substrate 1206 on the first end 1203 and the second end 1205 of the basin, thus pressurizing the region. Accordingly, the forced air 1242 overcomes the Stefan force between the flexible film layer 1204 and the print substrate 1206. Thus, the build platform 105 may now raise the printed part P and the flexible film layer 1204 together.

Figure 12D:
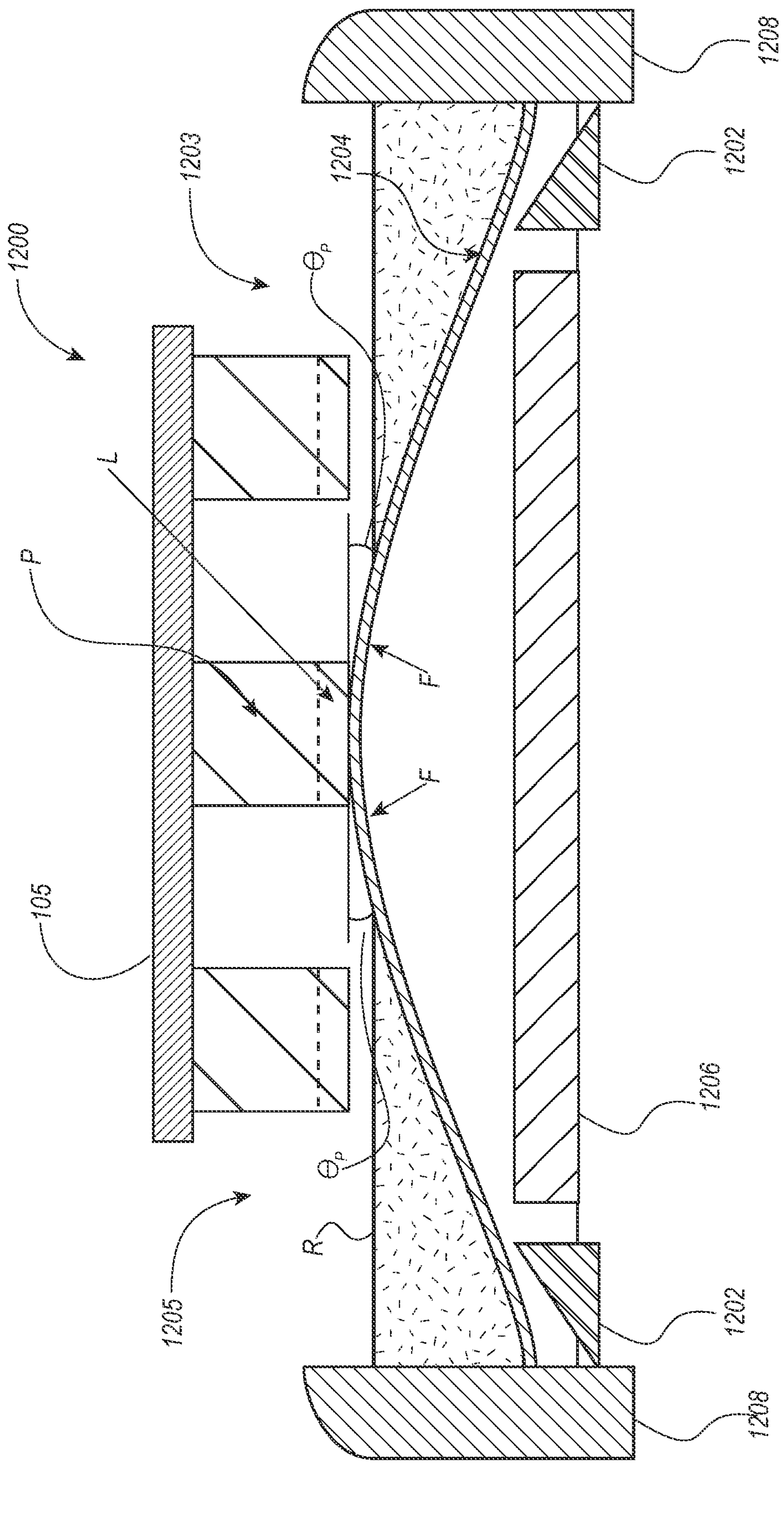

FIG. 12D illustrates an example of the basin 1200 wherein the build platform 105 lifts the printed part P and the flexible film layer from the print substrate 1206. Here, the flexible film layer 1204 may overcome Stefan forces adhering the flexible film layer 1204 and the print substrate 1206 together. In particular, the data processing hardware 115 instructs the build platform 105 to move in the vertical direction away from the print substrate 1206 inducing a peel front F. Here, the printed part P affixed to the build platform 105 and the flexible film layer 1204 adhered to the printed part Pare lifted in the vertical direction away from the print substrate 1206. The exact curvature of the flexible film layer 1204 depends on several factors including, but not limited to, geometry of the printed part P, geometric relationship between the blade and the printed part P, and the stiffness, or other characteristics, of the flexible film layer 1204. Notably, raising the build platform 105 induces a high peel angle $\theta_P$ (i.e., angle between the new print layer L of the printed part P and the flexible film layer 1204) on both sides of the flexible film layer 1204. Here, the peeling process initiates on both the first end 1203 and the second end 1205 of the basin and converging in the center of the basin. The high peel angle $\theta_P$ reduces the force applied to the printed part P (e.g., by localizing the peel front F) providing increased print quality of the printed part P.

Figure 12E:
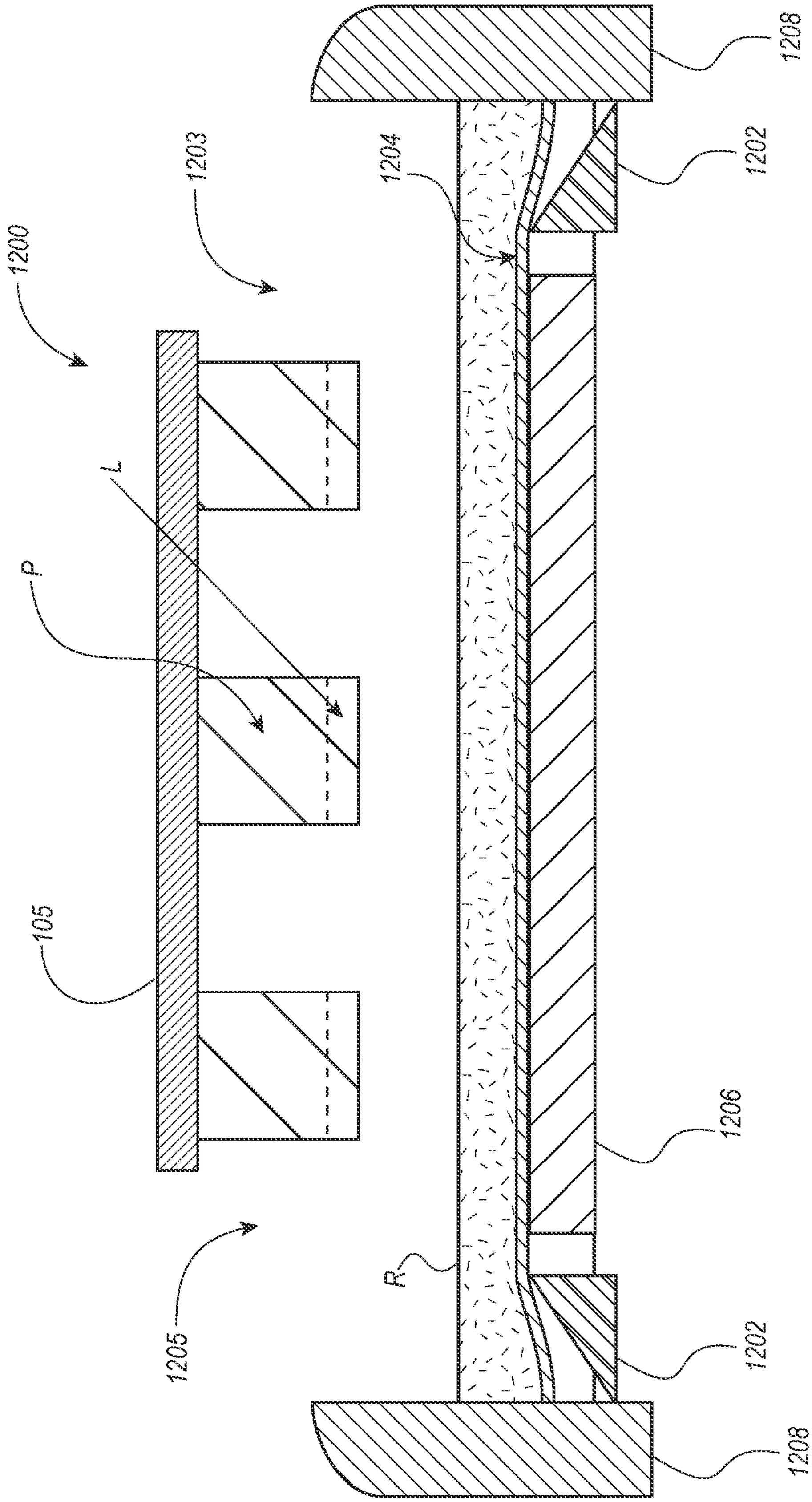

FIG. 12E illustrates an example of the basin 1200 wherein the flexible film layer 1204 fully separates from the printed part. After the flexible film layer 1204 fully separates from the printed part P, flexible film layer 1204 returns back to laying flat on the print substrate 1206. In some examples, the flexible film layer 1204 returns back to laying flat on the print substrate 1206 due to depressurizing the region between the flexible film layer 1204 and the print substrate 1206. Alternatively, the flexible film layer 1204 returns back to the laying flat on the print substrate due to the elastic force of the flexible film layer 1204 (e.g., due to the tensioning of the film) without any assistance of depressurization. That is to say, while forced air is used to pressurize the region between the flexible film layer 1204 and the print substrate 1206 after/concurrently with printing a layer, no active pressurization/depressurization occurs after the printed layer is fully separate from the flexible film layer 1204, and the inherent properties of the flexible film layer 1204 (e.g., elastic force or tension) re-laminates the flexible film layer 1204 over the print substrate.

Figure 12F:
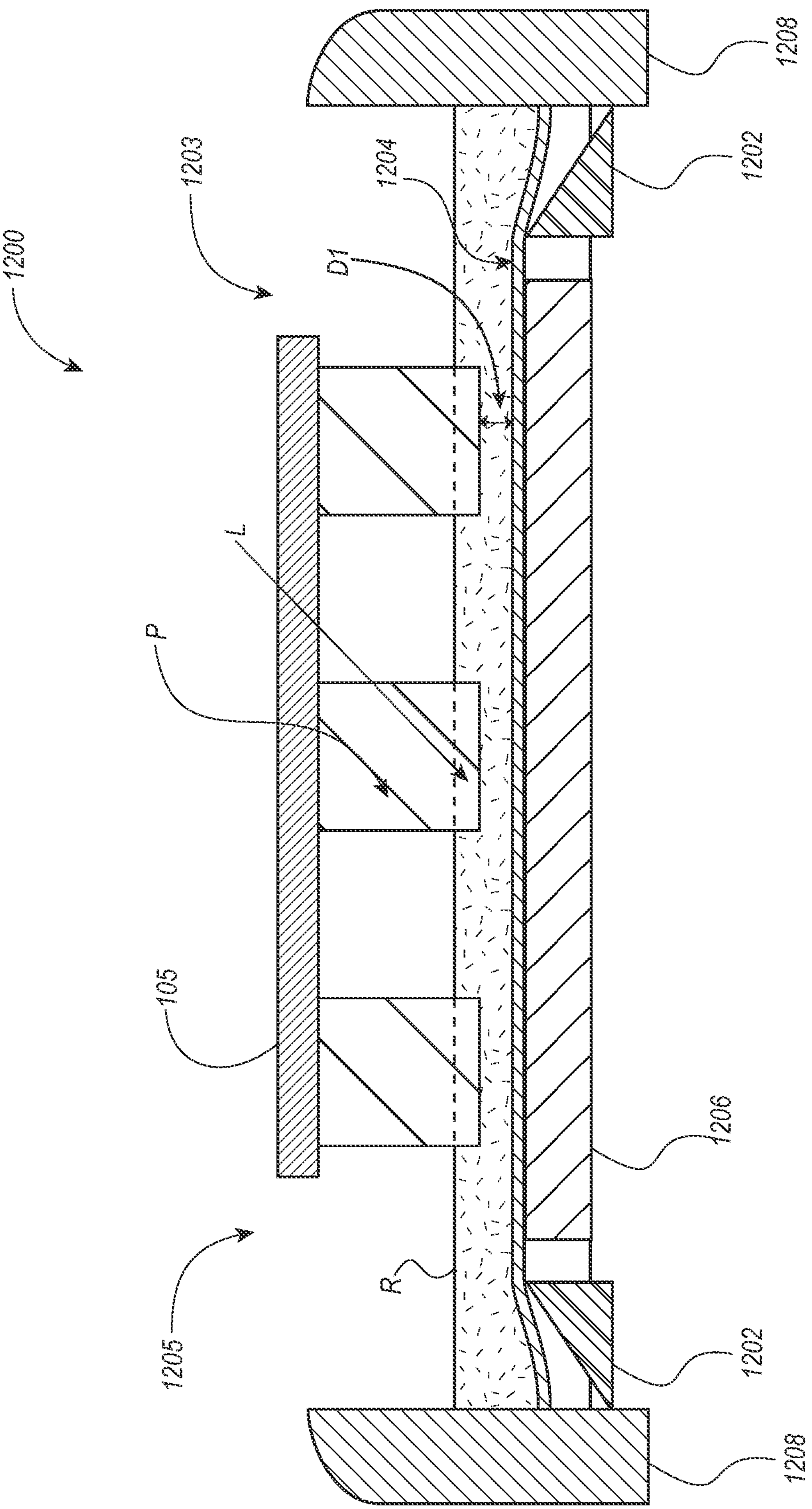

FIG. 12F illustrates an example of the basin 1200 wherein the data processing hardware 115 instructs the build platform 105 to lower the printed part P in the vertical direction towards the flexible film layer 1204, commonly referred to as a "squish" move. The build platform 105 lowers the printed part P such that the bottom surface of the new print layer L of the printed part P is spaced the first distance D1 equal to one layer thickness from the flexible film layer 1204. Notably, the printed part in FIG. 12F is larger than the printed part in FIG. 12A by the thickness of the previously printed layer. The process described above in FIGS. 12A-12F can be repeated until all print layers are formed onto the printed part P and the print is complete.

FIGS. 13A-13E illustrate schematic views of an example basin 1300, according to some examples. In the example of FIGS. 13A-13E, the basin 1300 includes a flexible film layer 1304, a print substrate 1306, side walls 1308, and liquid resin R. The side walls 1308 are coupled to the flexible film layer 1304 at the first end 1303 and the second end 1305 of the basin, respectively, to allow the liquid resin R to be disposed within the basin 1300. The print substrate 1306 may be a glass material that focuses a curing light 1320 towards the printed part P. That is, the print substrate 1306 may act as a window for the curing light 1320. The print substrate 1306 includes a textured surface 1306, 1306*a* (e.g., a surface that is not smooth and has particular pattern such as bumps). The textured surface 1306*a* of the print substrate 1306 is configured to reduce the surface area between the print substrate 1306 and the flexible film layer 1304. That is, only the textured part of the textured surface 1306*a* comes into contact with the flexible film layer 1304, thus reducing the contacting surface area between the flexible film layer 1304 and the print substrate 1306. The reduced surface area reduces Stefan forces adhering the flexible film layer 1304 and the print substrate 1306 together. In each of FIGS. 13A-13E, the build platform 105 includes a printed part P affixed to the build platform 105 interacting with the basin 1300.

Figure 13A:
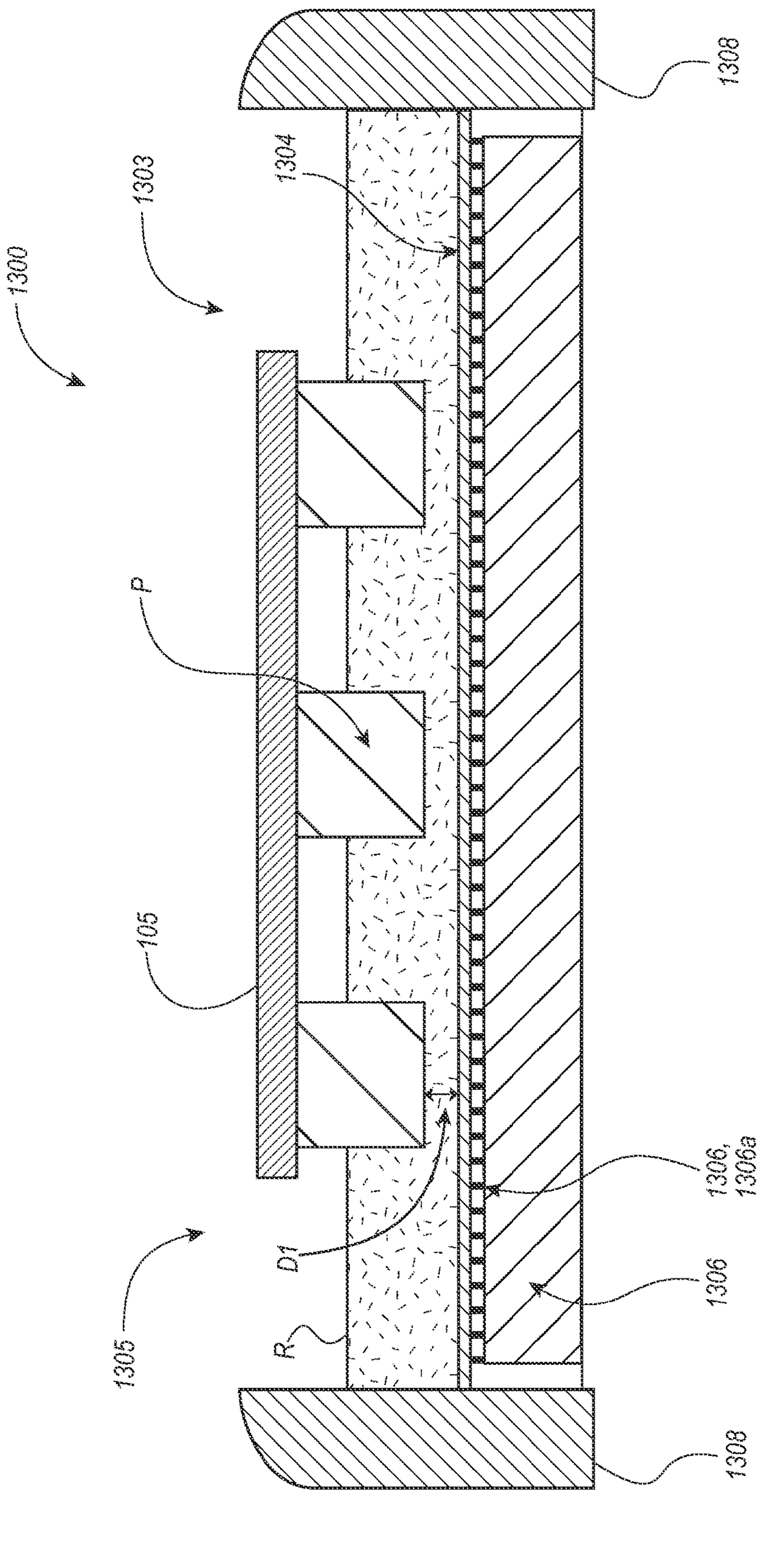
FIGS. 13A-13E illustrate schematic views of an example basin that includes a print substrate with a textured surface, according to some examples.

FIG. 13A illustrates an example of the basin 1300 wherein data processing hardware 115 instructs the build platform 105 to position the printed part P at a first vertical position in the basin 1300. Here, the printed part P includes three distinct structures rather than a single structure as in FIG. 2. At the first vertical position, the bottom surface of the printed part P is positioned a first distance D1 from the flexible film layer 1304 corresponding to one layer thickness. The one layer thickness refers to the depth of liquid resin R disposed between the printed part P and the flexible film layer 1304 for forming a single printed layer L on the bottom surface of the printed part P.

Figure 13B:
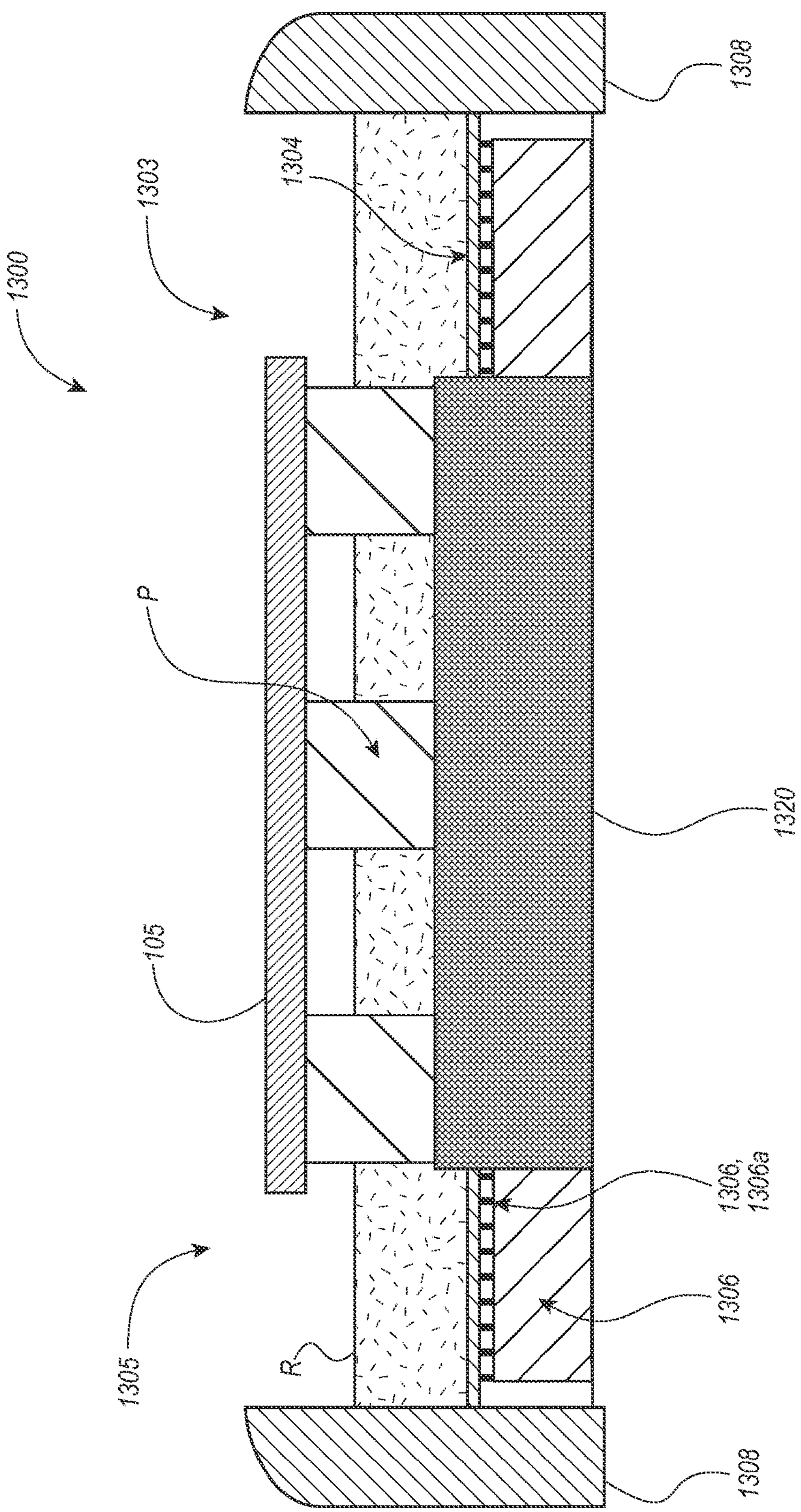

FIG. 13B illustrates an example of the basin 1300 wherein the curing light 1320 exposes the liquid resin R disposed between the printed part P and the flexible film layer 1304. The curing light 1320 cures the liquid resin R from the bottom side of the basin 1300 through the print substrate 1306 and the flexible film layer 1304 creating a new print layer L of the printed part P. Optionally, the light source of the curing light 1320 may be located beneath the print substrate 1306. The curing light 1320 may be provided by any light source known by those skilled in the art of SLA printing.

The curing light 1320 solidifies the liquid resin R onto the surface of the printed part P becoming the new print layer L of the printed part P. Notably, the printed part P in FIG. 13B is larger than the printed part P in FIG. 13A by the size of the new print layer L. The new print layer L of the printed part P adheres to the flexible film layer 1304 such that a force must be applied to separate new print layer L and the flexible film layer 1304.

Moreover, flexible film layer 1304 and the print substrate 1306 are adhered together by Stefan forces. Notably, the Stefan forces adhering the flexible film layer 1304 to the print substrate 1306 is reduced because the surface area between the flexible film layer 1304 and the print substrate 1306 is reduced by the textured surface 1306*a*. The reduced surface area (and thereby reduced Stefan force) allows the flexible film layer 1304 to be lifted from the print substrate 1306 with a limited force applied. Thus, the build platform 105 may now raise the printed part P and the flexible film layer 1304 together.

Figure 13C:
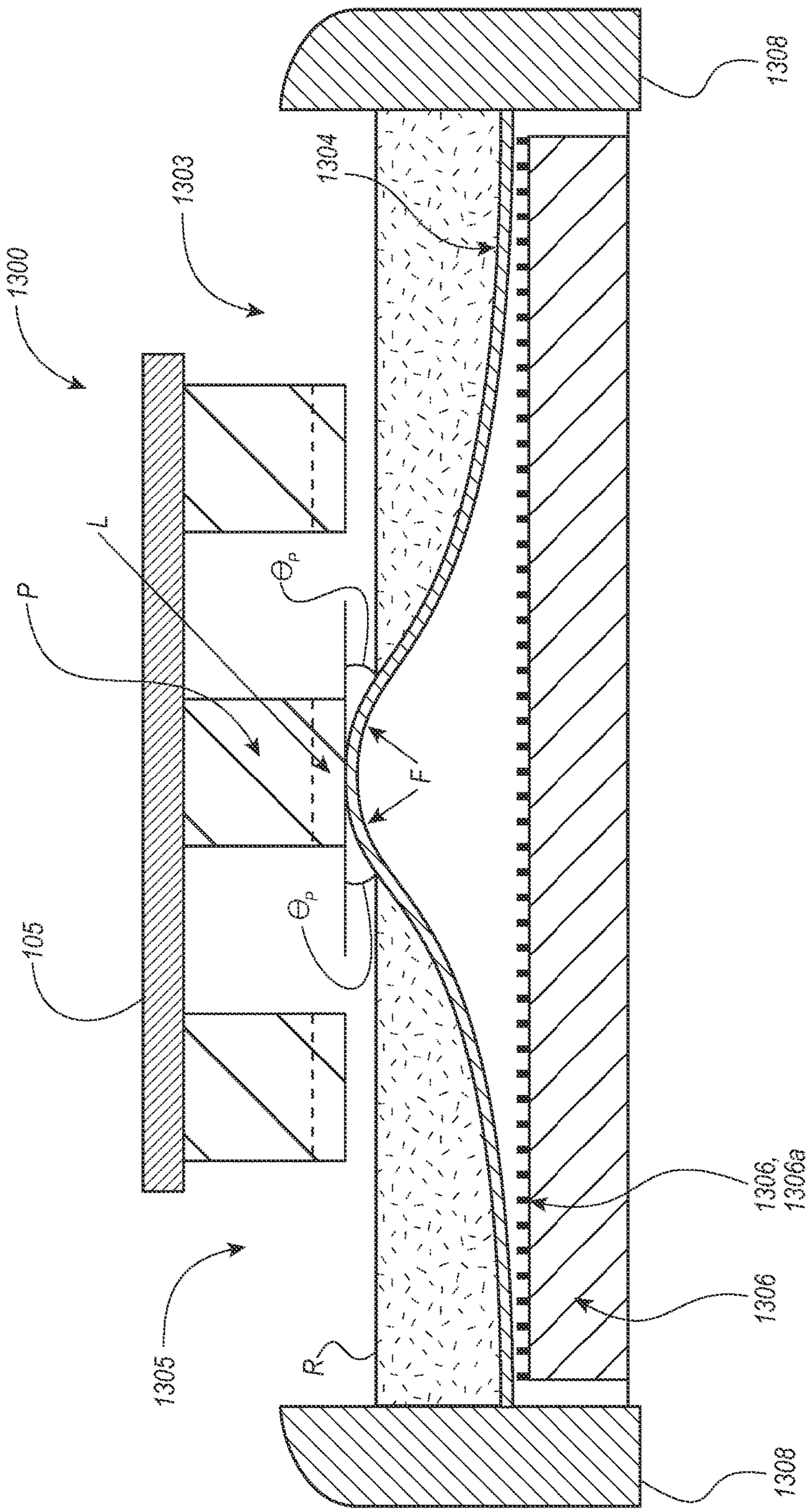

FIG. 13C illustrates an example of the basin 1300 wherein the build platform 105 lifts the printed part P and the flexible film layer from the print substrate 1306. Here, the flexible film layer 1304 may overcome Stefan forces adhering the flexible film layer 1304 and the print substrate 1306 together. In particular, the data processing hardware 115 instructs the build platform 105 to move in the vertical direction away from the print substrate 1306 inducing a peel front F. Here, the printed part P affixed to the build platform 105 and the flexible film layer 1304 adhered to the printed part P are lifted in the vertical direction away from the print substrate 1306. The exact curvature of the flexible film layer 1304 depends on several factors including, but not limited to, geometry of the printed part P, geometric relationship between the blade and the printed part P, and the stiffness, or other characteristics, of the flexible film layer 1304. Notably, raising the build platform 105 induces a high peel angle $\theta_P$ (i.e., angle between the new print layer L of the printed part P and the flexible film layer 1304) on both sides of the flexible film layer 1304. Here, the peeling process initiates on both the first end 1303 and the second end 1305 of the basin and converging in the center of the basin. The high peel angle $\theta_P$ reduces the force applied to the printed part P (e.g., by localizing the peel front F) providing increased print quality of the printed part P.

Figure 13D:
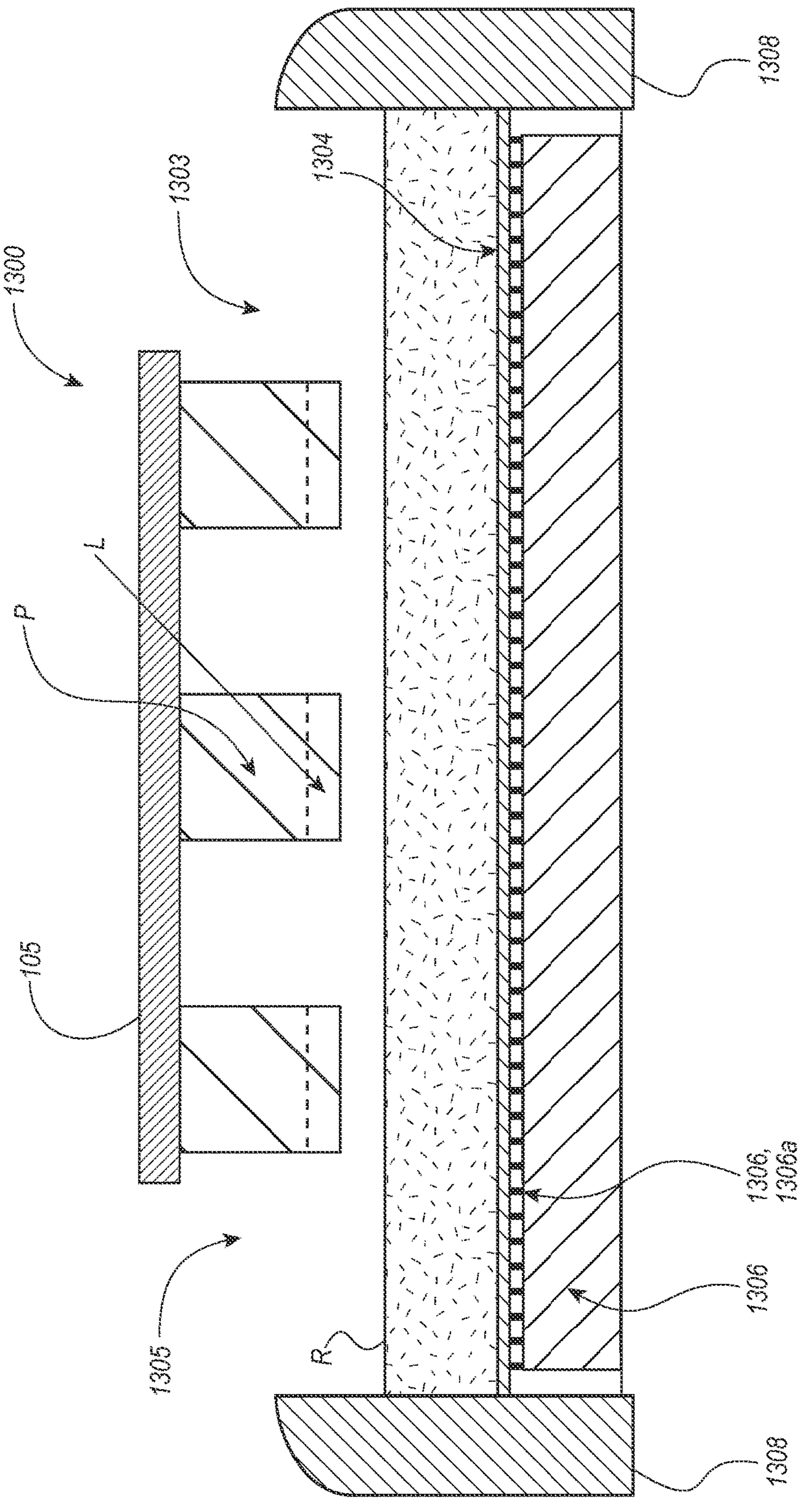

FIG. 13D illustrates an example of the basin 1300 wherein the flexible film layer 1304 fully separates from the printed part. After the flexible film layer 1304 fully separates from the printed part P, flexible film layer 1304 returns back to laying flat on the textured surface 1306*a* of the print substrate 1306.

Figure 13E:
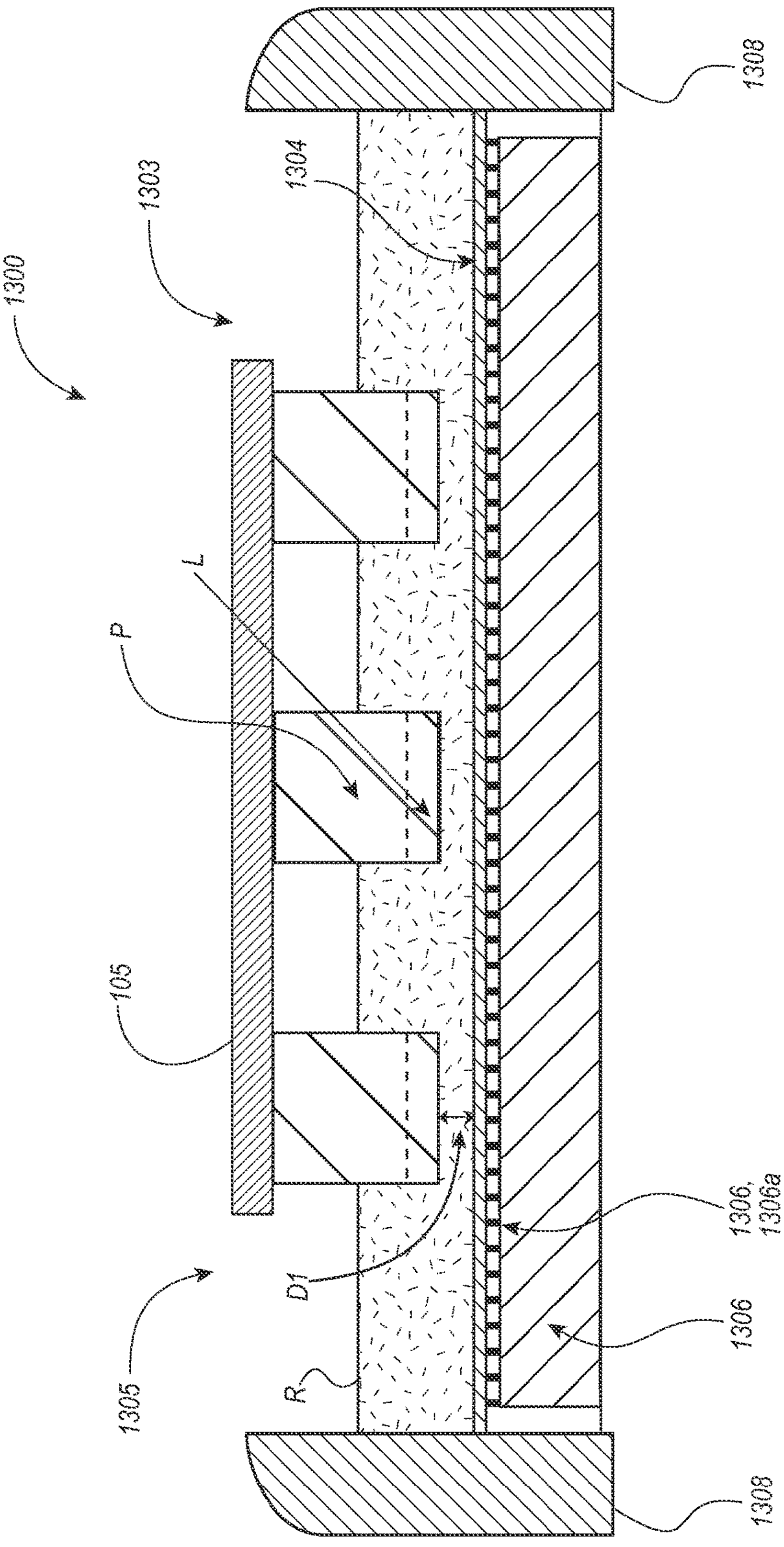

FIG. 13E illustrates an example of the basin 1300 wherein the data processing hardware 115 instructs the build platform 105 to lower the printed part P in the vertical direction towards the flexible film layer 1304, commonly referred to as a "squish" move.

The build platform 105 lowers the printed part P such that the bottom surface of the new print layer L of the printed part P is spaced the first distance D1 equal to one layer thickness from the flexible film layer 1304. Notably, the printed part in FIG. 13E is larger than the printed part in FIG. 13A by the thickness of the previously printed layer. The process described above in FIGS. 13A-13E can be repeated until all print layers are formed onto the printed part P and the print is complete.

FIGS. 14A-14F illustrate schematic views of an example basin 1400, according to some examples. In the example of FIGS. 14A-14F, the basin 1400 includes a flexible film layer 1404, a print substrate 1406, a platform 1412, side walls 1408, and liquid resin R. The side walls 1408 are coupled to the flexible film layer 1404 at the first end 1403 and the second end 1405 of the basin, respectively, to allow the liquid resin R to be disposed within the basin 1400. The side walls 1408 are configured to support the bottom side of the flexible film layer 1404. In particular, the flexible film layer 1404 sits atop of a ledge of the side walls 1408 such that the side walls 1408, when raised or lowered, can lift and lower the flexible film layer 1404. The print substrate 1406 may be a glass material that focuses a curing light 1420 towards the printed part P. That is, the print substrate 1406 may act as a window for the curing light 1420. In each of FIGS. 14A-14F, the build platform 105 includes a printed part P affixed to the build platform 105 interacting with the basin 1400.

Figure 14A:
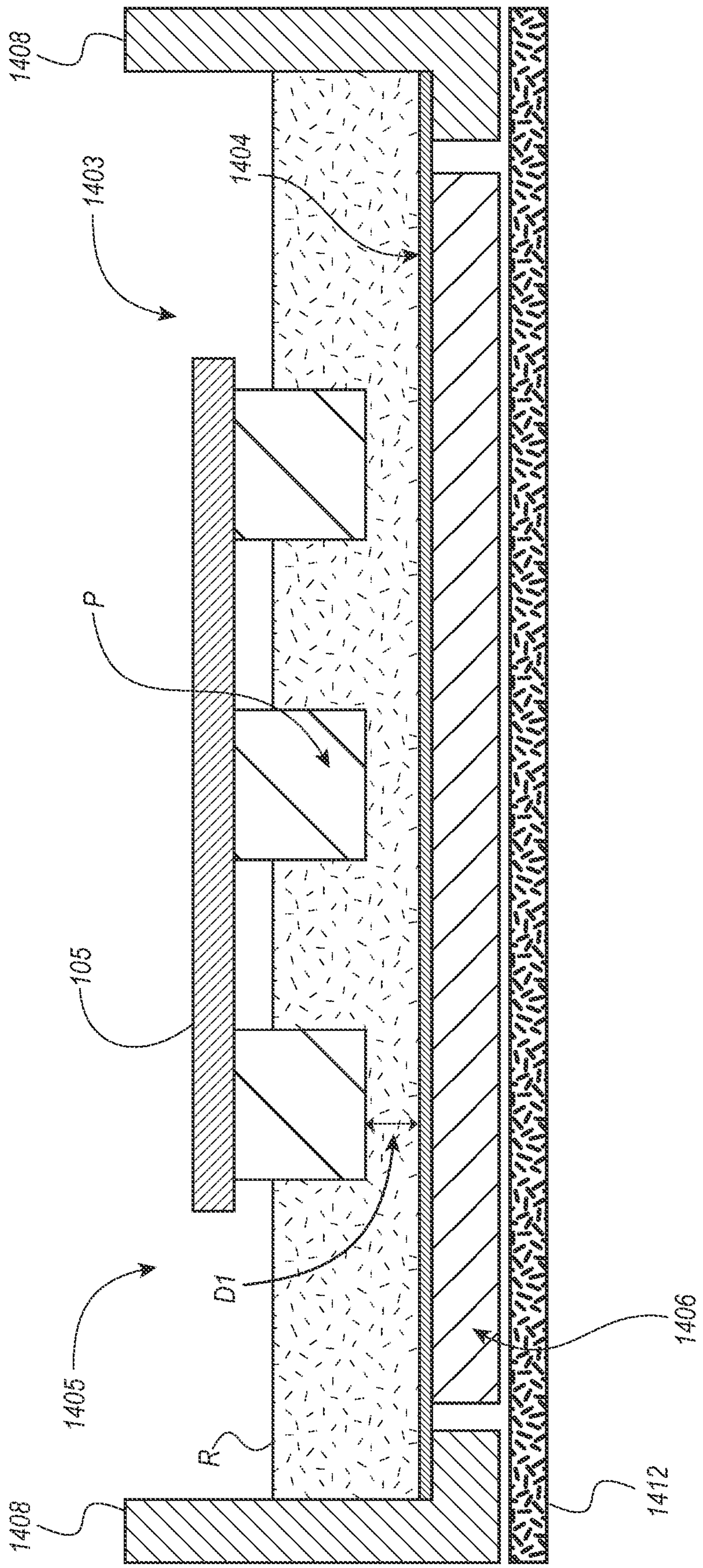
FIGS. 14A-14F illustrate schematic views of an example basin that includes an adjustable basin wall, according to some examples.

FIG. 14A illustrates an example of the basin 1400 wherein data processing hardware 115 instructs the build platform 105 to position the printed part P at a first vertical position in the basin 1400. Here, the printed part P includes three distinct structures rather than a single structure as in FIG. 2. At the first vertical position, the bottom surface of the printed part P is positioned a first distance D1 from the flexible film layer 1404 corresponding to one layer thickness. The one layer thickness refers to the amount of liquid resin R disposed between the printed part P and the flexible film layer 1404 for forming a single printed layer L on the bottom surface of the printed part P.

Figure 14B:
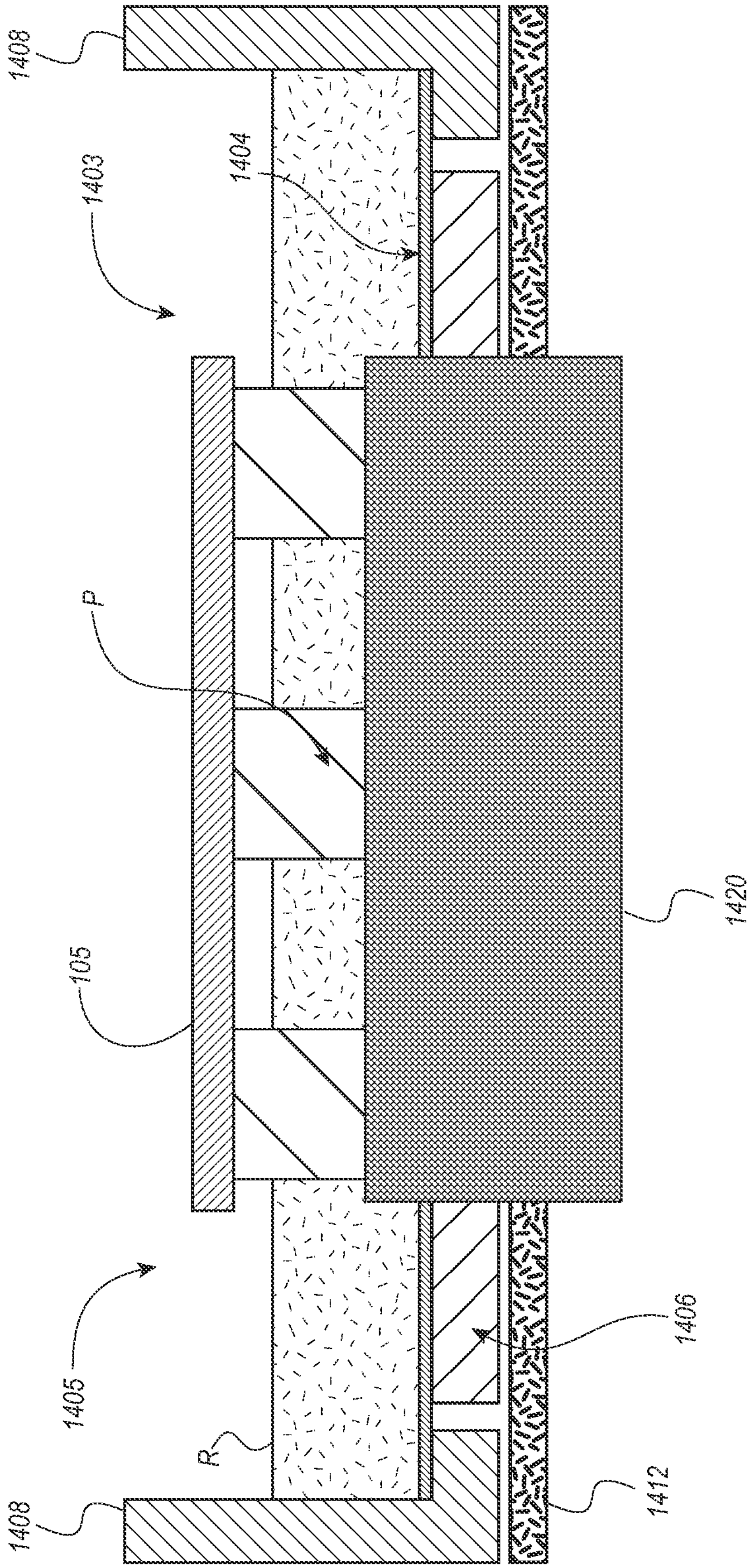

FIG. 14B illustrates an example of the basin 1400 wherein the curing light 1420 exposes the liquid resin R disposed between the printed part P and the flexible film layer 1404. The curing light 1420 cures the liquid resin R from the bottom side of the basin 1400 through the print substrate 1406 and the flexible film layer 1404 creating a new print layer L of the printed part P. Optionally, the light source of the curing light 1420 may be located beneath the print substrate 1406. The curing light 1420 may be provided by any light source known by those skilled in the art of SLA printing.

Figure 14C:
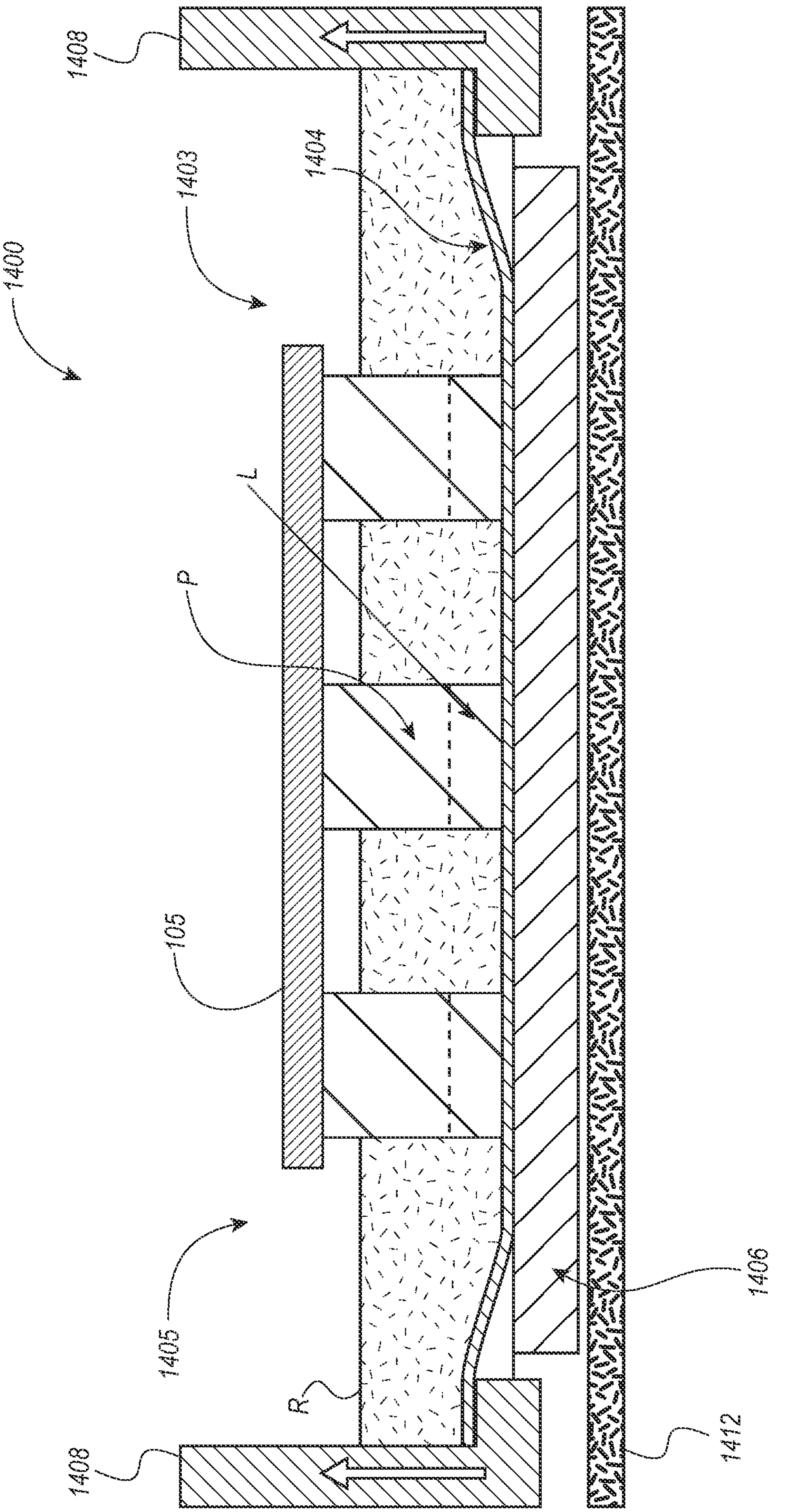

FIG. 14C illustrates an example of the basin 1400 wherein the liquid resin R disposed between the printed part P and the flexible film layer 1204 is cured to form a new part layer L. That is, the curing light 1420 (FIG. 14B) solidifies the liquid resin R onto the bottom surface of the printed part P to form the new print layer L of the printed part P. Notably, the printed part P in FIG. 14C is larger than the printed part P in FIG. 14B by the size of the new print layer L. The new print layer L of the printed part P adheres to the flexible film layer 1404 such that a force must be applied to separate new print layer L and the flexible film layer 1404. Moreover, the side walls 1408, located at the first end 1403 and the second end 1405 of the basin 1400 may be lifted to overcome Stefan forces between the flexible film layer 1404 and the print substrate 1406. The side walls 1408 may be lifted by any actuation method such as pneumatic, mechanical actuation, hydraulic actuation, etc. After the flexible film layer 1404 overcomes, or partially overcomes, the Stefan forces adhering the flexible film layer 1404 to the print substrate 1406, the build platform 105 may lift the printed part P and the flexible film layer 1404 from the print substrate 1406.

Figure 14D:
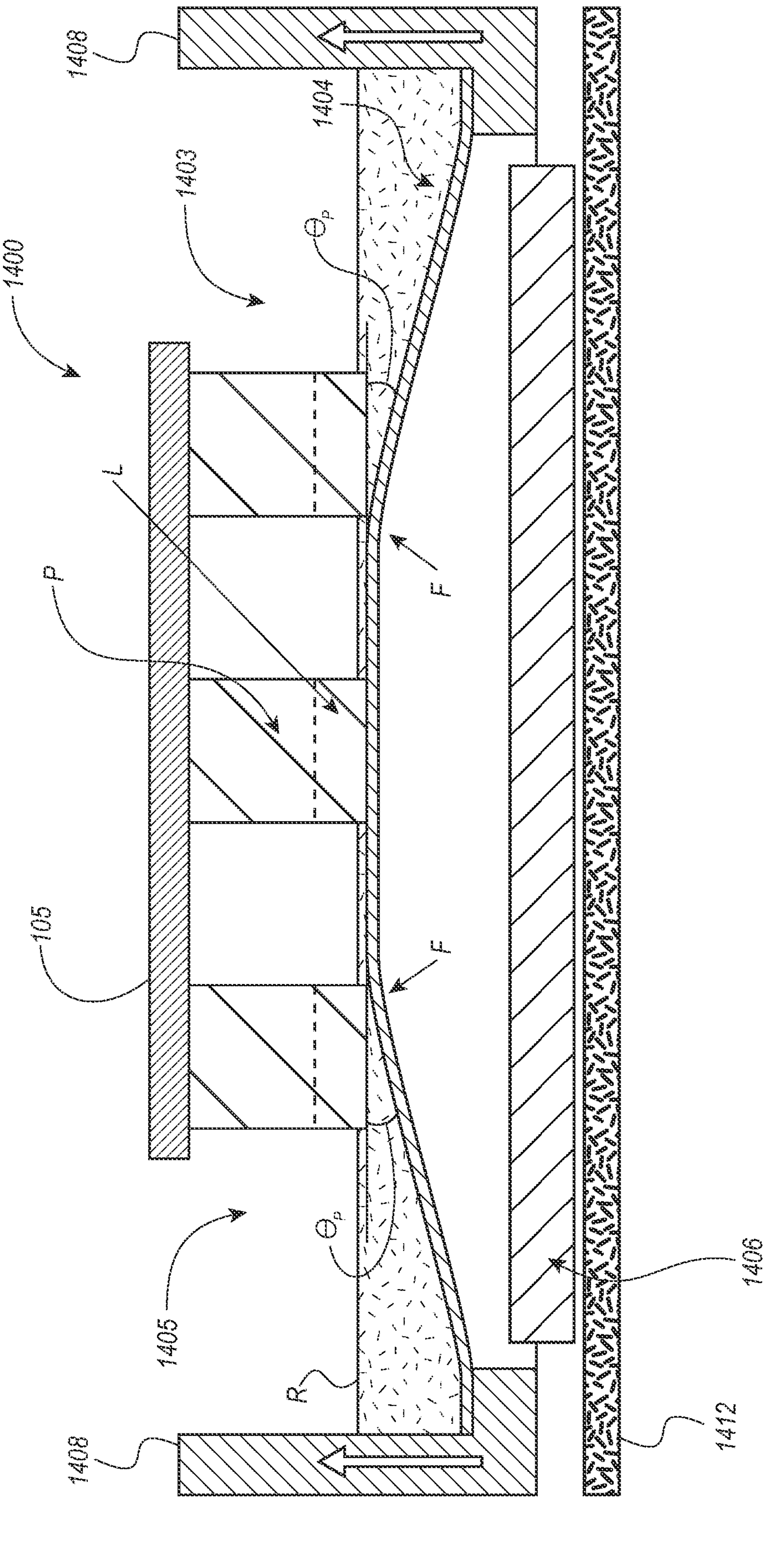

FIG. 14D illustrates an example of the basin 1400 wherein the build platform 105 lifts the printed part P and the flexible film layer from the print substrate 1406. Here, the flexible film layer 1404 may overcome Stefan forces adhering the flexible film layer 1404 and the print substrate 1406 together. In particular, the data processing hardware 115 instructs the build platform 105 to move in the vertical direction away from the print substrate 1406 inducing a peel front F. Here, the printed part P affixed to the build platform 105 and the flexible film layer 1404 adhered to the printed part P are lifted in the vertical direction away from the print substrate 1406. The exact curvature of the flexible film layer 1404 depends on several factors including, but not limited to, geometry of the printed part P, geometric relationship between the blade and the printed part P, and the stiffness, or other characteristics, of the flexible film layer 1404. Notably, raising the build platform 105 induces a high peel angle $\theta_P$ (i.e., angle between the new print layer L of the printed part P and the flexible film layer 1404) on both sides of the flexible film layer 1404. Here, the peeling process initiates on both the first end 1403 and the second end 1405 of the basin and converging in the center of the basin. The high peel angle $\theta_P$ reduces the force applied to the printed part P (e.g., by localizing the peel front F) providing increased print quality of the printed part P.

Figure 14E:
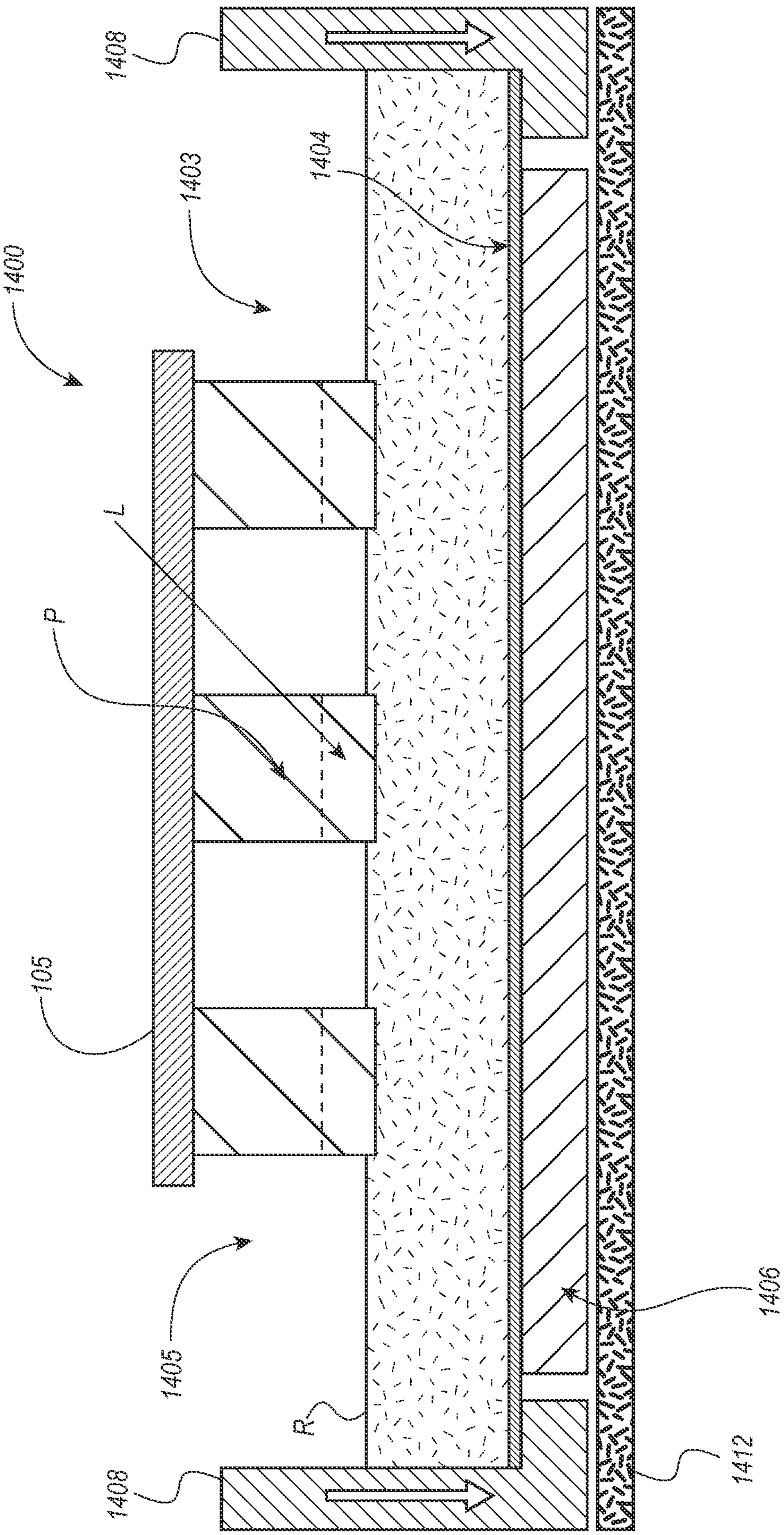

FIG. 14E illustrates an example of the basin 1400 wherein the flexible film layer 1404 fully separates from the printed part. After the flexible film layer 1404 fully separates from the printed part P, flexible film layer 1404 returns back to laying flat on the print substrate 1406. Here, the flexible film layer 1404 may return back to the print substrate 1406 because the side walls 1408 are returned back to a resting (i.e., non-actuated state).

Figure 14F:
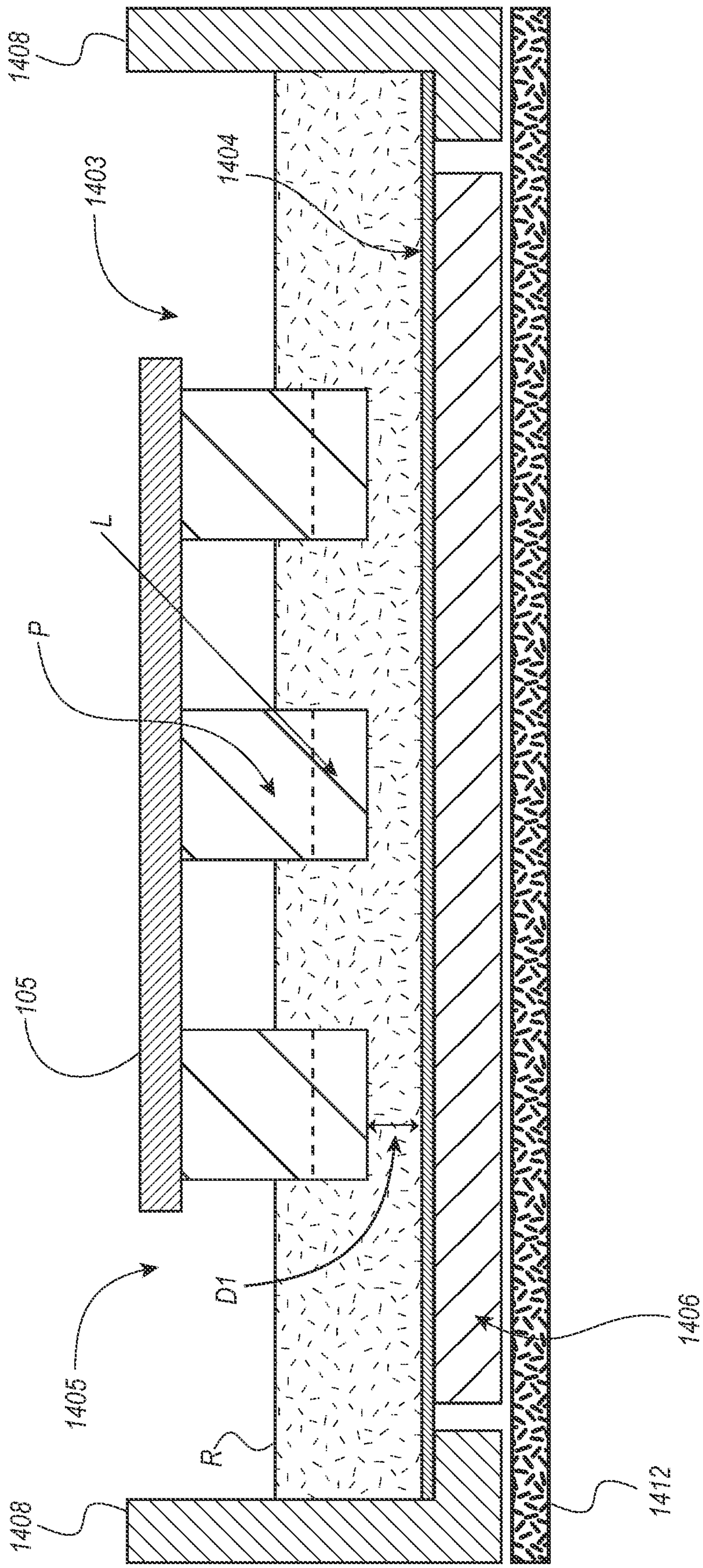

FIG. 14F illustrates an example of the basin 1400 wherein the data processing hardware 115 instructs the build platform 105 to lower the printed part P in the vertical direction towards the flexible film layer 1404, commonly referred to as a "squish" move. The build platform 105 lowers the printed part P such that the bottom surface of the new print layer L of the printed part P is spaced the first distance D1 equal to one layer thickness from the flexible film layer 1404. Notably, the printed part in FIG. 14F is larger than the printed part in FIG. 14A by the thickness of the previously printed layer. The process described above in FIGS. 14A-14F can be repeated until all print layers are formed onto the printed part P and the print is complete.

FIGS. 15A-15F illustrate schematic views of an example basin 1500, according to some examples. In the example of FIGS. 15A-15F, the basin 1500 includes a flexible film layer 1504, a print substrate 1506, side walls 1508, and liquid resin R. The side walls 1508 are coupled to the flexible film layer 1504 at the first end 1503 and the second end 1505 of the basin, respectively, to allow the liquid resin R to be disposed within the basin 1500. The side walls 1508 are configured to support the bottom side of the flexible film layer 1504. The flexible film layer 1504 is attached to the bottom of the basin 1500. In some examples, the flexible film layer 1504 is tensioned to laminate over the bottom of the basin 1500 and the print substrate 1506 such that the top surface of the flexible film layer 1504 remains flat for the printing process. The print substrate 1506 may be a glass material that focuses a curing light 1520 towards the printed part P. That is, the print substrate 1506 may act as a window for the curing light 1520. In each of FIGS. 15A-15F, the build platform 105 includes a printed part P affixed to the build platform 105 interacting with the basin 1500.

Figure 15A:
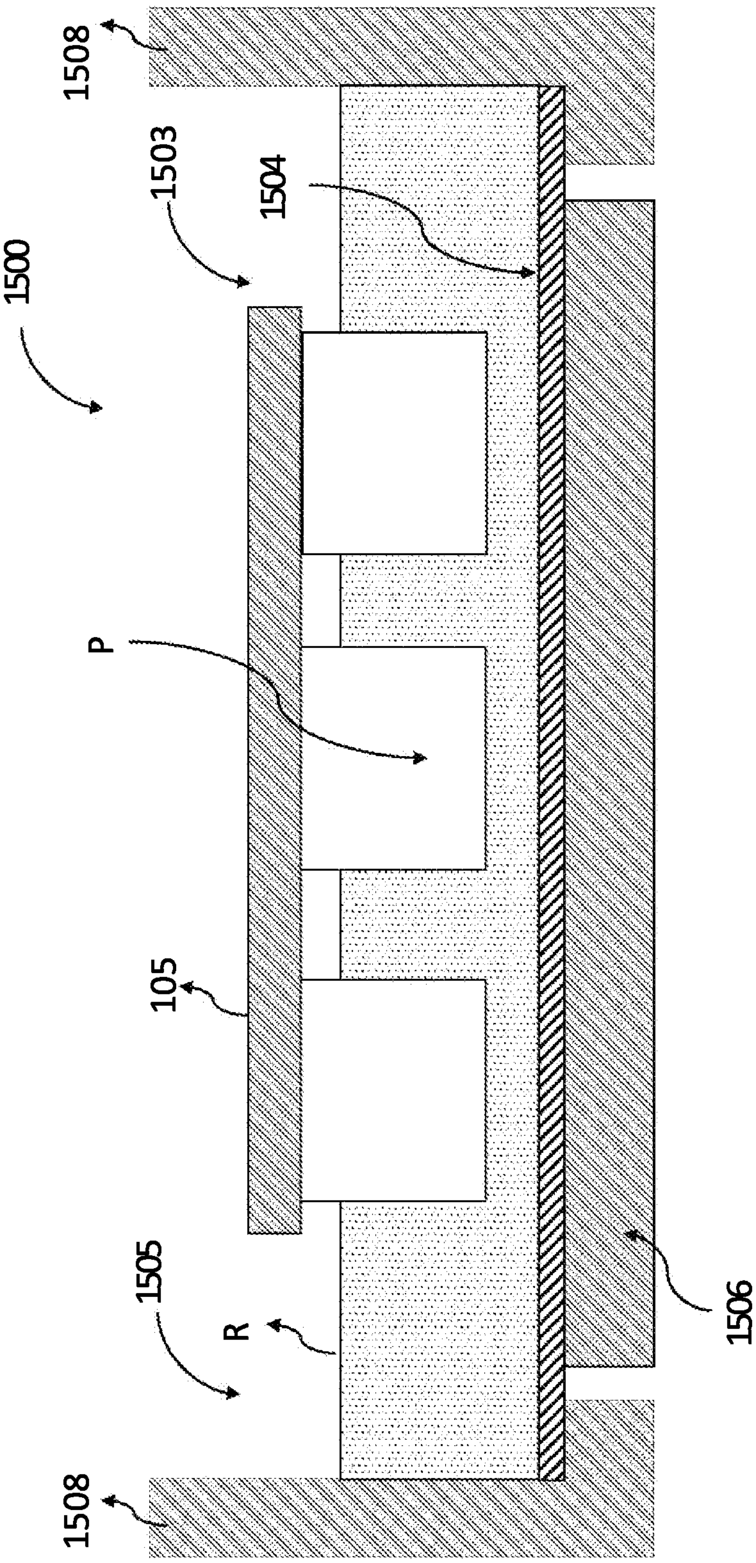
FIGS. 15A-15F illustrate cross-sectional schematic views of an example basin that includes a laminated film, according to some examples.

FIG. 15A illustrates an example of the basin 1500 wherein data processing hardware 115 instructs the build platform 105 to position the printed part P at a first vertical position in the basin 1500. Here, the printed part P includes three distinct structures rather than a single structure as in FIG. 2. At the first vertical position, the bottom surface of the printed part P is positioned a first distance D1 from the flexible film layer 1504 corresponding to one layer thickness. The one layer thickness refers to the amount of liquid resin R disposed between the printed part P and the flexible film layer 1504 for forming a single printed layer L on the bottom surface of the printed part P.

Figure 15B:
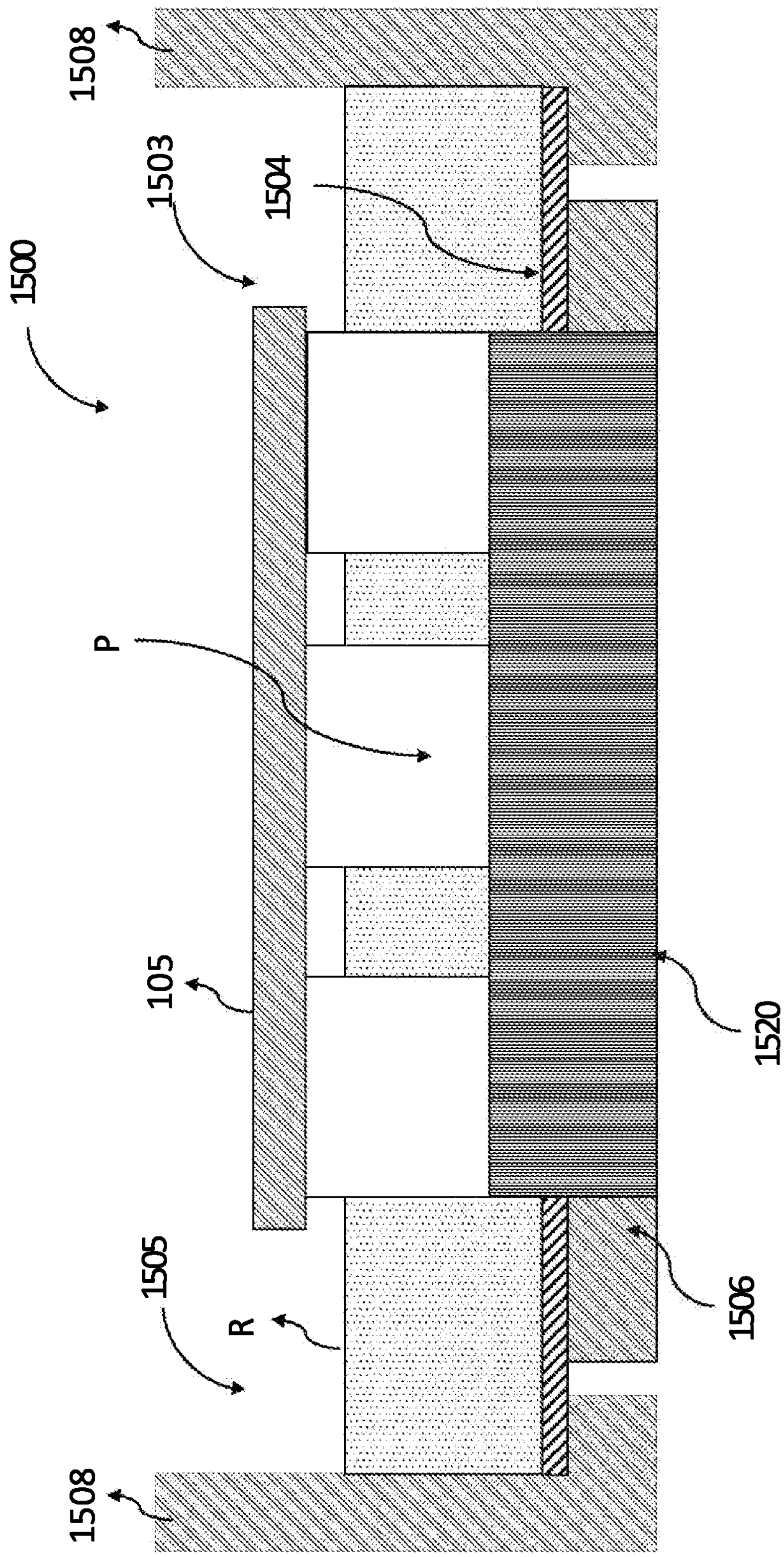

FIG. 15B illustrates an example of the basin 1500 wherein the curing light 1520 exposes the liquid resin R disposed between the printed part P and the flexible film layer 1504. The curing light 1520 cures the liquid resin R from the bottom side of the basin 1500 through the print substrate 1506 and the flexible film layer 1504 creating a new print layer L of the printed part P. Optionally, the light source of the curing light 1520 may be located beneath the print substrate 1506. The curing light 1520 may be provided by any light source known by those skilled in the art of SLA printing.

Figure 15C:
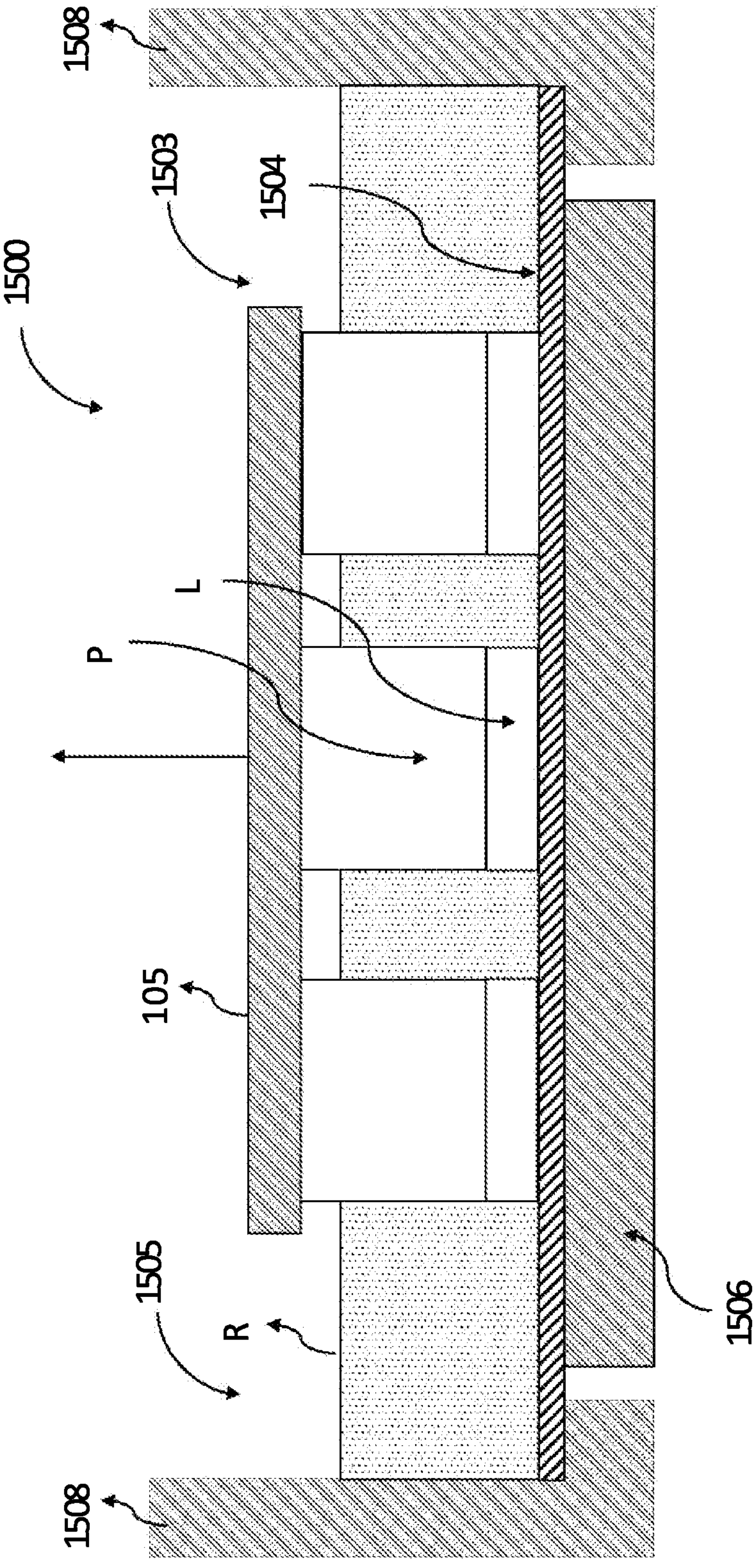

FIG. 15C illustrates an example of the basin 1500 wherein the liquid resin R disposed between the printed part P and the flexible film layer 1504 is cured to form a new part layer L. That is, the curing light 1520 (FIG. 15B) solidifies the liquid resin R onto the bottom surface of the printed part P to form the new print layer L of the printed part P. Notably, the printed part P in FIG. 15C is larger than the printed part P in FIG. 15B by the size of the new print layer L. The new print layer L of the printed part P adheres to the flexible film layer 1504 such that a force must be applied to separate new print layer L and the flexible film layer 1504. After the flexible film layer 1504 overcomes, or partially overcomes, the Stefan forces adhering the flexible film layer 1504 to the print substrate 1506, the build platform 105 may lift the printed part P and the flexible film layer 1504 from the print substrate 1506.

Figure 15D:
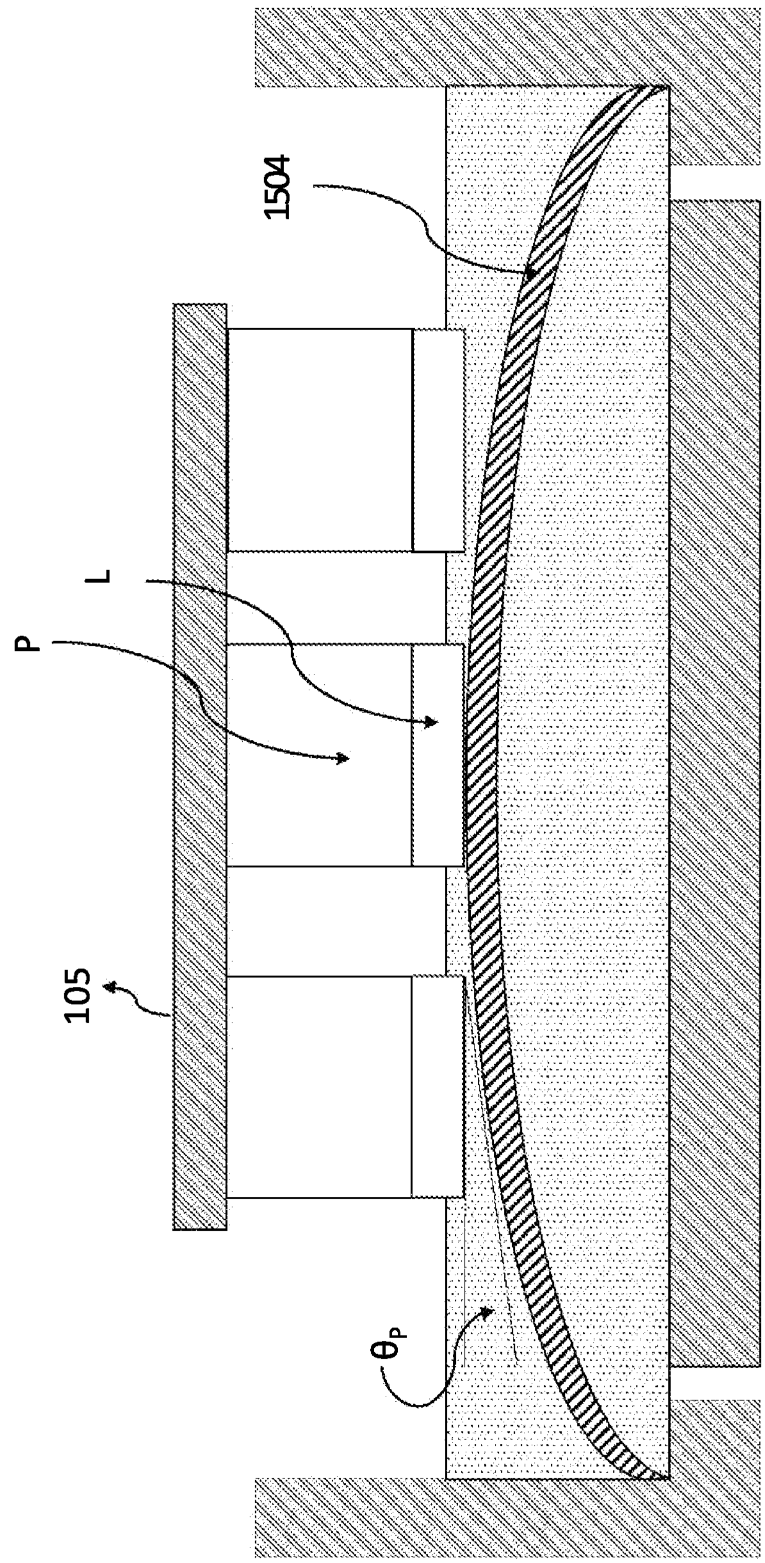

FIG. 15D illustrates an example of the basin 1500 wherein the build platform 105 lifts the printed part P and the flexible film layer from the print substrate 1506. Here, the flexible film layer 1504 may overcome Stefan forces adhering the flexible film layer 1504 and the print substrate 1506 together. In particular, the data processing hardware 115 instructs the build platform 105 to move in the vertical direction away from the print substrate 1506 inducing a peel front F. Here, the printed part P affixed to the build platform 105 and the flexible film layer 1504 adhered to the printed part P are lifted in the vertical direction away from the print substrate 1506. The exact curvature of the flexible film layer 1504 depends on several factors including, but not limited to, geometry of the printed part P, geometric relationship between the blade and the printed part P, and the stiffness, or other characteristics, of the flexible film layer 1504. Notably, raising the build platform 105 induces a high peel angle $\theta_P$ (i.e., angle between the new print layer L of the printed part P and the flexible film layer 1504) on both sides of the flexible film layer 1504. Here, the peeling process initiates on both the first end 1503 and the second end 1505 of the basin and converging in the center of the basin. The high peel angle $\theta_P$ reduces the force applied to the printed part P (e.g., by localizing the peel front F) providing increased print quality of the printed part P.

Figure 15E:
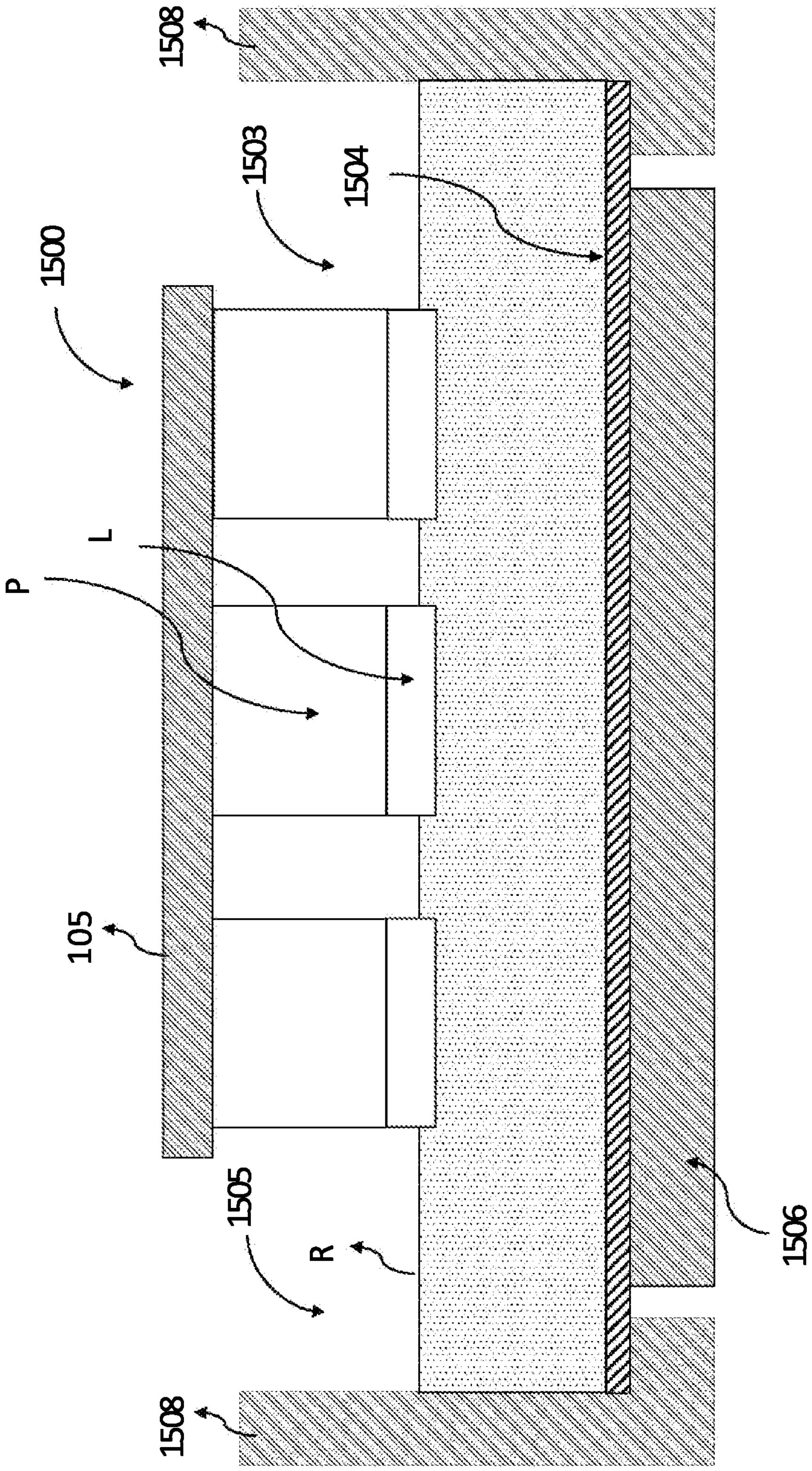

FIG. 15E illustrates an example of the basin 1500 wherein the flexible film layer 1504 fully separates from the printed part and has returned to re-laminate the print substrate 1504. In some examples, the flexible film layer 1504 returns to its initial position (e.g., laying flat on the print substrate 1504) solely due to the tension of the flexible film layer 1504. The flexible film layer 1504 may be stretched over the print substrate 1504 to form a flat print surface (e.g., the peripheral of the flexible film layer 1504 is affixed to the side walls 1508). The elastic force exerted by the flexible film layer 1504 in FIG. 15D causes the flexible film layer 1504 to return to its initial position and re-laminates the print substrate 1506. In FIGS. 15D-15E, as the build platform 105 travels upwards in the z-direction, the flexible film layer 1504 experiences both a "pulling-up" force due to the adhesion between the flexible film layer 1504 and the newly formed layer L, and a "pull-down" force due to the elasticity and the tendency of the flexible film layer to return to its initial position. As the build platform 105 continues to travel upward in z-direction, the pull-down force increases (e.g., due to the transformation of the flexible film layer 1504) while the pull-up force decreases (e.g., due to the gradual separation of the flexible film layer 1504 and the part L). At a threshold point, the flexible film layer 1504 fully separates from the printed part, and returns to its initial position to re-laminate the print substrate 1506. Comparing to a system where a blade, roller, pressurization or depressurization is used to assist the peeling of the parts, the process shown in FIGS. 15D-15E is simpler and relies exclusively on the inherent tensioning of the flexible film layer 1504 for peeling. The distance the build platform 105 is required to travel to complete the peel is at least a function of the internal properties of the flexible film layer 1504, such as the size of the film, the material of the film, and/or the elasticity of the film, and can be set before printing starts.

Figure 15F:
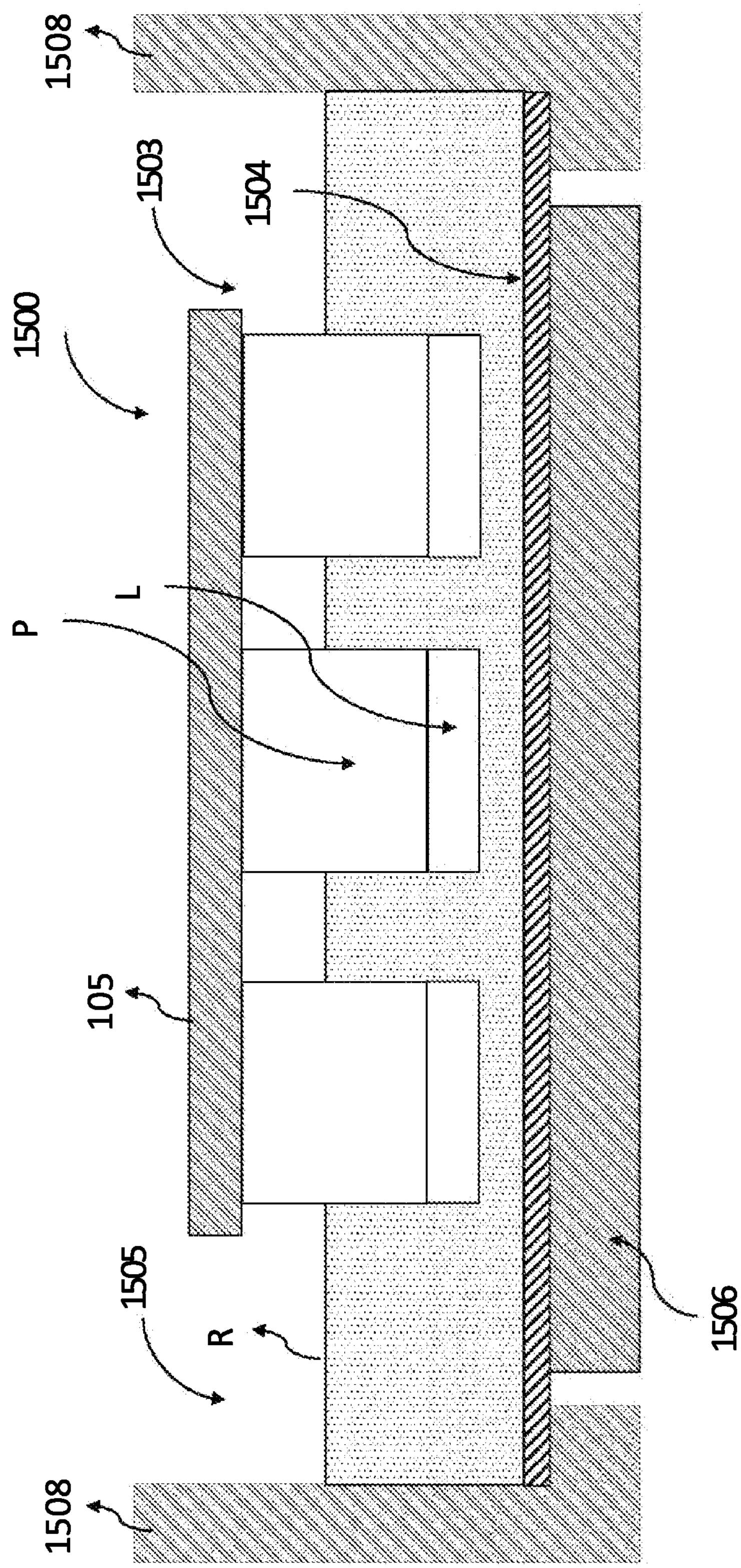

FIG. 15F illustrates an example of the basin 1500 wherein the data processing hardware 115 instructs the build platform 105 to lower the printed part P in the vertical direction towards the flexible film layer 1504, commonly referred to as a "squish" move. The build platform 105 lowers the printed part P such that the bottom surface of the new print layer L of the printed part P is spaced the first distance D1 equal to one layer thickness from the flexible film layer 1504. Notably, the printed part in FIG. 15F is larger than the printed part in FIG. 15A by the thickness of the previously printed layer. The process described above in FIGS. 15A-15F can be repeated until all print layers are formed onto the printed part P and the print is complete.

FIGS. 16A-16F illustrate schematic views of an example basin 1600, according to some examples. The peeling process illustrated in FIGS. 16A-16F is similar to that in FIGS. 15A-15F, but uses pressurization for assisted-peeling.

Figure 16A:
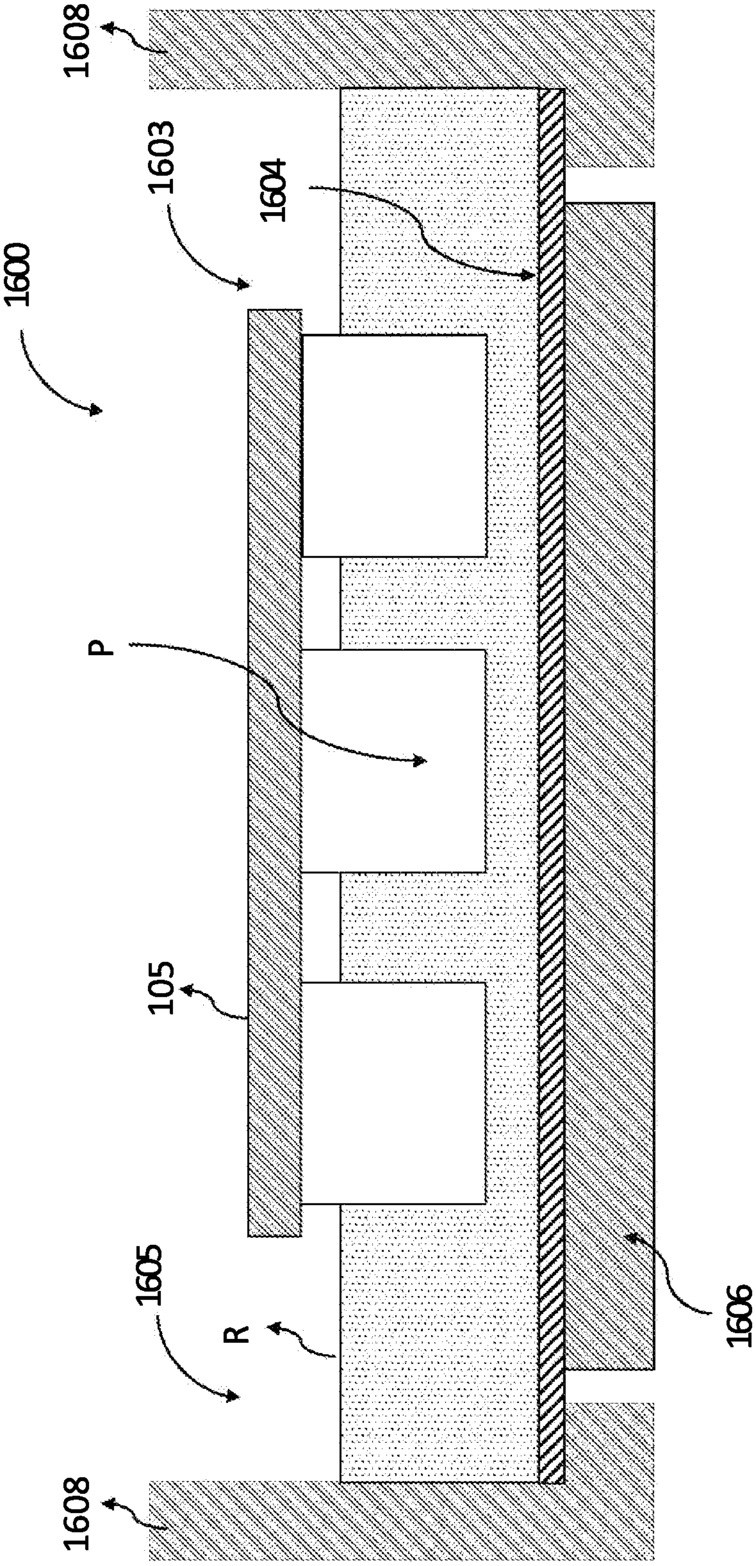
FIGS. 16A-16F illustrate cross-sectional schematic views of an example basin that uses pressurization for assisted peeling, according to some examples.
Figure 16B:
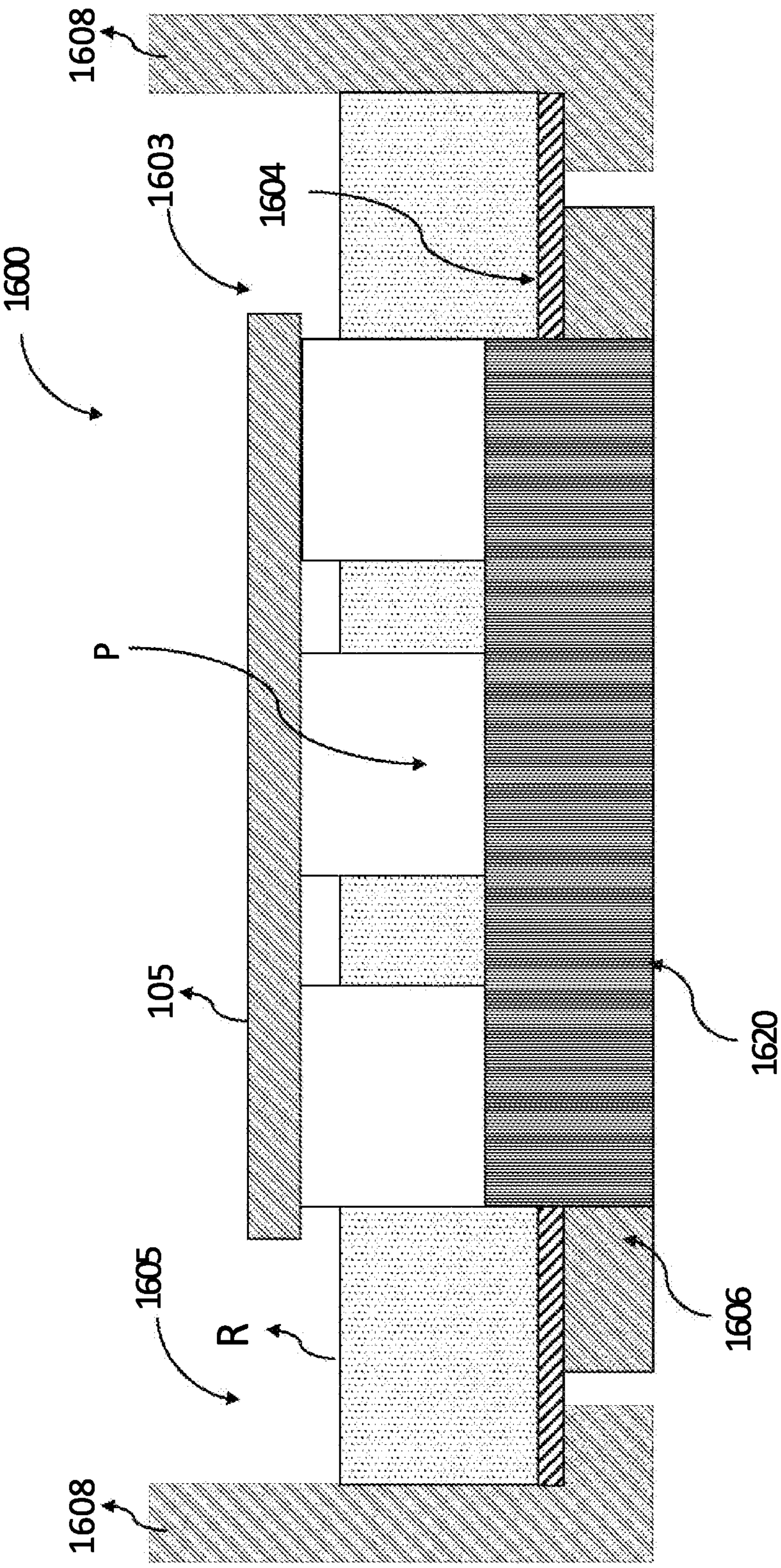
Figure 16C:
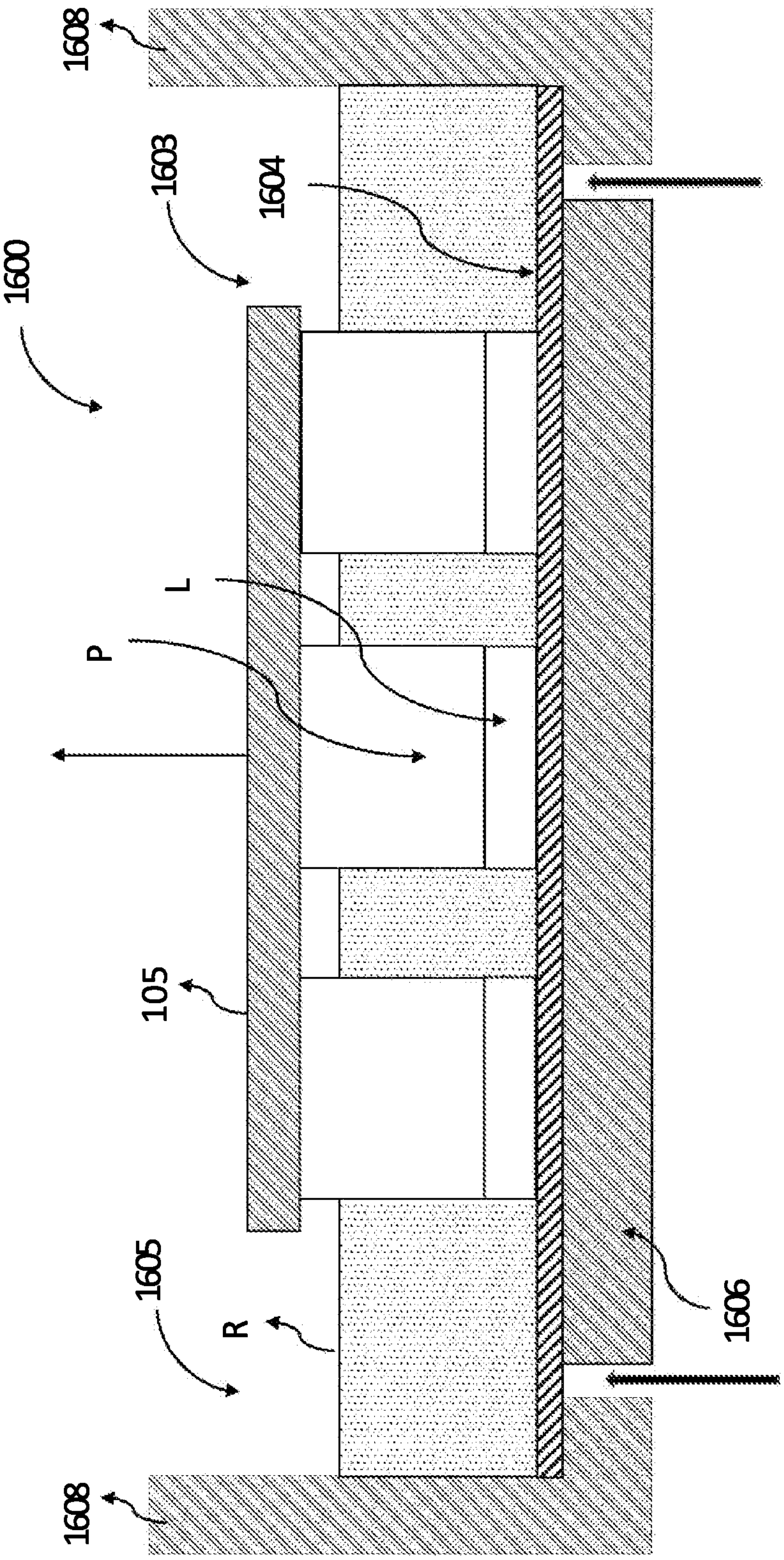
Figure 16D:
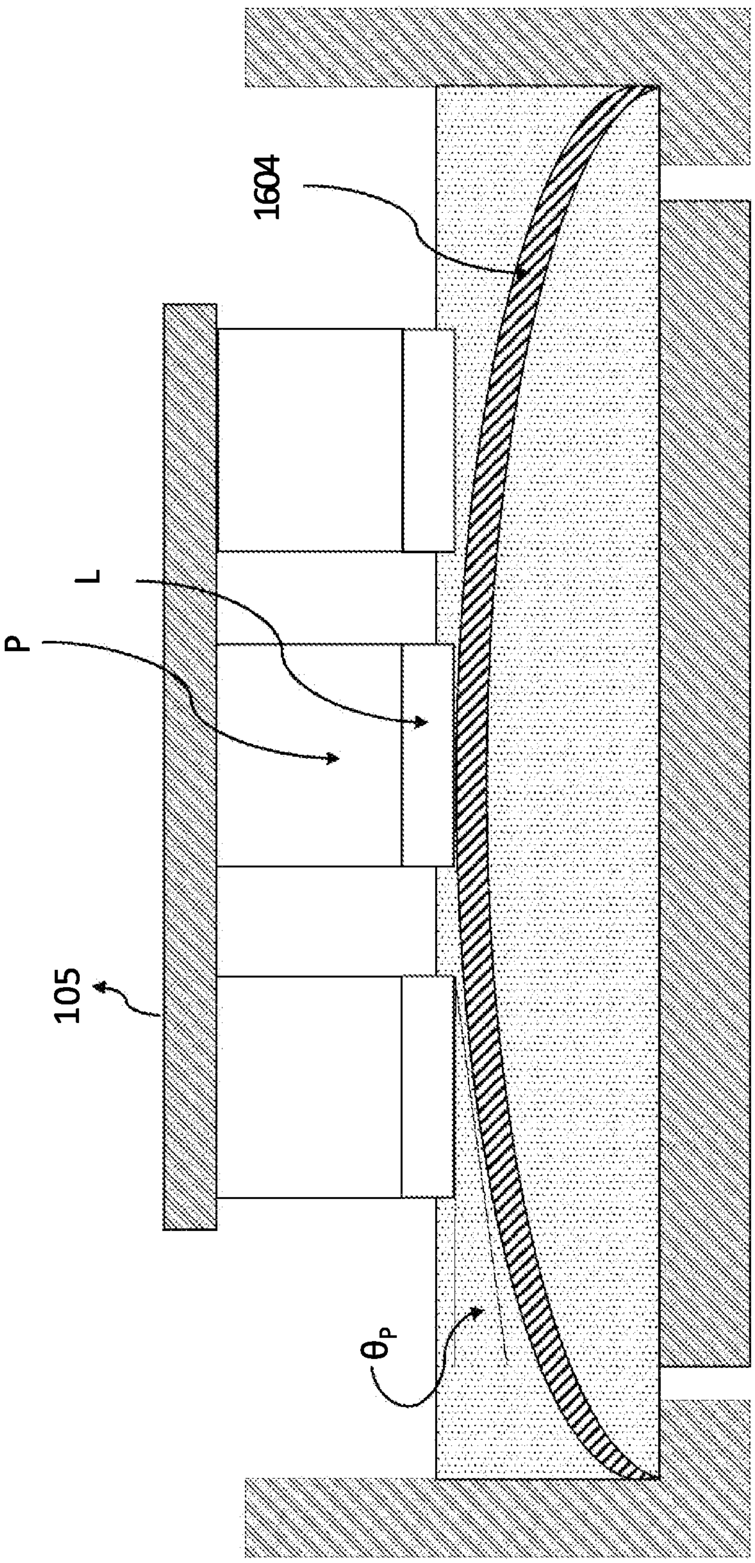
Figure 16E:
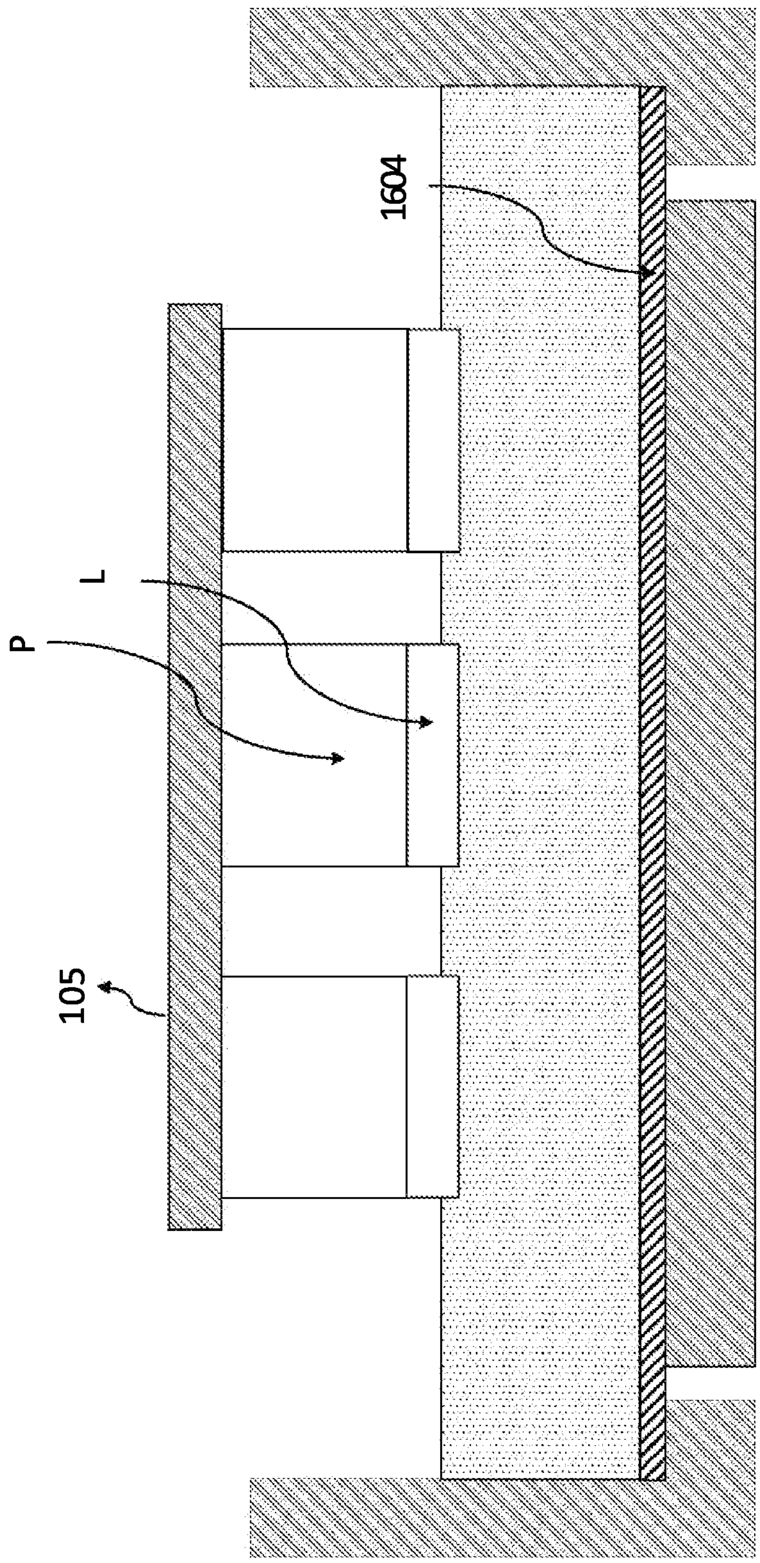
Figure 16F:
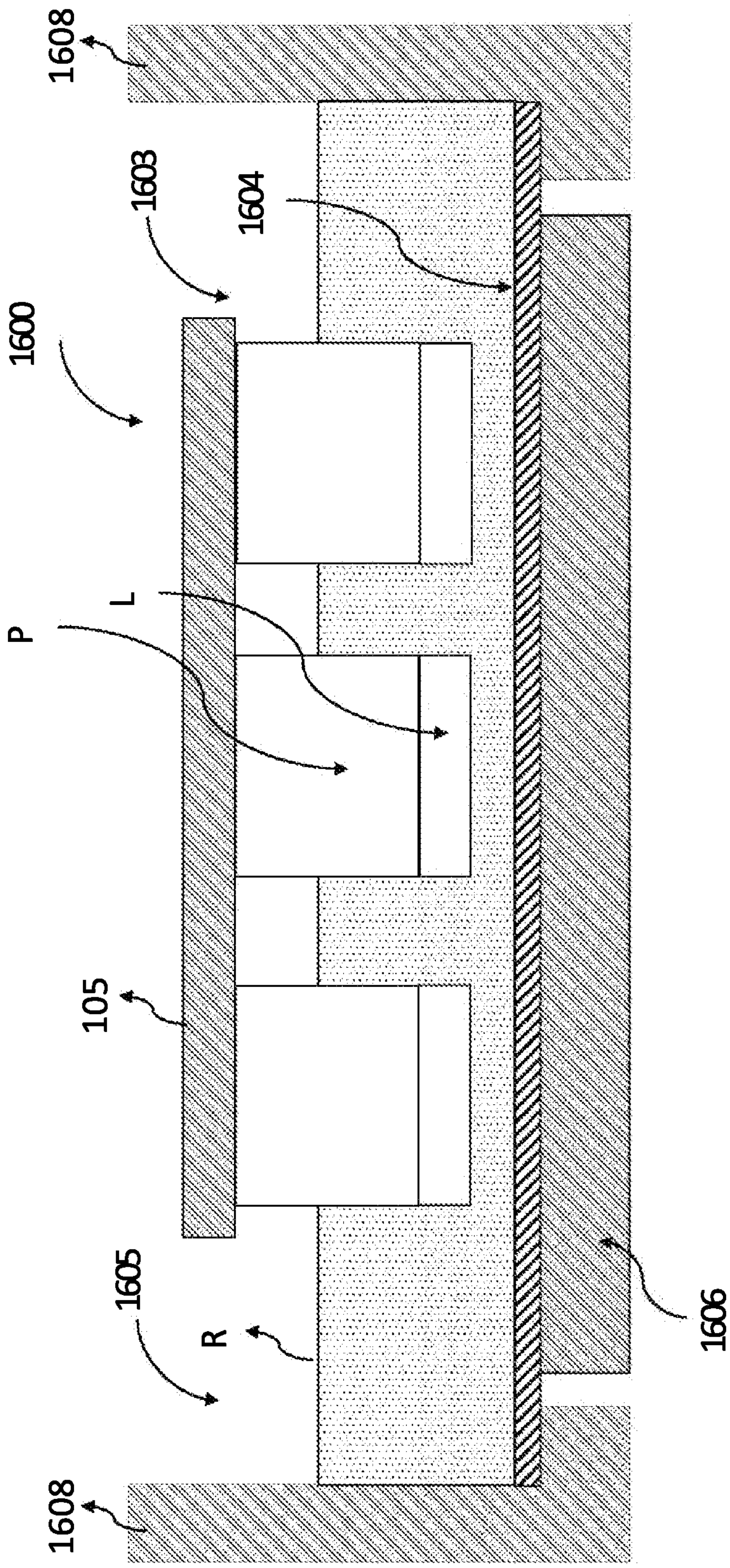

In FIG. 16C, after the new layer L has been printed and as the build platform 105 moves upward in the z-direction (or before the build platform 105 starts to move upward in the z-direction) the region between the flexible film layer 1604 and the print substrate 1606 is inflated to assisted the separation of the flexible film layer 1604 and the printed part L and the print substrate 1606. Comparing to basin 1200 as illustrated in FIGS. 12A-12F, the basin 1600 does not have additional blocks (e.g., blocks 1202) for defining the air channels. Instead, holes are directly located on the bottom of the print substrate 1606. Although FIG. 16C shows the pressurization happening before the build platform 105 lifts in the z-direction, in other examples, the pressurization process can happen simultaneously with or after the build platform 105 first starts to lift in the z-direction.

FIGS. 17A-17F illustrate schematic views of an example basin 1700, according to some examples. The peeling process illustrated in FIGS. 17A-17F is similar to that in FIGS. 16A-16F, but additionally uses depressurization to re-laminate the flexible film layer 1704 over the print substrate 1706.

Figure 17A:
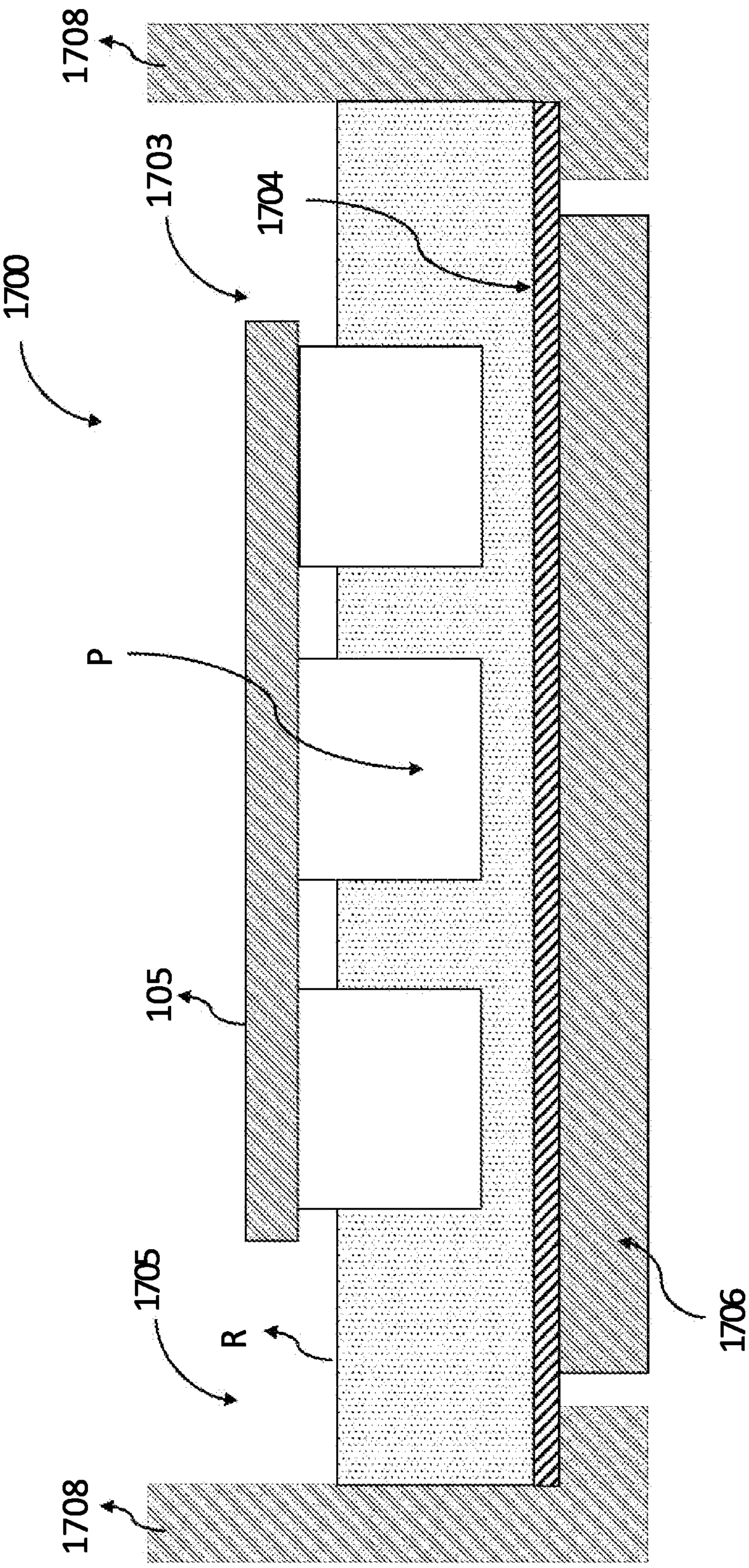
FIGS. 17A-17F illustrate cross-sectional schematic views of an example basin that uses pressurization and depressurization for assisted peeling, according to some examples.
Figure 17B:
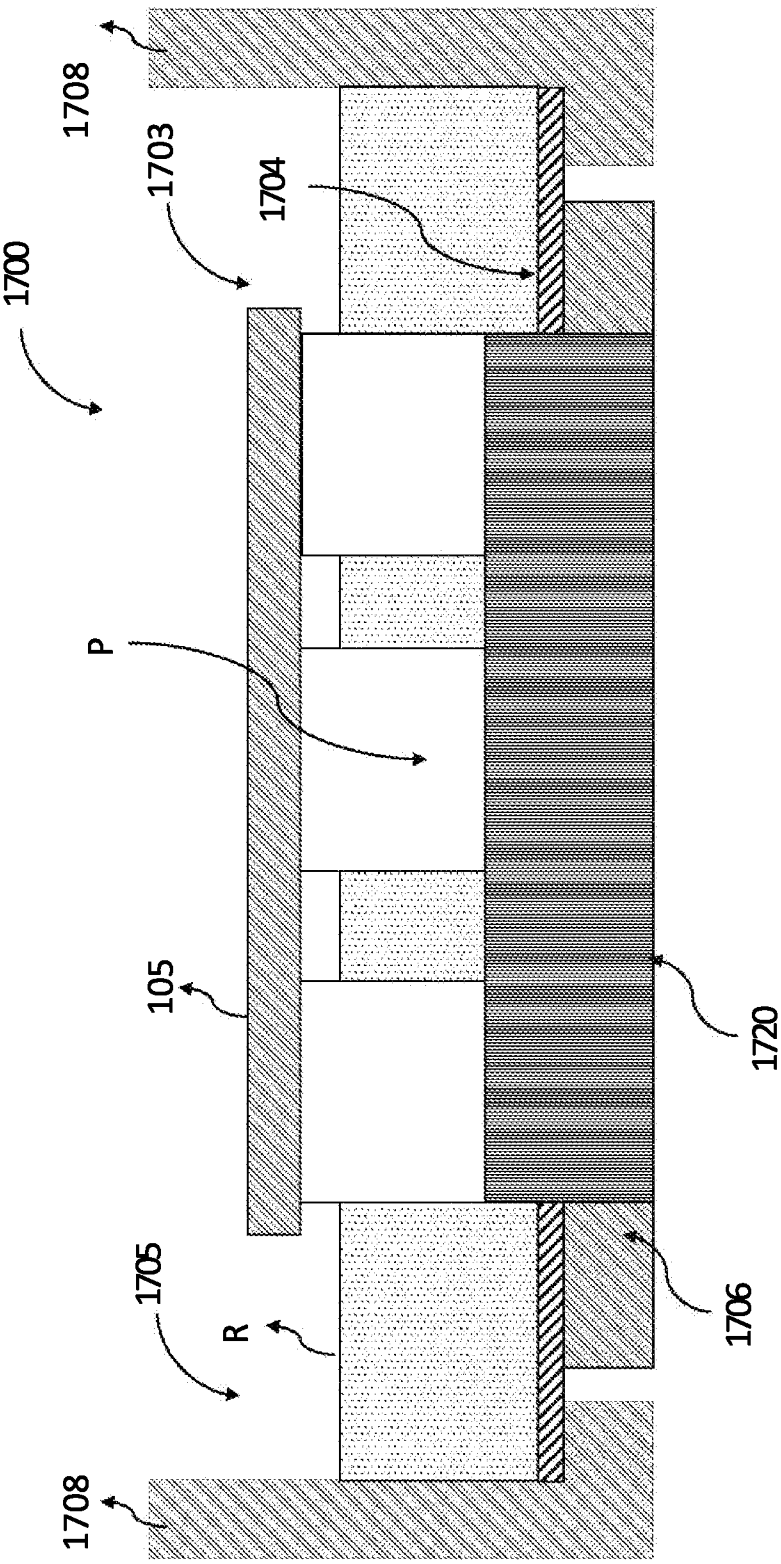
Figure 17C:
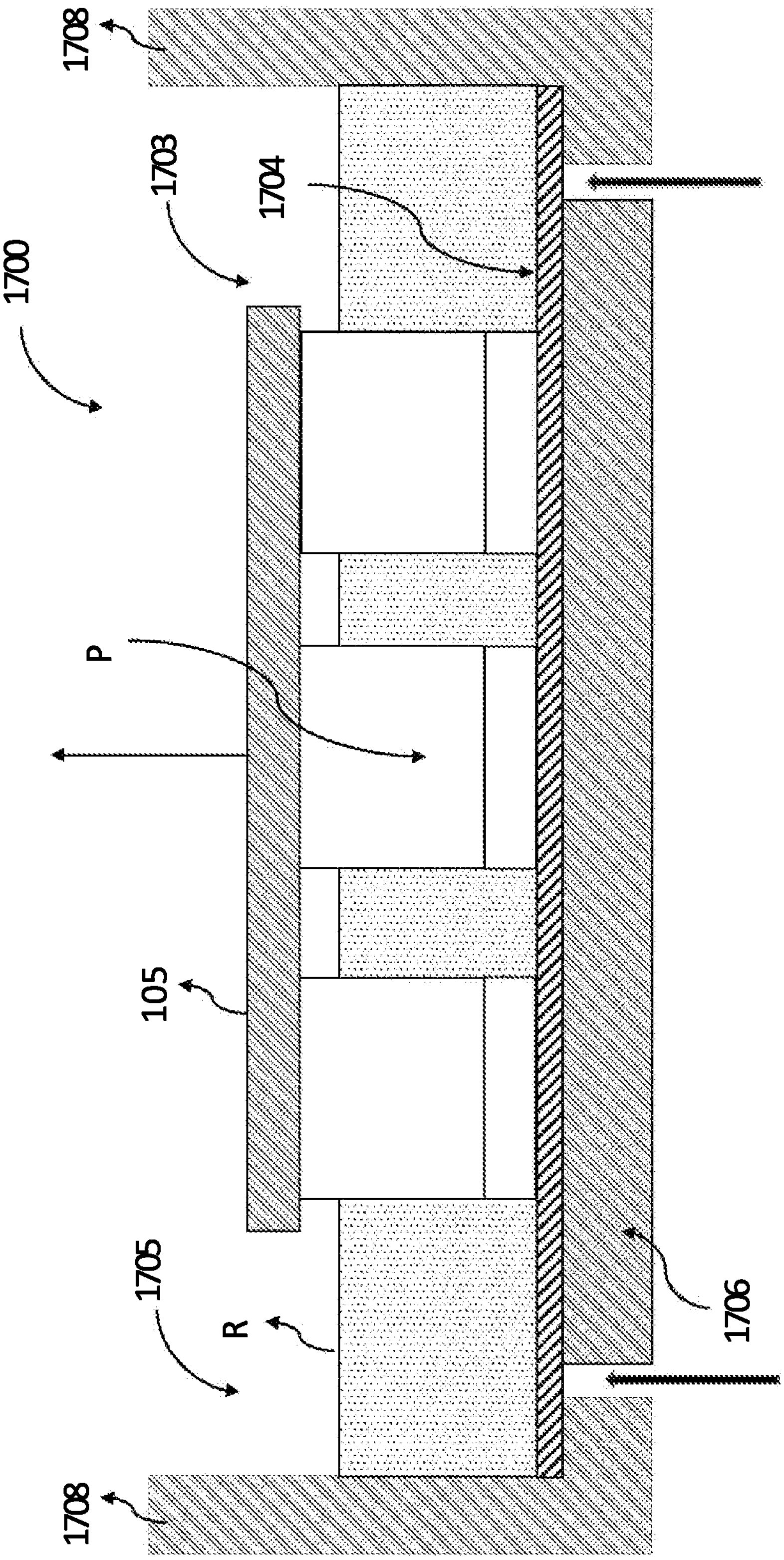
Figure 17D:
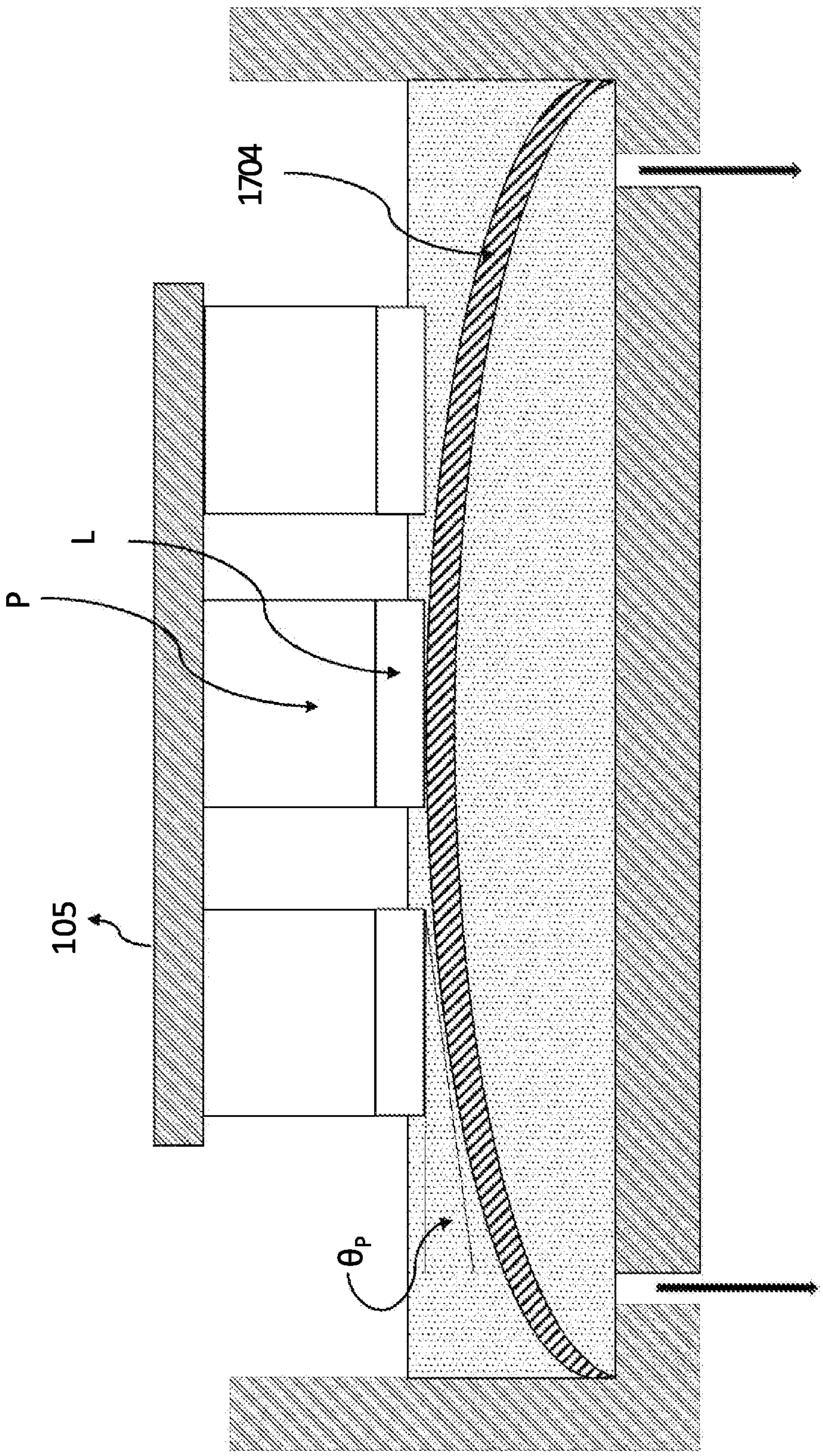
Figure 17E:
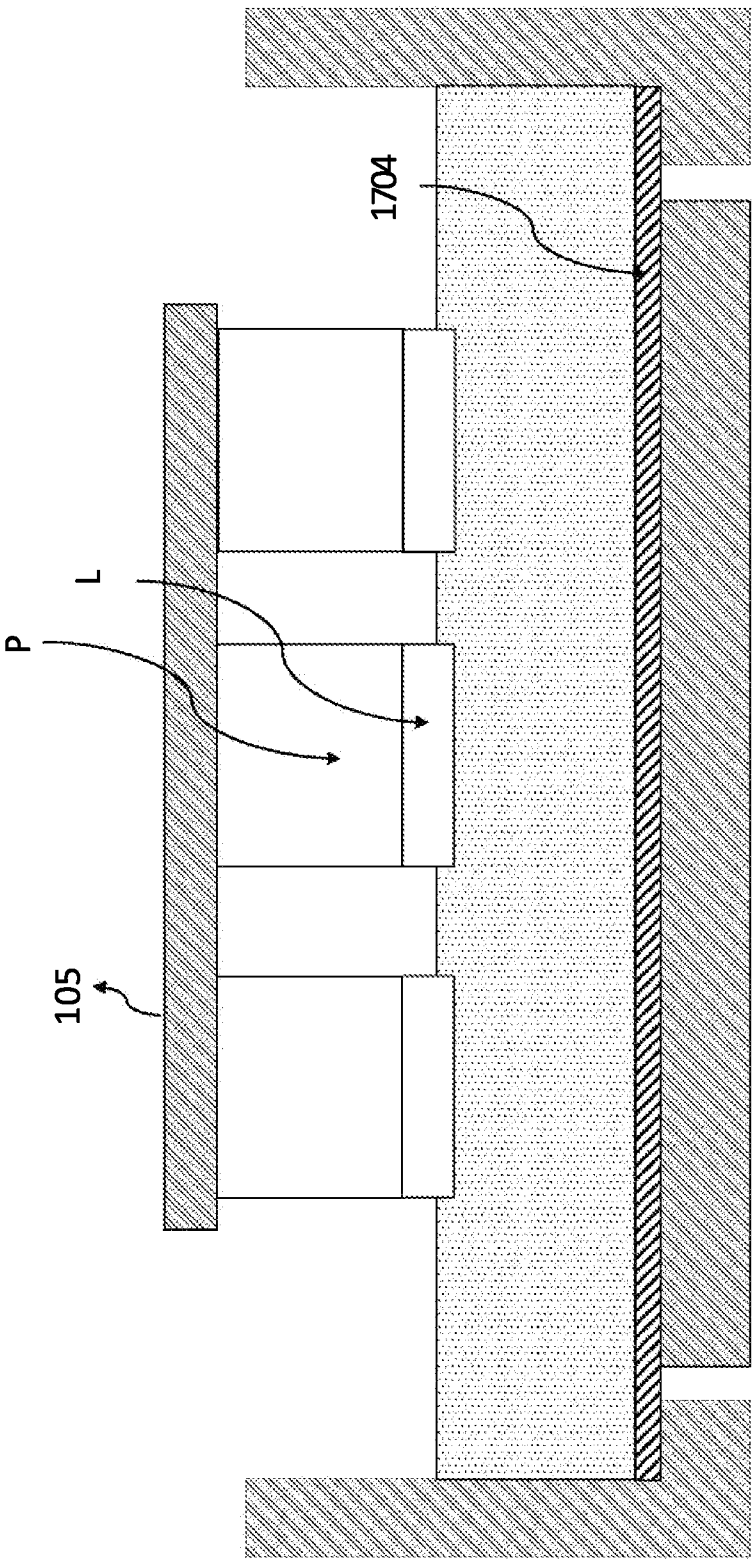
Figure 17F:
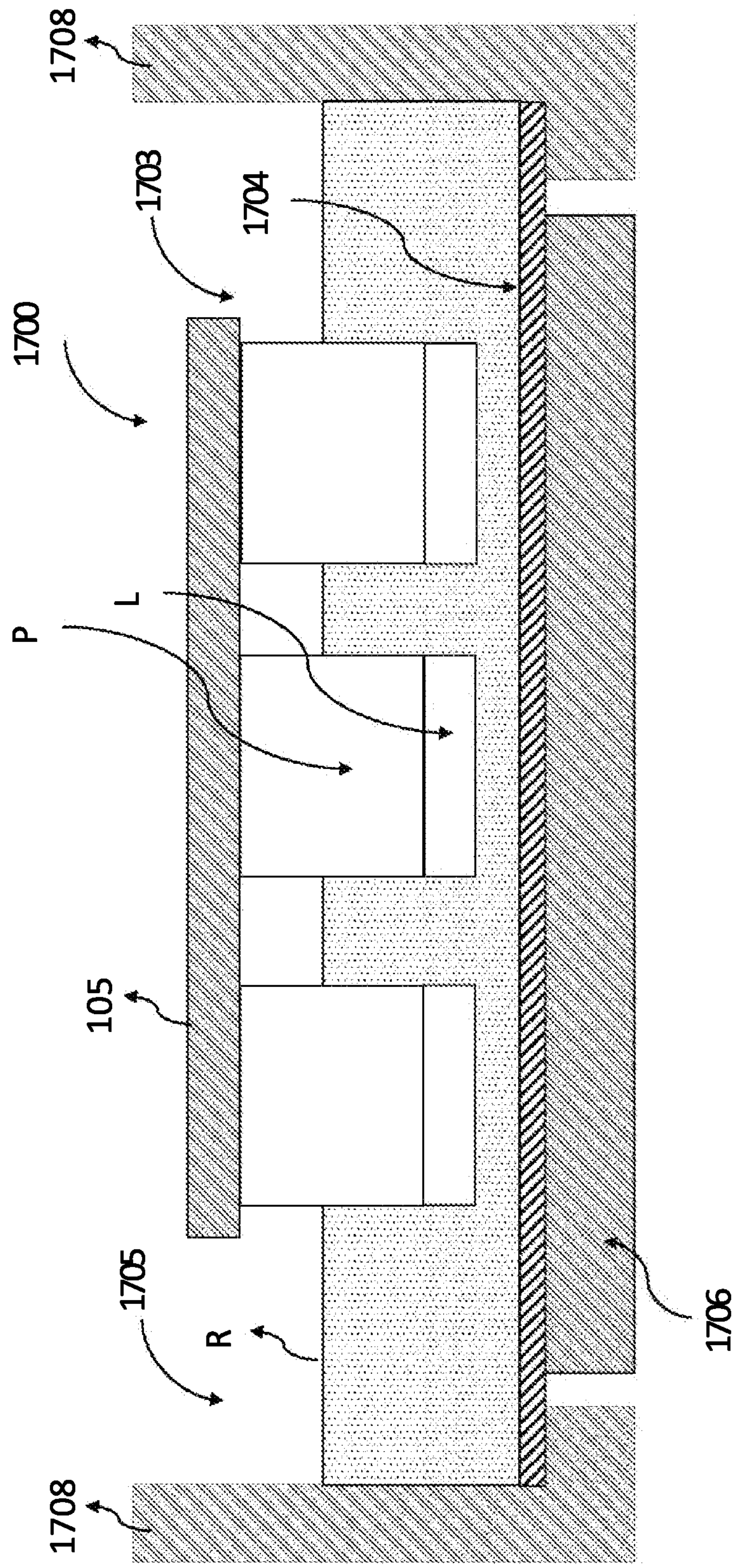

In FIG. 17D, as the build platform 105 travels upward in the z-direction (or after the build platform 105 has come to a stop), to assist peeling of the flexible film layer 1704 from the newly printed layer L, and to return the flexible film layer 1704 to the initial position, the region between the flexible film layer 1704 and the print substrate 1706 is depressurized. As a result, the pressure differential as well the elasticity of the flexible film layer 1704 force the flexible film layer 1704 to return to its initial position to re-laminate over the print substrate 1706. In some implementations, the step of pressurization (e.g., as illustrated in FIG. 17C) is omitted, and only depressurization is used for peeling. In some examples, the depressurization process illustrated in FIG. 17D or the pressurization process illustrated in FIG. 17C may happen prior to, simultaneously with, or after the build platform 105 first starts to lift in the z-direction.

FIGS. 18A-18F illustrate schematic views of an example basin 1800, according to some examples. In the example of FIGS. 18A-18F, the basin 1800 includes a flexible film layer 1804, a print substrate 1806, side walls 1808, and liquid resin R. The side walls 1808 are coupled to the flexible film layer 1804 at the first end 1803 and the second end 1805 of the basin, respectively, to allow the liquid resin R to be disposed within the basin 1800. The side walls 1808 are configured to support the bottom side of the flexible film layer 1804. The flexible film layer 1804 is attached to the bottom of the basin 1800. In some examples, the flexible film layer 1804 is tensioned to laminate over the bottom of the basin 1800 and the print substrate 1806 such that the top surface of the flexible film layer 1804 remains flat for the printing process. The print substrate 1806 may be a glass material that focuses a curing light 1820 towards the printed part P. That is, the print substrate 1806 may act as a window for the curing light 1820. In each of FIGS. 18A-18F, the build platform 105 includes a printed part P affixed to the build platform 105 interacting with the basin 1800. The mechanical raisers 1807 are configured to raise portions of the flexible film layer 1804 upward in the z-direction. The mechanical raisers 1807 can extend across the width of the basin 1800, or are localized to "poke" selected regions of the flexible film layer 1804.

Figure 18A:
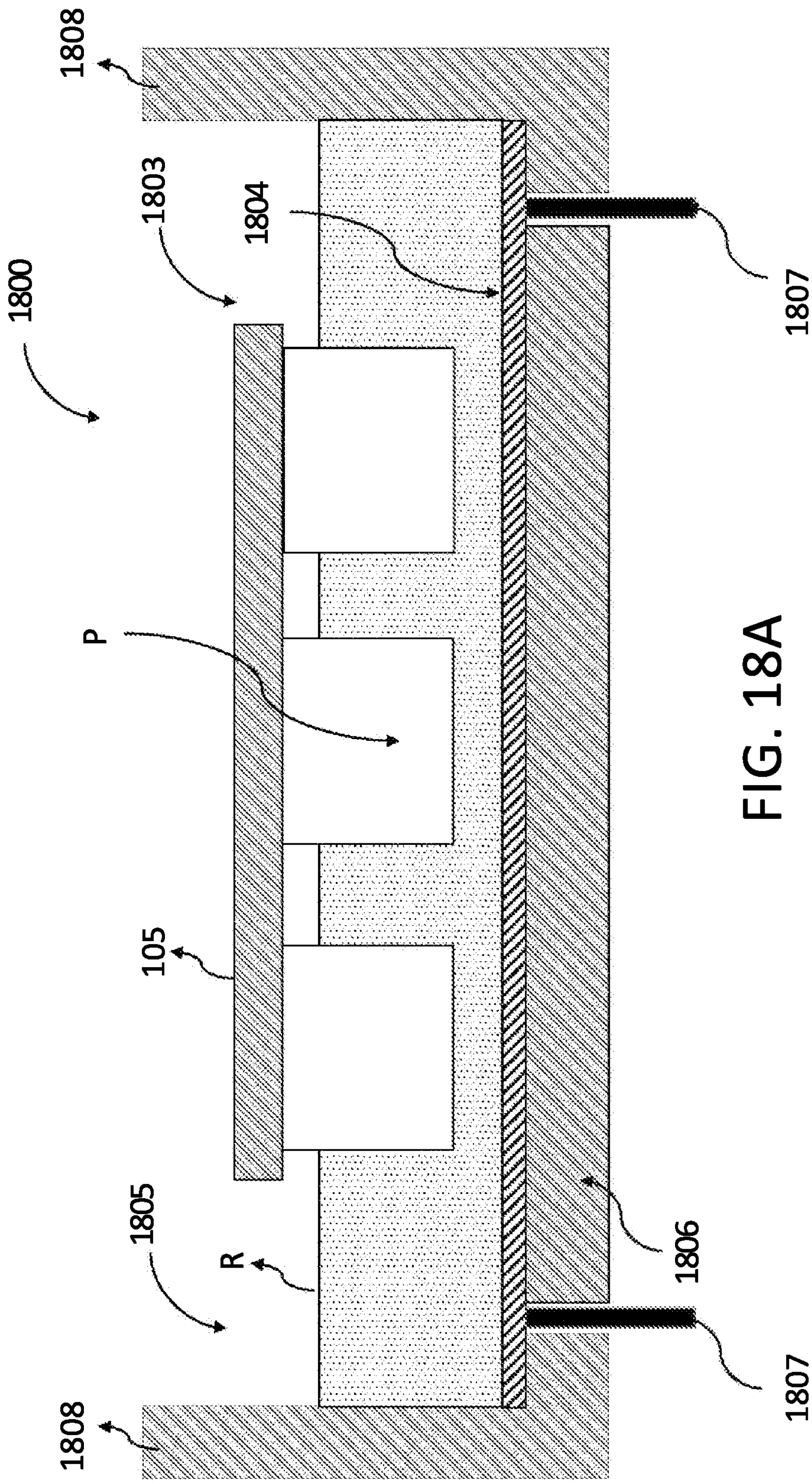
FIGS. 18A-18F illustrate cross-sectional schematic views of an example basin that includes mechanical raisers for assisted peeling, according to some examples.
Figure 18B:
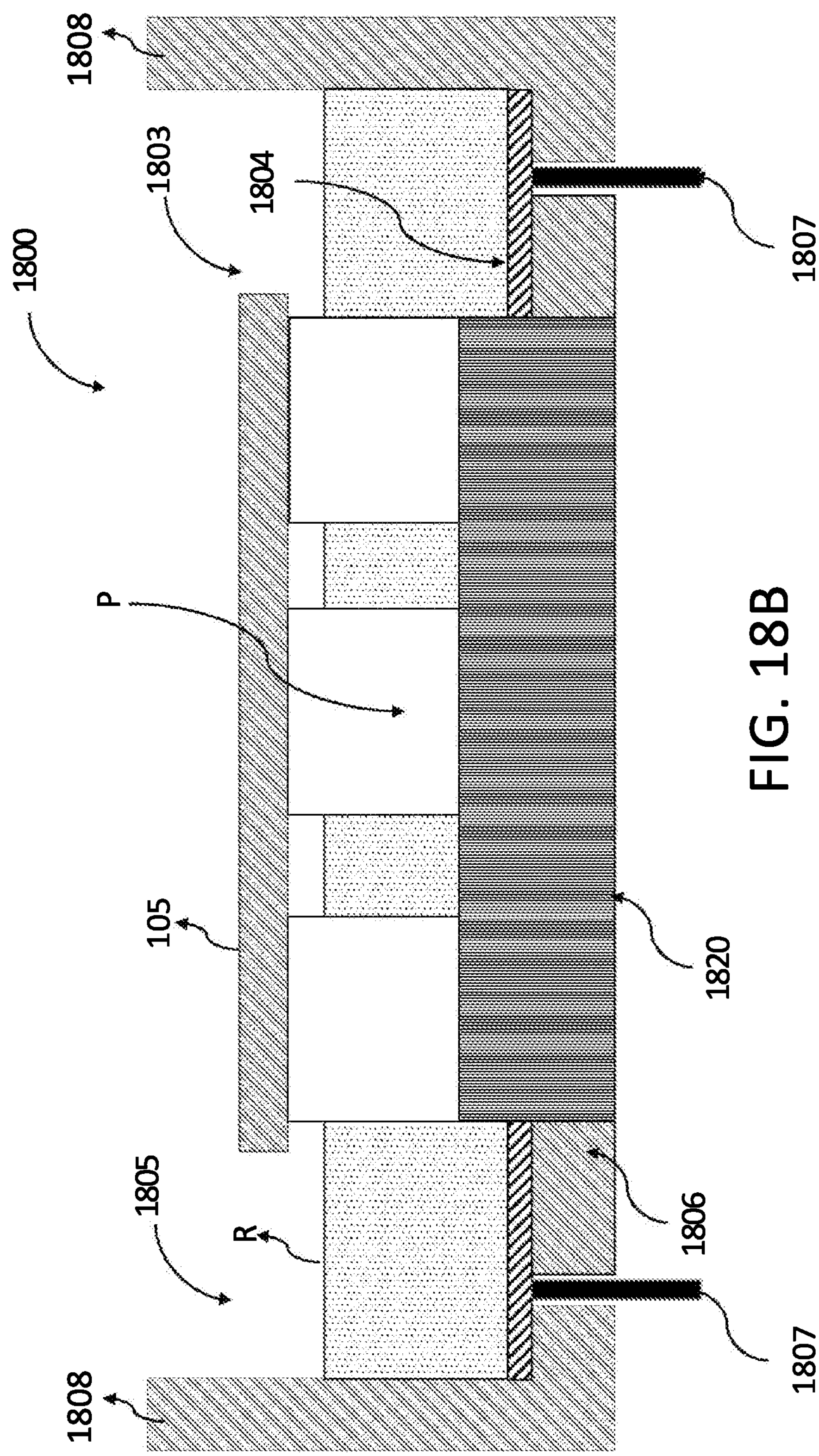
Figure 18C:
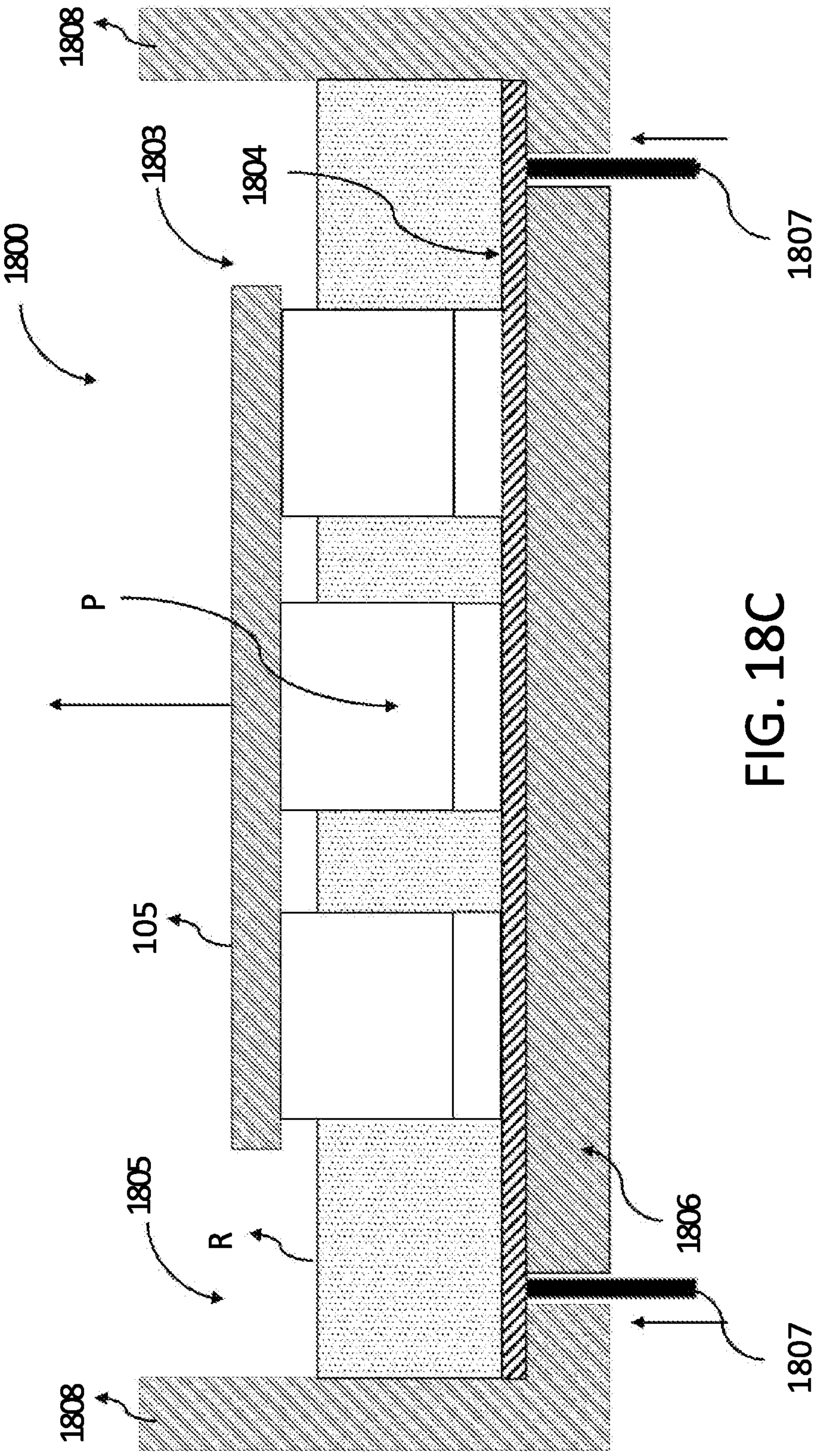
Figure 18D:
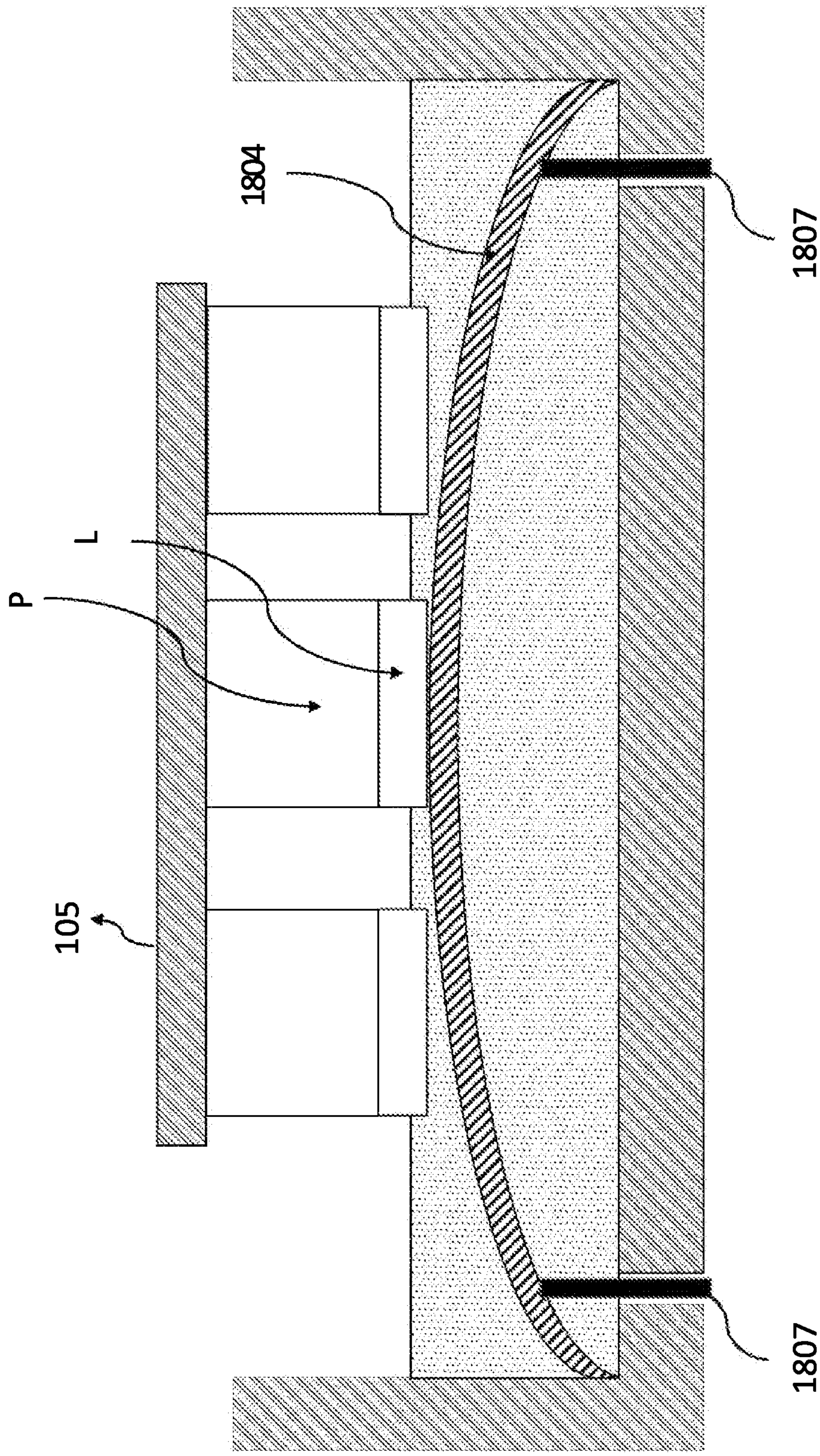

FIG. 18C illustrates an example of the basin 1800 wherein the liquid resin R disposed between the printed part P and the flexible film layer 1804 is cured to form a new part layer L. That is, the curing light 1820 (FIG. 18B) solidifies the liquid resin R onto the bottom surface of the printed part P to form the new print layer L of the printed part P. Notably, the printed part P in FIG. 18C is larger than the printed part P in FIG. 18B by the size of the new print layer L. The new print layer L of the printed part P adheres to the flexible film layer 1804 such that a force must be applied to separate new print layer L and the flexible film layer 1804. Moreover, the mechanical raisers 1807 may be lifted to overcome Stefan forces between the flexible film layer 1804 and the print substrate 1806. The mechanical raisers 1807 may be lifted by any actuation method such as pneumatic, mechanical actuation, hydraulic actuation, etc. After the flexible film layer 1804 overcomes, or partially overcomes, the Stefan forces adhering the flexible film layer 1804 to the print substrate 1806, the build platform 105 may lift the printed part P and the flexible film layer 1804 from the print substrate 1806.

Figure 18E:
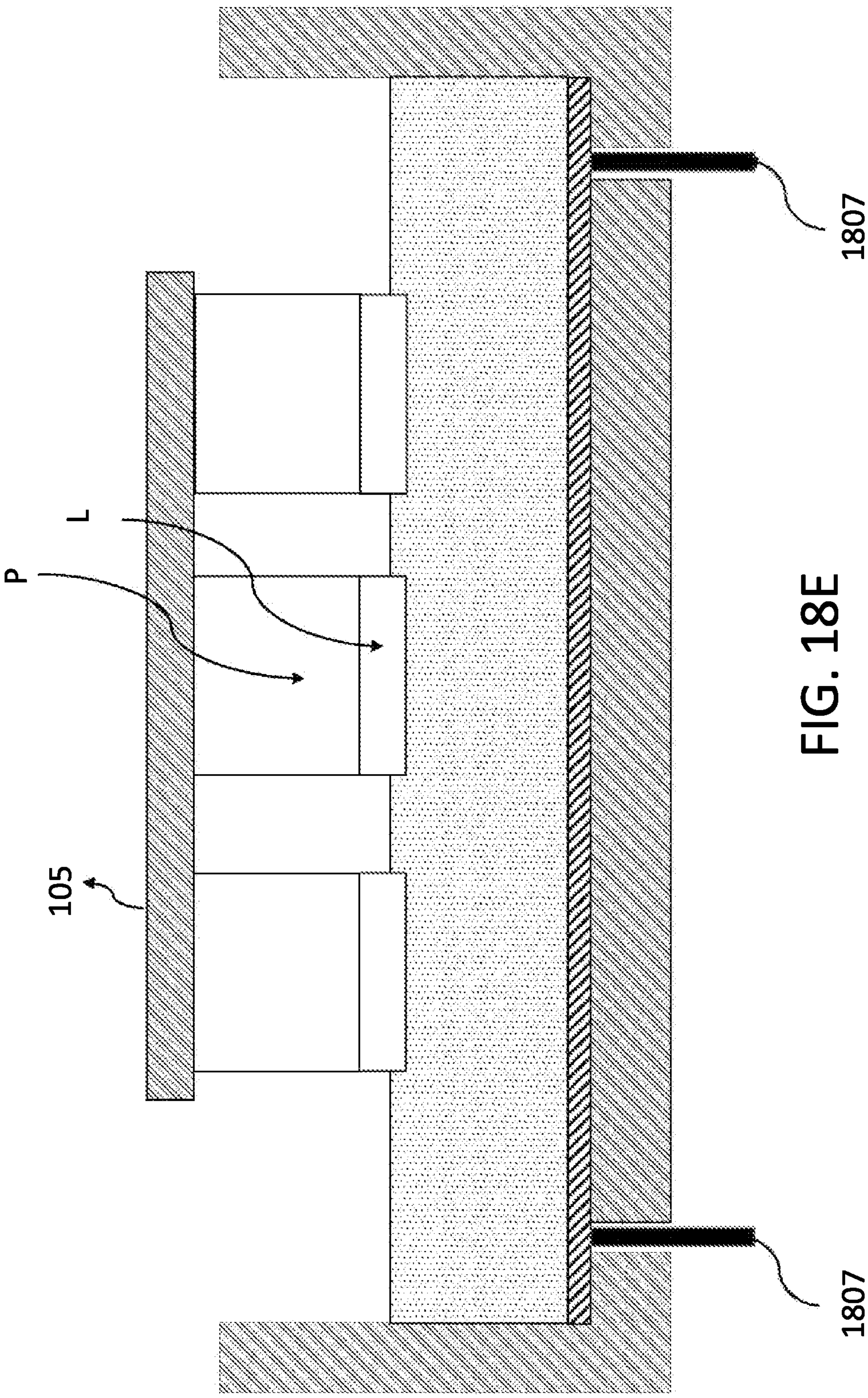
Figure 18F:
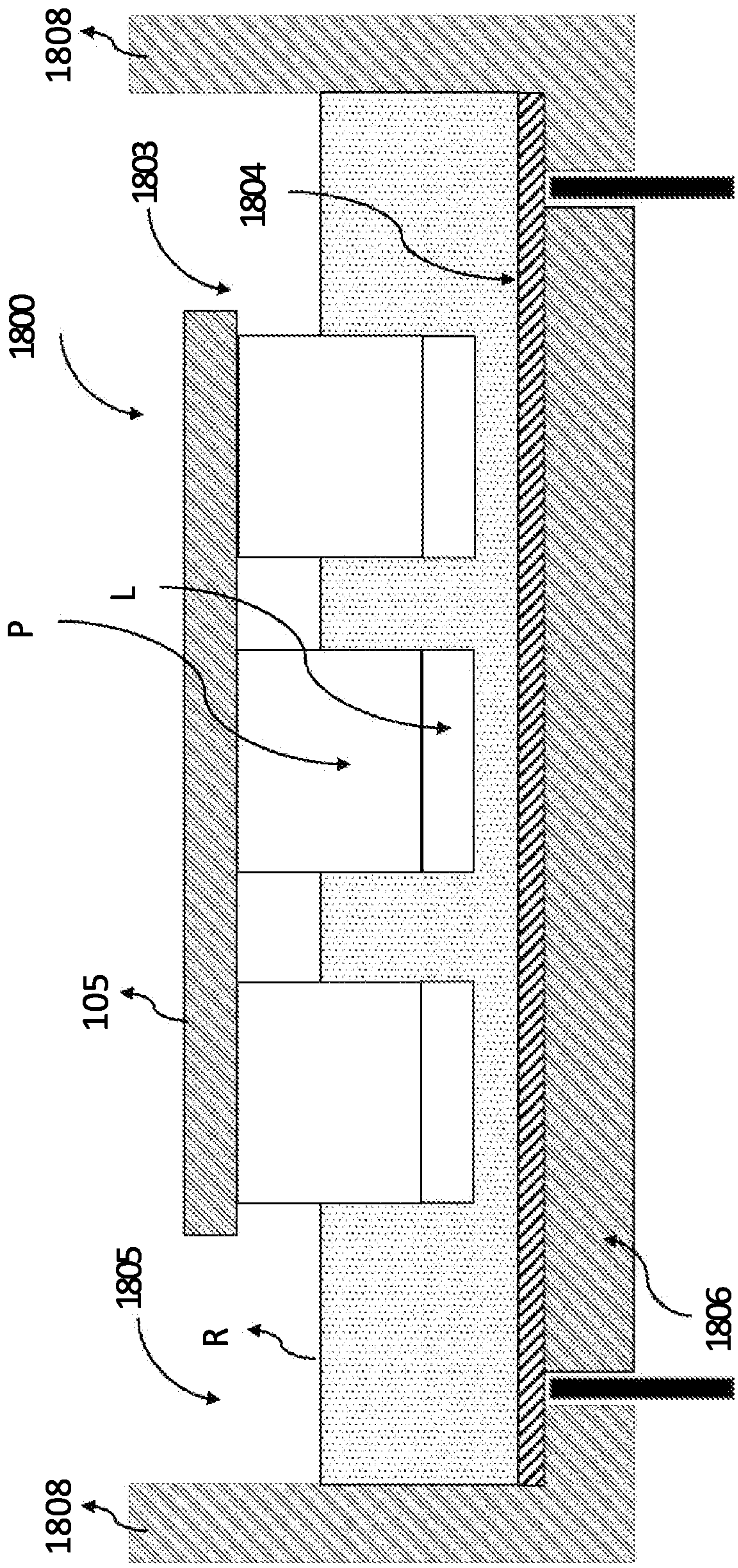

FIG. 18E illustrates an example of the basin 1800 wherein the flexible film layer 1804 fully separates from the printed part and has returned to re-laminate the print substrate 1804. In some examples, the flexible film layer 1804 returns to its initial position (e.g., laying flat on the print substrate 1806) as or after the mechanical raisers 1807 move downward in the z-direction.

Although the aforementioned description and related figures illustrate distinctive peeling systems and processes, in practice, any number of the illustrated peeling systems and processes can be combined to improve peeling efficiency. For example, the mechanical raiser based peeling system illustrated in FIGS. 18A-18E may be combined with the blade 202 in FIGS. 2A-2K, and/or with the pressurization/depressurization assisted peeling in FIGS. 16A-16F, FIGS. 17A-17F.

FIGS. 19A-19J illustrate schematic views of an example basin 1900, according to some examples. In the example of FIGS. 19A-19J, the basin 1900 includes a flexible film layer 1904, a print substrate 1906, side walls 1908, and liquid resin R. The side walls 1908 are coupled to the flexible film layer 1904 at the first end 1903 and the second end 1905 of the basin, respectively, to allow the liquid resin R to be disposed within the basin 1900. The print substrate 1906 includes a textured surface 1906, 1906*a* (e.g., a surface that is not smooth and has particular pattern such as a sinusoidal texture). The textured surface 1906*a* of the print substrate 1906 is configured to reduce the surface area between the print substrate 1906 and the flexible film layer 1904. That is, only the textured part of the textured surface 1906*a* comes into contact with the flexible film layer 1904, thus reducing the contacting surface area between the flexible film layer 1304 and the print substrate 1906. In some embodiments, texture 1906 is introduced to print substrate 1904 to allow sufficient air flow between the film 1902 and the print substrate 1904, mitigating the formation of low-pressure regions as the part lifts with the build platform. The texture 1906 can be designed as described below to produce minimal optical artifacts, lensing of the light, local optically coupled zones, blurring, etc., in order to maintain accurate prints. The reduced surface area reduces Stefan forces adhering the flexible film layer 1904 and the print substrate 1906 together. In each of FIGS. 13A-13E, the build platform 105 includes a printed part P affixed to the build platform 105 interacting with the basin 1900.

In some implementations, the textured surface 1906*a* is produced by injection molding the pattern directly into the print substrate 1906, cutting the pattern (e.g., milling) directly into the print substrate 1906, etching the pattern into the print substrate 1906 (e.g., HF glass etching), applying a film that contains geometric texture onto the print substrate 1906 or the LCD screen (e.g., UV roll to roll embossing, roll to roll hot embossing). Alternatively, the textured surface 1906*a* can be formed directly into a separate film and then casting the film between the print substrate 1906 and the flexible film layer 1904, or applying the film directly onto an LCD screen. In some implementations, the textured surface 1906*a* is directly cast onto the print substrate 1906 or to an LCD screen. The textured surface 1906*a* may be made using rubbery or elastomer material to provide compliance.

In some implementations, the flexible film layer 1904 has limited contact area with the textured surface 1906*a* (e.g., the flexible film layer 1904 rests on top of individual peaks of the textured surface 1906*a*). This can cause parts of the print area to have a different amount of optical coupling, causing power variation. To mitigate this effect, textured surface 1906*a* can have a high frequency pattern to the bottom of the print surface (e.g., stochastic texture), or increasing surface hardness of texture to help reduce surface are contact.

Figure 19A:
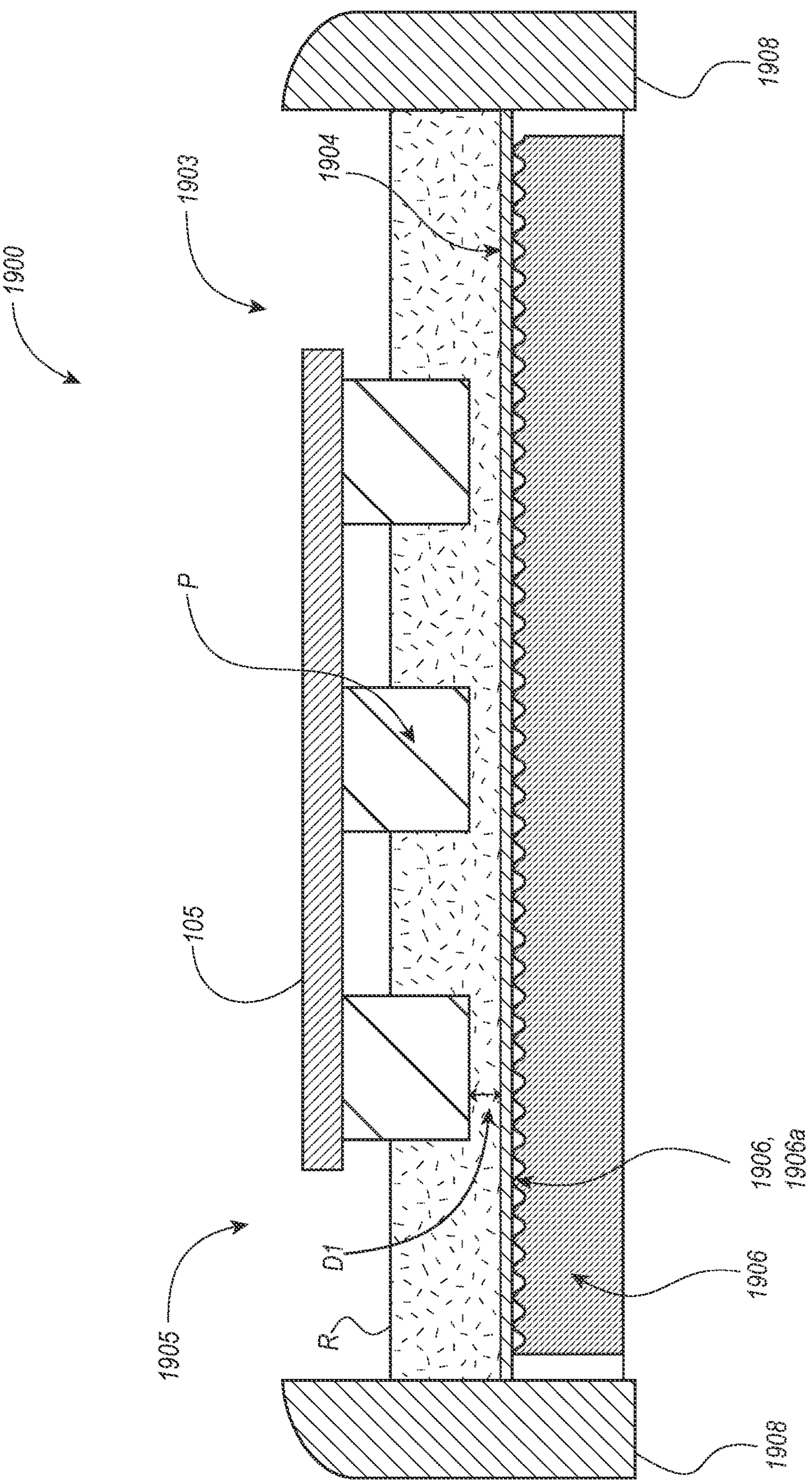
FIGS. 19A-19J illustrate schematic views of a textured surface of a print substrate of an example basin, according to some examples.
Figure 19B:
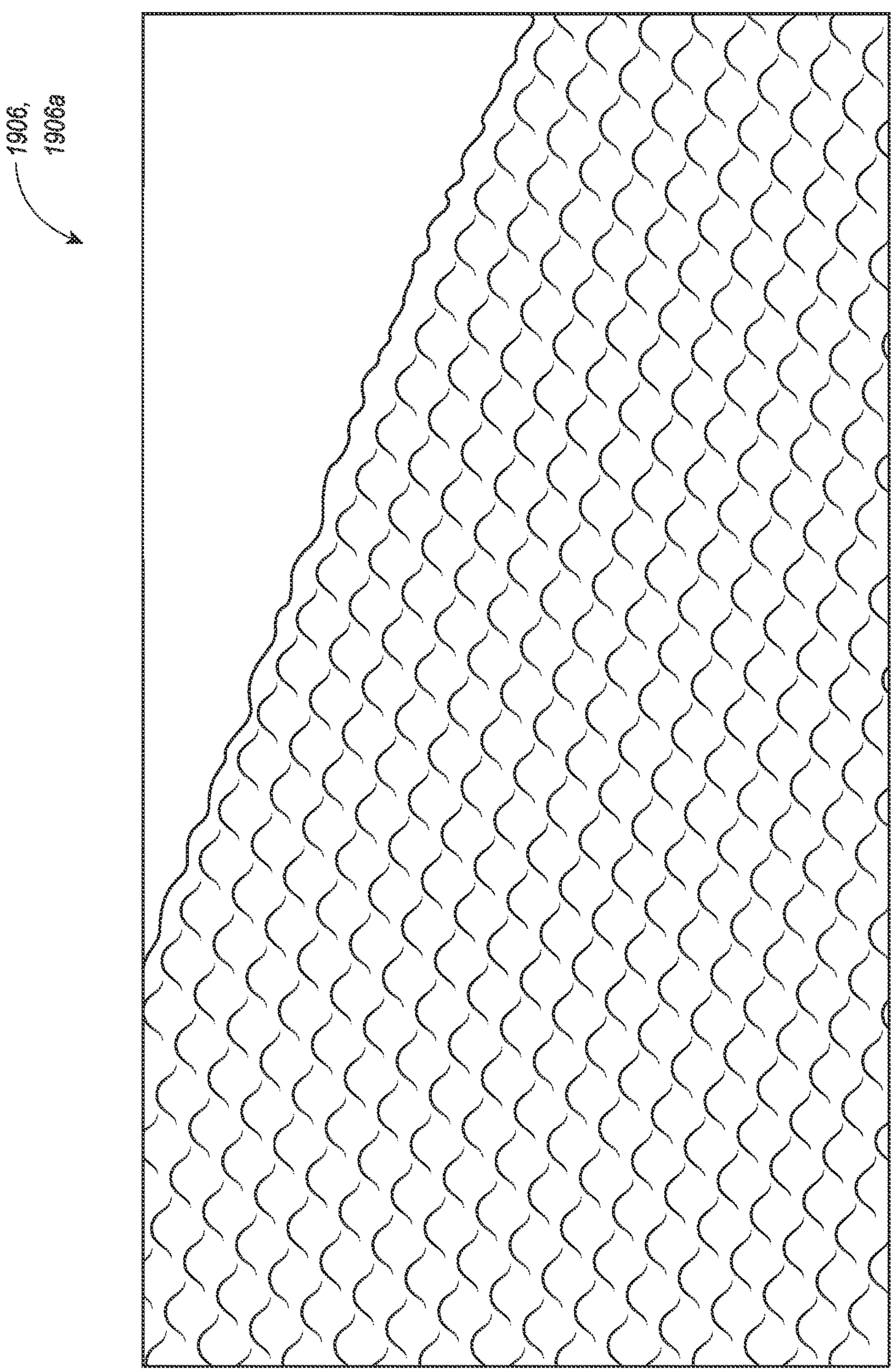

FIG. 19A illustrates an example of the basin 1900 wherein data processing hardware 115 instructs the build platform 105 to position the printed part P at a first vertical position in the basin 1900. At the first vertical position, the bottom surface of the printed part P is positioned a first distance D1 from the flexible film layer 1904 corresponding to one layer thickness. The one layer thickness refers to the depth of liquid resin R disposed between the printed part P and the flexible film layer 1904 for forming a single printed layer L on the bottom surface of the printed part P. The flexible film layer 1904 is highly tensioned and laminates the curing plane. FIG. 19B illustrates a perspective view of the print substrate 1906 that includes the textured surface 1906*a*.

Figure 19C:
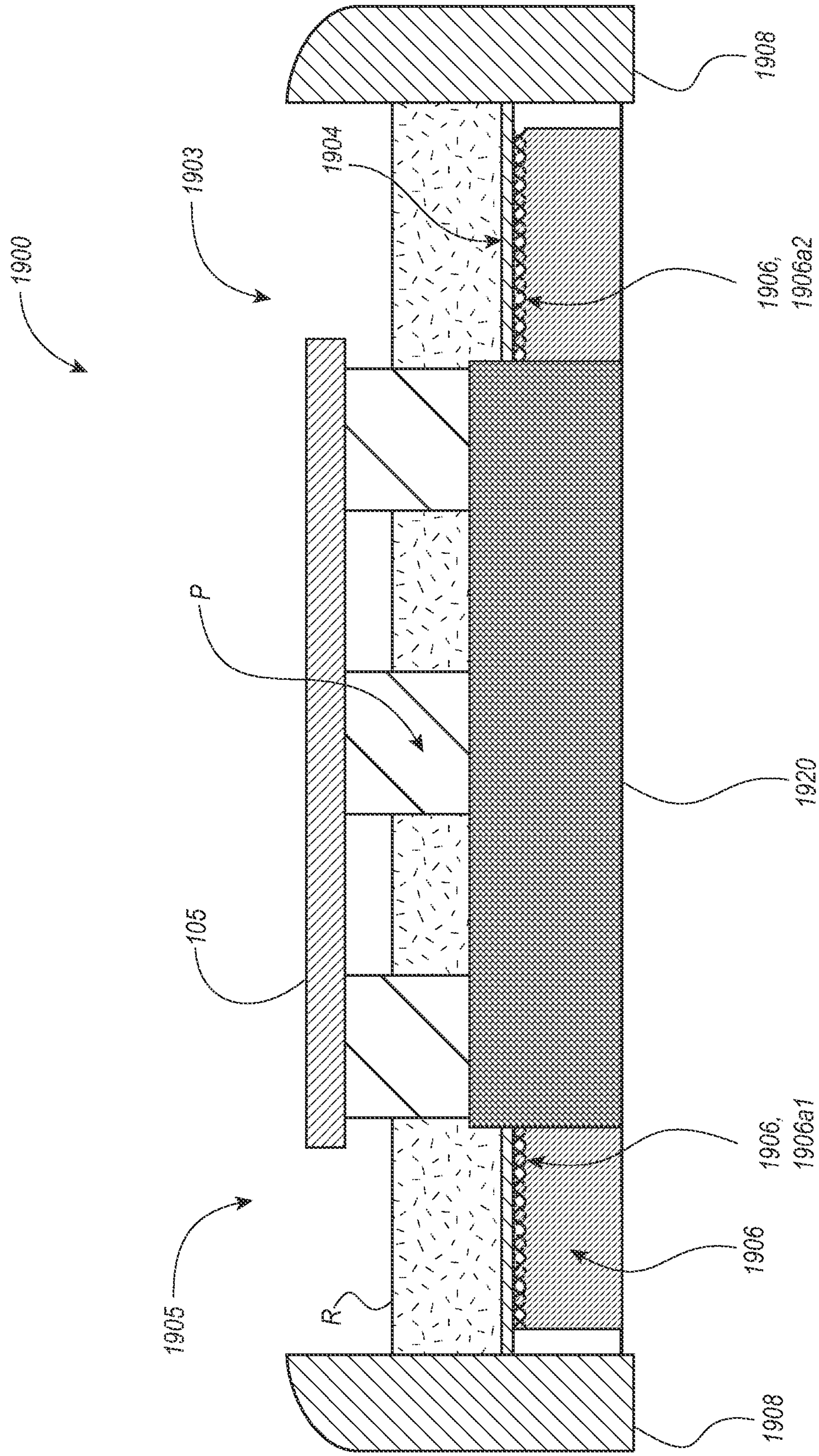

FIG. 19C illustrates an example of the basin 1900 wherein the curing light 1920 exposes the liquid resin R disposed between the printed part P and the flexible film layer 1904. The curing light 1920 cures the liquid resin R from the bottom side of the basin 1300 through the print substrate 1906 and the flexible film layer 1304 creating a new print layer L of the printed part P. Optionally, the data processing hardware 115 may operate the print substrate 1906 while the curing light 1920 exposes the liquid resin R. That is, the print substrate 1906 oscillates from a first sinusoidal position 1906, 1906*a*1 (denoted by the solid line) and a second sinusoidal position 1906, 1906*a*2. The operation of the print substrate 1906 during the curing process is configured to reduce any optical artifacts of the print substrate 1906 (e.g., bumps, folds, etc.). The textured surface 1906*a* can be designed as described below to produce minimal optical artifacts, lensing of the light, local optically coupled zones, blurring, etc., in order to maintain accurate prints.

Figure 19E:
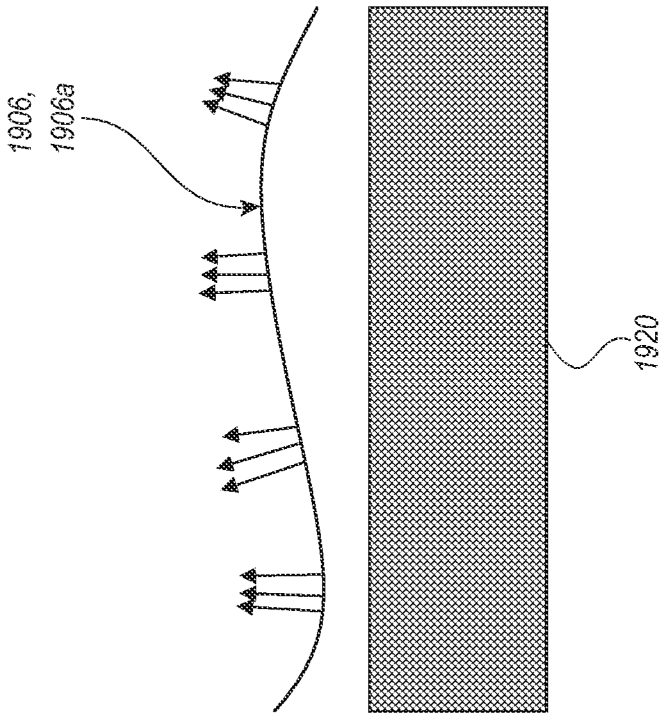
Figure 19D:
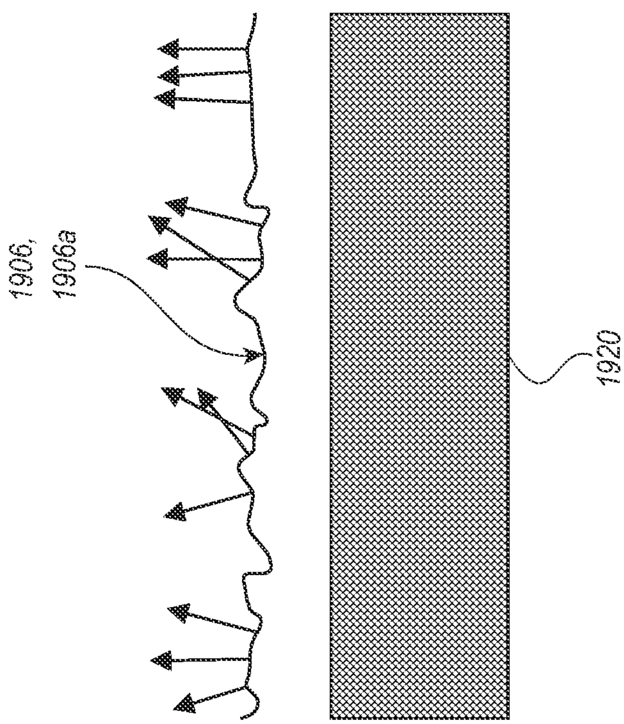

As shown in FIGS. 19D and 19E, the operation frequency of the print substrate 1906 may influence light distortions of the curing light 1920. In the example shown, the print substrate 1906 operates at a high frequency in FIG. 19D and a lower frequency in FIG. 19E. As such, the high frequency creates multiple distortions in the textured surface 1906*a* of the print substrates 1906 thereby distorting the light through the print substrate 1906. The arrows in 19D illustrate the distorted light flow from the curing light 1920 through the print substrate 1906. In contrast, the low frequency operation of the print substrate 1906 reduces distortions in the print substrate 1906 such that the curing light 1920 passes through the print substrate with minimal light distortions. Accordingly, operating the print substrate 1906 lower frequency may reduce light distortion and thereby increase print quality of the printed part P.

Figure 19F:
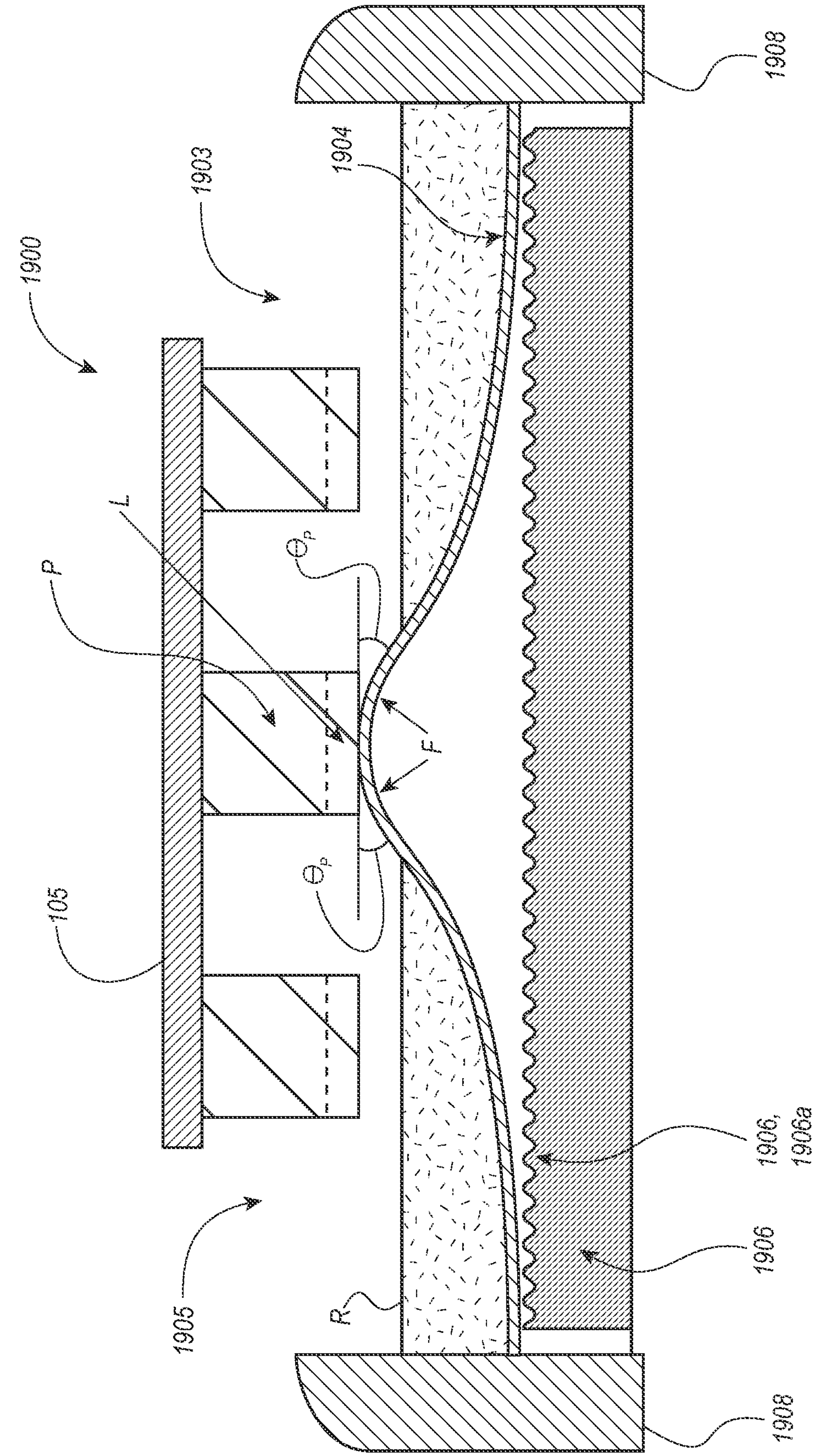

FIG. 19F illustrates an example of the basin 1900 wherein the build platform 105 lifts the printed part P and the flexible film layer from the print substrate 1906. Here, the flexible film layer 1904 may overcome Stefan forces adhering the flexible film layer 1904 and the print substrate 1906 together. In particular, the data processing hardware 115 instructs the build platform 105 to move in the vertical direction away from the print substrate 1906 inducing a peel front F. Here, the printed part P affixed to the build platform 105 and the flexible film layer 1904 adhered to the printed part P are lifted in the vertical direction away from the print substrate 1906. The exact curvature of the flexible film layer 1904 depends on several factors including, but not limited to, geometry of the printed part P, geometric relationship between the blade and the printed part P, and the stiffness, or other characteristics, of the flexible film layer 1904. Notably, raising the build platform 105 induces a high peel angle $\theta_P$ (i.e., angle between the new print layer L of the printed part P and the flexible film layer 1904) on both sides of the flexible film layer 1304. Here, the peeling process initiates on both the first end 1903 and the second end 1905 of the basin and converging in the center of the basin. During the peeling process, the printed part P sticks to and lifts the film 1904 in the z-direction. As a result, a low-pressure region forms between the flexible film layer 1904 and the print substrate 1906, causing high peel force and unpredictable peeling result. The high peel angle $\theta_P$ reduces the force applied to the printed part P (e.g., by localizing the peel front F) providing increased print quality of the printed part P.

Figure 19G:
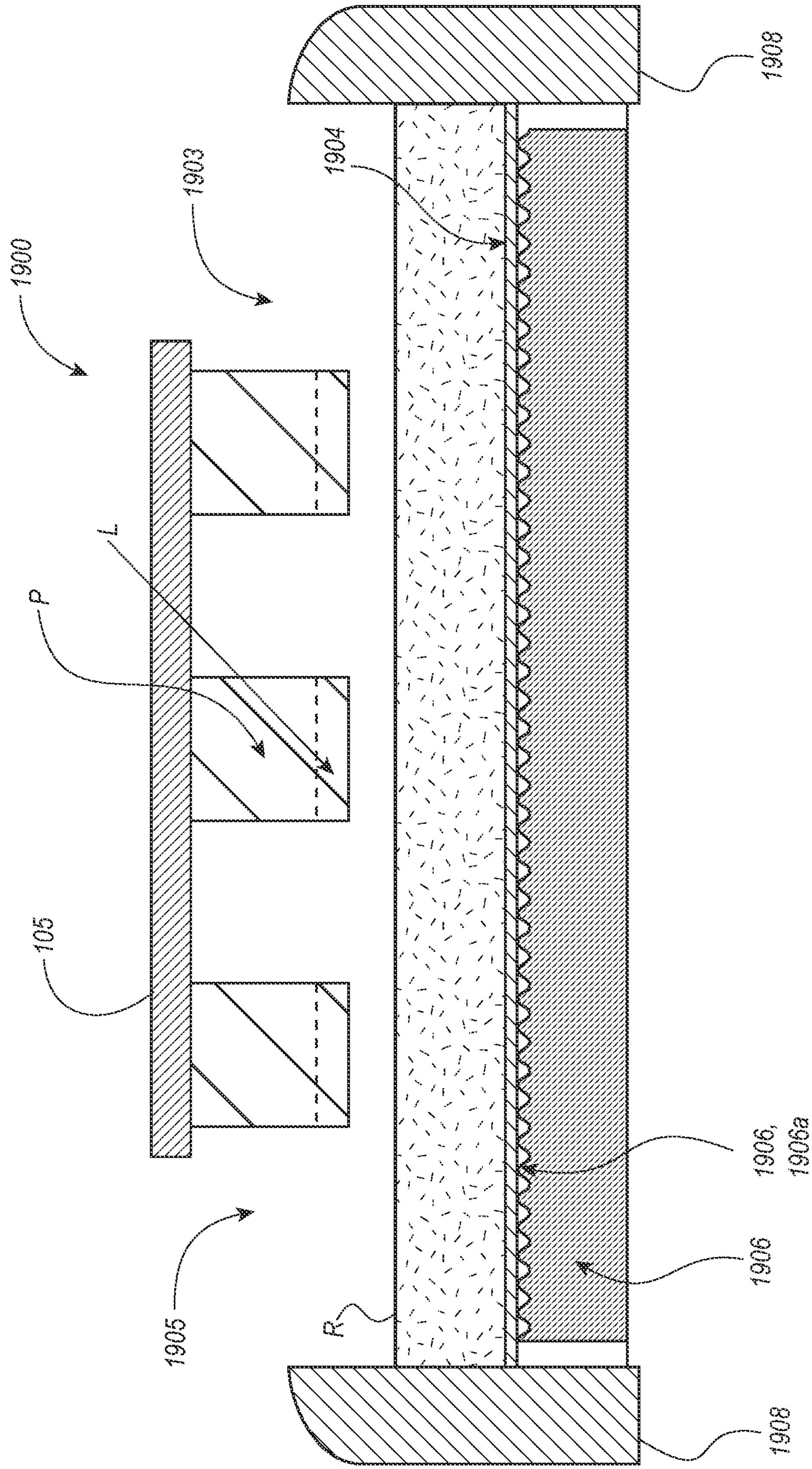

FIG. 19G illustrates an example of the basin 1900 wherein the flexible film layer 1904 fully separates from the printed part. After the flexible film layer 1904 fully separates from the printed part P, flexible film layer 1904 returns back to laying flat on the textured surface 1906*a* of the print substrate 1906.

Figure 19H:
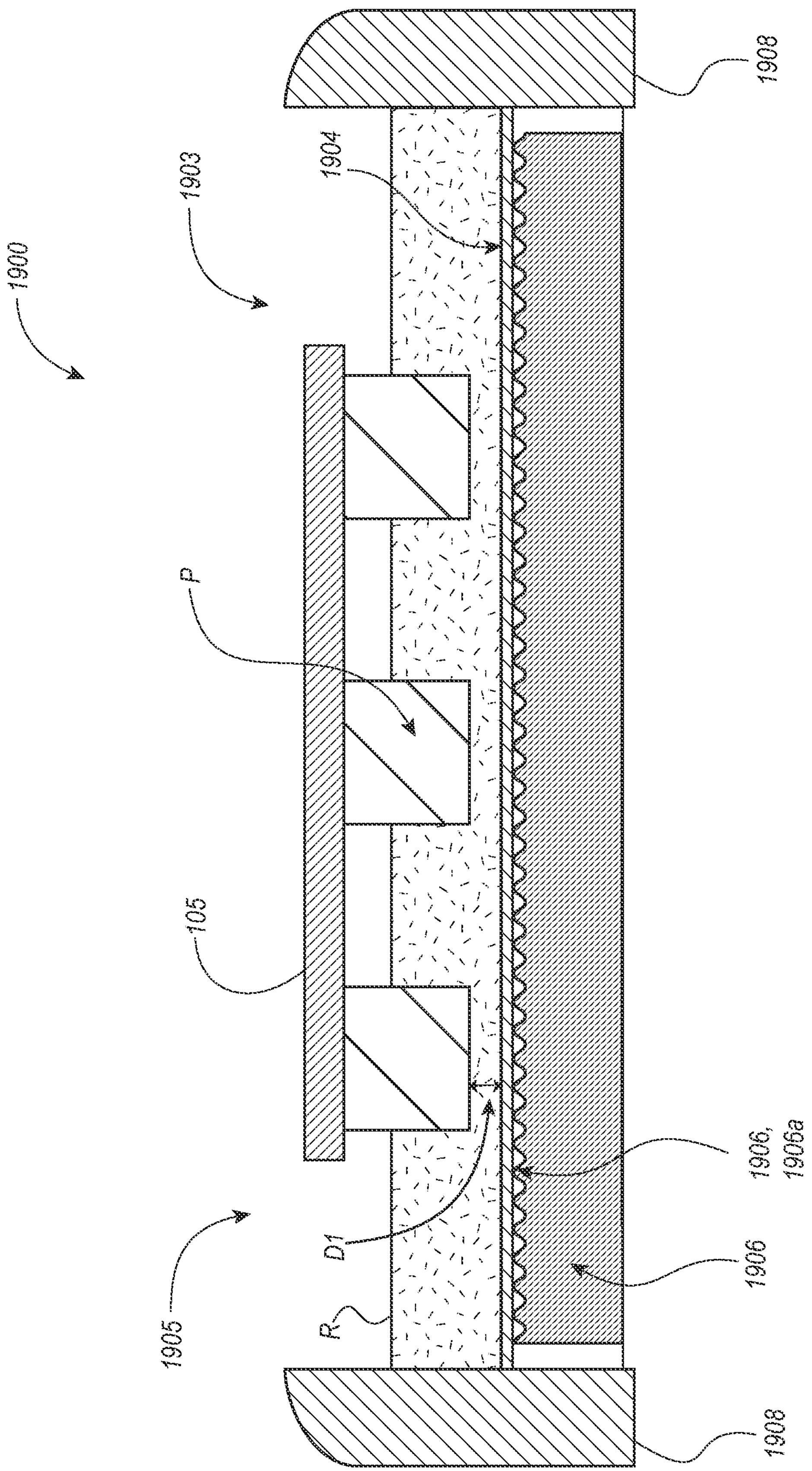

FIG. 19H illustrates an example of the basin 1900 wherein the data processing hardware 115 instructs the build platform 105 to lower the printed part P in the vertical direction towards the flexible film layer 1904, commonly referred to as a "squish" move. The build platform 105 lowers the printed part P such that the bottom surface of the new print layer L of the printed part P is spaced the first distance D1 equal to one layer thickness from the flexible film layer 1904. Notably, the printed part in FIG. 13H is larger than the printed part in FIG. 19A by the thickness of the previously printed layer.

Figure 19I:
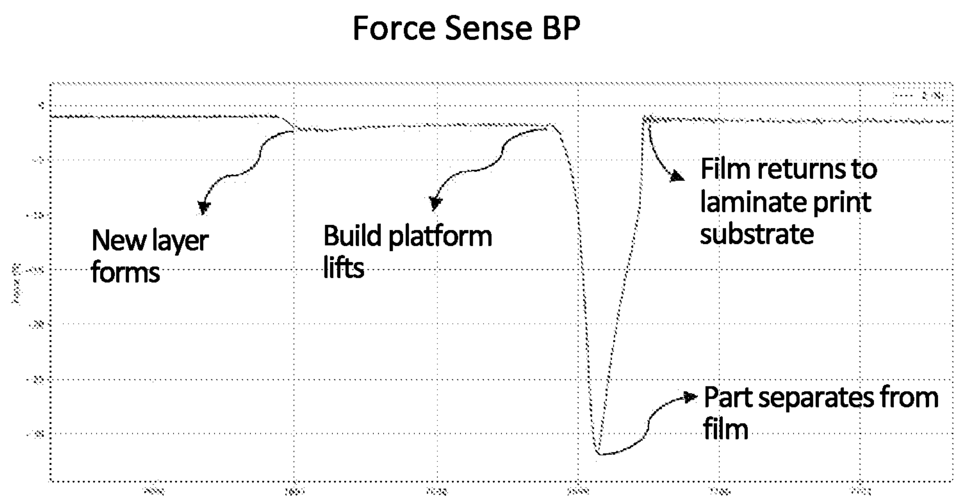
Figure 19J:
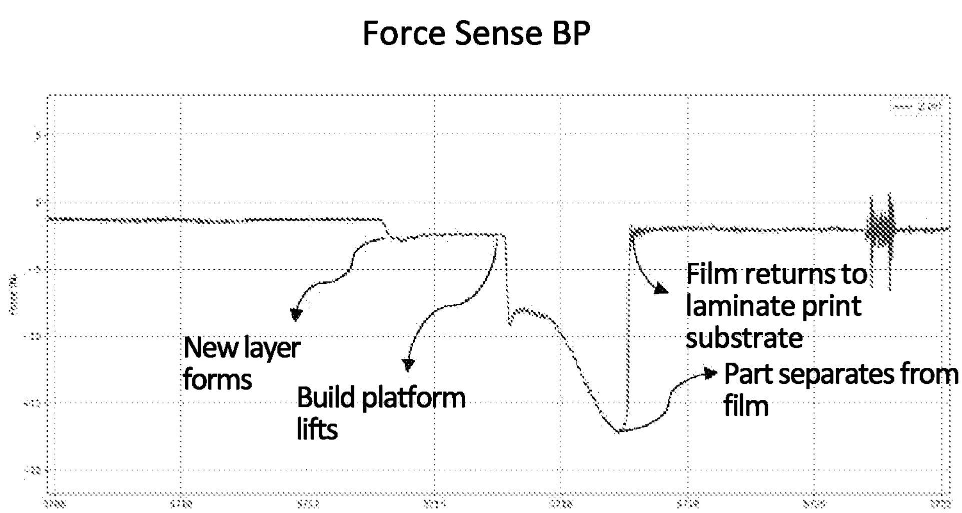

FIG. 19I shows the force experienced by the build platform during the peeling cycle when the flexible film layer 1904 is highly tensioned and laminates the print substrate 1906—a sudden increase in force is experienced by the build platform 105. FIG. 19J, on the other hand, shows the force experience by the build platform 105 when the flexible film layer 1904 is allowed to freely move over the print substrate 1906—a smaller magnitude of force is experienced by the build platform 105 (with a maximum peel force around 17 N), and the increase of force is slower and smoother.

In some implementations, the textured surface 1906*a* has a low frequency geometric pattern (e.g., shallow 2D sine waves) to allow minimal optical distortion while providing airflow. The pattern should be much larger than the expected pixel size in order to minimize optical distortions. Varying the amplitude and period of the pattern allows one to tune the optical lensing that occurs as well as the air flow that is allowed through the system. This pattern can be applied in a grid (rectangular, hex, parallelogram, etc.) or randomly spaced throughout the print substrate 1906. Additional features such as vents or holes can be added outside of the printing area to reduce air flow restriction outside of the printing build area.

A high frequency, stochastic texture can be added to the interface of the flexible film layer 1904 and the print substrate 1906. This texture can be adhered to either the print substrate 1906 (e.g., glass surface of LCD screen) or used as the bottom layer of a laminate stack in flexible film layer 1904. This texture can be formed by coating or embossing a film during the roll-to-roll film processing. Examples include matte films, anti-Newton ring (ANR) films, etc.

In some implementations, the textured surface 1906*a* can be moved during the exposure period (e.g., moving film with the texture) to attenuate any optical effects. The preferred motion is half of a texture period in the X and Y directions, and the period of the motion would be shorter than the exposure period.

If the texture's position in XY is known as well as its optical effect, the exposed image can correct for the distortion. A number of calibration routines such as multipoint can be used to achieve this.

In some embodiments, texture geometry can be variable across the printing region to compensate for known and consistent distortions in the optical system. Optimized textures in the center or edges of the print region could blur a seam line or correct for field curvature.

Such alterations, modifications, and improvements are intended to be part of this disclosure, and are intended to be within the spirit and scope of the invention. Further, though advantages of the present invention are indicated, it should be appreciated that not every example of the technology described herein will include every described advantage. Some implementations may not implement any features described as advantageous herein and in some instances one or more of the described features may be implemented to achieve further implementations. Accordingly, the foregoing description and drawings are by way of example only.

Various aspects of the present disclosure may be used alone, in combination, or in a variety of arrangements not specifically discussed in the implementations described in the foregoing and is therefore not limited in its application to the details and arrangement of components set forth in the foregoing description or illustrated in the drawings. For example, aspects described in one example may be combined in any manner with aspects described in other implementations.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:

curing a photopolymer resin disposed between a first build surface and a flexible film layer to form a print layer of a printed part with the printed part at a first position, wherein the print layer of the printed part defines a second build surface attached to a first side of the flexible film layer facing the printed part, and wherein a second side of the flexible film layer opposite the printed part is attached to a surface of a substrate;

instructing the printed part to move in a direction transverse of the surface of the substrate to a second position while the substrate remains stationary, wherein instructing the printed part to move causes the flexible film layer to move with the printed part in the direction transverse of the surface of the substrate and detach from the substrate; and with the printed part at the second position, translating a peeling mechanism between the second build surface and the flexible film layer to detach the flexible film layer from the second build surface.

2. The method of claim 1, further comprising inducing a peel front between the second build surface and the flexible film layer.

3. The method of claim 2, wherein translating the peeling mechanism between the second build surface and the flexible film layer includes translating the peeling mechanism along the peel front.

4. The method of claim 2, further comprising, before inducing the peel front between the second build surface and the flexible film layer, separating the flexible film layer from the substrate by a poke actuation applied to the second side of the flexible film layer.

5. The method of claim 2, further comprising, before inducing the peel front between the second build surface and the flexible film layer, separating the flexible film layer and the substrate by forced air applied to the second side of the flexible film layer.

6. The method of claim 2, further comprising, before inducing the peel front between the second build surface and the flexible film layer, separating the flexible film layer and the substrate by applying a parallel force to the flexible film layer.

7. The method of claim 2, further comprising flattening the flexible film layer on a substrate by applying a vacuum to the second side of the flexible film layer.

8. The method of claim 2, further comprising flattening the flexible film layer on the substrate by applying tension to opposite ends of the flexible film layer.

9. The method of claim 1, further comprising operating the peeling mechanism from a first peel position on a first side of the printed part to a second peel position on a second side of the printed part.

10. The method of claim 1, wherein after curing the photopolymer resin disposed between the first build surface and the flexible film layer to form the print layer of the printed part:

the photopolymer resin at a first distance from the printed part includes a first temperature and the photopolymer resin at a second distance from the printed part includes a second temperature; and translating the peeling mechanism between the second build surface and the flexible film layer to detach the flexible film layer from the second build surface reduces the first temperature of the photopolymer resin at the first distance from the print part.

11. The method of claim 10, wherein instructing the printed part to the second position induces an oblique peel angle between the print layer and the flexible film layer.

12. The method of claim 1, wherein translating the peeling mechanism between the second build surface and the flexible film layer to detach the flexible film layer from the second build surface reoxygenates the flexible film layer.

13. A system comprising:

a substrate;

a flexible film layer comprising a first side and a second side, wherein the second side faces the substrate and the first side is opposite the second side;

a build surface attached to the first side of the flexible film layer and operable between a first build surface position a first distance from the substrate and a second build surface position a second distance greater than the first distance from the substrate, wherein the second side of the flexible film layer is attached to the substrate with the build surface at the first build surface position and the second side of the flexible film layer is detached from the substrate with the build surface at the second build surface position; and a peel mechanism contacting the flexible film layer and operable to translate along the flexible film layer between the build surface and the substrate with the build surface at the second build surface position.

14. The system of claim 13, wherein the peel mechanism includes a first peel mechanism on the first side of the flexible film layer and a second peel mechanism on the second side of the flexible film layer.

15. The system of claim 13, wherein the peel mechanism includes a vacuum nozzle disposed on the second side of the flexible film layer.

16. The system of claim 13, further comprising data processing hardware in communication with the peel mechanism and controlling a translation of the peel mechanism.

17. The system of claim 13, wherein the build surface is defined by a printed part affixed to a build platform.

18. The system of claim 17, wherein the build platform is configured to move the build surface between the first build surface position and the second build surface position.

19. The system of claim 13, further comprising a curing light located at the second side of the flexible film layer, the curing light configured to cure a liquid resin disposed between the flexible film layer and the build surface.

20. The system of claim 19, wherein curing the liquid resin disposed between the flexible film layer and the build surface attaches the build surface to the flexible film layer.

* * * * *